(12) United States Patent
Ling et al.

(10) Patent No.: US 12,540,120 B2
(45) Date of Patent: Feb. 3, 2026

(54) HERBICIDAL COMPOUNDS

(71) Applicant: SYNGENTA CROP PROTECTION AG, Basel (CH)

(72) Inventors: Kenneth Bruce Ling, Bracknell (GB); Peter Timothy Seden, Bracknell (GB); Christopher John Mathews, Bracknell (GB); Stephen Edward Shanahan, Bracknell (GB); Christiana Kitsiou, Bracknell (GB); John Finney, Bracknell (GB)

(73) Assignee: SYNGENTA CROP PROTECTION AG, Basel (CH)

(*) Notice: Subject to any disclaimer, the term of this patent is extended or adjusted under 35 U.S.C. 154(b) by 923 days.

(21) Appl. No.: 17/627,831

(22) PCT Filed: Jul. 17, 2020

(86) PCT No.: PCT/EP2020/070242
§ 371 (c)(1),
(2) Date: Jan. 18, 2022

(87) PCT Pub. No.: WO2021/009334
PCT Pub. Date: Jan. 21, 2021

(65) Prior Publication Data
US 2022/0281827 A1    Sep. 8, 2022

(30) Foreign Application Priority Data

Jul. 18, 2019    (GB) ...................................... 1910290

(51) Int. Cl.
| C07D 401/10 | (2006.01) |
| A01N 25/32 | (2006.01) |
| A01N 43/58 | (2006.01) |
| A01N 43/653 | (2006.01) |
| A01N 43/713 | (2006.01) |
| A01N 43/76 | (2006.01) |
| A01N 43/78 | (2006.01) |
| A01N 43/84 | (2006.01) |
| A01P 13/00 | (2006.01) |
| A61P 13/00 | (2006.01) |
| C07D 237/04 | (2006.01) |
| C07D 403/10 | (2006.01) |
| C07D 405/10 | (2006.01) |
| C07D 409/10 | (2006.01) |
| C07D 413/10 | (2006.01) |
| C07D 417/10 | (2006.01) |

(52) U.S. Cl.
CPC ........... *C07D 237/04* (2013.01); *A01N 25/32* (2013.01); *A01N 43/58* (2013.01); *A01N 43/653* (2013.01); *A01N 43/713* (2013.01); *A01N 43/76* (2013.01); *A01N 43/78* (2013.01); *A01N 43/84* (2013.01); *A01P 13/00* (2021.08); *C07D 401/10* (2013.01); *C07D 403/10* (2013.01); *C07D 405/10* (2013.01); *C07D 409/10* (2013.01); *C07D 413/10* (2013.01); *C07D 417/10* (2013.01)

(58) Field of Classification Search
CPC .. C07D 237/04; C07D 401/10; C07D 403/10; C07D 405/10; A01P 13/00
See application file for complete search history.

(56) References Cited

U.S. PATENT DOCUMENTS

| 9,944,608 | B2 | 4/2018 | Shanahan et al. |
| 11,330,821 | B2 | 5/2022 | Shanahan et al. |
| 2011/0118118 | A1 | 5/2011 | Lehr et al. |
| 2022/0033436 | A1 | 2/2022 | Mu et al. |
| 2022/0281827 | A1 | 9/2022 | Ling et al. |
| 2022/0281837 | A1 | 9/2022 | Ling et al. |
| 2023/0009626 | A1 | 1/2023 | Chaudhari et al. |
| 2023/0305027 | A1 | 9/2023 | Li et al. |

FOREIGN PATENT DOCUMENTS

| CN | 106536486 | A | 3/2017 |
| JP | 2018-515470 | A | 6/2018 |
| JP | 2022-502455 | A | 1/2022 |
| JP | 2022-502509 | A | 1/2022 |
| JP | 2022-540908 | A | 9/2022 |
| JP | 2024-160261 | A | 11/2024 |
| JP | 2025-13765 | A | 1/2025 |
| JP | 2025-13766 | A | 1/2025 |
| JP | 7679351 | B2 | 5/2025 |
| WO | 2009086041 | A1 | 7/2009 |
| WO | 2011035878 | A1 | 3/2011 |
| WO | 2011045271 | A1 | 4/2011 |
| WO | 2013160126 | A1 | 10/2013 |
| WO | 2016008816 | A1 | 1/2016 |
| WO | 2019137851 | A1 | 7/2019 |
| WO | 2020114869 | A1 | 6/2020 |

OTHER PUBLICATIONS

Written Opinion of the International Searching Authority and International Search Report of PCT/EP2020/070242, mailed Jan. 20, 2021.
GB Search report for GB1910290.4., mailed Dec. 19, 2019.

*Primary Examiner* — Adam C Milligan
*Assistant Examiner* — Karen Cheng
(74) *Attorney, Agent, or Firm* — BakerHostetler; Toni-Junell Herbert

(57) ABSTRACT

The present invention relates to herbicidal substituted phenyl-pyridazine-diones and substituted phenyl-pyridazinone derivatives of formula (I), as well as to processes and intermediates used for the preparation of such derivatives. The invention further extends to herbicidal compositions comprising such derivatives, as well as to the use of such compounds and compositions in controlling undesirable plant growth: in particular the use in controlling weeds, such as broad-leaved dicotyledonous weeds, in crops of useful plants.

25 Claims, No Drawings

HERBICIDAL COMPOUNDS

CROSS-REFERENCE TO RELATED APPLICATIONS

This application is a 371 National Stage application of International Application No. PCT/EP2020/070242 filed Jul. 17, 2020, which claims the benefit of GB 1910290.4, filed Jul. 18, 2019, the entire contents of these applications are hereby incorporated by reference.

The present invention relates to herbicidal substituted phenyl-pyridazine-diones and substituted phenyl-pyridazinone derivatives of formula (I), as well as to processes and intermediates used for the preparation of such derivatives. The invention further extends to herbicidal compositions comprising such derivatives, as well as to the use of such compounds and compositions in controlling undesirable plant growth: in particular the use in controlling weeds, such as broad-leaved dicotyledonous weeds, in crops of useful plants.

Herbicidal pyridazinones are known from WO2009/086041. In addition, herbicidal 5/6 membered heterocyclyl-substituted pyridazinones are known from WO 2011/045271. Whilst WO2013/160126 describes indolyl-pyridazinone derivatives, which exhibit herbicidal activity.

The present invention is based on the finding substituted phenyl-pyridazine-diones and substituted phenyl-pyridazinone derivatives of formula (I), exhibit surprisingly good herbicidal activity.

Thus, in a first aspect there is provided a compound of formula (I)

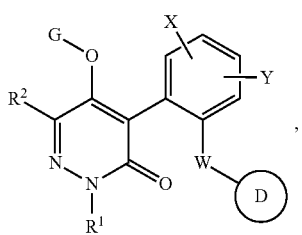

(I)

or a salt or N-oxide thereof, wherein $R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$ alkyl, $C_2$-$C_4$alkenyl, $C_1$-$C_4$haloalkyl, cyano-$C_1$-$C_4$alkyl, $C_2$-$C_4$ haloalkenyl, $C_2$-$C_4$alkynyl and $C_2$-$C_4$haloalkynyl;

$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl-, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$ $C_1$-$C_6$alkyl, amino, $C_1$-$C_6$alkylamino, $C_1$-$C_6$dialkylamino, —C($C_1$-$C_3$alkyl)=N—O—$C_1$-$C_3$alkyl and $C_2$-$C_6$ haloalkynyl; G is hydrogen, or C(O)$R^3$;

$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;

each $R^4$ and $R^5$ are independently selected from the group consisting of hydrogen, $C_1$-$C_6$ alkyl, $C_1$-$C_6$ alkoxy, and $C_3$-$C_6$cycloalkyl, or $R^4$ and $R^5$ together can form a morpholinyl ring; and, each $R^{4a}$ and $R^{5a}$ are independently selected from the group consisting of $C_1$-$C_6$ alkoxy, and $C_3$-$C_6$cycloalkyl, or $R^{4a}$ and $R^{5a}$ together can form a morpholinyl ring; and, $R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;

X and Y are each independently hydrogen, $C_1$-$C_3$ alkyl, cyclopropyl, $C_1$-$C_3$ alkoxy, $C_1$-$C_3$haloalkyl, $C_1$-$C_3$haloalkoxy, or halogen;

D is a substituted monocyclic heteroaryl ring containing 1, 2, or 3 heteroatoms independently selected from oxygen, nitrogen and sulphur, substituted on at least one ring carbon atom with $R^8$ and/or on at least one ring nitrogen atom with $R^9$;

at least one $R^8$ is selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; and a ring system selected from the group consisting of a phenyl ring, a 5-6-membered heteroaryl ring and a 3-6-membered heterocyclyl ring, wherein said ring system is substituted by 0 to 5 $R^{16}$;

at least one $R^9$ is selected from the group consisting of $C_5$-$C_6$alkyl, $C_5$-$C_6$haloalkyl, $C_3$-$C_6$-cycloalkyl, $C_1$-$C_3$alkoxy-$C_3$alkyl-, $C_3$alkoxy-$C_1$-$C_2$alkyl-, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$;

m is an integer of 0, 1, or 2;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

or D is a phenyl ring substituted by at least one $R^8$; and,

W is either

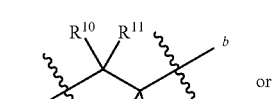

W1

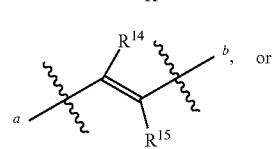

W2

-continued

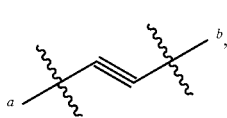

wherein:
"a" denotes the point of attachment to the phenyl-pyridazine dione/phenyl-pyridazinone moiety,
"b" denotes the point of attachment to ring D,
$R^{10}$, $R^{12}$, $R^{14}$ and $R^{15}$ are each independently hydrogen, $C_1$-$C_3$alkyl, or $C_1$-$C_3$haloalkyl;
or $R^{10}$ and $R^{12}$ together with the carbon atoms to which they are joined forma a $C_3$-$C_6$ carbocyclic ring; and
$R^{11}$ and $R^{13}$ are each independently hydrogen, halogen, $C_1$-$C_3$alkyl, or $C_1$-$C_3$haloalkyl; provided that when one of $R^{11}$ or $R^{13}$ is halogen, $C_1$-$C_3$alkyl or $C_1$-$C_3$ haloalkyl, the other is hydrogen.

In a second aspect there is provided a compound of formula (I)

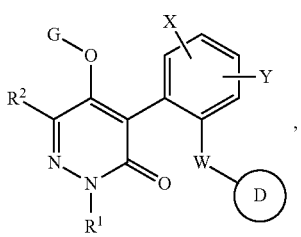

or a salt or N-oxide thereof, wherein
$R^1$ is selected from the group consisting of $C_1$-$C_4$ alkyl, $C_3$-$C_6$cycloalkyl, $C_3$-$C_6$alkoxy, $C_1$-$C_2$ alkoxy-$C_1$-$C_2$ alkyl, $C_2$-$C_4$ alkenyl, $C_1$-$C_4$ haloalkyl, cyano-$C_1$-$C_4$alkyl, $C_2$-$C_4$ haloalkenyl, $C_2$-$C_4$ alkynyl and $C_2$-$C_4$ haloalkynyl;
$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$ alkenyl, $C_2$-$C_6$ haloalkenyl, $C_2$-$C_6$ alkynyl, $C_1$-$C_6$hydroxyalkyl-, $C_1$-$C_6$alkylcarbonyl-, —S(O)$_m$ $C_1$-$C_6$alkyl, —NR$^4$R$^5$, —C(C$_1$-$C_3$alkyl)=N—O—$C_1$-$C_3$alkyl and $C_2$-$C_6$ haloalkynyl;
G is hydrogen, or C(O)R$^3$;
$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more R$^6$;
each $R^4$ and $R^5$ are independently selected from the group consisting of hydrogen, $C_1$-$C_6$ alkyl, $C_1$-$C_6$ alkoxy, and $C_3$-$C_6$cycloalkyl, or $R^4$ and $R^5$ together can form a morpholinyl ring; and,
$R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;
X is cyclopropyl (preferably, X is ortho with respect to the pyridazinone/pyridazine-dione moiety);
Y is hydrogen, $C_1$-$C_3$ alkyl, cyclopropyl, $C_1$-$C_3$ alkoxy, $C_1$-$C_3$haloalkyl, $C_1$-$C_3$haloalkoxy, or halogen (Y is ortho (3-position) with respect to the —W-D moiety).

D is a substituted or unsubstituted monocyclic heteroaryl ring containing 1, 2, or 3 heteroatoms independently selected from oxygen, nitrogen and sulphur, and wherein when D is substituted it is substituted on at least one ring carbon atom with R$^8$ and/or on a ring nitrogen atom with R$^9$;
each $R^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alk-ylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl) amino, $C_1$-$C_6$alkoxyamino, $C_1$-$C_6$alkoxy($C_1$-$C_6$alkyl) amino, $C_1$-$C_6$haloalkoxyamino, $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 R$^{16}$;
m is an integer of 0, 1, or 2 (preferably 0 or 2); and
each $R^9$ is independently $C_1$-$C_6$alkyl, $C_1$-$C_6$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 R$^{16}$;
each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;
or D is a substituted or unsubstituted phenyl ring, and wherein when said phenyl ring is substituted it is substituted by 1 to 5 R$^8$;
and, W is either

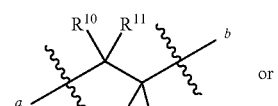

or

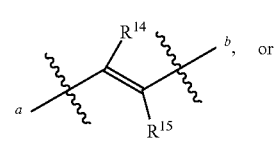

-continued

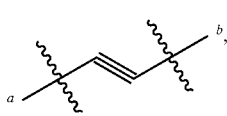

wherein
"a" denotes the point of attachment to the phenyl-pyridazine dione/phenyl-pyridazinone moiety,
"b" denotes the point of attachment to ring D,
$R^{10}$, $R^{12}$, $R^{14}$ and $R^{15}$ are each independently hydrogen, $C_1$-$C_3$alkyl, or $C_1$-$C_3$haloalkyl;
or $R^{10}$ and $R^{12}$ together with the carbon atoms to which they are joined forma a $C_3$-$C_6$ carbocyclic ring; and
$R^{11}$ and $R^{13}$ are each independently hydrogen, halogen, $C_1$-$C_3$alkyl, or $C_1$-$C_3$haloalkyl; provided that when one of $R^{11}$ or $R^{13}$ is halogen, $C_1$-$C_3$alkyl or $C_1$-$C_3$ haloalkyl, the other is hydrogen.

In a third aspect there is provided a compound of formula (I)

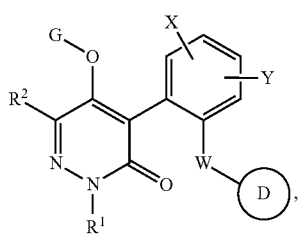

or a salt or N-oxide thereof, wherein
$R^1$ is selected from the group consisting of $C_1$-$C_4$ alkyl, $C_3$-$C_6$cycloalkyl, $C_3$-$C_6$alkoxy, $C_1$-$C_2$ alkoxy-$C_1$-$C_2$ alkyl, $C_2$-$C_4$ alkenyl, $C_1$-$C_4$ haloalkyl, cyano-$C_1$-$C_4$alkyl, $C_2$-$C_4$ haloalkenyl, $C_2$-$C_4$ alkynyl and $C_2$-$C_4$ haloalkynyl;
$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$ alkenyl, $C_2$-$C_6$ haloalkenyl, $C_2$-$C_6$ alkynyl, $C_1$-$C_6$hydroxyalkyl-, $C_1$-$C_6$alkylcarbonyl-, —S(O)$_m$ $C_1$-$C_6$alkyl, —NR$^4$R$^5$, —C(C$_1$-C$_3$alkyl)=N—O—C$_1$-$C_3$alkyl and $C_2$-$C_6$ haloalkynyl;
G is hydrogen, or C(O)R$^3$;
$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more R$^6$;
each R$^4$ and R$^5$ are each independently selected from the group consisting of hydrogen, $C_1$-$C_6$ alkyl, $C_1$-$C_6$ alkoxy, and $C_3$-$C_6$cycloalkyl, or R$^4$ and R$^5$ together can form a morpholinyl ring; and,
R$^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy.
X is hydrogen, $C_1$-$C_3$ alkyl, cyclopropyl, $C_1$-$C_3$ alkoxy, $C_1$-$C_3$haloalkyl, $C_1$-$C_3$haloalkoxy, or halogen (preferably, X is ortho with respect to the pyridazinone/pyridazine-dione moiety);
Y is cyclopropyl (preferably, Y is ortho with respect to the —W-D moiety);

D is a substituted or unsubstituted monocyclic heteroaryl ring containing 1, 2, or 3 heteroatoms independently selected from oxygen, nitrogen and sulphur, and wherein when D is substituted it is substituted on at least one ring carbon atom with R$^8$ and/or on a ring nitrogen atom with R$^9$;
each R$^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)OC$_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alky- lcarbonyl($C_1$-$C_6$alkyl)amino-, $C_1$-$C_6$haloalkylcarbonyl-amino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 R$^{16}$;
m is an integer of 0, 1, or 2; and
each R$^9$ is independently $C_1$-$C_6$alkyl, $C_1$-$C_6$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 R$^{16}$;
each R$^{16}$ is independently halogen, cyano, $C_1$-$C_6$alkyl, $C_1$-$C_6$haloalkyl, $C_1$-$C_6$alkoxy or $C_1$-$C_6$haloalkoxy;
or D is a substituted or unsubstituted phenyl ring, and wherein when said phenyl ring is substituted it is substituted by 1 to 5 R$^8$; and,
W is either

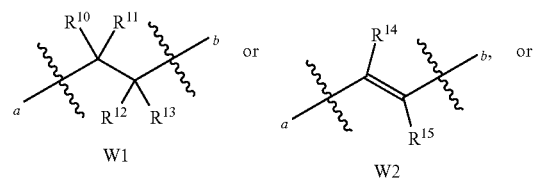

-continued

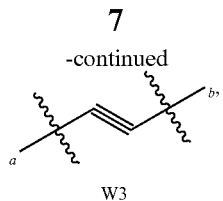

W3 wherein
"a" denotes the point of attachment to the phenyl-pyridazine dione/phenyl-pyridazinone moiety,
"b" denotes the point of attachment to ring D,
$R^{10}$, $R^{12}$, $R^{14}$ and $R^{15}$ are each independently hydrogen, $C_1$-$C_3$alkyl, or $C_1$-$C_3$haloalkyl;
or $R^{10}$ and $R^{12}$ together with the carbon atoms to which they are joined forma a $C_3$-$C_6$ carbocyclic ring;
$R^{11}$ and $R^{13}$ are each independently hydrogen, halogen, $C_1$-$C_3$alkyl, or $C_1$-$C_3$haloalkyl;
provided that when one of $R^{11}$ or $R^{13}$ is halogen, $C_1$-$C_3$alkyl or $C_1$-$C_3$ haloalkyl, the other is hydrogen.

Compounds of Formula (I) may contain asymmetric centres and may be present as a single enantiomer, pairs of enantiomers in any proportion or, where more than one asymmetric centre are present, contain diastereoisomers in all possible ratios. Typically one of the enantiomers has enhanced biological activity compared to the other possibilities.

Similarly, where there are di-substituted alkenes, these may be present in E or Z form or as mixtures of both in any proportion.

Furthermore, compounds of formula (I) may be in equilibrium with alternative tautomeric forms. For example, a compound of formula (I-i), i.e. a compound of formula (I) wherein $R^2$ is hydrogen and G is hydrogen, can be drawn in at least three tautomeric forms:

or $C_2$-$C_4$alkynyl, more specifically vinyl, allyl, ethynyl, propargyl or prop-1-ynyl. Alkenyl and alkynyl moieties can contain one or more double and/or triple bonds in any combination; but preferably contain only one double bond (for alkenyl) or only one triple bond (for alkynyl).

Preferably, the term cycloalkyl refers to cyclopropyl, cyclobutyl, cyclopentyl or cyclohexyl.

In the context of the present specification the term "aryl" preferably means phenyl. The term "heteroaryl" as used herein means an aromatic ring system containing at least one ring heteroatom and consists of a single ring. Preferably, single rings will contain 1, 2 or 3 ring heteroatoms selected independently from nitrogen, oxygen and sulfur. Typically "heteroaryl" is furyl, thienyl, pyrrolyl, pyrazolyl, imidazolyl, 1,2,3-triazolyl, 1,2,4-triazolyl, oxazolyl, isoxazolyl, thiazolyl, isothiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyrimidinyl, pyridazinyl, pyrazinyl, 1,2,3-triazinyl, 1,2,4-triazinyl, or 1,3,5-triazinyl.

Heterocyclyl groups and heterocyclic rings (either alone or as part of a larger group, such as heterocyclyl-alkyl-) are ring systems containing at least one heteroatom and can be in mono- or bi-cyclic form. Preferably, heterocyclyl groups will contain up to two heteroatoms which will preferably be chosen from nitrogen, oxygen and sulfur. Examples of heterocyclic groups include oxetanyl, thietanyl, azetidinyl and 7-oxa-bicyclo[2.2.1]hept-2-yl. Heterocyclyl groups containing a single oxygen atom as heteroatom are most preferred. The heterocyclyl groups are preferably 3- to 8-membered, more preferably 3- to 6-membered monocyclic rings, and may be fully or partially saturated.

Halogen (or halo) encompasses fluorine, chlorine, bromine or iodine. The same correspondingly applies to halogen in the context of other definitions, such as haloalkyl or halophenyl.

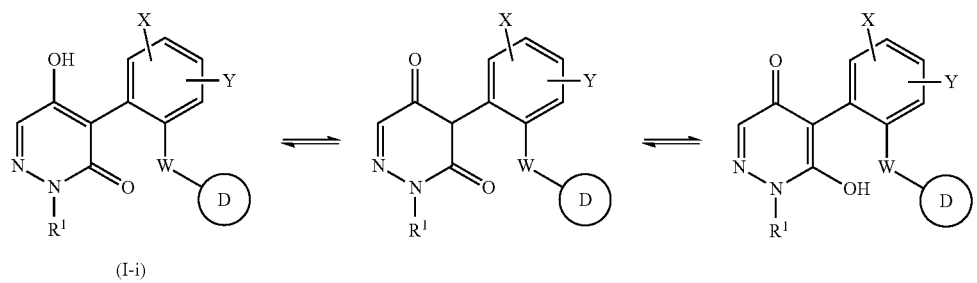

(I-i)

It should be appreciated that all tautomeric forms (single tautomer or mixtures thereof), racemic mixtures and single isomers are included within the scope of the present invention.

Each alkyl moiety either alone or as part of a larger group (such as alkoxy, alkylthio, alkoxycarbonyl, alkylcarbonyl, alkylaminocarbonyl, or dialkylaminocarbonyl, et al.) may be straight-chained or branched. Typically, the alkyl is, for example, methyl, ethyl, n-propyl, isopropyl, n-butyl, sec-butyl, isobutyl, tert-butyl, n-pentyl, neopentyl, or n-hexyl. The alkyl groups are generally $C_1$-$C_6$alkyl groups (except where already defined more narrowly), but are preferably $C_1$-$C_4$alkyl or $C_1$-$C_3$alkyl groups, and, more preferably, are $C_1$-$C_2$alkyl groups (such as methyl).

Alkenyl and alkynyl moieties can be in the form of straight or branched chains, and the alkenyl moieties, where appropriate, can be of either the (E)- or (Z)-configuration. The alkenyl or alkynyl moieties are typically $C_2$-$C_4$alkenyl Haloalkyl groups having a chain length of from 1 to 6 carbon atoms are, for example, fluoromethyl, difluoromethyl, trifluoromethyl, chloromethyl, dichloromethyl, trichloromethyl, 2,2,2-trifluoroethyl, 2-fluoroethyl, 2-chloroethyl, pentafluoroethyl, 1,1-difluoro-2,2,2-trichloroethyl, 2,2,3,3-tetrafluoroethyl and 2,2,2-trichloroethyl, heptafluoro-n-propyl and perfluoro-n-hexyl.

Alkoxy groups preferably have a chain length of from 1 to 6 carbon atoms. Alkoxy is, for example, methoxy, ethoxy, propoxy, isopropoxy, n-butoxy, isobutoxy, sec-butoxy or tert-butoxy or a pentyloxy or hexyloxy isomer, preferably methoxy and ethoxy. It should also be appreciated that two alkoxy substituents may be present on the same carbon atom.

Haloalkoxy is, for example, fluoromethoxy, difluoromethoxy, trifluoromethoxy, 2,2,2-trifluoroethoxy, 1,1,2,2-tetrafluoroethoxy, 2-fluoroethoxy, 2-chloroethoxy, 2,2-difluoroethoxy or 2,2,2-trichloroethoxy, preferably difluoromethoxy, 2-chloroethoxy or trifluoromethoxy.

$C_1$-$C_6$alkyl-S— (alkylthio) is, for example, methylthio, ethylthio, propylthio, isopropylthio, n-butylthio, isobutylthio, sec-butylthio or tert-butylthio, preferably methylthio or ethylthio.

$C_1$-$C_6$alkyl-S(O)— (alkylsulfinyl) is, for example, methylsulfinyl, ethylsulfinyl, propylsulfinyl, isopropylsulfinyl, n-butylsulfinyl, isobutylsulfinyl, sec-butylsulfinyl or tert-butylsulfinyl, preferably methylsulfinyl or ethylsulfinyl.

$C_1$-$C_6$alkyl-S(O)$_2$— (alkylsulfonyl) is, for example, methylsulfonyl, ethylsulfonyl, propylsulfonyl, isopropylsulfonyl, n-butylsulfonyl, isobutylsulfonyl, sec-butylsulfonyl or tert-butylsulfonyl, preferably methylsulfonyl or ethylsulfonyl.

The group Q

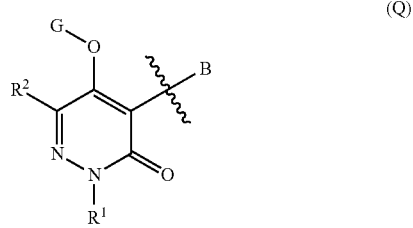

(Q)

is referred to herein as the pyridazine dione/pyridazinone moiety, wherein B denotes the point of attachment to the rest of the molecule (i.e. to the optionally substituted phenyl-W-D moiety).

The present invention also includes agronomically acceptable salts that the compounds of formula (I) may form with amines (for example ammonia, dimethylamine and triethylamine), alkali metal and alkaline earth metal bases or quaternary ammonium bases. Among the alkali metal and alkaline earth metal hydroxides, oxides, alkoxides and hydrogen carbonates and carbonates used as salt formers, emphasis is to be given to the hydroxides, alkoxides, oxides and carbonates of lithium, sodium, potassium, magnesium and calcium, but especially those of sodium, magnesium and calcium. The corresponding trimethylsulfonium salt may also be used. The compounds of formula (I) according to the invention also include hydrates which may be formed during the salt formation.

Preferred values of $R^1$, $R^2$, $R^3$, $R^4$, $R^5$, $R^{4a}$, $R^{5a}$, $R^6$, $R^8$, $R^9$, $R^{10}$, $R^{11}$, $R^{12}$, $R^{13}$, $R^{14}$, $R^{15}$, $R^{16}$, W, D, Dp, G, X, Y, and m are as set out below, and a compound of formula (I) according to the invention may comprise any combination of said values. The skilled man will appreciate that values for any specified set of embodiments may combined with values for any other set of embodiments where such combinations are not mutually exclusive.

Preferably $R^1$ is selected from the group consisting of methyl, ethyl, propyl (in particular n- or c-propyl), propargyl or $C_1$haloalkyl. More preferably $R^1$ is methyl, ethyl, cyclopropyl, propargyl or $C_1$fluoroalkyl. More preferably still $R^1$ is methyl, ethyl, cyclopropyl or propargyl. Most preferably, $R^1$ is methyl.

Preferably $R^2$ is selected from the group consisting of hydrogen, halogen, $C_1$-$C_6$alkyl, $C_1$-$C_6$haloalkyl, $C_1$-$C_6$alkoxy, $C_1$-$C_3$alkoxy-$C_1$-$C_3$alkyl-, $C_3$-$C_6$cycloalkyl, $C_2$-$C_6$alkenyl, $C_2$-$C_6$haloalkenyl, $C_2$-$C_6$alkynyl and $C_2$-$C_6$haloalkynyl. More preferably $R^2$ is selected from the group consisting of chloro, fluoro, methyl, ethyl, cyclopropyl, trifluoromethyl and methoxymethyl, more preferably still chloro, cyclopropyl, trifluoromethyl or methyl, most preferably chloro or methyl. In one set of embodiments of the present invention $R^2$ is hydrogen. In a further set of embodiments $R^2$ is cyclopropyl, in a third set of embodiments $R^2$ is methyl, in a fourth set of embodiments $R^2$ is trifluoromethyl, and in a fifth set of embodiments $R^2$ is chloro.

As described herein, G may be hydrogen or —C(O)—$R^3$, and $R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$.

As defined herein, $R^4$ and $R^5$ are independently selected from the group consisting of hydrogen, $C_1$-$C_6$ alkyl, $C_1$-$C_6$ alkoxy, and $C_3$-$C_6$cycloalkyl, or they can together form a morpholinyl ring. In the context of substituent G (and thus also $R^3$) $R^4$ and $R^5$ are preferably each independently selected from the group consisting of methyl, ethyl, propyl, methoxy, ethoxy and propoxy, and may be referred to as $R^{34}$ and $R^{35}$ respectively. In the context of other substituents (e.g. $R^2$, $R^8$), $R^4$ and $R^5$ are preferably each independently hydrogen, $C_1$-$C_3$alkyl, $C_1$-$C_3$alkoxy, or $C_3$-$C_6$cycloalkyl, and may be referred to as $R^{84}$ and $R^{85}$ respectively. Where more than one $R^4$ is comprised in a larger moiety, for example in the group —NR$^4$C(O)NR$^4$R$^5$, the skilled man will appreciate that each $R^4$ is independent, and thus in such a moiety the two $R^4$ groups may either be the same or they may be different to each other.

$R^6$ is selected from the group consisting of halogen, cyano, nitro, $C_1$-$C_3$alkyl, $C_1$-$C_3$haloalkyl, $C_1$-$C_3$alkoxy and $C_1$-$C_3$haloalkoxy. Preferably $R^6$ is selected from the group consisting of halogen, $C_1$-$C_3$alkyl, and $C_1$-$C_3$haloalkyl.

Preferably $R^3$ is $C_1$-$C_4$ alkyl, $C_2$-$C_3$alkenyl, $C_2$-$C_3$alkynyl, —$C_1$-$C_4$alkoxy, —NR$^4$R$^5$ wherein $R^4$ and $R^5$ together form a morpholinyl ring, or phenyl. More preferably $R^3$ is isopropyl, t-butyl, methyl, ethyl, propargyl, methoxy, ethoxy, or tert-butoxy. More preferably $R^3$ is isopropyl, t-butyl, methyl, ethyl, propargyl, or methoxy.

In one set of embodiments G is hydrogen or —C(O)—$R^3$, wherein $R^3$ is $C_1$-$C_4$ alkyl, $C_2$-$C_3$alkenyl, $C_2$-$C_3$alkynyl or —$C_1$-$C_4$alkoxy. In a further set of embodiments G is hydrogen or —C(O)—$R^3$, wherein $R^3$ is isopropyl, t-butyl, methyl, ethyl, propargyl or methoxy. However, it is particularly preferred that G is hydrogen, or —C(O)—$R^3$ wherein $R^3$ is isopropyl.

Where Y is cylcopropyl, X is preferably hydrogen, cyclopropyl, halogen, or $C_1$haloalkyl, more preferably hydrogen, fluoro, chloro, bromo, or $C_1$fluoroalkyl and more preferably still, hydrogen, fluoro, chloro or trifluoromethyl. Most preferably, when Y is cyclopropyl, X is fluoro. In one set of embodiments it is preferred that X is ortho (6-position) with respect to the pyridazinone/pyridazine-dione moiety (group Q). It is particularly preferred that X is fluoro, chloro or $C_1$-haloalkyl (in particular $C_1$fluoroalkyl) and is ortho (6-position) with respect to pyridazinone/pyridazine-dione moiety (group Q). Most preferably, X is fluoro and is ortho (6-position) with respect to pyridazinone/pyridazine-dione moiety (group Q).

Where X is cyclopropyl, Y is preferably hydrogen, $C_1$-$C_3$ alkyl, cylcopropyl, $C_1$-$C_3$haloalkyl, or halogen, and more preferably Y is hydrogen, chloro, fluoro, or bromo in such embodiments. Most preferably, when X is cyclopropyl, Y is chloro.

In one set of embodiments it is preferred that Y is ortho (3-position) with respect to the —W-D moiety. In a further set of embodiments, Y is para with respect to the pyridazinone/pyridazine-dione moiety (group Q).

It is particularly preferred that Y is ortho (3-position) with respect to the —W-D moiety and is halogen, in particular chloro or fluoro; more preferably chloro.

As described herein, D is an substituted or unsubstituted phenyl ring (Dp) or is a substituted or unsubstituted 5- or 6-membered monocyclic heteroaryl ring containing 1, 2, or 3 heteroatoms independently selected from oxygen, nitrogen and sulphur, and wherein when D is a substituted heteroaryl ring or a substituted phenyl ring, it is substituted on at least one ring carbon atom with $R^8$ and/or, in the case of a heteroaryl ring, on a ring nitrogen atom with $R^9$. Where D is a substituted or unsubstituted 5- or 6-membered monocyclic heteroaryl ring, it is preferably a substituted (as described herein) or unsubstituted furyl, thienyl, pyrrolyl, pyrazolyl, imidazolyl, 1,2,3-triazolyl, 1,2,4-triazolyl, oxazolyl, isoxazolyl, thiazolyl, isothiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyridonyl, pyrimidinyl, pyridazinyl, pyrazinyl, 1,2,3-triazinyl, 1,2,4-triazinyl, or 1,3,5-triazinyl ring.

In such embodiments, D is preferably a substituted (as described herein) or unsubstituted pyridyl, pyrazolyl, thiazolyl, pyrimidinyl, thienyl, triazolyl or oxadiazolyl ring, and more preferably a pyridyl ring.

In one set of embodiments, D is a substituted (as described herein) or unsubstituted pyrazolyl, imidazolyl, oxazolyl, isoxazolyl, thiazolyl, isothiazolyl, pyridyl, pyridonyl, pyrimidinyl, pyridazinyl, or pyrazinyl ring.

In a further set of such embodiments, D is a substituted (as described herein) or unsubstituted, oxazolyl, thiazolyl, or, pyridyl, ring. In certain embodiments, D is a substituted or unsubstituted pyridyl-, or substituted or unsubstituted thiazolyl ring.

The substitution of D by $R^8$ will depend upon the presence or absence of cyclopropyl at position X and/or Y. However, in general, where D is a substituted 5- or 6-membered heteroaryl ring, it is preferably substituted by 1 or 2 $R^8$ and/or 1 $R^9$, more preferably by 1 or 2 $R^8$. Where D is a 5-membered substituted heteroaryl ring, it is most preferably substituted by 1 $R^8$. Where D is a substituted phenyl ring, it is preferably substituted by 1 or 2 $R^8$, more preferably by 1 $R^8$.

Where at least one of X and Y is cyclopropyl, and D is substituted, each $R^8$ may be independently selected hydrogen, oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl) amino-, —NR$^4$C(O)NR$^4$R$^5$, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy ($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 $R^{15}$;

m is an integer of 0, 1, or 2 (preferably 0 or 2); and each $R^9$ is independently hydrogen, $C_1$-$C_6$alkyl, $C_1$-$C_6$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 $R^{16}$;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy.

Where both X and Y are other than cyproyl, and D is a phenyl ring, D will be substituted by at least one $R^8$ selected from the group consisting $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl) amino; or a ring system selected from the group consisting: of a phenyl ring, a 5-6-membered heteroaryl ring and a 3-6-membered heterocyclyl ring, wherein said ring system is substituted by 0 to 5 $R^{16}$; wherein m, $R^4$, $R^5$ and $R^{16}$ are as defined herein.

As defined herein, in the context where both X and Y are other than cyclopropyl, each $R^{4a}$ and $R^{5a}$ are independently selected from the group consisting of $C_1$-$C_6$ alkoxy, and $C_3$-$C_6$cycloalkyl, or $R^4$ and $R^5$ together can form a morpholinyl ring.

Any further $R^8$ substituent may be selected from the group consisting of oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl) amino-, $C_1$-$C_6$haloalkylcarbonylamino-, $C_1$-$C_6$haloalkylcarbonyl($C_1$-$C_6$alkyl)amino-, —NR$^4$C(O)NR$^4$R$^5$, $C_1$-$C_6$alkylsulfonylamino-, $C_1$-$C_6$alkylsulfonyl($C_1$-$C_6$alkyl)

amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 $R^{16}$; wherein m, $R^4$, $R^5$ and $R^{16}$ are as defined herein.

Where both X and Y are other than cyclopropyl and D is a monocyclic heteroaryl ring, D will be substituted either on a ring carbon by at least one $R^8$ selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, $NR^{4a}R^{5a}$, —C(S)$NR^4R^5$, —S(O)$_2$NHC(O)$C_1$-$C_3$alkyl, —S(O)$_2$$NR^4R^5$, —C(O)OH, —C(O)O$C_1$-$C_6$alkyl, —C(O)NHS—(O)$_2$$C_1$-$C_6$alkyl, —C(O)$NR^4R^5$, —$NR^4$C(O)$NR^4R^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; and a ring system selected from the group consisting: of a phenyl ring, a 5-6-membered heteroaryl ring and a 3-6-membered heterocyclyl ring, wherein said ring system is substituted by 0 to 5 $R^{16}$; and/or D will be substituted on a ring nitrogen by at least one $R^9$ selected from the group consisting of $C_5$-$C_6$alkyl, $C_5$-$C_6$haloalkyl, $C_3$-$C_6$-cycloalkyl, $C_1$-$C_3$alkoxy-$C_3$alkyl-, $C_3$alkoxy-$C_1$-$C_2$alkyl-, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$; wherein m, $R^4$, $R^5$, $R^{4a}$, $R^{5a}$ and $R^{16}$ are as defined herein.

In such embodiments where both X and Y are other than cyclopropyl, any further ring carbon $R^8$ substituents may be selected from the group consisting of the group consisting of oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —$NR^4R^5$, —C(S)$NR^4R^5$, —S(O)$_2$NHC(O)$C_1$-$C_3$alkyl, —S(O)$_2$$NR^4R^5$, —C(O)OH, —C(O)OC$_1$-$C_6$alkyl, —C(O)NHS—(O)$_2$$C_1$-$C_6$alkyl, —C(O)$NR^4R^5$, —$NR^4$C(O)$NR^4R^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; or a ring system selected from the group consisting of: a phenyl ring, a 5-6-membered heteroaryl ring and a 3-6-membered heterocyclyl ring, wherein said ring system is substituted by 0 to 5 $R^{1a}$; wherein m, $R^4$, $R^5$ and $R^{16}$ are as defined herein, and/or any further ring nitrogen $R^9$ substituents may be selected from the group consisting of $C_1$-$C_6$alkyl, $C_1$-$C_6$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$; wherein m, $R^4$, $R^5$ and $R^{16}$ are as defined herein.

In embodiments where at least one of X and Y is cyclopropyl, each $R^8$ is preferably independently oxo, $C_1$-$C_4$alkyl, $C_1$-$C_4$haloalkyl, halogen, cyano, amino, —NHC(O)CH$_3$, hydroxyl, $C_1$-$C_4$alkoxy, or $C_1$-$C_4$alkylthio. More preferably each $R^8$ is independently oxo, $C_1$-$C_4$alkyl, $C_1$-$C_4$haloalkyl, halogen, cyano, hydroxyl, $C_1$-$C_4$alkoxy, or $C_1$-$C_4$alkylthio, most preferably each $R^8$ is independently halogen, or $C_1$-$C_4$haloalkyl.

In embodiments where at least one of X and Y is cyclopropyl, each $R^9$ is preferably independently $C_1$-$C_4$alkyl, $C_1$-$C_4$haloalkyl, hydroxyl, $C_1$-$C_4$alkoxy, or $C_1$-$C_4$alkylthio.

In particular embodiments where at least one of X and Y is cyclopropyl and D is a substituted or unsubstituted 5- or 6-membered monocyclic heteroaryl ring as described above, D is selected from the group consisting of 4-chloro-3-pyridyl, 4-trifluoromethylpyridyl, 3-pyridyl, and 2-chloro-thiazo-5-yl, 2-chloro-3-pyridyl, 3-chloro-4-pyridyl, 1-methyl-3-(trifluoromethyl)-pyrazol-4-yl, thiazol-2-yl, thiazol-5-yl, pyrimidin-5-yl, 4-(tert-butoxy)phenyl, 2-chloro-4-pyridyl, 2-methyl-4-pyridyl, 2-trifluoromethyl-4-pyridyl, 4-pyridyl, 2-amino-4-pyridyl, thiophen-3-yl, 1-methyl-pyrazol-4-yl, 2-methyl-triazol-4-yl, 5-methyl-1,3,4-oxadiazol-2-yl, 5-methyl-3-pyridyl, 5-methyl-2-pyridyl, 6-methyl-2-pyridyl, 3-methyl-2-pyridyl, 6-choro-3-pyridyl, 3-trifluoromethyl-3-pyridyl, 4-methyl-2-pyridyl, 2-acetamidothiazol-5-yl, 2-fluoro-4-pyridyl, and 2-trifluoromethyl-3-pyridyl. In a subset of these embodiments D is selected from the group consisting of 4-chloro-3-pyridyl, 4-trifluoromethylpyridyl, 3-pyridyl, and 2-chloro-thiazo-5-yl, 2-chloro-3-pyridyl, 3-chloro-4-pyridyl, 1-methyl-3-(trifluoromethyl)-pyrazol-4-yl, thiazol-2-yl, thiazol-5-yl, pyrimidin-5-yl, 4-(tert-butoxy)phenyl, 2-chloro-4-pyridyl, 2-methyl-4-pyridyl, 2-trifluoromethyl-4-pyridyl, 4-pyridyl, thiophen-3-yl, 5-methyl-3-pyridyl, 5-methyl-2-pyridyl, 6-methyl-2-pyridyl, 3-trifluoromethyl-3-pyridyl, 2-fluoro-4-pyridyl, and 2-trifluoromethyl-3-pyridyl. In a further subset of these embodiments, D is selected from the group consisting of 4-chloro-3-pyridyl, 4-trifluoromethylpyridyl, 3-pyridyl, 2-fluoro-4-pyridyl and 2-chloro-thiazo-5-yl (preferably 2-fluoro-4-pyridyl).

Where D is a phenyl ring Dp, and is substituted, it may be substituted by 1 to 5 $R^8$ and may thus be represented by the following structure:

(Dp)

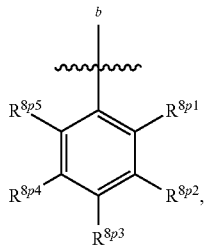

wherein at least one $R^{8p1}$, $R^{8p2}$, $R^{8p3}$, $R^{8p4}$ and $R^{8p5}$ is other than hydrogen. The skilled man will appreciate if at least one of $R^{8p1}$, $R^{8p2}$, $R^{8p3}$, $R^{8p4}$ and $R^{8p5}$ is not hydrogen, any remaining position on the phenyl ring may be unsubstituted, or, alternatively, bear a further $R^8$ substitutent the position of which on the phenyl ring being denoted by the superscripted p number. When Dp is unsubstituted, $R^{8p1}$, $R^{8p2}$, $R^{8p3}$, $R^{8p4}$ and $R^{8p5}$ will be absent, As stated above, the substitution of D by $R^8$ will depend upon the presence or absence of cyclopropyl at position X and/or Y. Thus in Dp, where at least one of X and Y is cyclopropyl, it is preferred that one or more of $R^{8p1}$, $R^{8p2}$, $R^{8p3}$, $R^{8p4}$ and $R^{8p5}$ is independently selected from the group consisting of cyano, amino, $C_1$-$C_3$dialkylamino, hydroxy, $C_1$-$C_3$alkyl, $C_1$-$C_4$alkoxy, $C_1$-$C_3$haloalkyl, $C_1$-$C_3$haloalkoxy, and halogen, and b is the point of attachment to the rest of the molecule.

In one such set of embodiments one or more of $R^{8p1}$, $R^{8p2}$, $R^{8p3}$, $R^{8p4}$ and $R^{8p5}$ is each independently selected from cyano, $C_1$-$C_3$ alkyl, $C_1$-$C_4$alkoxy, $C_1$-$C_3$haloalkyl, $C_1$-$C_3$haloalkoxy, or halogen. Preferably one or more of $R^{8p1}$, $R^{8p2}$, $R^{8p3}$, $R^{8p4}$ and $R^{8p5}$ is independently selected from, cyano, halogen (in particular chloro or fluoro), methyl, methoxy, and trifluoromethyl.

In yet another set of embodiments each of $R^{8p1}$, $R^{8p2}$, $R^{8p4}$ and $R^{8p5}$ are absent and $R^{8p3}$ is cyano, $C_1$-$C_3$ alkyl, $C_1$-$C_4$ alkoxy, $C_1$-$C_3$haloalkyl, $C_1$-$C_3$haloalkoxy, or halogen. Preferably in this set of embodiments, $R^{8p3}$ is halogen, more preferably chloro.

In a further set of embodiments still, each of $R^{8p1}$, $R^{8p4}$ and $R^{8p5}$ are absent, and $R^{8p2}$ and $R^{8p3}$ are each independently cyano, $C_1$-$C_3$ alkyl, $C_1$-$C_4$ alkoxy, $C_1$-$C_3$haloalkyl, $C_1$-$C_3$haloalkoxy, or halogen. In this set of embodiments it is particularly preferred that $R^{8p2}$ and $R^{8p3}$ are each independently halogen, and more preferred that $R^{8p2}$ and $R^{8p3}$ are both chloro.

In one particularly preferred set of embodiments where at least one of X and/or Y is cyclopropyl, D is an unsubstituted phenyl ring.

In a further embodiments, particularly preferred set of embodiments where at least one of X and/or Y is cyclopropyl, D is selected from the group consisting of 4-chloro-phenyl, 4-trifluoromethyl-phenyl, 4-cyanophenyl, 4-fluoro-phenyl, 3,4-di-fluoro-phenyl, 2-trifluoromethyl-phenyl and 4-tolyl.

W acts as a linker moiety, linking ring D to the rest of the molecule (i.e. to the phenyl-pyridazinone/phenyl-pyridazine dione moiety). Compounds of formula (I) wherein the linker is W1 are herbicidal, whereas compounds of formula (I) wherein the linker is W2 may be not only herbicidal, but also useful intermediates in the production of compounds of formula (I) bearing W1 linkers. Thus, in one set of embodiments, W is W1, whereas in a second set of embodiments, W is W2. In a third set of embodiments, W is —C≡C—.

Preferably $R^{10}$, $R^{11}$, $R^{12}$ and $R^{13}$ are each independently selected from hydrogen or $C_1$-$C_3$ alkyl. In one set of embodiments $R^{10}$, $R^{11}$, $R^{12}$, and $R^{13}$ are all hydrogen.

Preferably $R^{14}$ and $R^{15}$ are each independently selected from hydrogen or $C_1$-$C_3$alkyl. In one set of embodiments $R^{14}$ and $R^{15}$ are both hydrogen.

Specific examples of W include —CH$_2$—CH$_2$—, and —CH═CH—, cis

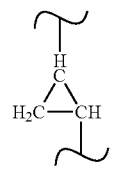

and trans

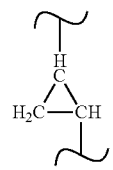

and —C≡C—. In more preferred embodiments W is either —CH$_2$—CH$_2$—, or —CH═CH— (in particular (E) —CH═CH—), more preferably still —CH$_2$—CH$_2$—.

In one preferred set of embodiments (where both X and Y are other than cyclopropyl) in a compound of formula (I);
$R^1$ is methyl, ethyl, cyclopropyl, propargyl or $C_1$fluoroalkyl;
$R^2$ is chloro, cyclopropyl, trifluoromethyl or methyl;
G is hydrogen or —C(O)—$R^3$, wherein $R^3$ is isopropyl, t-butyl, methyl, ethyl, propargyl, methoxy, ethoxy, or tert-butoxy;
X is fluoro, chloro or $C_1$-haloalkyl and is ortho with respect to pyridazinone/pyridazine-dione moiety;
Y is hydrogen, chloro, fluoro, or bromo and ortho with respect to the —W-D moiety;
D is a phenyl ring substituted by at least one $R^8$ selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino and $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 $R^{16}$; and Any further $R^8$ substituent may be selected from the group consisting of hydroxyl, halogen, cyano, $C_1$-$C_6$alkyl, $C_1$-$C_6$haloalkyl, $C_3$-$C_6$-cycloalkyl, $C_1$-$C_6$alkoxy, $C_2$-$C_6$alkenyl, and $C_2$-$C_6$alkynyl;

$R^4$ and $R^5$ are each independently hydrogen, $C_1$-$C_3$alkyl, $C_1$-$C_3$alkoxy, or $C_3$-$C_6$cylcoalkyl;

m is an integer of 0, 1, or 2 (preferably 0 or 2);

each $R^{4a}$ and $R^{5a}$ are independently selected from the group consisting of $C_1$-$C_6$ alkoxy, and $C_3$-$C_6$cycloalkyl, or $R^{4a}$ and $R^{5a}$ together can form a morpholinyl ring; and, each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

W is W1; and $R^{10}$, $R^{11}$, $R^{12}$, and $R^{13}$ are all hydrogen.

In more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl, t-butyl, methyl, ethyl, propargyl, methoxy, ethoxy, or tert-butoxy;

X is fluoro and is ortho with respect to pyridazinone/pyridazine-dione moiety;

Y is chloro and ortho with respect to the —W-D moiety;

D is a phenyl ring substituted by 1 or 2 $R^8$, wherein at least one $R^8$ is selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino- and $C_1$-$C_6$haloalkylcarbonyl($C_1$-$C_6$alkyl)amino-; or a ring system selected from the group consisting: of a phenyl ring, a 5-6-membered heteroaryl ring and a 3-6-membered heterocyclyl ring, wherein said ring system is substituted by 0 to 5 $R^{16}$; and Any further $R^8$ substituent may be selected from the group consisting of halogen, $C_1$-$C_6$alkyl and $C_1$-$C_6$haloalkyl;

$R^4$ and $R^5$ are each independently hydrogen, $C_1$-$C_3$alkyl, $C_1$-$C_3$alkoxy, or $C_3$-$C_6$cylcoalkyl;

m is 0 or 2 (preferably 0);

each $R^{16}$ is independently halogen, cyano, $C_1$-$C_4$alkyl, $C_1$-$C_3$haloalkyl or $C_1$-$C_4$alkoxy;

W is W1; and $R^{10}$, $R^{11}$, $R^{12}$, and $R^{13}$ are all hydrogen.

In an even more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl, t-butyl, methyl, ethyl, propargyl, or methoxy;

X is fluoro and is ortho with respect to pyridazinone/pyridazine-dione moiety;

Y is chloro and ortho with respect to the —W-D moiety;

D is a phenyl ring substituted by one $R^8$ selected from the group consisting of —$C_1$-$C_3$alkyl-S(O)$_m$—$C_1$-$C_6$alkyl, —S(O)$_2$NHC(O)$C_1$-$C_3$alkyl, —S(O)$_2$NR$^4$R$^5$, —C(O)OH, —C(O)O$C_1$-$C_6$alkyl and —C(O)NR$^4$R$^5$; or a ring system selected from the group consisting: of a phenyl, morpholinyl, tetrahydrofuranyl, furyl, thienyl, pyrrolyl, pyrazolyl, imidazolyl, 1,2,3-triazolyl, 1,2,4-triazolyl, tetrazolyl, oxazolyl, isoxazolyl, thiazolyl, isothiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyridonyl, pyrimidinyl, pyridazinyl, pyrazinyl, 1,2,3-triazinyl, 1,2,4-triazinyl, or a 1,3,5-triazinyl ring, wherein said ring system is substituted by 0 to 2 $R^{16}$;

$R^4$ and $R^5$ are each independently hydrogen or $C_1$-$C_3$alkyl;

m is 0 or 2 (preferably 0);

each $R^{16}$ is independently halogen or $C_1$-$C_4$alkyl (preferably methyl);

W is W1; and $R^{10}$, $R^{11}$, $R^{12}$, and $R^{13}$ are all hydrogen.

Yet in an even more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl;

X is fluoro and is ortho with respect to pyridazinone/pyridazine-dione moiety;

Y is chloro and ortho with respect to the —W-D moiety;

D is a phenyl ring substituted by one $R^8$ selected from the group consisting of methylsulfanylmethyl, isopropylsulfanylmethyl, sulfamoyl, methylsulfamoyl and carbamoyl; or a ring system selected from the group consisting: of a phenyl, morpholinyl, tetrahydrofuranyl, furyl, thienyl, pyrrolyl, pyrazolyl, 1,2,4-triazolyl, oxazolyl and a thiazolyl ring, wherein said ring system is substituted by 0 to 2 $R^{16}$;

each $R^{16}$ is methyl;

W is W1; and $R^{10}$, $R^{11}$, $R^{12}$, and $R^{13}$ are all hydrogen.

In an alternative preferred set of embodiments (where both X and Y are other than cyclopropyl) in a compound of formula (I);

$R^1$ is methyl, ethyl, cyclopropyl, propargyl or $C_1$fluoroalkyl;

$R^2$ is chloro, cyclopropyl, trifluoromethyl or methyl;

G is hydrogen or —C(O)—$R^3$, wherein $R^3$ is isopropyl, t-butyl, methyl, ethyl, propargyl, methoxy, ethoxy, or tert-butoxy;

X is fluoro, chloro or $C_1$-haloalkyl and is ortho with respect to pyridazinone/pyridazine-dione moiety;

Y is hydrogen, chloro, fluoro, or bromo and ortho with respect to the —W-D moiety;

D is a 5- or 6-membered monocyclic heteroaryl ring containing 1, 2, or 3 heteroatoms independently selected from oxygen, nitrogen and sulphur substituted either on a ring carbon by at least one $R^8$ selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; and a ring system selected from the group consisting: of a phenyl ring, a 5-6-membered heteroaryl ring and a 3-6-membered heterocyclyl ring, wherein said ring system is substituted by 0 to 5 $R^{16}$; and Any further $R^8$ substituent may be selected from the group consisting of hydroxyl, halogen, cyano, $C_1$-$C_6$alkyl, $C_1$-$C_6$haloalkyl, $C_3$-$C_6$-cycloalkyl, $C_1$-$C_6$alkoxy, $C_2$-$C_6$alkenyl, and $C_2$-$C_6$alkynyl; and/or D will be substituted on a ring nitrogen by at least one $R^9$ selected from the group consisting of $C_5$-$C_6$alkyl, $C_5$-$C_6$haloalkyl, $C_3$-$C_6$-cycloalkyl, $C_1$-$C_3$alkoxy-$C_3$alkyl-, $C_3$alkoxy-$C_1$-$C_2$alkyl-, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$;

$R^4$ and $R^5$ are each independently hydrogen, $C_1$-$C_3$alkyl, $C_1$-$C_3$alkoxy, or $C_3$-$C_6$cylcoalkyl;

m is an integer of 0, 1, or 2 (preferably 0 or 2);

each $R^{4a}$ and $R^{5a}$ are independently selected from the group consisting of $C_1$-$C_6$ alkoxy, and $C_3$-$C_6$cycloalkyl, or $R^{4a}$ and $R^{5a}$ together can form a morpholinyl ring; and, each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

W is W1; and $R^{10}$, $R^{11}$, $R^{12}$, and $R^{13}$ are all hydrogen.

In an alternative more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl, t-butyl, methyl, ethyl, propargyl, methoxy, ethoxy, or tert-butoxy;

X is fluoro and is ortho with respect to pyridazinone/pyridazine-dione moiety;

Y is chloro and ortho with respect to the —W-D moiety;

D is a 5- or 6-membered monocyclic heteroaryl ring containing 1, 2, or 3 heteroatoms independently selected from oxygen, nitrogen and sulphur substituted either on a ring carbon by 1 or 2 $R^8$, wherein at least one $R^8$ is selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, —S(O)$_2$NHC(O)$C_1$-$C_3$alkyl, —S(O)$_2$NR$^4$R$^5$, —C(O)OH, —C(O)OC$_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino- and $C_1$-$C_6$haloalkylcarbonyl($C_1$-$C_6$alkyl)amino-; or a ring system selected from the group consisting: of a phenyl ring, a 5-6-membered heteroaryl ring and a 3-6-membered heterocyclyl ring, wherein said ring system is substituted by 0 to 5 $R^{16}$; and Any further $R^8$ substituent may be selected from the group consisting of halogen, $C_1$-$C_6$alkyl and $C_1$-$C_6$haloalkyl; and/or D will be substituted on a ring nitrogen by one $R^9$ selected from the group consisting of $C_5$-$C_6$alkyl, $C_5$-$C_6$haloalkyl, $C_3$-$C_6$-cycloalkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, and a ring system selected from the group consisting of: a phenyl ring, a 5-6-membered heteroaryl ring and a 3-6-membered heterocyclyl ring, wherein said ring system is substituted by 0 to 5 $R^{16}$;

$R^4$ and $R^5$ are each independently hydrogen, $C_1$-$C_3$alkyl, $C_1$-$C_3$alkoxy, or $C_3$-$C_6$cylcoalkyl;

m is 0 or 2 (preferably 0);

each $R^{16}$ is independently halogen, cyano, $C_1$-$C_4$alkyl, $C_1$-$C_3$haloalkyl or $C_1$-$C_4$alkoxy;

W is W1; and $R^{10}$, $R^{11}$, $R^{12}$, and $R^{13}$ are all hydrogen.

In an alternative even more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl, t-butyl, methyl, ethyl, propargyl, or methoxy;

X is fluoro and is ortho with respect to pyridazinone/pyridazine-dione moiety;

Y is chloro and ortho with respect to the —W-D moiety;

D is a 5- or 6-membered monocyclic heteroaryl ring containing 1, 2, or 3 nitrogen atoms substituted either on a ring carbon by one $R^8$ selected from the group consisting of —$C_1$-$C_3$alkyl-S(O)$_m$—$C_1$-$C_6$alkyl, —S(O)$_2$NHC(O)$C_1$-$C_3$alkyl, —S(O)$_2$NR$^4$R$^5$, —C(O)OH, —C(O)OC$_1$-$C_6$alkyl and —C(O)NR$^4$R$^5$; or a ring system selected from the group consisting: of a phenyl, morpholinyl, tetrahydrofuranyl, furyl, thienyl, pyrrolyl, pyrazolyl, imidazolyl, 1,2,3-triazolyl, 1,2,4-triazolyl, tetrazolyl, oxazolyl, isoxazolyl, thiazolyl, isothiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyridonyl, pyrimidinyl, pyridazinyl, pyrazinyl, 1,2,3-triazinyl, 1,2,4-triazinyl, or a 1,3,5-triazinyl ring, wherein said ring system is substituted by 0 to 2 $R^{16}$; and/or D will be substituted on a ring nitrogen by one $R^9$ selected from the group consisting of $C_5$-$C_6$alkyl, $C_3$-$C_6$-cycloalkyl, and a ring system selected from the group consisting of: a phenyl ring, a 5-6-membered heteroaryl ring and a 3-6-membered heterocyclyl ring, wherein said ring system is substituted by 0 to 2 $R^{16}$;

$R^4$ and $R^5$ are each independently hydrogen or $C_1$-$C_3$alkyl;

m is 0 or 2 (preferably 0);

each $R^{16}$ is independently halogen or $C_1$-$C_4$alkyl (preferably methyl);

W is W1; and $R^{10}$, $R^{11}$, $R^{12}$, and $R^{13}$ are all hydrogen.

Yet in an alternative even more preferred set of embodiments (where both X and Y are other than cyclopropyl) in a compound of formula (I);

$R^1$ is methyl;

$R^2$ is methyl;

G is hydrogen or —C(O)—$R^3$, wherein $R^3$ is isopropyl;

X is fluoro and is ortho with respect to pyridazinone/pyridazine-dione moiety;

Y is chloro and ortho with respect to the —W-D moiety;
D is a pyrazolyl or pyridyl substituted either on a ring carbon by one $R^8$ selected from the group consisting of methylsulfanylmethyl, isopropylsulfanylmethyl, sulfamoyl, methylsulfamoyl and carbamoyl; or a ring system selected from the group consisting: of a phenyl, morpholinyl, tetrahydrofuranyl, furyl, thienyl, pyrrolyl, pyrazolyl, 1,2,4-triazolyl, oxazolyl and a thiazolyl ring, wherein said ring system is substituted by 0 to 2 $R^{16}$; and/or D will be substituted on a ring nitrogen by one $R^9$ selected from cyclopropyl or phenyl;
each $R^{16}$ is methyl;
W is W1; and
$R^{10}$, $R^{11}$, $R^{12}$, and $R^{13}$ are all hydrogen.

Tables A-1, A-2, A-3, A-4, B-1, B-2, B-3, B-4, C-1, C-2, C-3, and C-4 below illustrate specific examples of compounds of formula (I) of the invention.

Herbicidal compounds of the present invention. The numbering system used to describe the positions of X and Y in the compound of formula (I) shown below, is shown for the purposes of clarity only.

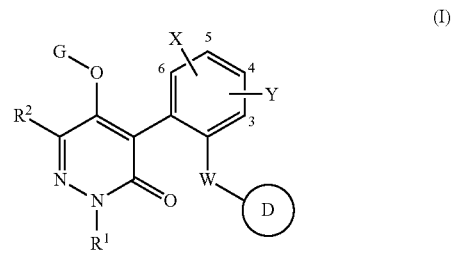

Table A-1 provides 672 compounds A-1.001 to A-1.672 of formula (I) wherein G is —H, W is —CH$_2$—CH$_2$— and $R^1$, $R^2$, X, Y, D are as defined for compound Nos. 1.001 to 1.672 respectively in Table 1 below.

TABLE 1

Substituent definitions of $R^1$, $R^2$, X, Y and D:

| Cmpd No. | $R^1$ | $R^2$ | X | Y | D |
|---|---|---|---|---|---|
| 1.001 | —Me | —Me | 6-F | 3-F | 4-oxazol-5-ylphenyl- |
| 1.002 | —Me | —Me | 6-F | 3-F | 4-acetamidophenyl- |
| 1.003 | —Me | —Me | 6-F | 3-F | 4-(dimethylsulfamoyl)phenyl- |
| 1.004 | —Me | —Me | 6-F | 3-F | 4-tert-butylphenyl- |
| 1.005 | —Me | —Me | 6-F | 3-F | 4-biphenyl- |
| 1.006 | —Me | —Me | 6-F | 3-F | 4-[ethyl(methyl)carbamoyl]-3-fluoro-phenyl- |
| 1.007 | —Me | —Me | 6-F | 3-F | 2-cyanophenyl- |
| 1.008 | —Me | —Me | 6-F | 3-F | 3-cyanophenyl- |
| 1.009 | —Me | —Me | 6-F | 3-F | 4-amino-3-methylphenyl- |
| 1.010 | —Me | —Me | 6-F | 3-F | 4-methylsulfonylphenyl- |
| 1.011 | —Me | —Me | 6-F | 3-F | 4-dimethylaminophenyl- |
| 1.012 | —Me | —Me | 6-F | 3-F | 4-methylaminophenyl- |
| 1.013 | —Me | —Me | 6-F | 3-F | 4-tert-butoxyphenyl- |
| 1.014 | —Me | —Me | 6-F | 3-F | 4-cyanophenyl- |
| 1.015 | —Me | —Me | 6-F | 3-F | 4-hydroxyphenyl- |
| 1.016 | —Me | —Me | 6-F | 3-F | 4-cyclopropylphenyl- |
| 1.017 | —Me | —Me | 6-F | 3-F | 4-(methylsulfanyl)phenyl- |
| 1.018 | —Me | —Me | 6-F | 3-F | 4-carboxyphenyl- |
| 1.019 | —Me | —Me | 6-F | 3-F | 4-methoxycarbonylphenyl- |
| 1.020 | —Me | —Me | 6-F | 3-F | 4-(tert-butoxycarbonylamino)-3-fluoro-phenyl- |
| 1.021 | —Me | —Me | 6-F | 3-F | 2-(methylsulfanyl)-4-pyridyl- |
| 1.022 | —Me | —Me | 6-F | 3-F | 2-acetamido-4-pyridyl- |
| 1.023 | —Me | —Me | 6-F | 3-Cl | 4-oxazol-5-ylphenyl- |
| 1.024 | —Me | —Me | 6-F | 3-Cl | 4-acetamidophenyl- |
| 1.025 | —Me | —Me | 6-F | 3-Cl | 4-(dimethylsulfamoyl)phenyl- |
| 1.026 | —Me | —Me | 6-F | 3-Cl | 4-tert-butylphenyl- |
| 1.027 | —Me | —Me | 6-F | 3-Cl | 4-biphenyl- |
| 1.028 | —Me | —Me | 6-F | 3-Cl | 4-[ethyl(methyl)carbamoyl]-3-fluoro-phenyl- |
| 1.029 | —Me | —Me | 6-F | 3-Cl | 2-cyanophenyl- |
| 1.030 | —Me | —Me | 6-F | 3-Cl | 3-cyanophenyl- |
| 1.031 | —Me | —Me | 6-F | 3-Cl | 4-amino-3-methylphenyl- |
| 1.032 | —Me | —Me | 6-F | 3-Cl | 4-methylsulfonylphenyl- |
| 1.033 | —Me | —Me | 6-F | 3-Cl | 4-dimethylaminophenyl- |
| 1.034 | —Me | —Me | 6-F | 3-Cl | 4-methylaminophenyl- |
| 1.035 | —Me | —Me | 6-F | 3-Cl | 4-tert-butoxyphenyl- |
| 1.036 | —Me | —Me | 6-F | 3-Cl | 4-cyanophenyl- |
| 1.037 | —Me | —Me | 6-F | 3-Cl | 4-hydroxyphenyl- |
| 1.038 | —Me | —Me | 6-F | 3-Cl | 4-cyclopropylphenyl- |
| 1.039 | —Me | —Me | 6-F | 3-Cl | 4-(methylsulfanyl)phenyl- |
| 1.040 | —Me | —Me | 6-F | 3-Cl | 4-carboxyphenyl- |
| 1.041 | —Me | —Me | 6-F | 3-Cl | 4-methoxycarbonylphenyl- |
| 1.042 | —Me | —Me | 6-F | 3-Cl | 4-(tert-butoxycarbonylamino)-3-fluoro-phenyl- |
| 1.043 | —Me | —Me | 6-F | 3-Cl | 2-(methylsulfanyl)-4-pyridyl- |
| 1.044 | —Me | —Me | 6-F | 3-Cl | 2-acetamido-4-pyridyl- |
| 1.045 | —Me | —Me | 6-Cl | 3-F | 4-oxazol-5-ylphenyl- |
| 1.046 | —Me | —Me | 6-Cl | 3-F | 4-acetamidophenyl- |
| 1.047 | —Me | —Me | 6-Cl | 3-F | 4-(dimethylsulfamoyl)phenyl- |
| 1.048 | —Me | —Me | 6-Cl | 3-F | 4-tert-butylphenyl- |
| 1.049 | —Me | —Me | 6-Cl | 3-F | 4-biphenyl- |

TABLE 1-continued

Substituent definitions of R¹, R², X, Y and D:

| Cmpd No. | R¹ | R² | X | Y | D |
|---|---|---|---|---|---|
| 1.050 | —Me | —Me | 6-Cl | 3-F | 4-[ethyl(methyl)carbamoyl]-3-fluoro-phenyl- |
| 1.051 | —Me | —Me | 6-Cl | 3-F | 2-cyanophenyl- |
| 1.052 | —Me | —Me | 6-Cl | 3-F | 3-cyanophenyl- |
| 1.053 | —Me | —Me | 6-Cl | 3-F | 4-amino-3-methylphenyl- |
| 1.054 | —Me | —Me | 6-Cl | 3-F | 4-methylsulfonylphenyl- |
| 1.055 | —Me | —Me | 6-Cl | 3-F | 4-dimethylaminophenyl- |
| 1.056 | —Me | —Me | 6-Cl | 3-F | 4-methylaminophenyl- |
| 1.057 | —Me | —Me | 6-Cl | 3-F | 4-tert-butoxyphenyl- |
| 1.058 | —Me | —Me | 6-Cl | 3-F | 4-cyanophenyl- |
| 1.059 | —Me | —Me | 6-Cl | 3-F | 4-hydroxyphenyl- |
| 1.060 | —Me | —Me | 6-Cl | 3-F | 4-cyclopropylphenyl- |
| 1.061 | —Me | —Me | 6-Cl | 3-F | 4-(methylsulfanyl)phenyl- |
| 1.062 | —Me | —Me | 6-Cl | 3-F | 4-carboxyphenyl- |
| 1.063 | —Me | —Me | 6-Cl | 3-F | 4-methoxycarbonylphenyl- |
| 1.064 | —Me | —Me | 6-Cl | 3-F | 4-(tert-butoxycarbonylamino)-3-fluoro-phenyl- |
| 1.065 | —Me | —Me | 6-Cl | 3-F | 2-(methylsulfanyl)-4-pyridyl- |
| 1.066 | —Me | —Me | 6-Cl | 3-F | 2-acetamido-4-pyridyl- |
| 1.067 | —Me | —Me | 6-Cl | 3-Cl | 4-oxazol-5-ylphenyl- |
| 1.068 | —Me | —Me | 6-Cl | 3-Cl | 4-acetamidophenyl- |
| 1.069 | —Me | —Me | 6-Cl | 3-Cl | 4-(dimethylsulfamoyl)phenyl- |
| 1.070 | —Me | —Me | 6-Cl | 3-Cl | 4-tert-butylphenyl- |
| 1.071 | —Me | —Me | 6-Cl | 3-Cl | 4-biphenyl- |
| 1.072 | —Me | —Me | 6-Cl | 3-Cl | 4-[ethyl(methyl)carbamoyl]-3-fluoro-phenyl- |
| 1.073 | —Me | —Me | 6-Cl | 3-Cl | 2-cyanophenyl- |
| 1.074 | —Me | —Me | 6-Cl | 3-Cl | 3-cyanophenyl- |
| 1.075 | —Me | —Me | 6-Cl | 3-Cl | 4-amino-3-methylphenyl- |
| 1.076 | —Me | —Me | 6-Cl | 3-Cl | 4-methylsulfonylphenyl- |
| 1.077 | —Me | —Me | 6-Cl | 3-Cl | 4-dimethylaminophenyl- |
| 1.078 | —Me | —Me | 6-Cl | 3-Cl | 4-methylaminophenyl- |
| 1.079 | —Me | —Me | 6-Cl | 3-Cl | 4-tert-butoxyphenyl- |
| 1.080 | —Me | —Me | 6-Cl | 3-Cl | 4-cyanophenyl- |
| 1.081 | —Me | —Me | 6-Cl | 3-Cl | 4-hydroxyphenyl- |
| 1.082 | —Me | —Me | 6-Cl | 3-Cl | 4-cyclopropylphenyl- |
| 1.083 | —Me | —Me | 6-Cl | 3-Cl | 4-(methylsulfanyl)phenyl- |
| 1.084 | —Me | —Me | 6-Cl | 3-Cl | 4-carboxyphenyl- |
| 1.085 | —Me | —Me | 6-Cl | 3-Cl | 4-methoxycarbonylphenyl- |
| 1.086 | —Me | —Me | 6-Cl | 3-Cl | 4-(tert-butoxycarbonylamino)-3-fluoro-phenyl- |
| 1.087 | —Me | —Me | 6-Cl | 3-Cl | 2-(methylsulfanyl)-4-pyridyl- |
| 1.088 | —Me | —Me | 6-Cl | 3-Cl | 2-acetamido-4-pyridyl- |
| 1.089 | —Me | —Cl | 6-F | 3-F | 4-oxazol-5-ylphenyl- |
| 1.090 | —Me | —Cl | 6-F | 3-F | 4-acetamidophenyl- |
| 1.091 | —Me | —Cl | 6-F | 3-F | 4-(dimethylsulfamoyl)phenyl- |
| 1.092 | —Me | —Cl | 6-F | 3-F | 4-tert-butylphenyl- |
| 1.093 | —Me | —Cl | 6-F | 3-F | 4-biphenyl- |
| 1.094 | —Me | —Cl | 6-F | 3-F | 4-[ethyl(methyl)carbamoyl]-3-fluoro-phenyl- |
| 1.095 | —Me | —Cl | 6-F | 3-F | 2-cyanophenyl- |
| 1.096 | —Me | —Cl | 6-F | 3-F | 3-cyanophenyl- |
| 1.097 | —Me | —Cl | 6-F | 3-F | 4-amino-3-methylphenyl- |
| 1.098 | —Me | —Cl | 6-F | 3-F | 4-methylsulfonylphenyl- |
| 1.099 | —Me | —Cl | 6-F | 3-F | 4-dimethylaminophenyl- |
| 1.100 | —Me | —Cl | 6-F | 3-F | 4-methylaminophenyl- |
| 1.101 | —Me | —Cl | 6-F | 3-F | 4-tert-butoxyphenyl- |
| 1.102 | —Me | —Cl | 6-F | 3-F | 4-cyanophenyl- |
| 1.103 | —Me | —Cl | 6-F | 3-F | 4-hydroxyphenyl- |
| 1.104 | —Me | —Cl | 6-F | 3-F | 4-cyclopropylphenyl- |
| 1.105 | —Me | —Cl | 6-F | 3-F | 4-(methylsulfanyl)phenyl- |
| 1.106 | —Me | —Cl | 6-F | 3-F | 4-carboxyphenyl- |
| 1.107 | —Me | —Cl | 6-F | 3-F | 4-methoxycarbonylphenyl- |
| 1.108 | —Me | —Cl | 6-F | 3-F | 4-(tert-butoxycarbonylamino)-3-fluoro-phenyl- |
| 1.109 | —Me | —Cl | 6-F | 3-F | 2-(methylsulfanyl)-4-pyridyl- |
| 1.110 | —Me | —Cl | 6-F | 3-F | 2-acetamido-4-pyridyl- |
| 1.111 | —Me | —Cl | 6-F | 3-Cl | 4-oxazol-5-ylphenyl- |
| 1.112 | —Me | —Cl | 6-F | 3-Cl | 4-acetamidophenyl- |
| 1.113 | —Me | —Cl | 6-F | 3-Cl | 4-(dimethylsulfamoyl)phenyl- |
| 1.114 | —Me | —Cl | 6-F | 3-Cl | 4-tert-butylphenyl- |
| 1.115 | —Me | —Cl | 6-F | 3-Cl | 4-biphenyl- |
| 1.116 | —Me | —Cl | 6-F | 3-Cl | 4-[ethyl(methyl)carbamoyl]-3-fluoro-phenyl- |
| 1.117 | —Me | —Cl | 6-F | 3-Cl | 2-cyanophenyl- |
| 1.118 | —Me | —Cl | 6-F | 3-Cl | 3-cyanophenyl- |
| 1.119 | —Me | —Cl | 6-F | 3-Cl | 4-amino-3-methylphenyl- |
| 1.120 | —Me | —Cl | 6-F | 3-Cl | 4-methylsulfonylphenyl- |
| 1.121 | —Me | —Cl | 6-F | 3-Cl | 4-dimethylaminophenyl- |
| 1.122 | —Me | —Cl | 6-F | 3-Cl | 4-methylaminophenyl- |
| 1.123 | —Me | —Cl | 6-F | 3-Cl | 4-tert-butoxyphenyl- |
| 1.124 | —Me | —Cl | 6-F | 3-Cl | 4-cyanophenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.125 | —Me | —Cl | 6-F | 3-Cl | 4-hydroxyphenyl- |
| 1.126 | —Me | —Cl | 6-F | 3-Cl | 4-cyclopropylphenyl- |
| 1.127 | —Me | —Cl | 6-F | 3-Cl | 4-(methylsulfanyl)phenyl- |
| 1.128 | —Me | —Cl | 6-F | 3-Cl | 4-carboxyphenyl- |
| 1.129 | —Me | —Cl | 6-F | 3-Cl | 4-methoxycarbonylphenyl- |
| 1.130 | —Me | —Cl | 6-F | 3-Cl | 4-(tert-butoxycarbonylamino)-3-fluoro-phenyl- |
| 1.131 | —Me | —Cl | 6-F | 3-Cl | 2-(methylsulfanyl)-4-pyridyl- |
| 1.132 | —Me | —Cl | 6-F | 3-Cl | 2-acetamido-4-pyridyl- |
| 1.133 | —Me | —Cl | 6-Cl | 3-F | 4-oxazol-5-ylphenyl- |
| 1.134 | —Me | —Cl | 6-Cl | 3-F | 4-acetamidophenyl- |
| 1.135 | —Me | —Cl | 6-Cl | 3-F | 4-(dimethylsulfamoyl)phenyl- |
| 1.136 | —Me | —Cl | 6-Cl | 3-F | 4-tert-butylphenyl- |
| 1.137 | —Me | —Cl | 6-Cl | 3-F | 4-biphenyl- |
| 1.138 | —Me | —Cl | 6-Cl | 3-F | 4-[ethyl(methyl)carbamoyl]-3-fluoro-phenyl- |
| 1.139 | —Me | —Cl | 6-Cl | 3-F | 2-cyanophenyl- |
| 1.140 | —Me | —Cl | 6-Cl | 3-F | 3-cyanophenyl- |
| 1.141 | —Me | —Cl | 6-Cl | 3-F | 4-amino-3-methylphenyl- |
| 1.142 | —Me | —Cl | 6-Cl | 3-F | 4-methylsulfonylphenyl- |
| 1.143 | —Me | —Cl | 6-Cl | 3-F | 4-dimethylaminophenyl- |
| 1.144 | —Me | —Cl | 6-Cl | 3-F | 4-methylaminophenyl- |
| 1.145 | —Me | —Cl | 6-Cl | 3-F | 4-tert-butoxyphenyl- |
| 1.146 | —Me | —Cl | 6-Cl | 3-F | 4-cyanophenyl- |
| 1.147 | —Me | —Cl | 6-Cl | 3-F | 4-hydroxyphenyl- |
| 1.148 | —Me | —Cl | 6-Cl | 3-F | 4-cyclopropylphenyl- |
| 1.149 | —Me | —Cl | 6-Cl | 3-F | 4-(methylsulfanyl)phenyl- |
| 1.150 | —Me | —Cl | 6-Cl | 3-F | 4-carboxyphenyl- |
| 1.151 | —Me | —Cl | 6-Cl | 3-F | 4-methoxycarbonylphenyl- |
| 1.152 | —Me | —Cl | 6-Cl | 3-F | 4-(tert-butoxycarbonylamino)-3-fluoro-phenyl- |
| 1.153 | —Me | —Cl | 6-Cl | 3-F | 2-(methylsulfanyl)-4-pyridyl- |
| 1.154 | —Me | —Cl | 6-Cl | 3-F | 2-acetamido-4-pyridyl- |
| 1.155 | —Me | —Cl | 6-Cl | 3-Cl | 4-oxazol-5-ylphenyl- |
| 1.156 | —Me | —Cl | 6-Cl | 3-Cl | 4-acetamidophenyl- |
| 1.157 | —Me | —Cl | 6-Cl | 3-Cl | 4-(dimethylsulfamoyl)phenyl- |
| 1.158 | —Me | —Cl | 6-Cl | 3-Cl | 4-tert-butylphenyl- |
| 1.159 | —Me | —Cl | 6-Cl | 3-Cl | 4-biphenyl- |
| 1.160 | —Me | —Cl | 6-Cl | 3-Cl | 4-[ethyl(methyl)carbamoyl]-3-fluoro-phenyl- |
| 1.161 | —Me | —Cl | 6-Cl | 3-Cl | 2-cyanophenyl- |
| 1.162 | —Me | —Cl | 6-Cl | 3-Cl | 3-cyanophenyl- |
| 1.163 | —Me | —Cl | 6-Cl | 3-Cl | 4-amino-3-methylphenyl- |
| 1.164 | —Me | —Cl | 6-Cl | 3-Cl | 4-methylsulfonylphenyl- |
| 1.165 | —Me | —Cl | 6-Cl | 3-Cl | 4-dimethylaminophenyl- |
| 1.166 | —Me | —Cl | 6-Cl | 3-Cl | 4-methylaminophenyl- |
| 1.167 | —Me | —Cl | 6-Cl | 3-Cl | 4-tert-butoxyphenyl- |
| 1.168 | —Me | —Cl | 6-Cl | 3-Cl | 4-cyanophenyl- |
| 1.169 | —Me | —Cl | 6-Cl | 3-Cl | 4-hydroxyphenyl- |
| 1.170 | —Me | —Cl | 6-Cl | 3-Cl | 4-cyclopropylphenyl- |
| 1.171 | —Me | —Cl | 6-Cl | 3-Cl | 4-(methylsulfanyl)phenyl- |
| 1.172 | —Me | —Cl | 6-Cl | 3-Cl | 4-carboxyphenyl- |
| 1.173 | —Me | —Cl | 6-Cl | 3-Cl | 4-methoxycarbonylphenyl- |
| 1.174 | —Me | —Cl | 6-Cl | 3-Cl | 4-(tert-butoxycarbonylamino)-3-fluoro-phenyl- |
| 1.175 | —Me | —Cl | 6-Cl | 3-Cl | 2-(methylsulfanyl)-4-pyridyl- |
| 1.176 | —Me | —Cl | 6-Cl | 3-Cl | 2-acetamido-4-pyridyl- |
| 1.177 | —CH$_2$—C≡CH | —Me | 6-F | 3-F | 4-oxazol-5-ylphenyl- |
| 1.178 | —CH$_2$—C≡CH | —Me | 6-F | 3-F | 4-acetamidophenyl- |
| 1.179 | —CH$_2$—C≡CH | —Me | 6-F | 3-F | 4-(dimethylsulfamoyl)phenyl- |
| 1.180 | —CH$_2$—C≡CH | —Me | 6-F | 3-F | 4-tert-butylphenyl- |
| 1.181 | —CH$_2$—C≡CH | —Me | 6-F | 3-F | 4-biphenyl- |
| 1.182 | —CH$_2$—C≡CH | —Me | 6-F | 3-F | 4-[ethyl(methyl)carbamoyl]-3-fluoro-phenyl- |
| 1.183 | —CH$_2$—C≡CH | —Me | 6-F | 3-F | 2-cyanophenyl- |
| 1.184 | —CH$_2$—C≡CH | —Me | 6-F | 3-F | 3-cyanophenyl- |
| 1.185 | —CH$_2$—C≡CH | —Me | 6-F | 3-F | 4-amino-3-methylphenyl- |
| 1.186 | —CH$_2$—C≡CH | —Me | 6-F | 3-F | 4-methylsulfonylphenyl- |
| 1.187 | —CH$_2$—C≡CH | —Me | 6-F | 3-F | 4-dimethylaminophenyl- |
| 1.188 | —CH$_2$—C≡CH | —Me | 6-F | 3-F | 4-methylaminophenyl- |
| 1.189 | —CH$_2$—C≡CH | —Me | 6-F | 3-F | 4-tert-butoxyphenyl- |
| 1.190 | —CH$_2$—C≡CH | —Me | 6-F | 3-F | 4-cyanophenyl- |
| 1.191 | —CH$_2$—C≡CH | —Me | 6-F | 3-F | 4-hydroxyphenyl- |
| 1.192 | —CH$_2$—C≡CH | —Me | 6-F | 3-F | 4-cyclopropylphenyl- |
| 1.193 | —CH$_2$—C≡CH | —Me | 6-F | 3-F | 4-(methylsulfanyl)phenyl- |
| 1.194 | —CH$_2$—C≡CH | —Me | 6-F | 3-F | 4-carboxyphenyl- |
| 1.195 | —CH$_2$—C≡CH | —Me | 6-F | 3-F | 4-methoxycarbonylphenyl- |
| 1.196 | —CH$_2$—C≡CH | —Me | 6-F | 3-F | 4-(tert-butoxycarbonylamino)-3-fluoro-phenyl- |
| 1.197 | —CH$_2$—C≡CH | —Me | 6-F | 3-F | 2-(methylsulfanyl)-4-pyridyl- |
| 1.198 | —CH$_2$—C≡CH | —Me | 6-F | 3-F | 2-acetamido-4-pyridyl- |
| 1.199 | —CH$_2$—C≡CH | —Me | 6-F | 3-Cl | 4-oxazol-5-ylphenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.200 | —CH₂—C≡CH | —Me | 6-F | 3-Cl | 4-acetamidophenyl- |
| 1.201 | —CH₂—C≡CH | —Me | 6-F | 3-Cl | 4-(dimethylsulfamoyl)phenyl- |
| 1.202 | —CH₂—C≡CH | —Me | 6-F | 3-Cl | 4-tert-butylphenyl- |
| 1.203 | —CH₂—C≡CH | —Me | 6-F | 3-Cl | 4-biphenyl- |
| 1.204 | —CH₂—C≡CH | —Me | 6-F | 3-Cl | 4-[ethyl(methyl)carbamoyl]-3-fluoro-phenyl- |
| 1.205 | —CH₂—C≡CH | —Me | 6-F | 3-Cl | 2-cyanophenyl- |
| 1.206 | —CH₂—C≡CH | —Me | 6-F | 3-Cl | 3-cyanophenyl- |
| 1.207 | —CH₂—C≡CH | —Me | 6-F | 3-Cl | 4-amino-3-methylphenyl- |
| 1.208 | —CH₂—C≡CH | —Me | 6-F | 3-Cl | 4-methylsulfonylphenyl- |
| 1.209 | —CH₂—C≡CH | —Me | 6-F | 3-Cl | 4-dimethylaminophenyl- |
| 1.210 | —CH₂—C≡CH | —Me | 6-F | 3-Cl | 4-methylaminophenyl- |
| 1.211 | —CH₂—C≡CH | —Me | 6-F | 3-Cl | 4-tert-butoxyphenyl- |
| 1.212 | —CH₂—C≡CH | —Me | 6-F | 3-Cl | 4-cyanophenyl- |
| 1.213 | —CH₂—C≡CH | —Me | 6-F | 3-Cl | 4-hydroxyphenyl- |
| 1.214 | —CH₂—C≡CH | —Me | 6-F | 3-Cl | 4-cyclopropylphenyl- |
| 1.215 | —CH₂—C≡CH | —Me | 6-F | 3-Cl | 4-(methylsulfanyl)phenyl- |
| 1.216 | —CH₂—C≡CH | —Me | 6-F | 3-Cl | 4-carboxyphenyl- |
| 1.217 | —CH₂—C≡CH | —Me | 6-F | 3-Cl | 4-methoxycarbonylphenyl- |
| 1.218 | —CH₂—C≡CH | —Me | 6-F | 3-Cl | 4-(tert-butoxycarbonylamino)-3-fluoro-phenyl- |
| 1.219 | —CH₂—C≡CH | —Me | 6-F | 3-Cl | 2-(methylsulfanyl)-4-pyridyl- |
| 1.220 | —CH₂—C≡CH | —Me | 6-F | 3-Cl | 2-acetamido-4-pyridyl- |
| 1.221 | —CH₂—C≡CH | —Me | 6-Cl | 3-F | 4-oxazol-5-ylphenyl- |
| 1.222 | —CH₂—C≡CH | —Me | 6-Cl | 3-F | 4-acetamidophenyl- |
| 1.223 | —CH₂—C≡CH | —Me | 6-Cl | 3-F | 4-(dimethylsulfamoyl)phenyl- |
| 1.224 | —CH₂—C≡CH | —Me | 6-Cl | 3-F | 4-tert-butylphenyl- |
| 1.225 | —CH₂—C≡CH | —Me | 6-Cl | 3-F | 4-biphenyl- |
| 1.226 | —CH₂—C≡CH | —Me | 6-Cl | 3-F | 4-[ethyl(methyl)carbamoyl]-3-fluoro-phenyl- |
| 1.227 | —CH₂—C≡CH | —Me | 6-Cl | 3-F | 2-cyanophenyl- |
| 1.228 | —CH₂—C≡CH | —Me | 6-Cl | 3-F | 3-cyanophenyl- |
| 1.229 | —CH₂—C≡CH | —Me | 6-Cl | 3-F | 4-amino-3-methylphenyl- |
| 1.230 | —CH₂—C≡CH | —Me | 6-Cl | 3-F | 4-methylsulfonylphenyl- |
| 1.231 | —CH₂—C≡CH | —Me | 6-Cl | 3-F | 4-dimethylaminophenyl- |
| 1.232 | —CH₂—C≡CH | —Me | 6-Cl | 3-F | 4-methylaminophenyl- |
| 1.233 | —CH₂—C≡CH | —Me | 6-Cl | 3-F | 4-tert-butoxyphenyl- |
| 1.234 | —CH₂—C≡CH | —Me | 6-Cl | 3-F | 4-cyanophenyl- |
| 1.235 | —CH₂—C≡CH | —Me | 6-Cl | 3-F | 4-hydroxyphenyl- |
| 1.236 | —CH₂—C≡CH | —Me | 6-Cl | 3-F | 4-cyclopropylphenyl- |
| 1.237 | —CH₂—C≡CH | —Me | 6-Cl | 3-F | 4-(methylsulfanyl)phenyl- |
| 1.238 | —CH₂—C≡CH | —Me | 6-Cl | 3-F | 4-carboxyphenyl- |
| 1.239 | —CH₂—C≡CH | —Me | 6-Cl | 3-F | 4-methoxycarbonylphenyl- |
| 1.240 | —CH₂—C≡CH | —Me | 6-Cl | 3-F | 4-(tert-butoxycarbonylamino)-3-fluoro-phenyl- |
| 1.241 | —CH₂—C≡CH | —Me | 6-Cl | 3-F | 2-(methylsulfanyl)-4-pyridyl- |
| 1.242 | —CH₂—C≡CH | —Me | 6-Cl | 3-F | 2-acetamido-4-pyridyl- |
| 1.243 | —CH₂—C≡CH | —Me | 6-Cl | 3-Cl | 4-oxazol-5-ylphenyl- |
| 1.244 | —CH₂—C≡CH | —Me | 6-Cl | 3-Cl | 4-acetamidophenyl- |
| 1.245 | —CH₂—C≡CH | —Me | 6-Cl | 3-Cl | 4-(dimethylsulfamoyl)phenyl- |
| 1.246 | —CH₂—C≡CH | —Me | 6-Cl | 3-Cl | 4-tert-butylphenyl- |
| 1.247 | —CH₂—C≡CH | —Me | 6-Cl | 3-Cl | 4-biphenyl- |
| 1.248 | —CH₂—C≡CH | —Me | 6-Cl | 3-Cl | 4-[ethyl(methyl)carbamoyl]-3-fluoro-phenyl- |
| 1.249 | —CH₂—C≡CH | —Me | 6-Cl | 3-Cl | 2-cyanophenyl- |
| 1.250 | —CH₂—C≡CH | —Me | 6-Cl | 3-Cl | 3-cyanophenyl- |
| 1.251 | —CH₂—C≡CH | —Me | 6-Cl | 3-Cl | 4-amino-3-methylphenyl- |
| 1.252 | —CH₂—C≡CH | —Me | 6-Cl | 3-Cl | 4-methylsulfonylphenyl- |
| 1.253 | —CH₂—C≡CH | —Me | 6-Cl | 3-Cl | 4-dimethylaminophenyl- |
| 1.254 | —CH₂—C≡CH | —Me | 6-Cl | 3-Cl | 4-methylaminophenyl- |
| 1.255 | —CH₂—C≡CH | —Me | 6-Cl | 3-Cl | 4-tert-butoxyphenyl- |
| 1.256 | —CH₂—C≡CH | —Me | 6-Cl | 3-Cl | 4-cyanophenyl- |
| 1.257 | —CH₂—C≡CH | —Me | 6-Cl | 3-Cl | 4-hydroxyphenyl- |
| 1.258 | —CH₂—C≡CH | —Me | 6-Cl | 3-Cl | 4-cyclopropylphenyl- |
| 1.259 | —CH₂—C≡CH | —Me | 6-Cl | 3-Cl | 4-(methylsulfanyl)phenyl- |
| 1.260 | —CH₂—C≡CH | —Me | 6-Cl | 3-Cl | 4-carboxyphenyl- |
| 1.261 | —CH₂—C≡CH | —Me | 6-Cl | 3-Cl | 4-methoxycarbonylphenyl- |
| 1.262 | —CH₂—C≡CH | —Me | 6-Cl | 3-Cl | 4-(tert-butoxycarbonylamino)-3-fluoro-phenyl- |
| 1.263 | —CH₂—C≡CH | —Me | 6-Cl | 3-Cl | 2-(methylsulfanyl)-4-pyridyl- |
| 1.264 | —CH₂—C≡CH | —Me | 6-Cl | 3-Cl | 2-acetamido-4-pyridyl- |
| 1.265 | —CH₂—C≡CH | —Cl | 6-F | 3-F | 4-oxazol-5-ylphenyl- |
| 1.266 | —CH₂—C≡CH | —Cl | 6-F | 3-F | 4-acetamidophenyl- |
| 1.267 | —CH₂—C≡CH | —Cl | 6-F | 3-F | 4-(dimethylsulfamoyl)phenyl- |
| 1.268 | —CH₂—C≡CH | —Cl | 6-F | 3-F | 4-tert-butylphenyl- |
| 1.269 | —CH₂—C≡CH | —Cl | 6-F | 3-F | 4-biphenyl- |
| 1.270 | —CH₂—C≡CH | —Cl | 6-F | 3-F | 4-[ethyl(methyl)carbamoyl]-3-fluoro-phenyl- |
| 1.271 | —CH₂—C≡CH | —Cl | 6-F | 3-F | 2-cyanophenyl- |
| 1.272 | —CH₂—C≡CH | —Cl | 6-F | 3-F | 3-cyanophenyl- |
| 1.273 | —CH₂—C≡CH | —Cl | 6-F | 3-F | 4-amino-3-methylphenyl- |
| 1.274 | —CH₂—C≡CH | —Cl | 6-F | 3-F | 4-methylsulfonylphenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.275 | —CH₂—C≡CH | —Cl | 6-F | 3-F | 4-dimethylaminophenyl- |
| 1.276 | —CH₂—C≡CH | —Cl | 6-F | 3-F | 4-methylaminophenyl- |
| 1.277 | —CH₂—C≡CH | —Cl | 6-F | 3-F | 4-tert-butoxyphenyl- |
| 1.278 | —CH₂—C≡CH | —Cl | 6-F | 3-F | 4-cyanophenyl- |
| 1.279 | —CH₂—C≡CH | —Cl | 6-F | 3-F | 4-hydroxyphenyl- |
| 1.280 | —CH₂—C≡CH | —Cl | 6-F | 3-F | 4-cyclopropylphenyl- |
| 1.281 | —CH₂—C≡CH | —Cl | 6-F | 3-F | 4-(methylsulfanyl)phenyl- |
| 1.282 | —CH₂—C≡CH | —Cl | 6-F | 3-F | 4-carboxyphenyl- |
| 1.283 | —CH₂—C≡CH | —Cl | 6-F | 3-F | 4-methoxycarbonylphenyl- |
| 1.284 | —CH₂—C≡CH | —Cl | 6-F | 3-F | 4-(tert-butoxycarbonylamino)-3-fluoro-phenyl- |
| 1.285 | —CH₂—C≡CH | —Cl | 6-F | 3-F | 2-(methylsulfanyl)-4-pyridyl- |
| 1.286 | —CH₂—C≡CH | —Cl | 6-F | 3-F | 2-acetamido-4-pyridyl- |
| 1.287 | —CH₂—C≡CH | —Cl | 6-F | 3-Cl | 4-oxazol-5-ylphenyl- |
| 1.288 | —CH₂—C≡CH | —Cl | 6-F | 3-Cl | 4-acetamidophenyl- |
| 1.289 | —CH₂—C≡CH | —Cl | 6-F | 3-Cl | 4-(dimethylsulfamoyl)phenyl- |
| 1.290 | —CH₂—C≡CH | —Cl | 6-F | 3-Cl | 4-tert-butylphenyl- |
| 1.291 | —CH₂—C≡CH | —Cl | 6-F | 3-Cl | 4-biphenyl- |
| 1.292 | —CH₂—C≡CH | —Cl | 6-F | 3-Cl | 4-[ethyl(methyl)carbamoyl]-3-fluoro-phenyl- |
| 1.293 | —CH₂—C≡CH | —Cl | 6-F | 3-Cl | 2-cyanophenyl- |
| 1.294 | —CH₂—C≡CH | —Cl | 6-F | 3-Cl | 3-cyanophenyl- |
| 1.295 | —CH₂—C≡CH | —Cl | 6-F | 3-Cl | 4-amino-3-methylphenyl- |
| 1.296 | —CH₂—C≡CH | —Cl | 6-F | 3-Cl | 4-methylsulfonylphenyl- |
| 1.297 | —CH₂—C≡CH | —Cl | 6-F | 3-Cl | 4-dimethylaminophenyl- |
| 1.298 | —CH₂—C≡CH | —Cl | 6-F | 3-Cl | 4-methylaminophenyl- |
| 1.299 | —CH₂—C≡CH | —Cl | 6-F | 3-Cl | 4-tert-butoxyphenyl- |
| 1.300 | —CH₂—C≡CH | —Cl | 6-F | 3-Cl | 4-cyanophenyl- |
| 1.301 | —CH₂—C≡CH | —Cl | 6-F | 3-Cl | 4-hydroxyphenyl- |
| 1.302 | —CH₂—C≡CH | —Cl | 6-F | 3-Cl | 4-cyclopropylphenyl- |
| 1.303 | —CH₂—C≡CH | —Cl | 6-F | 3-Cl | 4-(methylsulfanyl)phenyl- |
| 1.304 | —CH₂—C≡CH | —Cl | 6-F | 3-Cl | 4-carboxyphenyl- |
| 1.305 | —CH₂—C≡CH | —Cl | 6-F | 3-Cl | 4-methoxycarbonylphenyl- |
| 1.306 | —CH₂—C≡CH | —Cl | 6-F | 3-Cl | 4-(tert-butoxycarbonylamino)-3-fluoro-phenyl- |
| 1.307 | —CH₂—C≡CH | —Cl | 6-F | 3-Cl | 2-(methylsulfanyl)-4-pyridyl- |
| 1.308 | —CH₂—C≡CH | —Cl | 6-F | 3-Cl | 2-acetamido-4-pyridyl- |
| 1.309 | —CH₂—C≡CH | —Cl | 6-Cl | 3-F | 4-oxazol-5-ylphenyl- |
| 1.310 | —CH₂—C≡CH | —Cl | 6-Cl | 3-F | 4-acetamidophenyl- |
| 1.311 | —CH₂—C≡CH | —Cl | 6-Cl | 3-F | 4-(dimethylsulfamoyl)phenyl- |
| 1.312 | —CH₂—C≡CH | —Cl | 6-Cl | 3-F | 4-tert-butylphenyl- |
| 1.313 | —CH₂—C≡CH | —Cl | 6-Cl | 3-F | 4-biphenyl- |
| 1.314 | —CH₂—C≡CH | —Cl | 6-Cl | 3-F | 4-[ethyl(methyl)carbamoyl]-3-fluoro-phenyl- |
| 1.315 | —CH₂—C≡CH | —Cl | 6-Cl | 3-F | 2-cyanophenyl- |
| 1.316 | —CH₂—C≡CH | —Cl | 6-Cl | 3-F | 3-cyanophenyl- |
| 1.317 | —CH₂—C≡CH | —Cl | 6-Cl | 3-F | 4-amino-3-methylphenyl- |
| 1.318 | —CH₂—C≡CH | —Cl | 6-Cl | 3-F | 4-methylsulfonylphenyl- |
| 1.319 | —CH₂—C≡CH | —Cl | 6-Cl | 3-F | 4-dimethylaminophenyl- |
| 1.320 | —CH₂—C≡CH | —Cl | 6-Cl | 3-F | 4-methylaminophenyl- |
| 1.321 | —CH₂—C≡CH | —Cl | 6-Cl | 3-F | 4-tert-butoxyphenyl- |
| 1.322 | —CH₂—C≡CH | —Cl | 6-Cl | 3-F | 4-cyanophenyl- |
| 1.323 | —CH₂—C≡CH | —Cl | 6-Cl | 3-F | 4-hydroxyphenyl- |
| 1.324 | —CH₂—C≡CH | —Cl | 6-Cl | 3-F | 4-cyclopropylphenyl- |
| 1.325 | —CH₂—C≡CH | —Cl | 6-Cl | 3-F | 4-(methylsulfanyl)phenyl- |
| 1.326 | —CH₂—C≡CH | —Cl | 6-Cl | 3-F | 4-carboxyphenyl- |
| 1.327 | —CH₂—C≡CH | —Cl | 6-Cl | 3-F | 4-methoxycarbonylphenyl- |
| 1.328 | —CH₂—C≡CH | —Cl | 6-Cl | 3-F | 4-(tert-butoxycarbonylamino)-3-fluoro-phenyl- |
| 1.329 | —CH₂—C≡CH | —Cl | 6-Cl | 3-F | 2-(methylsulfanyl)-4-pyridyl- |
| 1.330 | —CH₂—C≡CH | —Cl | 6-Cl | 3-F | 2-acetamido-4-pyridyl- |
| 1.331 | —CH₂—C≡CH | —Cl | 6-Cl | 3-Cl | 4-oxazol-5-ylphenyl- |
| 1.332 | —CH₂—C≡CH | —Cl | 6-Cl | 3-Cl | 4-acetamidophenyl- |
| 1.333 | —CH₂—C≡CH | —Cl | 6-Cl | 3-Cl | 4-(dimethylsulfamoyl)phenyl- |
| 1.334 | —CH₂—C≡CH | —Cl | 6-Cl | 3-Cl | 4-tert-butylphenyl- |
| 1.335 | —CH₂—C≡CH | —Cl | 6-Cl | 3-Cl | 4-biphenyl- |
| 1.336 | —CH₂—C≡CH | —Cl | 6-Cl | 3-Cl | 4-[ethyl(methyl)carbamoyl]-3-fluoro-phenyl- |
| 1.337 | —CH₂—C≡CH | —Cl | 6-Cl | 3-Cl | 2-cyanophenyl- |
| 1.338 | —CH₂—C≡CH | —Cl | 6-Cl | 3-Cl | 3-cyanophenyl- |
| 1.339 | —CH₂—C≡CH | —Cl | 6-Cl | 3-Cl | 4-amino-3-methylphenyl- |
| 1.340 | —CH₂—C≡CH | —Cl | 6-Cl | 3-Cl | 4-methylsulfonylphenyl- |
| 1.341 | —CH₂—C≡CH | —Cl | 6-Cl | 3-Cl | 4-dimethylaminophenyl- |
| 1.342 | —CH₂—C≡CH | —Cl | 6-Cl | 3-Cl | 4-methylaminophenyl- |
| 1.343 | —CH₂—C≡CH | —Cl | 6-Cl | 3-Cl | 4-tert-butoxyphenyl- |
| 1.344 | —CH₂—C≡CH | —Cl | 6-Cl | 3-Cl | 4-cyanophenyl- |
| 1.345 | —CH₂—C≡CH | —Cl | 6-Cl | 3-Cl | 4-hydroxyphenyl- |
| 1.346 | —CH₂—C≡CH | —Cl | 6-Cl | 3-Cl | 4-cyclopropylphenyl- |
| 1.347 | —CH₂—C≡CH | —Cl | 6-Cl | 3-Cl | 4-(methylsulfanyl)phenyl- |
| 1.348 | —CH₂—C≡CH | —Cl | 6-Cl | 3-Cl | 4-carboxyphenyl- |
| 1.349 | —CH₂—C≡CH | —Cl | 6-Cl | 3-Cl | 4-methoxycarbonylphenyl- |

TABLE 1-continued

Substituent definitions of R¹, R², X, Y and D:

| Cmpd No. | R¹ | R² | X | Y | D |
|---|---|---|---|---|---|
| 1.350 | —CH₂—C≡CH | —Cl | 6-Cl | 3-Cl | 4-(tert-butoxycarbonylamino)-3-fluoro-phenyl- |
| 1.351 | —CH₂—C≡CH | —Cl | 6-Cl | 3-Cl | 2-(methylsulfanyl)-4-pyridyl- |
| 1.352 | —CH₂—C≡CH | —Cl | 6-Cl | 3-Cl | 2-acetamido-4-pyridyl- |
| 1.353 | —Me | —Me | 6-F | 3-F | 4-(1-methylpyrazol-3-yl)phenyl- |
| 1.354 | —Me | —Me | 6-F | 3-F | 4-(5-methyltetrazol-1-yl)phenyl- |
| 1.355 | —Me | —Me | 6-F | 3-F | 4-morpholinophenyl- |
| 1.356 | —Me | —Me | 6-F | 3-F | 4-(3-methylpyrazol-1-yl)phenyl- |
| 1.357 | —Me | —Me | 6-F | 3-F | 4-(3,5-dimethylpyrazol-1-yl)phenyl- |
| 1.358 | —Me | —Me | 6-F | 3-F | 4-pyrazol-1-ylphenyl- |
| 1.359 | —Me | —Me | 6-F | 3-F | 4-pyrrol-1-ylphenyl- |
| 1.360 | —Me | —Me | 6-F | 3-F | 4-(5-methyltetrahydrofuran-2-yl)phenyl- |
| 1.361 | —Me | —Me | 6-F | 3-F | 4-(5-methyl-2-furyl)phenyl- |
| 1.362 | —Me | —Me | 6-F | 3-F | 4-oxazol-2-ylphenyl- |
| 1.363 | —Me | —Me | 6-F | 3-F | 4-(2-methylthiazol-4-yl)phenyl- |
| 1.364 | —Me | —Me | 6-F | 3-F | 4-(2-thienyl)phenyl- |
| 1.365 | —Me | —Me | 6-F | 3-F | 4-(1,2,4-triazol-1-yl)phenyl- |
| 1.366 | —Me | —Me | 6-F | 3-F | 1-phenyl-4-pyrazolyl- |
| 1.367 | —Me | —Me | 6-F | 3-F | 1-cyclopropyl-4-pyrazolyl- |
| 1.368 | —Me | —Me | 6-F | 3-F | 4-(methylsulfanylmethyl)phenyl- |
| 1.369 | —Me | —Me | 6-F | 3-F | 4-(isopropylsulfanylmethyl)phenyl- |
| 1.370 | —Me | —Me | 6-F | 3-F | 4-(methylsulfamoyl)phenyl- |
| 1.371 | —Me | —Me | 6-F | 3-F | 4-sulfamoylphenyl- |
| 1.372 | —Me | —Me | 6-F | 3-F | 4-carbamoylphenyl- |
| 1.373 | —Me | —Me | 6-F | 3-Cl | 4-(1-methylpyrazol-3-yl)phenyl- |
| 1.374 | —Me | —Me | 6-F | 3-Cl | 4-(5-methyltetrazol-1-yl)phenyl- |
| 1.375 | —Me | —Me | 6-F | 3-Cl | 4-morpholinophenyl- |
| 1.376 | —Me | —Me | 6-F | 3-Cl | 4-(3-methylpyrazol-1-yl)phenyl- |
| 1.377 | —Me | —Me | 6-F | 3-Cl | 4-(3,5-dimethylpyrazol-1-yl)phenyl- |
| 1.378 | —Me | —Me | 6-F | 3-Cl | 4-pyrazol-1-ylphenyl- |
| 1.379 | —Me | —Me | 6-F | 3-Cl | 4-pyrrol-1-ylphenyl- |
| 1.380 | —Me | —Me | 6-F | 3-Cl | 4-(5-methyltetrahydrofuran-2-yl)phenyl- |
| 1.381 | —Me | —Me | 6-F | 3-Cl | 4-(5-methyl-2-furyl)phenyl- |
| 1.382 | —Me | —Me | 6-F | 3-Cl | 4-oxazol-2-ylphenyl- |
| 1.383 | —Me | —Me | 6-F | 3-Cl | 4-(2-methylthiazol-4-yl)phenyl- |
| 1.384 | —Me | —Me | 6-F | 3-Cl | 4-(2-thienyl)phenyl- |
| 1.385 | —Me | —Me | 6-F | 3-Cl | 4-(1,2,4-triazol-1-yl)phenyl- |
| 1.386 | —Me | —Me | 6-F | 3-Cl | 1-phenyl-4-pyrazolyl- |
| 1.387 | —Me | —Me | 6-F | 3-Cl | 1-cyclopropyl-4-pyrazolyl- |
| 1.388 | —Me | —Me | 6-F | 3-Cl | 4-(methylsulfanylmethyl)phenyl- |
| 1.389 | —Me | —Me | 6-F | 3-Cl | 4-(isopropylsulfanylmethyl)phenyl- |
| 1.390 | —Me | —Me | 6-F | 3-Cl | 4-(methylsulfamoyl)phenyl- |
| 1.391 | —Me | —Me | 6-F | 3-Cl | 4-sulfamoylphenyl- |
| 1.392 | —Me | —Me | 6-F | 3-Cl | 4-carbamoylphenyl- |
| 1.393 | —Me | —Me | 6-Cl | 3-F | 4-(1-methylpyrazol-3-yl)phenyl- |
| 1.394 | —Me | —Me | 6-Cl | 3-F | 4-(5-methyltetrazol-1-yl)phenyl- |
| 1.395 | —Me | —Me | 6-Cl | 3-F | 4-morpholinophenyl- |
| 1.396 | —Me | —Me | 6-Cl | 3-F | 4-(3-methylpyrazol-1-yl)phenyl- |
| 1.397 | —Me | —Me | 6-Cl | 3-F | 4-(3,5-dimethylpyrazol-1-yl)phenyl- |
| 1.398 | —Me | —Me | 6-Cl | 3-F | 4-pyrazol-1-ylphenyl- |
| 1.399 | —Me | —Me | 6-Cl | 3-F | 4-pyrrol-1-ylphenyl- |
| 1.400 | —Me | —Me | 6-Cl | 3-F | 4-(5-methyltetrahydrofuran-2-yl)phenyl- |
| 1.401 | —Me | —Me | 6-Cl | 3-F | 4-(5-methyl-2-furyl)phenyl- |
| 1.402 | —Me | —Me | 6-Cl | 3-F | 4-oxazol-2-ylphenyl- |
| 1.403 | —Me | —Me | 6-Cl | 3-F | 4-(2-methylthiazol-4-yl)phenyl- |
| 1.404 | —Me | —Me | 6-Cl | 3-F | 4-(2-thienyl)phenyl- |
| 1.405 | —Me | —Me | 6-Cl | 3-F | 4-(1,2,4-triazol-1-yl)phenyl- |
| 1.406 | —Me | —Me | 6-Cl | 3-F | 1-phenyl-4-pyrazolyl- |
| 1.407 | —Me | —Me | 6-Cl | 3-F | 1-cyclopropyl-4-pyrazolyl- |
| 1.408 | —Me | —Me | 6-Cl | 3-F | 4-(methylsulfanylmethyl)phenyl- |
| 1.409 | —Me | —Me | 6-Cl | 3-F | 4-(isopropylsulfanylmethyl)phenyl- |
| 1.410 | —Me | —Me | 6-Cl | 3-F | 4-(methylsulfamoyl)phenyl- |
| 1.411 | —Me | —Me | 6-Cl | 3-F | 4-sulfamoylphenyl- |
| 1.412 | —Me | —Me | 6-Cl | 3-F | 4-carbamoylphenyl- |
| 1.413 | —Me | —Me | 6-Cl | 3-Cl | 4-(1-methylpyrazol-3-yl)phenyl- |
| 1.414 | —Me | —Me | 6-Cl | 3-Cl | 4-(5-methyltetrazol-1-yl)phenyl- |
| 1.415 | —Me | —Me | 6-Cl | 3-Cl | 4-morpholinophenyl- |
| 1.416 | —Me | —Me | 6-Cl | 3-Cl | 4-(3-methylpyrazol-1-yl)phenyl- |
| 1.417 | —Me | —Me | 6-Cl | 3-Cl | 4-(3,5-dimethylpyrazol-1-yl)phenyl- |
| 1.418 | —Me | —Me | 6-Cl | 3-Cl | 4-pyrazol-1-ylphenyl- |
| 1.419 | —Me | —Me | 6-Cl | 3-Cl | 4-pyrrol-1-ylphenyl- |
| 1.420 | —Me | —Me | 6-Cl | 3-Cl | 4-(5-methyltetrahydrofuran-2-yl)phenyl- |
| 1.421 | —Me | —Me | 6-Cl | 3-Cl | 4-(5-methyl-2-furyl)phenyl- |
| 1.422 | —Me | —Me | 6-Cl | 3-Cl | 4-oxazol-2-ylphenyl- |
| 1.423 | —Me | —Me | 6-Cl | 3-Cl | 4-(2-methylthiazol-4-yl)phenyl- |
| 1.424 | —Me | —Me | 6-Cl | 3-Cl | 4-(2-thienyl)phenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.425 | —Me | —Me | 6-Cl | 3-Cl | 4-(1,2,4-triazol-1-yl)phenyl- |
| 1.426 | —Me | —Me | 6-Cl | 3-Cl | 1-phenyl-4-pyrazolyl- |
| 1.427 | —Me | —Me | 6-Cl | 3-Cl | 1-cyclopropyl-4-pyrazolyl- |
| 1.428 | —Me | —Me | 6-Cl | 3-Cl | 4-(methylsulfanylmethyl)phenyl- |
| 1.429 | —Me | —Me | 6-Cl | 3-Cl | 4-(isopropylsulfanylmethyl)phenyl- |
| 1.430 | —Me | —Me | 6-Cl | 3-Cl | 4-(methylsulfamoyl)phenyl- |
| 1.431 | —Me | —Me | 6-Cl | 3-Cl | 4-sulfamoylphenyl- |
| 1.432 | —Me | —Me | 6-Cl | 3-Cl | 4-carbamoylphenyl- |
| 1.433 | —Me | —Cl | 6-F | 3-F | 4-(1-methylpyrazol-3-yl)phenyl- |
| 1.434 | —Me | —Cl | 6-F | 3-F | 4-(5-methyltetrazol-1-yl)phenyl- |
| 1.435 | —Me | —Cl | 6-F | 3-F | 4-morpholinophenyl- |
| 1.436 | —Me | —Cl | 6-F | 3-F | 4-(3-methylpyrazol-1-yl)phenyl- |
| 1.437 | —Me | —Cl | 6-F | 3-F | 4-(3,5-dimethylpyrazol-1-yl)phenyl- |
| 1.438 | —Me | —Cl | 6-F | 3-F | 4-pyrazol-1-ylphenyl- |
| 1.439 | —Me | —Cl | 6-F | 3-F | 4-pyrrol-1-ylphenyl- |
| 1.440 | —Me | —Cl | 6-F | 3-F | 4-(5-methyltetrahydrofuran-2-yl)phenyl- |
| 1.441 | —Me | —Cl | 6-F | 3-F | 4-(5-methyl-2-furyl)phenyl- |
| 1.442 | —Me | —Cl | 6-F | 3-F | 4-oxazol-2-ylphenyl- |
| 1.443 | —Me | —Cl | 6-F | 3-F | 4-(2-methylthiazol-4-yl)phenyl- |
| 1.444 | —Me | —Cl | 6-F | 3-F | 4-(2-thienyl)phenyl- |
| 1.445 | —Me | —Cl | 6-F | 3-F | 4-(1,2,4-triazol-1-yl)phenyl- |
| 1.446 | —Me | —Cl | 6-F | 3-F | 1-phenyl-4-pyrazolyl- |
| 1.447 | —Me | —Cl | 6-F | 3-F | 1-cyclopropyl-4-pyrazolyl- |
| 1.448 | —Me | —Cl | 6-F | 3-F | 4-(methylsulfanylmethyl)phenyl- |
| 1.449 | —Me | —Cl | 6-F | 3-F | 4-(isopropylsulfanylmethyl)phenyl- |
| 1.450 | —Me | —Cl | 6-F | 3-F | 4-(methylsulfamoyl)phenyl- |
| 1.451 | —Me | —Cl | 6-F | 3-F | 4-sulfamoylphenyl- |
| 1.452 | —Me | —Cl | 6-F | 3-F | 4-carbamoylphenyl- |
| 1.453 | —Me | —Cl | 6-F | 3-Cl | 4-(1-methylpyrazol-3-yl)phenyl- |
| 1.454 | —Me | —Cl | 6-F | 3-Cl | 4-(5-methyltetrazol-1-yl)phenyl- |
| 1.455 | —Me | —Cl | 6-F | 3-Cl | 4-morpholinophenyl- |
| 1.456 | —Me | —Cl | 6-F | 3-Cl | 4-(3-methylpyrazol-1-yl)phenyl- |
| 1.457 | —Me | —Cl | 6-F | 3-Cl | 4-(3,5-dimethylpyrazol-1-yl)phenyl- |
| 1.458 | —Me | —Cl | 6-F | 3-Cl | 4-pyrazol-1-ylphenyl- |
| 1.459 | —Me | —Cl | 6-F | 3-Cl | 4-pyrrol-1-ylphenyl- |
| 1.460 | —Me | —Cl | 6-F | 3-Cl | 4-(5-methyltetrahydrofuran-2-yl)phenyl- |
| 1.461 | —Me | —Cl | 6-F | 3-Cl | 4-(5-methyl-2-furyl)phenyl- |
| 1.462 | —Me | —Cl | 6-F | 3-Cl | 4-oxazol-2-ylphenyl- |
| 1.463 | —Me | —Cl | 6-F | 3-Cl | 4-(2-methylthiazol-4-yl)phenyl- |
| 1.464 | —Me | —Cl | 6-F | 3-Cl | 4-(2-thienyl)phenyl- |
| 1.465 | —Me | —Cl | 6-F | 3-Cl | 4-(1,2,4-triazol-1-yl)phenyl- |
| 1.466 | —Me | —Cl | 6-F | 3-Cl | 1-phenyl-4-pyrazolyl- |
| 1.467 | —Me | —Cl | 6-F | 3-Cl | 1-cyclopropyl-4-pyrazolyl- |
| 1.468 | —Me | —Cl | 6-F | 3-Cl | 4-(methylsulfanylmethyl)phenyl- |
| 1.469 | —Me | —Cl | 6-F | 3-Cl | 4-(isopropylsulfanylmethyl)phenyl- |
| 1.470 | —Me | —Cl | 6-F | 3-Cl | 4-(methylsulfamoyl)phenyl- |
| 1.471 | —Me | —Cl | 6-F | 3-Cl | 4-sulfamoylphenyl- |
| 1.472 | —Me | —Cl | 6-F | 3-Cl | 4-carbamoylphenyl- |
| 1.473 | —Me | —Cl | 6-Cl | 3-F | 4-(1-methylpyrazol-3-yl)phenyl- |
| 1.474 | —Me | —Cl | 6-Cl | 3-F | 4-(5-methyltetrazol-1-yl)phenyl- |
| 1.475 | —Me | —Cl | 6-Cl | 3-F | 4-morpholinophenyl- |
| 1.476 | —Me | —Cl | 6-Cl | 3-F | 4-(3-methylpyrazol-1-yl)phenyl- |
| 1.477 | —Me | —Cl | 6-Cl | 3-F | 4-(3,5-dimethylpyrazol-1-yl)phenyl- |
| 1.478 | —Me | —Cl | 6-Cl | 3-F | 4-pyrazol-1-ylphenyl- |
| 1.479 | —Me | —Cl | 6-Cl | 3-F | 4-pyrrol-1-ylphenyl- |
| 1.480 | —Me | —Cl | 6-Cl | 3-F | 4-(5-methyltetrahydrofuran-2-yl)phenyl- |
| 1.481 | —Me | —Cl | 6-Cl | 3-F | 4-(5-methyl-2-furyl)phenyl- |
| 1.482 | —Me | —Cl | 6-Cl | 3-F | 4-oxazol-2-ylphenyl- |
| 1.483 | —Me | —Cl | 6-Cl | 3-F | 4-(2-methylthiazol-4-yl)phenyl- |
| 1.484 | —Me | —Cl | 6-Cl | 3-F | 4-(2-thienyl)phenyl- |
| 1.485 | —Me | —Cl | 6-Cl | 3-F | 4-(1,2,4-triazol-1-yl)phenyl- |
| 1.486 | —Me | —Cl | 6-Cl | 3-F | 1-phenyl-4-pyrazolyl- |
| 1.487 | —Me | —Cl | 6-Cl | 3-F | 1-cyclopropyl-4-pyrazolyl- |
| 1.488 | —Me | —Cl | 6-Cl | 3-F | 4-(methylsulfanylmethyl)phenyl- |
| 1.489 | —Me | —Cl | 6-Cl | 3-F | 4-(isopropylsulfanylmethyl)phenyl- |
| 1.490 | —Me | —Cl | 6-Cl | 3-F | 4-(methylsulfamoyl)phenyl- |
| 1.491 | —Me | —Cl | 6-Cl | 3-F | 4-sulfamoylphenyl- |
| 1.492 | —Me | —Cl | 6-Cl | 3-F | 4-carbamoylphenyl- |
| 1.493 | —Me | —Cl | 6-Cl | 3-Cl | 4-(1-methylpyrazol-3-yl)phenyl- |
| 1.494 | —Me | —Cl | 6-Cl | 3-Cl | 4-(5-methyltetrazol-1-yl)phenyl- |
| 1.495 | —Me | —Cl | 6-Cl | 3-Cl | 4-morpholinophenyl- |
| 1.496 | —Me | —Cl | 6-Cl | 3-Cl | 4-(3-methylpyrazol-1-yl)phenyl- |
| 1.497 | —Me | —Cl | 6-Cl | 3-Cl | 4-(3,5-dimethylpyrazol-1-yl)phenyl- |
| 1.498 | —Me | —Cl | 6-Cl | 3-Cl | 4-pyrazol-1-ylphenyl- |
| 1.499 | —Me | —Cl | 6-Cl | 3-Cl | 4-pyrrol-1-ylphenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.500 | —Me | —Cl | 6-Cl | 3-Cl | 4-(5-methyltetrahydrofuran-2-yl)phenyl- |
| 1.501 | —Me | —Cl | 6-Cl | 3-Cl | 4-(5-methyl-2-furyl)phenyl- |
| 1.502 | —Me | —Cl | 6-Cl | 3-Cl | 4-oxazol-2-ylphenyl- |
| 1.503 | —Me | —Cl | 6-Cl | 3-Cl | 4-(2-methylthiazol-4-yl)phenyl- |
| 1.504 | —Me | —Cl | 6-Cl | 3-Cl | 4-(2-thienyl)phenyl- |
| 1.505 | —Me | —Cl | 6-Cl | 3-Cl | 4-(1,2,4-triazol-1-yl)phenyl- |
| 1.506 | —Me | —Cl | 6-Cl | 3-Cl | 1-phenyl-4-pyrazolyl- |
| 1.507 | —Me | —Cl | 6-Cl | 3-Cl | 1-cyclopropyl-4-pyrazolyl- |
| 1.508 | —Me | —Cl | 6-Cl | 3-Cl | 4-(methylsulfanylmethyl)phenyl- |
| 1.509 | —Me | —Cl | 6-Cl | 3-Cl | 4-(isopropylsulfanylmethyl)phenyl- |
| 1.510 | —Me | —Cl | 6-Cl | 3-Cl | 4-(methylsulfamoyl)phenyl- |
| 1.511 | —Me | —Cl | 6-Cl | 3-Cl | 4-sulfamoylphenyl- |
| 1.512 | —Me | —Cl | 6-Cl | 3-Cl | 4-carbamoylphenyl- |
| 1.513 | —CH$_2$—C≡CH | —Me | 6-F | 3-F | 4-(1-methylpyrazol-3-yl)phenyl- |
| 1.514 | —CH$_2$—C≡CH | —Me | 6-F | 3-F | 4-(5-methyltetrazol-1-yl)phenyl- |
| 1.515 | —CH$_2$—C≡CH | —Me | 6-F | 3-F | 4-morpholinophenyl- |
| 1.516 | —CH$_2$—C≡CH | —Me | 6-F | 3-F | 4-(3-methylpyrazol-1-yl)phenyl- |
| 1.517 | —CH$_2$—C≡CH | —Me | 6-F | 3-F | 4-(3,5-dimethylpyrazol-1-yl)phenyl- |
| 1.518 | —CH$_2$—C≡CH | —Me | 6-F | 3-F | 4-pyrazol-1-ylphenyl- |
| 1.519 | —CH$_2$—C≡CH | —Me | 6-F | 3-F | 4-pyrrol-1-ylphenyl- |
| 1.520 | —CH$_2$—C≡CH | —Me | 6-F | 3-F | 4-(5-methyltetrahydrofuran-2-yl)phenyl- |
| 1.521 | —CH$_2$—C≡CH | —Me | 6-F | 3-F | 4-(5-methyl-2-furyl)phenyl- |
| 1.522 | —CH$_2$—C≡CH | —Me | 6-F | 3-F | 4-oxazol-2-ylphenyl- |
| 1.523 | —CH$_2$—C≡CH | —Me | 6-F | 3-F | 4-(2-methylthiazol-4-yl)phenyl- |
| 1.524 | —CH$_2$—C≡CH | —Me | 6-F | 3-F | 4-(2-thienyl)phenyl- |
| 1.525 | —CH$_2$—C≡CH | —Me | 6-F | 3-F | 4-(1,2,4-triazol-1-yl)phenyl- |
| 1.526 | —CH$_2$—C≡CH | —Me | 6-F | 3-F | 1-phenyl-4-pyrazolyl- |
| 1.527 | —CH$_2$—C≡CH | —Me | 6-F | 3-F | 1-cyclopropyl-4-pyrazolyl- |
| 1.528 | —CH$_2$—C≡CH | —Me | 6-F | 3-F | 4-(methylsulfanylmethyl)phenyl- |
| 1.529 | —CH$_2$—C≡CH | —Me | 6-F | 3-F | 4-(isopropylsulfanylmethyl)phenyl- |
| 1.530 | —CH$_2$—C≡CH | —Me | 6-F | 3-F | 4-(methylsulfamoyl)phenyl- |
| 1.531 | —CH$_2$—C≡CH | —Me | 6-F | 3-F | 4-sulfamoylphenyl- |
| 1.532 | —CH$_2$—C≡CH | —Me | 6-F | 3-F | 4-carbamoylphenyl- |
| 1.533 | —CH$_2$—C≡CH | —Me | 6-F | 3-Cl | 4-(1-methylpyrazol-3-yl)phenyl- |
| 1.534 | —CH$_2$—C≡CH | —Me | 6-F | 3-Cl | 4-(5-methyltetrazol-1-yl)phenyl- |
| 1.535 | —CH$_2$—C≡CH | —Me | 6-F | 3-Cl | 4-morpholinophenyl- |
| 1.536 | —CH$_2$—C≡CH | —Me | 6-F | 3-Cl | 4-(3-methylpyrazol-1-yl)phenyl- |
| 1.537 | —CH$_2$—C≡CH | —Me | 6-F | 3-Cl | 4-(3,5-dimethylpyrazol-1-yl)phenyl- |
| 1.538 | —CH$_2$—C≡CH | —Me | 6-F | 3-Cl | 4-pyrazol-1-ylphenyl- |
| 1.539 | —CH$_2$—C≡CH | —Me | 6-F | 3-Cl | 4-pyrrol-1-ylphenyl- |
| 1.540 | —CH$_2$—C≡CH | —Me | 6-F | 3-Cl | 4-(5-methyltetrahydrofuran-2-yl)phenyl- |
| 1.541 | —CH$_2$—C≡CH | —Me | 6-F | 3-Cl | 4-(5-methyl-2-furyl)phenyl- |
| 1.542 | —CH$_2$—C≡CH | —Me | 6-F | 3-Cl | 4-oxazol-2-ylphenyl- |
| 1.543 | —CH$_2$—C≡CH | —Me | 6-F | 3-Cl | 4-(2-methylthiazol-4-yl)phenyl- |
| 1.544 | —CH$_2$—C≡CH | —Me | 6-F | 3-Cl | 4-(2-thienyl)phenyl- |
| 1.545 | —CH$_2$—C≡CH | —Me | 6-F | 3-Cl | 4-(1,2,4-triazol-1-yl)phenyl- |
| 1.546 | —CH$_2$—C≡CH | —Me | 6-F | 3-Cl | 1-phenyl-4-pyrazolyl- |
| 1.547 | —CH$_2$—C≡CH | —Me | 6-F | 3-Cl | 1-cyclopropyl-4-pyrazolyl- |
| 1.548 | —CH$_2$—C≡CH | —Me | 6-F | 3-Cl | 4-(methylsulfanylmethyl)phenyl- |
| 1.549 | —CH$_2$—C≡CH | —Me | 6-F | 3-Cl | 4-(isopropylsulfanylmethyl)phenyl- |
| 1.550 | —CH$_2$—C≡CH | —Me | 6-F | 3-Cl | 4-(methylsulfamoyl)phenyl- |
| 1.551 | —CH$_2$—C≡CH | —Me | 6-F | 3-Cl | 4-sulfamoylphenyl- |
| 1.552 | —CH$_2$—C≡CH | —Me | 6-F | 3-Cl | 4-carbamoylphenyl- |
| 1.553 | —CH$_2$—C≡CH | —Me | 6-Cl | 3-F | 4-(1-methylpyrazol-3-yl)phenyl- |
| 1.554 | —CH$_2$—C≡CH | —Me | 6-Cl | 3-F | 4-(5-methyltetrazol-1-yl)phenyl- |
| 1.555 | —CH$_2$—C≡CH | —Me | 6-Cl | 3-F | 4-morpholinophenyl- |
| 1.556 | —CH$_2$—C≡CH | —Me | 6-Cl | 3-F | 4-(3-methylpyrazol-1-yl)phenyl- |
| 1.557 | —CH$_2$—C≡CH | —Me | 6-Cl | 3-F | 4-(3,5-dimethylpyrazol-1-yl)phenyl- |
| 1.558 | —CH$_2$—C≡CH | —Me | 6-Cl | 3-F | 4-pyrazol-1-ylphenyl- |
| 1.559 | —CH$_2$—C≡CH | —Me | 6-Cl | 3-F | 4-pyrrol-1-ylphenyl- |
| 1.560 | —CH$_2$—C≡CH | —Me | 6-Cl | 3-F | 4-(5-methyltetrahydrofuran-2-yl)phenyl- |
| 1.561 | —CH$_2$—C≡CH | —Me | 6-Cl | 3-F | 4-(5-methyl-2-furyl)phenyl- |
| 1.562 | —CH$_2$—C≡CH | —Me | 6-Cl | 3-F | 4-oxazol-2-ylphenyl- |
| 1.563 | —CH$_2$—C≡CH | —Me | 6-Cl | 3-F | 4-(2-methylthiazol-4-yl)phenyl- |
| 1.564 | —CH$_2$—C≡CH | —Me | 6-Cl | 3-F | 4-(2-thienyl)phenyl- |
| 1.565 | —CH$_2$—C≡CH | —Me | 6-Cl | 3-F | 4-(1,2,4-triazol-1-yl)phenyl- |
| 1.566 | —CH$_2$—C≡CH | —Me | 6-Cl | 3-F | 1-phenyl-4-pyrazolyl- |
| 1.567 | —CH$_2$—C≡CH | —Me | 6-Cl | 3-F | 1-cyclopropyl-4-pyrazolyl- |
| 1.568 | —CH$_2$—C≡CH | —Me | 6-Cl | 3-F | 4-(methylsulfanylmethyl)phenyl- |
| 1.569 | —CH$_2$—C≡CH | —Me | 6-Cl | 3-F | 4-(isopropylsulfanylmethyl)phenyl- |
| 1.570 | —CH$_2$—C≡CH | —Me | 6-Cl | 3-F | 4-(methylsulfamoyl)phenyl- |
| 1.571 | —CH$_2$—C≡CH | —Me | 6-Cl | 3-F | 4-sulfamoylphenyl- |
| 1.572 | —CH$_2$—C≡CH | —Me | 6-Cl | 3-F | 4-carbamoylphenyl- |
| 1.573 | —CH$_2$—C≡CH | —Me | 6-Cl | 3-Cl | 4-(1-methylpyrazol-3-yl)phenyl- |
| 1.574 | —CH$_2$—C≡CH | —Me | 6-Cl | 3-Cl | 4-(5-methyltetrazol-1-yl)phenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.575 | —CH$_2$—C≡CH | —Me | 6-Cl | 3-Cl | 4-morpholinophenyl- |
| 1.576 | —CH$_2$—C≡CH | —Me | 6-Cl | 3-Cl | 4-(3-methylpyrazol-1-yl)phenyl- |
| 1.577 | —CH$_2$—C≡CH | —Me | 6-Cl | 3-Cl | 4-(3,5-dimethylpyrazol-1-yl)phenyl- |
| 1.578 | —CH$_2$—C≡CH | —Me | 6-Cl | 3-Cl | 4-pyrazol-1-ylphenyl- |
| 1.579 | —CH$_2$—C≡CH | —Me | 6-Cl | 3-Cl | 4-pyrrol-1-ylphenyl- |
| 1.580 | —CH$_2$—C≡CH | —Me | 6-Cl | 3-Cl | 4-(5-methyltetrahydrofuran-2-yl)phenyl- |
| 1.581 | —CH$_2$—C≡CH | —Me | 6-Cl | 3-Cl | 4-(5-methyl-2-furyl)phenyl- |
| 1.582 | —CH$_2$—C≡CH | —Me | 6-Cl | 3-Cl | 4-oxazol-2-ylphenyl- |
| 1.583 | —CH$_2$—C≡CH | —Me | 6-Cl | 3-Cl | 4-(2-methylthiazol-4-yl)phenyl- |
| 1.584 | —CH$_2$—C≡CH | —Me | 6-Cl | 3-Cl | 4-(2-thienyl)phenyl- |
| 1.585 | —CH$_2$—C≡CH | —Me | 6-Cl | 3-Cl | 4-(1,2,4-triazol-1-yl)phenyl- |
| 1.586 | —CH$_2$—C≡CH | —Me | 6-Cl | 3-Cl | 1-phenyl-4-pyrazolyl- |
| 1.587 | —CH$_2$—C≡CH | —Me | 6-Cl | 3-Cl | 1-cyclopropyl-4-pyrazolyl- |
| 1.588 | —CH$_2$—C≡CH | —Me | 6-Cl | 3-Cl | 4-(methylsulfanylmethyl)phenyl- |
| 1.589 | —CH$_2$—C≡CH | —Me | 6-Cl | 3-Cl | 4-(isopropylsulfanylmethyl)phenyl- |
| 1.590 | —CH$_2$—C≡CH | —Me | 6-Cl | 3-Cl | 4-(methylsulfamoyl)phenyl- |
| 1.591 | —CH$_2$—C≡CH | —Me | 6-Cl | 3-Cl | 4-sulfamoylphenyl- |
| 1.592 | —CH$_2$—C≡CH | —Me | 6-Cl | 3-Cl | 4-carbamoylphenyl- |
| 1.593 | —CH$_2$—C≡CH | —Cl | 6-F | 3-F | 4-(1-methylpyrazol-3-yl)phenyl- |
| 1.594 | —CH$_2$—C≡CH | —Cl | 6-F | 3-F | 4-(5-methyltetrazol-1-yl)phenyl- |
| 1.595 | —CH$_2$—C≡CH | —Cl | 6-F | 3-F | 4-morpholinophenyl- |
| 1.596 | —CH$_2$—C≡CH | —Cl | 6-F | 3-F | 4-(3-methylpyrazol-1-yl)phenyl- |
| 1.597 | —CH$_2$—C≡CH | —Cl | 6-F | 3-F | 4-(3,5-dimethylpyrazol-1-yl)phenyl- |
| 1.598 | —CH$_2$—C≡CH | —Cl | 6-F | 3-F | 4-pyrazol-1-ylphenyl- |
| 1.599 | —CH$_2$—C≡CH | —Cl | 6-F | 3-F | 4-pyrrol-1-ylphenyl- |
| 1.600 | —CH$_2$—C≡CH | —Cl | 6-F | 3-F | 4-(5-methyltetrahydrofuran-2-yl)phenyl- |
| 1.601 | —CH$_2$—C≡CH | —Cl | 6-F | 3-F | 4-(5-methyl-2-furyl)phenyl- |
| 1.602 | —CH$_2$—C≡CH | —Cl | 6-F | 3-F | 4-oxazol-2-ylphenyl- |
| 1.603 | —CH$_2$—C≡CH | —Cl | 6-F | 3-F | 4-(2-methylthiazol-4-yl)phenyl- |
| 1.604 | —CH$_2$—C≡CH | —Cl | 6-F | 3-F | 4-(2-thienyl)phenyl- |
| 1.605 | —CH$_2$—C≡CH | —Cl | 6-F | 3-F | 4-(1,2,4-triazol-1-yl)phenyl- |
| 1.606 | —CH$_2$—C≡CH | —Cl | 6-F | 3-F | 1-phenyl-4-pyrazolyl- |
| 1.607 | —CH$_2$—C≡CH | —Cl | 6-F | 3-F | 1-cyclopropyl-4-pyrazolyl- |
| 1.608 | —CH$_2$—C≡CH | —Cl | 6-F | 3-F | 4-(methylsulfanylmethyl)phenyl- |
| 1.609 | —CH$_2$—C≡CH | —Cl | 6-F | 3-F | 4-(isopropylsulfanylmethyl)phenyl- |
| 1.610 | —CH$_2$—C≡CH | —Cl | 6-F | 3-F | 4-(methylsulfamoyl)phenyl- |
| 1.611 | —CH$_2$—C≡CH | —Cl | 6-F | 3-F | 4-sulfamoylphenyl- |
| 1.612 | —CH$_2$—C≡CH | —Cl | 6-F | 3-F | 4-carbamoylphenyl- |
| 1.613 | —CH$_2$—C≡CH | —Cl | 6-F | 3-Cl | 4-(1-methylpyrazol-3-yl)phenyl- |
| 1.614 | —CH$_2$—C≡CH | —Cl | 6-F | 3-Cl | 4-(5-methyltetrazol-1-yl)phenyl- |
| 1.615 | —CH$_2$—C≡CH | —Cl | 6-F | 3-Cl | 4-morpholinophenyl- |
| 1.616 | —CH$_2$—C≡CH | —Cl | 6-F | 3-Cl | 4-(3-methylpyrazol-1-yl)phenyl- |
| 1.617 | —CH$_2$—C≡CH | —Cl | 6-F | 3-Cl | 4-(3,5-dimethylpyrazol-1-yl)phenyl- |
| 1.618 | —CH$_2$—C≡CH | —Cl | 6-F | 3-Cl | 4-pyrazol-1-ylphenyl- |
| 1.619 | —CH$_2$—C≡CH | —Cl | 6-F | 3-Cl | 4-pyrrol-1-ylphenyl- |
| 1.620 | —CH$_2$—C≡CH | —Cl | 6-F | 3-Cl | 4-(5-methyltetrahydrofuran-2-yl)phenyl- |
| 1.621 | —CH$_2$—C≡CH | —Cl | 6-F | 3-Cl | 4-(5-methyl-2-furyl)phenyl- |
| 1.622 | —CH$_2$—C≡CH | —Cl | 6-F | 3-Cl | 4-oxazol-2-ylphenyl- |
| 1.623 | —CH$_2$—C≡CH | —Cl | 6-F | 3-Cl | 4-(2-methylthiazol-4-yl)phenyl- |
| 1.624 | —CH$_2$—C≡CH | —Cl | 6-F | 3-Cl | 4-(2-thienyl)phenyl- |
| 1.625 | —CH$_2$—C≡CH | —Cl | 6-F | 3-Cl | 4-(1,2,4-triazol-1-yl)phenyl- |
| 1.626 | —CH$_2$—C≡CH | —Cl | 6-F | 3-Cl | 1-phenyl-4-pyrazolyl- |
| 1.627 | —CH$_2$—C≡CH | —Cl | 6-F | 3-Cl | 1-cyclopropyl-4-pyrazolyl- |
| 1.628 | —CH$_2$—C≡CH | —Cl | 6-F | 3-Cl | 4-(methylsulfanylmethyl)phenyl- |
| 1.629 | —CH$_2$—C≡CH | —Cl | 6-F | 3-Cl | 4-(isopropylsulfanylmethyl)phenyl- |
| 1.630 | —CH$_2$—C≡CH | —Cl | 6-F | 3-Cl | 4-(methylsulfamoyl)phenyl- |
| 1.631 | —CH$_2$—C≡CH | —Cl | 6-F | 3-Cl | 4-sulfamoylphenyl- |
| 1.632 | —CH$_2$—C≡CH | —Cl | 6-F | 3-Cl | 4-carbamoylphenyl- |
| 1.633 | —CH$_2$—C≡CH | —Cl | 6-Cl | 3-F | 4-(1-methylpyrazol-3-yl)phenyl- |
| 1.634 | —CH$_2$—C≡CH | —Cl | 6-Cl | 3-F | 4-(5-methyltetrazol-1-yl)phenyl- |
| 1.635 | —CH$_2$—C≡CH | —Cl | 6-Cl | 3-F | 4-morpholinophenyl- |
| 1.636 | —CH$_2$—C≡CH | —Cl | 6-Cl | 3-F | 4-(3-methylpyrazol-1-yl)phenyl- |
| 1.637 | —CH$_2$—C≡CH | —Cl | 6-Cl | 3-F | 4-(3,5-dimethylpyrazol-1-yl)phenyl- |
| 1.638 | —CH$_2$—C≡CH | —Cl | 6-Cl | 3-F | 4-pyrazol-1-ylphenyl- |
| 1.639 | —CH$_2$—C≡CH | —Cl | 6-Cl | 3-F | 4-pyrrol-1-ylphenyl- |
| 1.640 | —CH$_2$—C≡CH | —Cl | 6-Cl | 3-F | 4-(5-methyltetrahydrofuran-2-yl)phenyl- |
| 1.641 | —CH$_2$—C≡CH | —Cl | 6-Cl | 3-F | 4-(5-methyl-2-furyl)phenyl- |
| 1.642 | —CH$_2$—C≡CH | —Cl | 6-Cl | 3-F | 4-oxazol-2-ylphenyl- |
| 1.643 | —CH$_2$—C≡CH | —Cl | 6-Cl | 3-F | 4-(2-methylthiazol-4-yl)phenyl- |
| 1.644 | —CH$_2$—C≡CH | —Cl | 6-Cl | 3-F | 4-(2-thienyl)phenyl- |
| 1.645 | —CH$_2$—C≡CH | —Cl | 6-Cl | 3-F | 4-(1,2,4-triazol-1-yl)phenyl- |
| 1.646 | —CH$_2$—C≡CH | —Cl | 6-Cl | 3-F | 1-phenyl-4-pyrazolyl- |
| 1.647 | —CH$_2$—C≡CH | —Cl | 6-Cl | 3-F | 1-cyclopropyl-4-pyrazolyl- |
| 1.648 | —CH$_2$—C≡CH | —Cl | 6-Cl | 3-F | 4-(methylsulfanylmethyl)phenyl- |
| 1.649 | —CH$_2$—C≡CH | —Cl | 6-Cl | 3-F | 4-(isopropylsulfanylmethyl)phenyl- |

TABLE 1-continued

Substituent definitions of $R^1$, $R^2$, X, Y and D:

| Cmpd No. | $R^1$ | $R^2$ | X | Y | D |
|---|---|---|---|---|---|
| 1.650 | —CH₂—C≡CH | —Cl | 6-Cl | 3-F | 4-(methylsulfamoyl)phenyl- |
| 1.651 | —CH₂—C≡CH | —Cl | 6-Cl | 3-F | 4-sulfamoylphenyl- |
| 1.652 | —CH₂—C≡CH | —Cl | 6-Cl | 3-F | 4-carbamoylphenyl- |
| 1.653 | —CH₂—C≡CH | —Cl | 6-Cl | 3-Cl | 4-(1-methylpyrazol-3-yl)phenyl- |
| 1.654 | —CH₂—C≡CH | —Cl | 6-Cl | 3-Cl | 4-(5-methyltetrazol-1-yl)phenyl- |
| 1.655 | —CH₂—C≡CH | —Cl | 6-Cl | 3-Cl | 4-morpholinophenyl- |
| 1.656 | —CH₂—C≡CH | —Cl | 6-Cl | 3-Cl | 4-(3-methylpyrazol-1-yl)phenyl- |
| 1.657 | —CH₂—C≡CH | —Cl | 6-Cl | 3-Cl | 4-(3,5-dimethylpyrazol-1-yl)phenyl- |
| 1.658 | —CH₂—C≡CH | —Cl | 6-Cl | 3-Cl | 4-pyrazol-1-ylphenyl- |
| 1.659 | —CH₂—C≡CH | —Cl | 6-Cl | 3-Cl | 4-pyrrol-1-ylphenyl- |
| 1.660 | —CH₂—C≡CH | —Cl | 6-Cl | 3-Cl | 4-(5-methyltetrahydrofuran-2-yl)phenyl- |
| 1.661 | —CH₂—C≡CH | —Cl | 6-Cl | 3-Cl | 4-(5-methyl-2-furyl)phenyl- |
| 1.662 | —CH₂—C≡CH | —Cl | 6-Cl | 3-Cl | 4-oxazol-2-ylphenyl- |
| 1.663 | —CH₂—C≡CH | —Cl | 6-Cl | 3-Cl | 4-(2-methylthiazol-4-yl)phenyl- |
| 1.664 | —CH₂—C≡CH | —Cl | 6-Cl | 3-Cl | 4-(2-thienyl)phenyl- |
| 1.665 | —CH₂—C≡CH | —Cl | 6-Cl | 3-Cl | 4-(1,2,4-triazol-1-yl)phenyl- |
| 1.666 | —CH₂—C≡CH | —Cl | 6-Cl | 3-Cl | 1-phenyl-4-pyrazolyl- |
| 1.667 | —CH₂—C≡CH | —Cl | 6-Cl | 3-Cl | 1-cyclopropyl-4-pyrazolyl- |
| 1.668 | —CH₂—C≡CH | —Cl | 6-Cl | 3-Cl | 4-(methylsulfanylmethyl)phenyl- |
| 1.669 | —CH₂—C≡CH | —Cl | 6-Cl | 3-Cl | 4-(isopropylsulfanylmethyl)phenyl- |
| 1.670 | —CH₂—C≡CH | —Cl | 6-Cl | 3-Cl | 4-(methylsulfamoyl)phenyl- |
| 1.671 | —CH₂—C≡CH | —Cl | 6-Cl | 3-Cl | 4-sulfamoylphenyl- |
| 1.672 | —CH₂—C≡CH | —Cl | 6-Cl | 3-Cl | 4-carbamoylphenyl- |

Table A-2 provides 672 compounds A-2.001 to A-2.672 of formula (I) wherein G is —H, W is (E) —CH=CH— and $R^1$, $R^2$, X, Y, D are as defined for compound Nos. 1.001 to 1.672 respectively in Table 1 above.

Table A-3 provides 672 compounds A-3.001 to A-3.672 of formula (I) wherein G is —(C=O)iPr, W is —CH₂—CH₂— and $R^1$, $R^2$, X, Y, D are as defined for compound Nos. 1.001 to 1.672 respectively in Table 1 above.

Table A-4 provides 672 compounds A-4.001 to A-4.672 of formula (I) wherein G is —(C=O)iPr, W is (E) —CH=CH— and $R^1$, $R^2$, X, Y, D are as defined for compound Nos. 1.001 to 1.672 respectively in Table 1 above.

Table B-1 provides 744 compounds B-1.001 to B-1.744 of formula (I) wherein G is —H, W is —CH₂—CH₂— X is 6-cyclopropyl, and $R^1$, $R^2$, Y, D are as defined for compound Nos 2.001 to 2.744 respectively in Table 2 below.

TABLE 2

Substituent definitions of $R^1$, $R^2$, Y and D:

| Compound No. | $R^1$ | $R^2$ | Y | D |
|---|---|---|---|---|
| 2.001 | —Me | —Me | 3-F | —Ph |
| 2.002 | —Me | —Me | 3-F | 1-methyl-3-(trifluoromethyl)pyrazol-4-yl- |
| 2.003 | —Me | —Me | 3-F | 1-methyl-pyrazol-4-yl- |
| 2.004 | —Me | —Me | 3-F | 2-(methylsulfanyl)-4-pyridyl- |
| 2.005 | —Me | —Me | 3-F | 2-acetamido-4-pyridyl- |
| 2.006 | —Me | —Me | 3-F | 2-acetamidothiazol-5-yl- |
| 2.007 | —Me | —Me | 3-F | 2-amino-4-pyridyl- |
| 2.008 | —Me | —Me | 3-F | 2-chloro-3-pyridyl- |
| 2.009 | —Me | —Me | 3-F | 2-chloro-4-pyridyl- |
| 2.010 | —Me | —Me | 3-F | 2-chlorothiazol-5-yl- |
| 2.011 | —Me | —Me | 3-F | 2-cyanophenyl- |
| 2.012 | —Me | —Me | 3-F | 2-cyano-phenyl- |
| 2.013 | —Me | —Me | 3-F | 2-fluoro-4-pyridyl- |
| 2.014 | —Me | —Me | 3-F | 2-methyl-4-pyridyl- |
| 2.015 | —Me | —Me | 3-F | 2-methyl-triazol-4-yl- |
| 2.016 | —Me | —Me | 3-F | 2-tolyl- |
| 2.017 | —Me | —Me | 3-F | 2-trifluoromethyl-4-pyridyl- |
| 2.018 | —Me | —Me | 3-F | 2-trifluoromethyl-phenyl- |
| 2.019 | —Me | —Me | 3-F | 3,4-difluoro-phenyl- |
| 2.020 | —Me | —Me | 3-F | 3,5-difluoro-phenyl- |
| 2.021 | —Me | —Me | 3-F | 3-chloro-4-fluoro-phenyl- |
| 2.022 | —Me | —Me | 3-F | 3-chloro-4-pyridyl- |
| 2.023 | —Me | —Me | 3-F | 3-cyanophenyl- |
| 2.024 | —Me | —Me | 3-F | 3-cyano-phenyl- |
| 2.025 | —Me | —Me | 3-F | 3-methyl-2-pyridyl- |
| 2.026 | —Me | —Me | 3-F | 3-methyl-4-amino-phenyl- |
| 2.027 | —Me | —Me | 3-F | 3-pyridyl- |
| 2.028 | —Me | —Me | 3-F | 3-tolyl- |
| 2.029 | —Me | —Me | 3-F | 3-trifluoromethyl-3-pyridyl- |
| 2.030 | —Me | —Me | 3-F | 3-trifluoromethyl-phenyl- |

TABLE 2-continued

Substituent definitions of $R^1$, $R^2$, Y and D:

| Compound No. | $R^1$ | $R^2$ | Y | D |
|---|---|---|---|---|
| 2.031 | —Me | —Me | 3-F | 4-(dimethylamino)-phenyl- |
| 2.032 | —Me | —Me | 3-F | 4-(dimethylsulfamoyl)phenyl- |
| 2.033 | —Me | —Me | 3-F | 4-(methylamino)-phenyl- |
| 2.034 | —Me | —Me | 3-F | 4-(methylsulfanyl)phenyl- |
| 2.035 | —Me | —Me | 3-F | 4-(tert-butoxy)-phenyl- |
| 2.036 | —Me | —Me | 3-F | 4-(tert-butoxycarbonylamino)-3-fluoro-phenyl- |
| 2.037 | —Me | —Me | 3-F | 4-(trifluoromethoxy)-phenyl- |
| 2.038 | —Me | —Me | 3-F | 4-[ethyl(methyl)carbamoyl]-3-fluoro-phenyl- |
| 2.039 | —Me | —Me | 3-F | 4-acetamidophenyl- |
| 2.040 | —Me | —Me | 3-F | 4-amino-3-methylphenyl- |
| 2.041 | —Me | —Me | 3-F | 4-amino-phenyl- |
| 2.042 | —Me | —Me | 3-F | 4-biphenyl- |
| 2.043 | —Me | —Me | 3-F | 4-carboxyphenyl- |
| 2.044 | —Me | —Me | 3-F | 4-chloro-3-pyridyl- |
| 2.045 | —Me | —Me | 3-F | 4-chloro-phenyl- |
| 2.046 | —Me | —Me | 3-F | 4-cyanophenyl- |
| 2.047 | —Me | —Me | 3-F | 4-cyano-phenyl- |
| 2.048 | —Me | —Me | 3-F | 4-cyclopropylphenyl- |
| 2.049 | —Me | —Me | 3-F | 4-cyclopropyl-phenyl- |
| 2.050 | —Me | —Me | 3-F | 4-dimethylaminophenyl- |
| 2.051 | —Me | —Me | 3-F | 4-fluoro-phenyl- |
| 2.052 | —Me | —Me | 3-F | 4-hydroxyphenyl- |
| 2.053 | —Me | —Me | 3-F | 4-hydroxy-phenyl- |
| 2.054 | —Me | —Me | 3-F | 4-methoxycarbonylphenyl- |
| 2.055 | —Me | —Me | 3-F | 4-methyl-2-pyridyl- |
| 2.056 | —Me | —Me | 3-F | 4-methylaminophenyl- |
| 2.057 | —Me | —Me | 3-F | 4-methylsulfonylphenyl- |
| 2.058 | —Me | —Me | 3-F | 4-oxazol-5-ylphenyl- |
| 2.059 | —Me | —Me | 3-F | 4-pyridyl- |
| 2.060 | —Me | —Me | 3-F | 4-tert-butoxyphenyl- |
| 2.061 | —Me | —Me | 3-F | 4-tert-butylphenyl- |
| 2.062 | —Me | —Me | 3-F | 4-tolyl- |
| 2.063 | —Me | —Me | 3-F | 4-trifluoromethyl-3-pyridyl- |
| 2.064 | —Me | —Me | 3-F | 4-trifluoromethyl-phenyl- |
| 2.065 | —Me | —Me | 3-F | 5-methyl-1,3,4-oxadiazol-2-yl- |
| 2.066 | —Me | —Me | 3-F | 5-methyl-2-pyridyl- |
| 2.067 | —Me | —Me | 3-F | 5-methyl-3-pyridyl- |
| 2.068 | —Me | —Me | 3-F | 6-chloro-3-pyridyl- |
| 2.069 | —Me | —Me | 3-F | 6-methyl-2-pyridyl- |
| 2.070 | —Me | —Me | 3-F | pyrimidin-5-yl- |
| 2.071 | —Me | —Me | 3-F | thiazol-2-yl- |
| 2.072 | —Me | —Me | 3-F | thiazol-5-yl- |
| 2.073 | —Me | —Me | 3-F | thiophen-3-yl- |
| 2.074 | —Me | —Me | 3-Cl | —Ph |
| 2.075 | —Me | —Me | 3-Cl | 1-methyl-3-(trifluoromethyl)pyrazol-4-yl- |
| 2.076 | —Me | —Me | 3-Cl | 1-methyl-pyrazol-4-yl- |
| 2.077 | —Me | —Me | 3-Cl | 2-(methylsulfanyl)-4-pyridyl- |
| 2.078 | —Me | —Me | 3-Cl | 2-acetamido-4-pyridyl- |
| 2.079 | —Me | —Me | 3-Cl | 2-acetamidothiazol-5-yl- |
| 2.080 | —Me | —Me | 3-Cl | 2-amino-4-pyridyl- |
| 2.081 | —Me | —Me | 3-Cl | 2-chloro-3-pyridyl- |
| 2.082 | —Me | —Me | 3-Cl | 2-chloro-4-pyridyl- |
| 2.083 | —Me | —Me | 3-Cl | 2-chlorothiazol-5-yl- |
| 2.084 | —Me | —Me | 3-Cl | 2-cyanophenyl- |
| 2.085 | —Me | —Me | 3-Cl | 2-cyano-phenyl- |
| 2.086 | —Me | —Me | 3-Cl | 2-fluoro-4-pyridyl- |
| 2.087 | —Me | —Me | 3-Cl | 2-methyl-4-pyridyl- |
| 2.088 | —Me | —Me | 3-Cl | 2-methyl-triazol-4-yl- |
| 2.089 | —Me | —Me | 3-Cl | 2-tolyl- |
| 2.090 | —Me | —Me | 3-Cl | 2-trifluoromethyl-4-pyridyl- |
| 2.091 | —Me | —Me | 3-Cl | 2-trifluoromethyl-phenyl- |
| 2.092 | —Me | —Me | 3-Cl | 3,4-difluoro-phenyl- |
| 2.093 | —Me | —Me | 3-Cl | 3,5-difluoro-phenyl- |
| 2.094 | —Me | —Me | 3-Cl | 3-chloro-4-fluoro-phenyl- |
| 2.095 | —Me | —Me | 3-Cl | 3-chloro-4-pyridyl- |
| 2.096 | —Me | —Me | 3-Cl | 3-cyanophenyl- |
| 2.097 | —Me | —Me | 3-Cl | 3-cyano-phenyl- |
| 2.098 | —Me | —Me | 3-Cl | 3-methyl-2-pyridyl- |
| 2.099 | —Me | —Me | 3-Cl | 3-methyl-4-amino-phenyl- |
| 2.100 | —Me | —Me | 3-Cl | 3-pyridyl- |
| 2.101 | —Me | —Me | 3-Cl | 3-tolyl- |
| 2.102 | —Me | —Me | 3-Cl | 3-trifluoromethyl-3-pyridyl- |
| 2.103 | —Me | —Me | 3-Cl | 3-trifluoromethyl-phenyl- |
| 2.104 | —Me | —Me | 3-Cl | 4-(dimethylamino)-phenyl- |
| 2.105 | —Me | —Me | 3-Cl | 4-(dimethylsulfamoyl)phenyl- |
| 2.106 | —Me | —Me | 3-Cl | 4-(methylamino)-phenyl- |

TABLE 2-continued

Substituent definitions of $R^1$, $R^2$, Y and D:

| Compound No. | $R^1$ | $R^2$ | Y | D |
|---|---|---|---|---|
| 2.107 | —Me | —Me | 3-Cl | 4-(methylsulfanyl)phenyl- |
| 2.108 | —Me | —Me | 3-Cl | 4-(tert-butoxy)-phenyl- |
| 2.109 | —Me | —Me | 3-Cl | 4-(tert-butoxycarbonylamino)-3-fluoro-phenyl- |
| 2.110 | —Me | —Me | 3-Cl | 4-(trifluoromethoxy)-phenyl- |
| 2.111 | —Me | —Me | 3-Cl | 4-[ethyl(methyl)carbamoyl]-3-fluoro-phenyl- |
| 2.112 | —Me | —Me | 3-Cl | 4-acetamidophenyl- |
| 2.113 | —Me | —Me | 3-Cl | 4-amino-3-methylphenyl- |
| 2.114 | —Me | —Me | 3-Cl | 4-amino-phenyl- |
| 2.115 | —Me | —Me | 3-Cl | 4-biphenyl- |
| 2.116 | —Me | —Me | 3-Cl | 4-carboxyphenyl- |
| 2.117 | —Me | —Me | 3-Cl | 4-chloro-3-pyridyl- |
| 2.118 | —Me | —Me | 3-Cl | 4-chloro-phenyl- |
| 2.119 | —Me | —Me | 3-Cl | 4-cyanophenyl- |
| 2.120 | —Me | —Me | 3-Cl | 4-cyano-phenyl- |
| 2.121 | —Me | —Me | 3-Cl | 4-cyclopropylphenyl- |
| 2.122 | —Me | —Me | 3-Cl | 4-cyclopropyl-phenyl- |
| 2.123 | —Me | —Me | 3-Cl | 4-dimethylaminophenyl- |
| 2.124 | —Me | —Me | 3-Cl | 4-fluoro-phenyl- |
| 2.125 | —Me | —Me | 3-Cl | 4-hydroxyphenyl- |
| 2.126 | —Me | —Me | 3-Cl | 4-hydroxy-phenyl- |
| 2.127 | —Me | —Me | 3-Cl | 4-methoxycarbonylphenyl- |
| 2.128 | —Me | —Me | 3-Cl | 4-methyl-2-pyridyl- |
| 2.129 | —Me | —Me | 3-Cl | 4-methylaminophenyl- |
| 2.130 | —Me | —Me | 3-Cl | 4-methylsulfonylphenyl- |
| 2.131 | —Me | —Me | 3-Cl | 4-oxazol-5-ylphenyl- |
| 2.132 | —Me | —Me | 3-Cl | 4-pyridyl- |
| 2.133 | —Me | —Me | 3-Cl | 4-tert-butoxyphenyl- |
| 2.134 | —Me | —Me | 3-Cl | 4-tert-butylphenyl- |
| 2.135 | —Me | —Me | 3-Cl | 4-tolyl- |
| 2.136 | —Me | —Me | 3-Cl | 4-trifluoromethyl-3-pyridyl- |
| 2.137 | —Me | —Me | 3-Cl | 4-trifluoromethyl-phenyl- |
| 2.138 | —Me | —Me | 3-Cl | 5-methyl-1,3,4-oxadiazol-2-yl- |
| 2.139 | —Me | —Me | 3-Cl | 5-methyl-2-pyridyl- |
| 2.140 | —Me | —Me | 3-Cl | 5-methyl-3-pyridyl- |
| 2.141 | —Me | —Me | 3-Cl | 6-chloro-3-pyridyl- |
| 2.142 | —Me | —Me | 3-Cl | 6-methyl-2-pyridyl- |
| 2.143 | —Me | —Me | 3-Cl | pyrimidin-5-yl- |
| 2.144 | —Me | —Me | 3-Cl | thiazol-2-yl- |
| 2.145 | —Me | —Me | 3-Cl | thiazol-5-yl- |
| 2.146 | —Me | —Me | 3-Cl | thiophen-3-yl- |
| 2.147 | —Me | —Cl | 3-F | —Ph |
| 2.148 | —Me | —Cl | 3-F | 1-methyl-3-(trifluoromethyl)pyrazol-4-yl- |
| 2.149 | —Me | —Cl | 3-F | 1-methyl-pyrazol-4-yl- |
| 2.150 | —Me | —Cl | 3-F | 2-(methylsulfanyl)-4-pyridyl- |
| 2.151 | —Me | —Cl | 3-F | 2-acetamido-4-pyridyl- |
| 2.152 | —Me | —Cl | 3-F | 2-acetamidothiazol-5-yl- |
| 2.153 | —Me | —Cl | 3-F | 2-amino-4-pyridyl- |
| 2.154 | —Me | —Cl | 3-F | 2-chloro-3-pyridyl- |
| 2.155 | —Me | —Cl | 3-F | 2-chloro-4-pyridyl- |
| 2.156 | —Me | —Cl | 3-F | 2-chlorothiazol-5-yl- |
| 2.157 | —Me | —Cl | 3-F | 2-cyanophenyl- |
| 2.158 | —Me | —Cl | 3-F | 2-cyano-phenyl- |
| 2.159 | —Me | —Cl | 3-F | 2-fluoro-4-pyridyl- |
| 2.160 | —Me | —Cl | 3-F | 2-methyl-4-pyridyl- |
| 2.161 | —Me | —Cl | 3-F | 2-methyl-triazol-4-yl- |
| 2.162 | —Me | —Cl | 3-F | 2-tolyl- |
| 2.163 | —Me | —Cl | 3-F | 2-trifluoromethyl-4-pyridyl- |
| 2.164 | —Me | —Cl | 3-F | 2-trifluoromethyl-phenyl- |
| 2.165 | —Me | —Cl | 3-F | 3,4-difluoro-phenyl- |
| 2.166 | —Me | —Cl | 3-F | 3,5-difluoro-phenyl- |
| 2.167 | —Me | —Cl | 3-F | 3-chloro-4-fluoro-phenyl- |
| 2.168 | —Me | —Cl | 3-F | 3-chloro-4-pyridyl- |
| 2.169 | —Me | —Cl | 3-F | 3-cyanophenyl- |
| 2.170 | —Me | —Cl | 3-F | 3-cyano-phenyl- |
| 2.171 | —Me | —Cl | 3-F | 3-methyl-2-pyridyl- |
| 2.172 | —Me | —Cl | 3-F | 3-methyl-4-amino-phenyl- |
| 2.173 | —Me | —Cl | 3-F | 3-pyridyl- |
| 2.174 | —Me | —Cl | 3-F | 3-tolyl- |
| 2.175 | —Me | —Cl | 3-F | 3-trifluoromethyl-3-pyridyl- |
| 2.176 | —Me | —Cl | 3-F | 3-trifluoromethyl-phenyl- |
| 2.177 | —Me | —Cl | 3-F | 4-(dimethylamino)-phenyl- |
| 2.178 | —Me | —Cl | 3-F | 4-(dimethylsulfamoyl)phenyl- |
| 2.179 | —Me | —Cl | 3-F | 4-(methylamino)-phenyl- |
| 2.180 | —Me | —Cl | 3-F | 4-(methylsulfanyl)phenyl- |
| 2.181 | —Me | —Cl | 3-F | 4-(tert-butoxy)-phenyl- |
| 2.182 | —Me | —Cl | 3-F | 4-(tert-butoxycarbonylamino)-3-fluoro-phenyl- |

TABLE 2-continued

Substituent definitions of R¹, R², Y and D:

| Compound No. | R¹ | R² | Y | D |
|---|---|---|---|---|
| 2.183 | —Me | —Cl | 3-F | 4-(trifluoromethoxy)-phenyl- |
| 2.184 | —Me | —Cl | 3-F | 4-[ethyl(methyl)carbamoyl]-3-fluoro-phenyl- |
| 2.185 | —Me | —Cl | 3-F | 4-acetamidophenyl- |
| 2.186 | —Me | —Cl | 3-F | 4-amino-3-methylphenyl- |
| 2.187 | —Me | —Cl | 3-F | 4-amino-phenyl- |
| 2.188 | —Me | —Cl | 3-F | 4-biphenyl- |
| 2.189 | —Me | —Cl | 3-F | 4-carboxyphenyl- |
| 2.190 | —Me | —Cl | 3-F | 4-chloro-3-pyridyl- |
| 2.191 | —Me | —Cl | 3-F | 4-chloro-phenyl- |
| 2.192 | —Me | —Cl | 3-F | 4-cyanophenyl- |
| 2.193 | —Me | —Cl | 3-F | 4-cyano-phenyl- |
| 2.194 | —Me | —Cl | 3-F | 4-cyclopropylphenyl- |
| 2.195 | —Me | —Cl | 3-F | 4-cyclopropyl-phenyl- |
| 2.196 | —Me | —Cl | 3-F | 4-dimethylaminophenyl- |
| 2.197 | —Me | —Cl | 3-F | 4-fluoro-phenyl- |
| 2.198 | —Me | —Cl | 3-F | 4-hydroxyphenyl- |
| 2.199 | —Me | —Cl | 3-F | 4-hydroxy-phenyl- |
| 2.200 | —Me | —Cl | 3-F | 4-methoxycarbonylphenyl- |
| 2.201 | —Me | —Cl | 3-F | 4-methyl-2-pyridyl- |
| 2.202 | —Me | —Cl | 3-F | 4-methylaminophenyl- |
| 2.203 | —Me | —Cl | 3-F | 4-methylsulfonylphenyl- |
| 2.204 | —Me | —Cl | 3-F | 4-oxazol-5-ylphenyl- |
| 2.205 | —Me | —Cl | 3-F | 4-pyridyl- |
| 2.206 | —Me | —Cl | 3-F | 4-tert-butoxyphenyl- |
| 2.207 | —Me | —Cl | 3-F | 4-tert-butylphenyl- |
| 2.208 | —Me | —Cl | 3-F | 4-tolyl- |
| 2.209 | —Me | —Cl | 3-F | 4-trifluoromethyl-3-pyridyl- |
| 2.210 | —Me | —Cl | 3-F | 4-trifluoromethyl-phenyl- |
| 2.211 | —Me | —Cl | 3-F | 5-methyl-1,3,4-oxadiazol-2-yl- |
| 2.212 | —Me | —Cl | 3-F | 5-methyl-2-pyridyl- |
| 2.213 | —Me | —Cl | 3-F | 5-methyl-3-pyridyl- |
| 2.214 | —Me | —Cl | 3-F | 6-chloro-3-pyridyl- |
| 2.215 | —Me | —Cl | 3-F | 6-methyl-2-pyridyl- |
| 2.216 | —Me | —Cl | 3-F | pyrimidin-5-yl- |
| 2.217 | —Me | —Cl | 3-F | thiazol-2-yl- |
| 2.218 | —Me | —Cl | 3-F | thiazol-5-yl- |
| 2.219 | —Me | —Cl | 3-F | thiophen-3-yl- |
| 2.220 | —Me | —Cl | 3-Cl | —Ph |
| 2.221 | —Me | —Cl | 3-Cl | 1-methyl-3-(trifluoromethyl)pyrazol-4-yl- |
| 2.222 | —Me | —Cl | 3-Cl | 1-methyl-pyrazol-4-yl- |
| 2.223 | —Me | —Cl | 3-Cl | 2-(methylsulfanyl)-4-pyridyl- |
| 2.224 | —Me | —Cl | 3-Cl | 2-acetamido-4-pyridyl- |
| 2.225 | —Me | —Cl | 3-Cl | 2-acetamidothiazol-5-yl- |
| 2.226 | —Me | —Cl | 3-Cl | 2-amino-4-pyridyl- |
| 2.227 | —Me | —Cl | 3-Cl | 2-chloro-3-pyridyl- |
| 2.228 | —Me | —Cl | 3-Cl | 2-chloro-4-pyridyl- |
| 2.229 | —Me | —Cl | 3-Cl | 2-chlorothiazol-5-yl- |
| 2.230 | —Me | —Cl | 3-Cl | 2-cyanophenyl- |
| 2.231 | —Me | —Cl | 3-Cl | 2-cyano-phenyl- |
| 2.232 | —Me | —Cl | 3-Cl | 2-fluoro-4-pyridyl- |
| 2.233 | —Me | —Cl | 3-Cl | 2-methyl-4-pyridyl- |
| 2.234 | —Me | —Cl | 3-Cl | 2-methyl-triazol-4-yl- |
| 2.235 | —Me | —Cl | 3-Cl | 2-tolyl- |
| 2.236 | —Me | —Cl | 3-Cl | 2-trifluoromethyl-4-pyridyl- |
| 2.237 | —Me | —Cl | 3-Cl | 2-trifluoromethyl-phenyl- |
| 2.238 | —Me | —Cl | 3-Cl | 3,4-difluoro-phenyl- |
| 2.239 | —Me | —Cl | 3-Cl | 3,5-difluoro-phenyl- |
| 2.240 | —Me | —Cl | 3-Cl | 3-chloro-4-fluoro-phenyl- |
| 2.241 | —Me | —Cl | 3-Cl | 3-chloro-4-pyridyl- |
| 2.242 | —Me | —Cl | 3-Cl | 3-cyanophenyl- |
| 2.243 | —Me | —Cl | 3-Cl | 3-cyano-phenyl- |
| 2.244 | —Me | —Cl | 3-Cl | 3-methyl-2-pyridyl- |
| 2.245 | —Me | —Cl | 3-Cl | 3-methyl-4-amino-phenyl- |
| 2.246 | —Me | —Cl | 3-Cl | 3-pyridyl- |
| 2.247 | —Me | —Cl | 3-Cl | 3-tolyl- |
| 2.248 | —Me | —Cl | 3-Cl | 3-trifluoromethyl-3-pyridyl- |
| 2.249 | —Me | —Cl | 3-Cl | 3-trifluoromethyl-phenyl- |
| 2.250 | —Me | —Cl | 3-Cl | 4-(dimethylamino)-phenyl- |
| 2.251 | —Me | —Cl | 3-Cl | 4-(dimethylsulfamoyl)phenyl- |
| 2.252 | —Me | —Cl | 3-Cl | 4-(methylamino)-phenyl- |
| 2.253 | —Me | —Cl | 3-Cl | 4-(methylsulfanyl)phenyl- |
| 2.254 | —Me | —Cl | 3-Cl | 4-(tert-butoxy)-phenyl- |
| 2.255 | —Me | —Cl | 3-Cl | 4-(tert-butoxycarbonylamino)-3-fluoro-phenyl- |
| 2.256 | —Me | —Cl | 3-Cl | 4-(trifluoromethoxy)-phenyl- |
| 2.257 | —Me | —Cl | 3-Cl | 4-[ethyl(methyl)carbamoyl]-3-fluoro-phenyl- |
| 2.258 | —Me | —Cl | 3-Cl | 4-acetamidophenyl- |

TABLE 2-continued

Substituent definitions of $R^1$, $R^2$, Y and D:

| Compound No. | $R^1$ | $R^2$ | Y | D |
|---|---|---|---|---|
| 2.259 | —Me | —Cl | 3-Cl | 4-amino-3-methylphenyl- |
| 2.260 | —Me | —Cl | 3-Cl | 4-amino-phenyl- |
| 2.261 | —Me | —Cl | 3-Cl | 4-biphenyl- |
| 2.262 | —Me | —Cl | 3-Cl | 4-carboxyphenyl- |
| 2.263 | —Me | —Cl | 3-Cl | 4-chloro-3-pyridyl- |
| 2.264 | —Me | —Cl | 3-Cl | 4-chloro-phenyl- |
| 2.265 | —Me | —Cl | 3-Cl | 4-cyanophenyl- |
| 2.266 | —Me | —Cl | 3-Cl | 4-cyano-phenyl- |
| 2.267 | —Me | —Cl | 3-Cl | 4-cyclopropylphenyl- |
| 2.268 | —Me | —Cl | 3-Cl | 4-cyclopropyl-phenyl- |
| 2.269 | —Me | —Cl | 3-Cl | 4-dimethylaminophenyl- |
| 2.270 | —Me | —Cl | 3-Cl | 4-fluoro-phenyl- |
| 2.271 | —Me | —Cl | 3-Cl | 4-hydroxyphenyl- |
| 2.272 | —Me | —Cl | 3-Cl | 4-hydroxy-phenyl- |
| 2.273 | —Me | —Cl | 3-Cl | 4-methoxycarbonylphenyl- |
| 2.274 | —Me | —Cl | 3-Cl | 4-methyl-2-pyridyl- |
| 2.275 | —Me | —Cl | 3-Cl | 4-methylaminophenyl- |
| 2.276 | —Me | —Cl | 3-Cl | 4-methylsulfonylphenyl- |
| 2.277 | —Me | —Cl | 3-Cl | 4-oxazol-5-ylphenyl- |
| 2.278 | —Me | —Cl | 3-Cl | 4-pyridyl- |
| 2.279 | —Me | —Cl | 3-Cl | 4-tert-butoxyphenyl- |
| 2.280 | —Me | —Cl | 3-Cl | 4-tert-butylphenyl- |
| 2.281 | —Me | —Cl | 3-Cl | 4-tolyl- |
| 2.282 | —Me | —Cl | 3-Cl | 4-trifluoromethyl-3-pyridyl- |
| 2.283 | —Me | —Cl | 3-Cl | 4-trifluoromethyl-phenyl- |
| 2.284 | —Me | —Cl | 3-Cl | 5-methyl-1,3,4-oxadiazol-2-yl- |
| 2.285 | —Me | —Cl | 3-Cl | 5-methyl-2-pyridyl- |
| 2.286 | —Me | —Cl | 3-Cl | 5-methyl-3-pyridyl- |
| 2.287 | —Me | —Cl | 3-Cl | 6-chloro-3-pyridyl- |
| 2.288 | —Me | —Cl | 3-Cl | 6-methyl-2-pyridyl- |
| 2.289 | —Me | —Cl | 3-Cl | pyrimidin-5-yl- |
| 2.290 | —Me | —Cl | 3-Cl | thiazol-2-yl- |
| 2.291 | —Me | —Cl | 3-Cl | thiazol-5-yl- |
| 2.292 | —Me | —Cl | 3-Cl | thiophen-3-yl- |
| 2.293 | —CH$_2$—C≡CH | —Me | 3-F | —Ph |
| 2.294 | —CH$_2$—C≡CH | —Me | 3-F | 1-methyl-3-(trifluoromethyl)pyrazol-4-yl- |
| 2.295 | —CH$_2$—C≡CH | —Me | 3-F | 1-methyl-pyrazol-4-yl- |
| 2.296 | —CH$_2$—C≡CH | —Me | 3-F | 2-(methylsulfanyl)-4-pyridyl- |
| 2.297 | —CH$_2$—C≡CH | —Me | 3-F | 2-acetamido-4-pyridyl- |
| 2.298 | —CH$_2$—C≡CH | —Me | 3-F | 2-acetamidothiazol-5-yl- |
| 2.299 | —CH$_2$—C≡CH | —Me | 3-F | 2-amino-4-pyridyl- |
| 2.300 | —CH$_2$—C≡CH | —Me | 3-F | 2-chloro-3-pyridyl- |
| 2.301 | —CH$_2$—C≡CH | —Me | 3-F | 2-chloro-4-pyridyl- |
| 2.302 | —CH$_2$—C≡CH | —Me | 3-F | 2-chlorothiazol-5-yl- |
| 2.303 | —CH$_2$—C≡CH | —Me | 3-F | 2-cyanophenyl- |
| 2.304 | —CH$_2$—C≡CH | —Me | 3-F | 2-cyano-phenyl- |
| 2.305 | —CH$_2$—C≡CH | —Me | 3-F | 2-fluoro-4-pyridyl- |
| 2.306 | —CH$_2$—C≡CH | —Me | 3-F | 2-methyl-4-pyridyl- |
| 2.307 | —CH$_2$—C≡CH | —Me | 3-F | 2-methyl-triazol-4-yl- |
| 2.308 | —CH$_2$—C≡CH | —Me | 3-F | 2-tolyl- |
| 2.309 | —CH$_2$—C≡CH | —Me | 3-F | 2-trifluoromethyl-4-pyridyl- |
| 2.310 | —CH$_2$—C≡CH | —Me | 3-F | 2-trifluoromethyl-phenyl- |
| 2.311 | —CH$_2$—C≡CH | —Me | 3-F | 3,4-difluoro-phenyl- |
| 2.312 | —CH$_2$—C≡CH | —Me | 3-F | 3,5-difluoro-phenyl- |
| 2.313 | —CH$_2$—C≡CH | —Me | 3-F | 3-chloro-4-fluoro-phenyl- |
| 2.314 | —CH$_2$—C≡CH | —Me | 3-F | 3-chloro-4-pyridyl- |
| 2.315 | —CH$_2$—C≡CH | —Me | 3-F | 3-cyanophenyl- |
| 2.316 | —CH$_2$—C≡CH | —Me | 3-F | 3-cyano-phenyl- |
| 2.317 | —CH$_2$—C≡CH | —Me | 3-F | 3-methyl-2-pyridyl- |
| 2.318 | —CH$_2$—C≡CH | —Me | 3-F | 3-methyl-4-amino-phenyl- |
| 2.319 | —CH$_2$—C≡CH | —Me | 3-F | 3-pyridyl- |
| 2.320 | —CH$_2$—C≡CH | —Me | 3-F | 3-tolyl- |
| 2.321 | —CH$_2$—C≡CH | —Me | 3-F | 3-trifluoromethyl-3-pyridyl- |
| 2.322 | —CH$_2$—C≡CH | —Me | 3-F | 3-trifluoromethyl-phenyl- |
| 2.323 | —CH$_2$—C≡CH | —Me | 3-F | 4-(dimethylamino)-phenyl- |
| 2.324 | —CH$_2$—C≡CH | —Me | 3-F | 4-(dimethylsulfamoyl)phenyl- |
| 2.325 | —CH$_2$—C≡CH | —Me | 3-F | 4-(methylamino)-phenyl- |
| 2.326 | —CH$_2$—C≡CH | —Me | 3-F | 4-(methylsulfanyl)phenyl- |
| 2.327 | —CH$_2$—C≡CH | —Me | 3-F | 4-(tert-butoxy)-phenyl- |
| 2.328 | —CH$_2$—C≡CH | —Me | 3-F | 4-(tert-butoxycarbonylamino)-3-fluoro-phenyl- |
| 2.329 | —CH$_2$—C≡CH | —Me | 3-F | 4-(trifluoromethoxy)-phenyl- |
| 2.330 | —CH$_2$—C≡CH | —Me | 3-F | 4-[ethyl(methyl)carbamoyl]-3-fluoro-phenyl- |
| 2.331 | —CH$_2$—C≡CH | —Me | 3-F | 4-acetamidophenyl- |
| 2.332 | —CH$_2$—C≡CH | —Me | 3-F | 4-amino-3-methylphenyl- |
| 2.333 | —CH$_2$—C≡CH | —Me | 3-F | 4-amino-phenyl- |
| 2.334 | —CH$_2$—C≡CH | —Me | 3-F | 4-biphenyl- |

TABLE 2-continued

Substituent definitions of R¹, R², Y and D:

| Compound No. | R¹ | R² | Y | D |
|---|---|---|---|---|
| 2.335 | —CH₂—C≡CH | —Me | 3-F | 4-carboxyphenyl- |
| 2.336 | —CH₂—C≡CH | —Me | 3-F | 4-chloro-3-pyridyl- |
| 2.337 | —CH₂—C≡CH | —Me | 3-F | 4-chloro-phenyl- |
| 2.338 | —CH₂—C≡CH | —Me | 3-F | 4-cyanophenyl- |
| 2.339 | —CH₂—C≡CH | —Me | 3-F | 4-cyano-phenyl- |
| 2.340 | —CH₂—C≡CH | —Me | 3-F | 4-cyclopropylphenyl- |
| 2.341 | —CH₂—C≡CH | —Me | 3-F | 4-cyclopropyl-phenyl- |
| 2.342 | —CH₂—C≡CH | —Me | 3-F | 4-dimethylaminophenyl- |
| 2.343 | —CH₂—C≡CH | —Me | 3-F | 4-fluoro-phenyl- |
| 2.344 | —CH₂—C≡CH | —Me | 3-F | 4-hydroxyphenyl- |
| 2.345 | —CH₂—C≡CH | —Me | 3-F | 4-hydroxy-phenyl- |
| 2.346 | —CH₂—C≡CH | —Me | 3-F | 4-methoxycarbonylphenyl- |
| 2.347 | —CH₂—C≡CH | —Me | 3-F | 4-methyl-2-pyridyl- |
| 2.348 | —CH₂—C≡CH | —Me | 3-F | 4-methylaminophenyl- |
| 2.349 | —CH₂—C≡CH | —Me | 3-F | 4-methylsulfonylphenyl- |
| 2.350 | —CH₂—C≡CH | —Me | 3-F | 4-oxazol-5-ylphenyl- |
| 2.351 | —CH₂—C≡CH | —Me | 3-F | 4-pyridyl- |
| 2.352 | —CH₂—C≡CH | —Me | 3-F | 4-tert-butoxyphenyl- |
| 2.353 | —CH₂—C≡CH | —Me | 3-F | 4-tert-butylphenyl- |
| 2.354 | —CH₂—C≡CH | —Me | 3-F | 4-tolyl- |
| 2.355 | —CH₂—C≡CH | —Me | 3-F | 4-trifluoromethyl-3-pyridyl- |
| 2.356 | —CH₂—C≡CH | —Me | 3-F | 4-trifluoromethyl-phenyl- |
| 2.357 | —CH₂—C≡CH | —Me | 3-F | 5-methyl-1,3,4-oxadiazol-2-yl- |
| 2.358 | —CH₂—C≡CH | —Me | 3-F | 5-methyl-2-pyridyl- |
| 2.359 | —CH₂—C≡CH | —Me | 3-F | 5-methyl-3-pyridyl- |
| 2.360 | —CH₂—C≡CH | —Me | 3-F | 6-chloro-3-pyridyl- |
| 2.361 | —CH₂—C≡CH | —Me | 3-F | 6-methyl-2-pyridyl- |
| 2.362 | —CH₂—C≡CH | —Me | 3-F | pyrimidin-5-yl- |
| 2.363 | —CH₂—C≡CH | —Me | 3-F | thiazol-2-yl- |
| 2.364 | —CH₂—C≡CH | —Me | 3-F | thiazol-5-yl- |
| 2.365 | —CH₂—C≡CH | —Me | 3-F | thiophen-3-yl- |
| 2.366 | —CH₂—C≡CH | —Me | 3-Cl | —Ph |
| 2.367 | —CH₂—C≡CH | —Me | 3-Cl | 1-methyl-3-(trifluoromethyl)pyrazol-4-yl- |
| 2.368 | —CH₂—C≡CH | —Me | 3-Cl | 1-methyl-pyrazol-4-yl- |
| 2.369 | —CH₂—C≡CH | —Me | 3-Cl | 2-(methylsulfanyl)-4-pyridyl- |
| 2.370 | —CH₂—C≡CH | —Me | 3-Cl | 2-acetamido-4-pyridyl- |
| 2.371 | —CH₂—C≡CH | —Me | 3-Cl | 2-acetamidothiazol-5-yl- |
| 2.372 | —CH₂—C≡CH | —Me | 3-Cl | 2-amino-4-pyridyl- |
| 2.373 | —CH₂—C≡CH | —Me | 3-Cl | 2-chloro-3-pyridyl- |
| 2.374 | —CH₂—C≡CH | —Me | 3-Cl | 2-chloro-4-pyridyl- |
| 2.375 | —CH₂—C≡CH | —Me | 3-Cl | 2-chlorothiazol-5-yl- |
| 2.376 | —CH₂—C≡CH | —Me | 3-Cl | 2-cyanophenyl- |
| 2.377 | —CH₂—C≡CH | —Me | 3-Cl | 2-cyano-phenyl- |
| 2.378 | —CH₂—C≡CH | —Me | 3-Cl | 2-fluoro-4-pyridyl- |
| 2.379 | —CH₂—C≡CH | —Me | 3-Cl | 2-methyl-4-pyridyl- |
| 2.380 | —CH₂—C≡CH | —Me | 3-Cl | 2-methyl-triazol-4-yl- |
| 2.381 | —CH₂—C≡CH | —Me | 3-Cl | 2-tolyl- |
| 2.382 | —CH₂—C≡CH | —Me | 3-Cl | 2-trifluoromethyl-4-pyridyl- |
| 2.383 | —CH₂—C≡CH | —Me | 3-Cl | 2-trifluoromethyl-phenyl- |
| 2.384 | —CH₂—C≡CH | —Me | 3-Cl | 3,4-difluoro-phenyl- |
| 2.385 | —CH₂—C≡CH | —Me | 3-Cl | 3,5-difluoro-phenyl- |
| 2.386 | —CH₂—C≡CH | —Me | 3-Cl | 3-chloro-4-fluoro-phenyl- |
| 2.387 | —CH₂—C≡CH | —Me | 3-Cl | 3-chloro-4-pyridyl- |
| 2.388 | —CH₂—C≡CH | —Me | 3-Cl | 3-cyanophenyl- |
| 2.389 | —CH₂—C≡CH | —Me | 3-Cl | 3-cyano-phenyl- |
| 2.390 | —CH₂—C≡CH | —Me | 3-Cl | 3-methyl-2-pyridyl- |
| 2.391 | —CH₂—C≡CH | —Me | 3-Cl | 3-methyl-4-amino-phenyl- |
| 2.392 | —CH₂—C≡CH | —Me | 3-Cl | 3-pyridyl- |
| 2.393 | —CH₂—C≡CH | —Me | 3-Cl | 3-tolyl- |
| 2.394 | —CH₂—C≡CH | —Me | 3-Cl | 3-trifluoromethyl-3-pyridyl- |
| 2.395 | —CH₂—C≡CH | —Me | 3-Cl | 3-trifluoromethyl-phenyl- |
| 2.396 | —CH₂—C≡CH | —Me | 3-Cl | 4-(dimethylamino)-phenyl- |
| 2.397 | —CH₂—C≡CH | —Me | 3-Cl | 4-(dimethylsulfamoyl)phenyl- |
| 2.398 | —CH₂—C≡CH | —Me | 3-Cl | 4-(methylamino)-phenyl- |
| 2.399 | —CH₂—C≡CH | —Me | 3-Cl | 4-(methylsulfanyl)phenyl- |
| 2.400 | —CH₂—C≡CH | —Me | 3-Cl | 4-(tert-butoxy)-phenyl- |
| 2.401 | —CH₂—C≡CH | —Me | 3-Cl | 4-(tert-butoxycarbonylamino)-3-fluoro-phenyl- |
| 2.402 | —CH₂—C≡CH | —Me | 3-Cl | 4-(trifluoromethoxy)-phenyl- |
| 2.403 | —CH₂—C≡CH | —Me | 3-Cl | 4-[ethyl(methyl)carbamoyl]-3-fluoro-phenyl- |
| 2.404 | —CH₂—C≡CH | —Me | 3-Cl | 4-acetamidophenyl- |
| 2.405 | —CH₂—C≡CH | —Me | 3-Cl | 4-amino-3-methylphenyl- |
| 2.406 | —CH₂—C≡CH | —Me | 3-Cl | 4-amino-phenyl- |
| 2.407 | —CH₂—C≡CH | —Me | 3-Cl | 4-biphenyl- |
| 2.408 | —CH₂—C≡CH | —Me | 3-Cl | 4-carboxyphenyl- |
| 2.409 | —CH₂—C≡CH | —Me | 3-Cl | 4-chloro-3-pyridyl- |
| 2.410 | —CH₂—C≡CH | —Me | 3-Cl | 4-chloro-phenyl- |

TABLE 2-continued

Substituent definitions of R¹, R², Y and D:

| Compound No. | R¹ | R² | Y | D |
|---|---|---|---|---|
| 2.411 | —CH₂—C≡CH | —Me | 3-Cl | 4-cyanophenyl- |
| 2.412 | —CH₂—C≡CH | —Me | 3-Cl | 4-cyano-phenyl- |
| 2.413 | —CH₂—C≡CH | —Me | 3-Cl | 4-cyclopropylphenyl- |
| 2.414 | —CH₂—C≡CH | —Me | 3-Cl | 4-cyclopropyl-phenyl- |
| 2.415 | —CH₂—C≡CH | —Me | 3-Cl | 4-dimethylaminophenyl- |
| 2.416 | —CH₂—C≡CH | —Me | 3-Cl | 4-fluoro-phenyl- |
| 2.417 | —CH₂—C≡CH | —Me | 3-Cl | 4-hydroxyphenyl- |
| 2.418 | —CH₂—C≡CH | —Me | 3-Cl | 4-hydroxy-phenyl- |
| 2.419 | —CH₂—C≡CH | —Me | 3-Cl | 4-methoxycarbonylphenyl- |
| 2.420 | —CH₂—C≡CH | —Me | 3-Cl | 4-methyl-2-pyridyl- |
| 2.421 | —CH₂—C≡CH | —Me | 3-Cl | 4-methylaminophenyl- |
| 2.422 | —CH₂—C≡CH | —Me | 3-Cl | 4-methylsulfonylphenyl- |
| 2.423 | —CH₂—C≡CH | —Me | 3-Cl | 4-oxazol-5-ylphenyl- |
| 2.424 | —CH₂—C≡CH | —Me | 3-Cl | 4-pyridyl- |
| 2.425 | —CH₂—C≡CH | —Me | 3-Cl | 4-tert-butoxyphenyl- |
| 2.426 | —CH₂—C≡CH | —Me | 3-Cl | 4-tert-butylphenyl- |
| 2.427 | —CH₂—C≡CH | —Me | 3-Cl | 4-tolyl- |
| 2.428 | —CH₂—C≡CH | —Me | 3-Cl | 4-trifluoromethyl-3-pyridyl- |
| 2.429 | —CH₂—C≡CH | —Me | 3-Cl | 4-trifluoromethyl-phenyl- |
| 2.430 | —CH₂—C≡CH | —Me | 3-Cl | 5-methyl-1,3,4-oxadiazol-2-yl- |
| 2.431 | —CH₂—C≡CH | —Me | 3-Cl | 5-methyl-2-pyridyl- |
| 2.432 | —CH₂—C≡CH | —Me | 3-Cl | 5-methyl-3-pyridyl- |
| 2.433 | —CH₂—C≡CH | —Me | 3-Cl | 6-chloro-3-pyridyl- |
| 2.434 | —CH₂—C≡CH | —Me | 3-Cl | 6-methyl-2-pyridyl- |
| 2.435 | —CH₂—C≡CH | —Me | 3-Cl | pyrimidin-5-yl- |
| 2.436 | —CH₂—C≡CH | —Me | 3-Cl | thiazol-2-yl- |
| 2.437 | —CH₂—C≡CH | —Me | 3-Cl | thiazol-5-yl- |
| 2.438 | —CH₂—C≡CH | —Me | 3-Cl | thiophen-3-yl- |
| 2.439 | —CH₂—C≡CH | —Cl | 3-F | —Ph |
| 2.440 | —CH₂—C≡CH | —Cl | 3-F | 1-methyl-3-(trifluoromethyl)pyrazol-4-yl- |
| 2.441 | —CH₂—C≡CH | —Cl | 3-F | 1-methyl-pyrazol-4-yl- |
| 2.442 | —CH₂—C≡CH | —Cl | 3-F | 2-(methylsulfanyl)-4-pyridyl- |
| 2.443 | —CH₂—C≡CH | —Cl | 3-F | 2-acetamido-4-pyridyl- |
| 2.444 | —CH₂—C≡CH | —Cl | 3-F | 2-acetamidothiazol-5-yl- |
| 2.445 | —CH₂—C≡CH | —Cl | 3-F | 2-amino-4-pyridyl- |
| 2.446 | —CH₂—C≡CH | —Cl | 3-F | 2-chloro-3-pyridyl- |
| 2.447 | —CH₂—C≡CH | —Cl | 3-F | 2-chloro-4-pyridyl- |
| 2.448 | —CH₂—C≡CH | —Cl | 3-F | 2-chlorothiazol-5-yl- |
| 2.449 | —CH₂—C≡CH | —Cl | 3-F | 2-cyanophenyl- |
| 2.450 | —CH₂—C≡CH | —Cl | 3-F | 2-cyano-phenyl- |
| 2.451 | —CH₂—C≡CH | —Cl | 3-F | 2-fluoro-4-pyridyl- |
| 2.452 | —CH₂—C≡CH | —Cl | 3-F | 2-methyl-4-pyridyl- |
| 2.453 | —CH₂—C≡CH | —Cl | 3-F | 2-methyl-triazol-4-yl- |
| 2.454 | —CH₂—C≡CH | —Cl | 3-F | 2-tolyl- |
| 2.455 | —CH₂—C≡CH | —Cl | 3-F | 2-trifluoromethyl-4-pyridyl- |
| 2.456 | —CH₂—C≡CH | —Cl | 3-F | 2-trifluoromethyl-phenyl- |
| 2.457 | —CH₂—C≡CH | —Cl | 3-F | 3,4-difluoro-phenyl- |
| 2.458 | —CH₂—C≡CH | —Cl | 3-F | 3,5-difluoro-phenyl- |
| 2.459 | —CH₂—C≡CH | —Cl | 3-F | 3-chloro-4-fluoro-phenyl- |
| 2.460 | —CH₂—C≡CH | —Cl | 3-F | 3-chloro-4-pyridyl- |
| 2.461 | —CH₂—C≡CH | —Cl | 3-F | 3-cyanophenyl- |
| 2.462 | —CH₂—C≡CH | —Cl | 3-F | 3-cyano-phenyl- |
| 2.463 | —CH₂—C≡CH | —Cl | 3-F | 3-methyl-2-pyridyl- |
| 2.464 | —CH₂—C≡CH | —Cl | 3-F | 3-methyl-4-amino-phenyl- |
| 2.465 | —CH₂—C≡CH | —Cl | 3-F | 3-pyridyl- |
| 2.466 | —CH₂—C≡CH | —Cl | 3-F | 3-tolyl- |
| 2.467 | —CH₂—C≡CH | —Cl | 3-F | 3-trifluoromethyl-3-pyridyl- |
| 2.468 | —CH₂—C≡CH | —Cl | 3-F | 3-trifluoromethyl-phenyl- |
| 2.469 | —CH₂—C≡CH | —Cl | 3-F | 4-(dimethylamino)-phenyl- |
| 2.470 | —CH₂—C≡CH | —Cl | 3-F | 4-(dimethylsulfamoyl)phenyl- |
| 2.471 | —CH₂—C≡CH | —Cl | 3-F | 4-(methylamino)-phenyl- |
| 2.472 | —CH₂—C≡CH | —Cl | 3-F | 4-(methylsulfanyl)phenyl- |
| 2.473 | —CH₂—C≡CH | —Cl | 3-F | 4-(tert-butoxy)-phenyl- |
| 2.474 | —CH₂—C≡CH | —Cl | 3-F | 4-(tert-butoxycarbonylamino)-3-fluoro-phenyl- |
| 2.475 | —CH₂—C≡CH | —Cl | 3-F | 4-(trifluoromethoxy)-phenyl- |
| 2.476 | —CH₂—C≡CH | —Cl | 3-F | 4-[ethyl(methyl)carbamoyl]-3-fluoro-phenyl- |
| 2.477 | —CH₂—C≡CH | —Cl | 3-F | 4-acetamidophenyl- |
| 2.478 | —CH₂—C≡CH | —Cl | 3-F | 4-amino-3-methylphenyl- |
| 2.479 | —CH₂—C≡CH | —Cl | 3-F | 4-amino-phenyl- |
| 2.480 | —CH₂—C≡CH | —Cl | 3-F | 4-biphenyl- |
| 2.481 | —CH₂—C≡CH | —Cl | 3-F | 4-carboxyphenyl- |
| 2.482 | —CH₂—C≡CH | —Cl | 3-F | 4-chloro-3-pyridyl- |
| 2.483 | —CH₂—C≡CH | —Cl | 3-F | 4-chloro-phenyl- |
| 2.484 | —CH₂—C≡CH | —Cl | 3-F | 4-cyanophenyl- |
| 2.485 | —CH₂—C≡CH | —Cl | 3-F | 4-cyano-phenyl- |
| 2.486 | —CH₂—C≡CH | —Cl | 3-F | 4-cyclopropylphenyl- |

TABLE 2-continued

Substituent definitions of $R^1$, $R^2$, Y and D:

| Compound No. | $R^1$ | $R^2$ | Y | D |
|---|---|---|---|---|
| 2.487 | —CH₂—C≡CH | —Cl | 3-F | 4-cyclopropyl-phenyl- |
| 2.488 | —CH₂—C≡CH | —Cl | 3-F | 4-dimethylaminophenyl- |
| 2.489 | —CH₂—C≡CH | —Cl | 3-F | 4-fluoro-phenyl- |
| 2.490 | —CH₂—C≡CH | —Cl | 3-F | 4-hydroxyphenyl- |
| 2.491 | —CH₂—C≡CH | —Cl | 3-F | 4-hydroxy-phenyl- |
| 2.492 | —CH₂—C≡CH | —Cl | 3-F | 4-methoxycarbonylphenyl- |
| 2.493 | —CH₂—C≡CH | —Cl | 3-F | 4-methyl-2-pyridyl- |
| 2.494 | —CH₂—C≡CH | —Cl | 3-F | 4-methylaminophenyl- |
| 2.495 | —CH₂—C≡CH | —Cl | 3-F | 4-methylsulfonylphenyl- |
| 2.496 | —CH₂—C≡CH | —Cl | 3-F | 4-oxazol-5-ylphenyl- |
| 2.497 | —CH₂—C≡CH | —Cl | 3-F | 4-pyridyl- |
| 2.498 | —CH₂—C≡CH | —Cl | 3-F | 4-tert-butoxyphenyl- |
| 2.499 | —CH₂—C≡CH | —Cl | 3-F | 4-tert-butylphenyl- |
| 2.500 | —CH₂—C≡CH | —Cl | 3-F | 4-tolyl- |
| 2.501 | —CH₂—C≡CH | —Cl | 3-F | 4-trifluoromethyl-3-pyridyl- |
| 2.502 | —CH₂—C≡CH | —Cl | 3-F | 4-trifluoromethyl-phenyl- |
| 2.503 | —CH₂—C≡CH | —Cl | 3-F | 5-methyl-1,3,4-oxadiazol-2-yl- |
| 2.504 | —CH₂—C≡CH | —Cl | 3-F | 5-methyl-2-pyridyl- |
| 2.505 | —CH₂—C≡CH | —Cl | 3-F | 5-methyl-3-pyridyl- |
| 2.506 | —CH₂—C≡CH | —Cl | 3-F | 6-chloro-3-pyridyl- |
| 2.507 | —CH₂—C≡CH | —Cl | 3-F | 6-methyl-2-pyridyl- |
| 2.508 | —CH₂—C≡CH | —Cl | 3-F | pyrimidin-5-yl- |
| 2.509 | —CH₂—C≡CH | —Cl | 3-F | thiazol-2-yl- |
| 2.510 | —CH₂—C≡CH | —Cl | 3-F | thiazol-5-yl- |
| 2.511 | —CH₂—C≡CH | —Cl | 3-F | thiophen-3-yl- |
| 2.512 | —CH₂—C≡CH | —Cl | 3-Cl | —Ph |
| 2.513 | —CH₂—C≡CH | —Cl | 3-Cl | 1-methyl-3-(trifluoromethyl)pyrazol-4-yl- |
| 2.514 | —CH₂—C≡CH | —Cl | 3-Cl | 1-methyl-pyrazol-4-yl- |
| 2.515 | —CH₂—C≡CH | —Cl | 3-Cl | 2-(methylsulfanyl)-4-pyridyl- |
| 2.516 | —CH₂—C≡CH | —Cl | 3-Cl | 2-acetamido-4-pyridyl- |
| 2.517 | —CH₂—C≡CH | —Cl | 3-Cl | 2-acetamidothiazol-5-yl- |
| 2.518 | —CH₂—C≡CH | —Cl | 3-Cl | 2-amino-4-pyridyl- |
| 2.519 | —CH₂—C≡CH | —Cl | 3-Cl | 2-chloro-3-pyridyl- |
| 2.520 | —CH₂—C≡CH | —Cl | 3-Cl | 2-chloro-4-pyridyl- |
| 2.521 | —CH₂—C≡CH | —Cl | 3-Cl | 2-chlorothiazol-5-yl- |
| 2.522 | —CH₂—C≡CH | —Cl | 3-Cl | 2-cyanophenyl- |
| 2.523 | —CH₂—C≡CH | —Cl | 3-Cl | 2-cyano-phenyl- |
| 2.524 | —CH₂—C≡CH | —Cl | 3-Cl | 2-fluoro-4-pyridyl- |
| 2.525 | —CH₂—C≡CH | —Cl | 3-Cl | 2-methyl-4-pyridyl- |
| 2.526 | —CH₂—C≡CH | —Cl | 3-Cl | 2-methyl-triazol-4-yl- |
| 2.527 | —CH₂—C≡CH | —Cl | 3-Cl | 2-tolyl- |
| 2.528 | —CH₂—C≡CH | —Cl | 3-Cl | 2-trifluoromethyl-4-pyridyl- |
| 2.529 | —CH₂—C≡CH | —Cl | 3-Cl | 2-trifluoromethyl-phenyl- |
| 2.530 | —CH₂—C≡CH | —Cl | 3-Cl | 3,4-difluoro-phenyl- |
| 2.531 | —CH₂—C≡CH | —Cl | 3-Cl | 3,5-difluoro-phenyl- |
| 2.532 | —CH₂—C≡CH | —Cl | 3-Cl | 3-chloro-4-fluoro-phenyl- |
| 2.533 | —CH₂—C≡CH | —Cl | 3-Cl | 3-chloro-4-pyridyl- |
| 2.534 | —CH₂—C≡CH | —Cl | 3-Cl | 3-cyanophenyl- |
| 2.535 | —CH₂—C≡CH | —Cl | 3-Cl | 3-cyano-phenyl- |
| 2.536 | —CH₂—C≡CH | —Cl | 3-Cl | 3-methyl-2-pyridyl- |
| 2.537 | —CH₂—C≡CH | —Cl | 3-Cl | 3-methyl-4-amino-phenyl- |
| 2.538 | —CH₂—C≡CH | —Cl | 3-Cl | 3-pyridyl- |
| 2.539 | —CH₂—C≡CH | —Cl | 3-Cl | 3-tolyl- |
| 2.540 | —CH₂—C≡CH | —Cl | 3-Cl | 3-trifluoromethyl-3-pyridyl- |
| 2.541 | —CH₂—C≡CH | —Cl | 3-Cl | 3-trifluoromethyl-phenyl- |
| 2.542 | —CH₂—C≡CH | —Cl | 3-Cl | 4-(dimethylamino)-phenyl- |
| 2.543 | —CH₂—C≡CH | —Cl | 3-Cl | 4-(dimethylsulfamoyl)phenyl- |
| 2.544 | —CH₂—C≡CH | —Cl | 3-Cl | 4-(methylamino)-phenyl- |
| 2.545 | —CH₂—C≡CH | —Cl | 3-Cl | 4-(methylsulfanyl)phenyl- |
| 2.546 | —CH₂—C≡CH | —Cl | 3-Cl | 4-(tert-butoxy)-phenyl- |
| 2.547 | —CH₂—C≡CH | —Cl | 3-Cl | 4-(tert-butoxycarbonylamino)-3-fluoro-phenyl- |
| 2.548 | —CH₂—C≡CH | —Cl | 3-Cl | 4-(trifluoromethoxy)-phenyl- |
| 2.549 | —CH₂—C≡CH | —Cl | 3-Cl | 4-[ethyl(methyl)carbamoyl]-3-fluoro-phenyl- |
| 2.550 | —CH₂—C≡CH | —Cl | 3-Cl | 4-acetamidophenyl- |
| 2.551 | —CH₂—C≡CH | —Cl | 3-Cl | 4-amino-3-methylphenyl- |
| 2.552 | —CH₂—C≡CH | —Cl | 3-Cl | 4-amino-phenyl- |
| 2.553 | —CH₂—C≡CH | —Cl | 3-Cl | 4-biphenyl- |
| 2.554 | —CH₂—C≡CH | —Cl | 3-Cl | 4-carboxyphenyl- |
| 2.555 | —CH₂—C≡CH | —Cl | 3-Cl | 4-chloro-3-pyridyl- |
| 2.556 | —CH₂—C≡CH | —Cl | 3-Cl | 4-chloro-phenyl- |
| 2.557 | —CH₂—C≡CH | —Cl | 3-Cl | 4-cyanophenyl- |
| 2.558 | —CH₂—C≡CH | —Cl | 3-Cl | 4-cyano-phenyl- |
| 2.559 | —CH₂—C≡CH | —Cl | 3-Cl | 4-cyclopropylphenyl- |
| 2.560 | —CH₂—C≡CH | —Cl | 3-Cl | 4-cyclopropyl-phenyl- |
| 2.561 | —CH₂—C≡CH | —Cl | 3-Cl | 4-dimethylaminophenyl- |
| 2.562 | —CH₂—C≡CH | —Cl | 3-Cl | 4-fluoro-phenyl- |

TABLE 2-continued

Substituent definitions of R¹, R², Y and D:

| Compound No. | R¹ | R² | Y | D |
|---|---|---|---|---|
| 2.563 | —CH₂—C≡CH | —Cl | 3-Cl | 4-hydroxyphenyl- |
| 2.564 | —CH₂—C≡CH | —Cl | 3-Cl | 4-hydroxy-phenyl- |
| 2.565 | —CH₂—C≡CH | —Cl | 3-Cl | 4-methoxycarbonylphenyl- |
| 2.566 | —CH₂—C≡CH | —Cl | 3-Cl | 4-methyl-2-pyridyl- |
| 2.567 | —CH₂—C≡CH | —Cl | 3-Cl | 4-methylaminophenyl- |
| 2.568 | —CH₂—C≡CH | —Cl | 3-Cl | 4-methylsulfonylphenyl- |
| 2.569 | —CH₂—C≡CH | —Cl | 3-Cl | 4-oxazol-5-ylphenyl- |
| 2.570 | —CH₂—C≡CH | —Cl | 3-Cl | 4-pyridyl- |
| 2.571 | —CH₂—C≡CH | —Cl | 3-Cl | 4-tert-butoxyphenyl- |
| 2.572 | —CH₂—C≡CH | —Cl | 3-Cl | 4-tert-butylphenyl- |
| 2.573 | —CH₂—C≡CH | —Cl | 3-Cl | 4-tolyl- |
| 2.574 | —CH₂—C≡CH | —Cl | 3-Cl | 4-trifluoromethyl-3-pyridyl- |
| 2.575 | —CH₂—C≡CH | —Cl | 3-Cl | 4-trifluoromethyl-phenyl- |
| 2.576 | —CH₂—C≡CH | —Cl | 3-Cl | 5-methyl-1,3,4-oxadiazol-2-yl- |
| 2.577 | —CH₂—C≡CH | —Cl | 3-Cl | 5-methyl-2-pyridyl- |
| 2.578 | —CH₂—C≡CH | —Cl | 3-Cl | 5-methyl-3-pyridyl- |
| 2.579 | —CH₂—C≡CH | —Cl | 3-Cl | 6-chloro-3-pyridyl- |
| 2.580 | —CH₂—C≡CH | —Cl | 3-Cl | 6-methyl-2-pyridyl- |
| 2.581 | —CH₂—C≡CH | —Cl | 3-Cl | pyrimidin-5-yl- |
| 2.582 | —CH₂—C≡CH | —Cl | 3-Cl | thiazol-2-yl- |
| 2.583 | —CH₂—C≡CH | —Cl | 3-Cl | thiazol-5-yl- |
| 2.584 | —CH₂—C≡CH | —Cl | 3-Cl | thiophen-3-yl- |
| 2.585 | —Me | —Me | 3-F | 4-(1-methylpyrazol-3-yl)phenyl- |
| 2.586 | —Me | —Me | 3-F | 4-(5-methyltetrazol-1-yl)phenyl- |
| 2.587 | —Me | —Me | 3-F | 4-morpholinophenyl- |
| 2.588 | —Me | —Me | 3-F | 4-(3-methylpyrazol-1-yl)phenyl- |
| 2.589 | —Me | —Me | 3-F | 4-(3,5-dimethylpyrazol-1-yl)phenyl- |
| 2.590 | —Me | —Me | 3-F | 4-pyrazol-1-ylphenyl- |
| 2.591 | —Me | —Me | 3-F | 4-pyrrol-1-ylphenyl- |
| 2.592 | —Me | —Me | 3-F | 4-(5-methyltetrahydrofuran-2-yl)phenyl- |
| 2.593 | —Me | —Me | 3-F | 4-(5-methyl-2-furyl)phenyl- |
| 2.594 | —Me | —Me | 3-F | 4-oxazol-2-ylphenyl- |
| 2.595 | —Me | —Me | 3-F | 4-(2-methylthiazol-4-yl)phenyl- |
| 2.596 | —Me | —Me | 3-F | 4-(2-thienyl)phenyl- |
| 2.597 | —Me | —Me | 3-F | 4-(1,2,4-triazol-1-yl)phenyl- |
| 2.598 | —Me | —Me | 3-F | 1-phenyl-4-pyrazolyl- |
| 2.599 | —Me | —Me | 3-F | 1-cyclopropyl-4-pyrazolyl- |
| 2.600 | —Me | —Me | 3-F | 4-(methylsulfanylmethyl)phenyl- |
| 2.601 | —Me | —Me | 3-F | 4-(isopropylsulfanylmethyl)phenyl- |
| 2.602 | —Me | —Me | 3-F | 4-(methylsulfamoyl)phenyl- |
| 2.603 | —Me | —Me | 3-F | 4-sulfamoylphenyl- |
| 2.604 | —Me | —Me | 3-F | 4-carbamoylphenyl- |
| 2.605 | —Me | —Me | 3-Cl | 4-(1-methylpyrazol-3-yl)phenyl- |
| 2.606 | —Me | —Me | 3-Cl | 4-(5-methyltetrazol-1-yl)phenyl- |
| 2.607 | —Me | —Me | 3-Cl | 4-morpholinophenyl- |
| 2.608 | —Me | —Me | 3-Cl | 4-(3-methylpyrazol-1-yl)phenyl- |
| 2.609 | —Me | —Me | 3-Cl | 4-(3,5-dimethylpyrazol-1-yl)phenyl- |
| 2.610 | —Me | —Me | 3-Cl | 4-pyrazol-1-ylphenyl- |
| 2.611 | —Me | —Me | 3-Cl | 4-pyrrol-1-ylphenyl- |
| 2.612 | —Me | —Me | 3-Cl | 4-(5-methyltetrahydrofuran-2-yl)phenyl- |
| 2.613 | —Me | —Me | 3-Cl | 4-(5-methyl-2-furyl)phenyl- |
| 2.614 | —Me | —Me | 3-Cl | 4-oxazol-2-ylphenyl- |
| 2.615 | —Me | —Me | 3-Cl | 4-(2-methylthiazol-4-yl)phenyl- |
| 2.616 | —Me | —Me | 3-Cl | 4-(2-thienyl)phenyl- |
| 2.617 | —Me | —Me | 3-Cl | 4-(1,2,4-triazol-1-yl)phenyl- |
| 2.618 | —Me | —Me | 3-Cl | 1-phenyl-4-pyrazolyl- |
| 2.619 | —Me | —Me | 3-Cl | 1-cyclopropyl-4-pyrazolyl- |
| 2.620 | —Me | —Me | 3-Cl | 4-(methylsulfanylmethyl)phenyl- |
| 2.621 | —Me | —Me | 3-Cl | 4-(isopropylsulfanylmethyl)phenyl- |
| 2.622 | —Me | —Me | 3-Cl | 4-(methylsulfamoyl)phenyl- |
| 2.623 | —Me | —Me | 3-Cl | 4-sulfamoylphenyl- |
| 2.624 | —Me | —Me | 3-Cl | 4-carbamoylphenyl- |
| 2.625 | —Me | —Cl | 3-F | 4-(1-methylpyrazol-3-yl)phenyl- |
| 2.626 | —Me | —Cl | 3-F | 4-(5-methyltetrazol-1-yl)phenyl- |
| 2.627 | —Me | —Cl | 3-F | 4-morpholinophenyl- |
| 2.628 | —Me | —Cl | 3-F | 4-(3-methylpyrazol-1-yl)phenyl- |
| 2.629 | —Me | —Cl | 3-F | 4-(3,5-dimethylpyrazol-1-yl)phenyl- |
| 2.630 | —Me | —Cl | 3-F | 4-pyrazol-1-ylphenyl- |
| 2.631 | —Me | —Cl | 3-F | 4-pyrrol-1-ylphenyl- |
| 2.632 | —Me | —Cl | 3-F | 4-(5-methyltetrahydrofuran-2-yl)phenyl- |
| 2.633 | —Me | —Cl | 3-F | 4-(5-methyl-2-furyl)phenyl- |
| 2.634 | —Me | —Cl | 3-F | 4-oxazol-2-ylphenyl- |
| 2.635 | —Me | —Cl | 3-F | 4-(2-methylthiazol-4-yl)phenyl- |
| 2.636 | —Me | —Cl | 3-F | 4-(2-thienyl)phenyl- |
| 2.637 | —Me | —Cl | 3-F | 4-(1,2,4-triazol-1-yl)phenyl- |
| 2.638 | —Me | —Cl | 3-F | 1-phenyl-4-pyrazolyl- |

TABLE 2-continued

Substituent definitions of R¹, R², Y and D:

| Compound No. | R¹ | R² | Y | D |
|---|---|---|---|---|
| 2.639 | —Me | —Cl | 3-F | 1-cyclopropyl-4-pyrazolyl- |
| 2.640 | —Me | —Cl | 3-F | 4-(methylsulfanylmethyl)phenyl- |
| 2.641 | —Me | —Cl | 3-F | 4-(isopropylsulfanylmethyl)phenyl- |
| 2.642 | —Me | —Cl | 3-F | 4-(methylsulfamoyl)phenyl- |
| 2.643 | —Me | —Cl | 3-F | 4-sulfamoylphenyl- |
| 2.644 | —Me | —Cl | 3-F | 4-carbamoylphenyl- |
| 2.645 | —Me | —Cl | 3-Cl | 4-(1-methylpyrazol-3-yl)phenyl- |
| 2.646 | —Me | —Cl | 3-Cl | 4-(5-methyltetrazol-1-yl)phenyl- |
| 2.647 | —Me | —Cl | 3-Cl | 4-morpholinophenyl- |
| 2.648 | —Me | —Cl | 3-Cl | 4-(3-methylpyrazol-1-yl)phenyl- |
| 2.649 | —Me | —Cl | 3-Cl | 4-(3,5-dimethylpyrazol-1-yl)phenyl- |
| 2.650 | —Me | —Cl | 3-Cl | 4-pyrazol-1-ylphenyl- |
| 2.651 | —Me | —Cl | 3-Cl | 4-pyrrol-1-ylphenyl- |
| 2.652 | —Me | —Cl | 3-Cl | 4-(5-methyltetrahydrofuran-2-yl)phenyl- |
| 2.653 | —Me | —Cl | 3-Cl | 4-(5-methyl-2-furyl)phenyl- |
| 2.654 | —Me | —Cl | 3-Cl | 4-oxazol-2-ylphenyl- |
| 2.655 | —Me | —Cl | 3-Cl | 4-(2-methylthiazol-4-yl)phenyl- |
| 2.656 | —Me | —Cl | 3-Cl | 4-(2-thienyl)phenyl- |
| 2.657 | —Me | —Cl | 3-Cl | 4-(1,2,4-triazol-1-yl)phenyl- |
| 2.658 | —Me | —Cl | 3-Cl | 1-phenyl-4-pyrazolyl- |
| 2.659 | —Me | —Cl | 3-Cl | 1-cyclopropyl-4-pyrazolyl- |
| 2.660 | —Me | —Cl | 3-Cl | 4-(methylsulfanylmethyl)phenyl- |
| 2.661 | —Me | —Cl | 3-Cl | 4-(isopropylsulfanylmethyl)phenyl- |
| 2.662 | —Me | —Cl | 3-Cl | 4-(methylsulfamoyl)phenyl- |
| 2.663 | —Me | —Cl | 3-Cl | 4-sulfamoylphenyl- |
| 2.664 | —Me | —Cl | 3-Cl | 4-carbamoylphenyl- |
| 2.665 | —CH₂—C≡CH | —Me | 3-F | 4-(1-methylpyrazol-3-yl)phenyl- |
| 2.666 | —CH₂—C≡CH | —Me | 3-F | 4-(5-methyltetrazol-1-yl)phenyl- |
| 2.667 | —CH₂—C≡CH | —Me | 3-F | 4-morpholinophenyl- |
| 2.668 | —CH₂—C≡CH | —Me | 3-F | 4-(3-methylpyrazol-1-yl)phenyl- |
| 2.669 | —CH₂—C≡CH | —Me | 3-F | 4-(3,5-dimethylpyrazol-1-yl)phenyl- |
| 2.670 | —CH₂—C≡CH | —Me | 3-F | 4-pyrazol-1-ylphenyl- |
| 2.671 | —CH₂—C≡CH | —Me | 3-F | 4-pyrrol-1-ylphenyl- |
| 2.672 | —CH₂—C≡CH | —Me | 3-F | 4-(5-methyltetrahydrofuran-2-yl)phenyl- |
| 2.673 | —CH₂—C≡CH | —Me | 3-F | 4-(5-methyl-2-furyl)phenyl- |
| 2.674 | —CH₂—C≡CH | —Me | 3-F | 4-oxazol-2-ylphenyl- |
| 2.675 | —CH₂—C≡CH | —Me | 3-F | 4-(2-methylthiazol-4-yl)phenyl- |
| 2.676 | —CH₂—C≡CH | —Me | 3-F | 4-(2-thienyl)phenyl- |
| 2.677 | —CH₂—C≡CH | —Me | 3-F | 4-(1,2,4-triazol-1-yl)phenyl- |
| 2.678 | —CH₂—C≡CH | —Me | 3-F | 1-phenyl-4-pyrazolyl- |
| 2.679 | —CH₂—C≡CH | —Me | 3-F | 1-cyclopropyl-4-pyrazolyl- |
| 2.680 | —CH₂—C≡CH | —Me | 3-F | 4-(methylsulfanylmethyl)phenyl- |
| 2.681 | —CH₂—C≡CH | —Me | 3-F | 4-(isopropylsulfanylmethyl)phenyl- |
| 2.682 | —CH₂—C≡CH | —Me | 3-F | 4-(methylsulfamoyl)phenyl- |
| 2.683 | —CH₂—C≡CH | —Me | 3-F | 4-sulfamoylphenyl- |
| 2.684 | —CH₂—C≡CH | —Me | 3-F | 4-carbamoylphenyl- |
| 2.685 | —CH₂—C≡CH | —Me | 3-Cl | 4-(1-methylpyrazol-3-yl)phenyl- |
| 2.686 | —CH₂—C≡CH | —Me | 3-Cl | 4-(5-methyltetrazol-1-yl)phenyl- |
| 2.687 | —CH₂—C≡CH | —Me | 3-Cl | 4-morpholinophenyl- |
| 2.688 | —CH₂—C≡CH | —Me | 3-Cl | 4-(3-methylpyrazol-1-yl)phenyl- |
| 2.689 | —CH₂—C≡CH | —Me | 3-Cl | 4-(3,5-dimethylpyrazol-1-yl)phenyl- |
| 2.690 | —CH₂—C≡CH | —Me | 3-Cl | 4-pyrazol-1-ylphenyl- |
| 2.691 | —CH₂—C≡CH | —Me | 3-Cl | 4-pyrrol-1-ylphenyl- |
| 2.692 | —CH₂—C≡CH | —Me | 3-Cl | 4-(5-methyltetrahydrofuran-2-yl)phenyl- |
| 2.693 | —CH₂—C≡CH | —Me | 3-Cl | 4-(5-methyl-2-furyl)phenyl- |
| 2.694 | —CH₂—C≡CH | —Me | 3-Cl | 4-oxazol-2-ylphenyl- |
| 2.695 | —CH₂—C≡CH | —Me | 3-Cl | 4-(2-methylthiazol-4-yl)phenyl- |
| 2.696 | —CH₂—C≡CH | —Me | 3-Cl | 4-(2-thienyl)phenyl- |
| 2.697 | —CH₂—C≡CH | —Me | 3-Cl | 4-(1,2,4-triazol-1-yl)phenyl- |
| 2.698 | —CH₂—C≡CH | —Me | 3-Cl | 1-phenyl-4-pyrazolyl- |
| 2.699 | —CH₂—C≡CH | —Me | 3-Cl | 1-cyclopropyl-4-pyrazolyl- |
| 2.700 | —CH₂—C≡CH | —Me | 3-Cl | 4-(methylsulfanylmethyl)phenyl- |
| 2.701 | —CH₂—C≡CH | —Me | 3-Cl | 4-(isopropylsulfanylmethyl)phenyl- |
| 2.702 | —CH₂—C≡CH | —Me | 3-Cl | 4-(methylsulfamoyl)phenyl- |
| 2.703 | —CH₂—C≡CH | —Me | 3-Cl | 4-sulfamoylphenyl- |
| 2.704 | —CH₂—C≡CH | —Me | 3-Cl | 4-carbamoylphenyl- |
| 2.705 | —CH₂—C≡CH | —Cl | 3-F | 4-(1-methylpyrazol-3-yl)phenyl- |
| 2.706 | —CH₂—C≡CH | —Cl | 3-F | 4-(5-methyltetrazol-1-yl)phenyl- |
| 2.707 | —CH₂—C≡CH | —Cl | 3-F | 4-morpholinophenyl- |
| 2.708 | —CH₂—C≡CH | —Cl | 3-F | 4-(3-methylpyrazol-1-yl)phenyl- |
| 2.709 | —CH₂—C≡CH | —Cl | 3-F | 4-(3,5-dimethylpyrazol-1-yl)phenyl- |
| 2.710 | —CH₂—C≡CH | —Cl | 3-F | 4-pyrazol-1-ylphenyl- |
| 2.711 | —CH₂—C≡CH | —Cl | 3-F | 4-pyrrol-1-ylphenyl- |
| 2.712 | —CH₂—C≡CH | —Cl | 3-F | 4-(5-methyltetrahydrofuran-2-yl)phenyl- |
| 2.713 | —CH₂—C≡CH | —Cl | 3-F | 4-(5-methyl-2-furyl)phenyl- |
| 2.714 | —CH₂—C≡CH | —Cl | 3-F | 4-oxazol-2-ylphenyl- |

TABLE 2-continued

Substituent definitions of $R^1$, $R^2$, Y and D:

| Compound No. | $R^1$ | $R^2$ | Y | D |
|---|---|---|---|---|
| 2.715 | —CH₂—C≡CH | —Cl | 3-F | 4-(2-methylthiazol-4-yl)phenyl- |
| 2.716 | —CH₂—C≡CH | —Cl | 3-F | 4-(2-thienyl)phenyl- |
| 2.717 | —CH₂—C≡CH | —Cl | 3-F | 4-(1,2,4-triazol-1-yl)phenyl- |
| 2.718 | —CH₂—C≡CH | —Cl | 3-F | 1-phenyl-4-pyrazolyl- |
| 2.719 | —CH₂—C≡CH | —Cl | 3-F | 1-cyclopropyl-4-pyrazolyl- |
| 2.720 | —CH₂—C≡CH | —Cl | 3-F | 4-(methylsulfanylmethyl)phenyl- |
| 2.721 | —CH₂—C≡CH | —Cl | 3-F | 4-(isopropylsulfanylmethyl)phenyl- |
| 2.722 | —CH₂—C≡CH | —Cl | 3-F | 4-(methylsulfamoyl)phenyl- |
| 2.723 | —CH₂—C≡CH | —Cl | 3-F | 4-sulfamoylphenyl- |
| 2.724 | —CH₂—C≡CH | —Cl | 3-F | 4-carbamoylphenyl- |
| 2.725 | —CH₂—C≡CH | —Cl | 3-Cl | 4-(1-methylpyrazol-3-yl)phenyl- |
| 2.726 | —CH₂—C≡CH | —Cl | 3-Cl | 4-(5-methyltetrazol-1-yl)phenyl- |
| 2.727 | —CH₂—C≡CH | —Cl | 3-Cl | 4-morpholinophenyl- |
| 2.728 | —CH₂—C≡CH | —Cl | 3-Cl | 4-(3-methylpyrazol-1-yl)phenyl- |
| 2.729 | —CH₂—C≡CH | —Cl | 3-Cl | 4-(3,5-dimethylpyrazol-1-yl)phenyl- |
| 2.730 | —CH₂—C≡CH | —Cl | 3-Cl | 4-pyrazol-1-ylphenyl- |
| 2.731 | —CH₂—C≡CH | —Cl | 3-Cl | 4-pyrrol-1-ylphenyl- |
| 2.732 | —CH₂—C≡CH | —Cl | 3-Cl | 4-(5-methyltetrahydrofuran-2-yl)phenyl- |
| 2.733 | —CH₂—C≡CH | —Cl | 3-Cl | 4-(5-methyl-2-furyl)phenyl- |
| 2.734 | —CH₂—C≡CH | —Cl | 3-Cl | 4-oxazol-2-ylphenyl- |
| 2.735 | —CH₂—C≡CH | —Cl | 3-Cl | 4-(2-methylthiazol-4-yl)phenyl- |
| 2.736 | —CH₂—C≡CH | —Cl | 3-Cl | 4-(2-thienyl)phenyl- |
| 2.737 | —CH₂—C≡CH | —Cl | 3-Cl | 4-(1,2,4-triazol-1-yl)phenyl- |
| 2.738 | —CH₂—C≡CH | —Cl | 3-Cl | 1-phenyl-4-pyrazolyl- |
| 2.739 | —CH₂—C≡CH | —Cl | 3-Cl | 1-cyclopropyl-4-pyrazolyl- |
| 2.740 | —CH₂—C≡CH | —Cl | 3-Cl | 4-(methylsulfanylmethyl)phenyl- |
| 2.741 | —CH₂—C≡CH | —Cl | 3-Cl | 4-(isopropylsulfanylmethyl)phenyl- |
| 2.742 | —CH₂—C≡CH | —Cl | 3-Cl | 4-(methylsulfamoyl)phenyl- |
| 2.743 | —CH₂—C≡CH | —Cl | 3-Cl | 4-sulfamoylphenyl- |
| 2.744 | —CH₂—C≡CH | —Cl | 3-Cl | 4-carbamoylphenyl- |

Table B-2 provides 744 compounds B-2.001 to B-2.744 of formula (I) wherein G is —H, W is (E) —CH═CH—, X is 6-cyclopropyl and R, $R^2$, Y, D are as defined for compound Nos 2.001 to 2.744 respectively in Table 2 above.

Table B-3 provides 744 compounds B-3.001 to B-3.744 of formula (I) wherein G is —(C═O)iPr, W is —CH₂—CH₂—, X is 6-cyclopropyl and $R^6$, $R^2$, Y, D are as defined for compound Nos 2.001 to 2.744 respectively in Table 2 above.

Table B-4 provides 744 compounds B-4.001 to B-4.744 of formula (I) wherein G is —(C═O)iPr, W is (E) —CH═CH—, X is 6-cyclopropyl and $R^1$, $R^2$, Y, D are as defined for compound Nos 2.001 to 2.744 respectively in Table 2 above.

Table C-1 provides 744 compounds C-1.001 to C-1.744 of formula (I) wherein G is —H, W is —CH₂—CH₂—, Y is 3-cyclopropyl and $R^1$, $R^2$, X, and D are as defined for compound Nos 3.001 to 3.744 respectively in Table 3 below.

TABLE 3

Substituent definitions of $R^1$, $R^2$, X and D:

| Compound No. | $R^1$ | $R^2$ | X | D |
|---|---|---|---|---|
| 3.001 | —Me | —Me | 6-F | —Ph |
| 3.002 | —Me | —Me | 6-F | 1-methyl-3-(trifluoromethyl)pyrazol-4-yl- |
| 3.003 | —Me | —Me | 6-F | 1-methyl-pyrazol-4-yl- |
| 3.004 | —Me | —Me | 6-F | 2-(methylsulfanyl)-4-pyridyl- |
| 3.005 | —Me | —Me | 6-F | 2-acetamido-4-pyridyl- |
| 3.006 | —Me | —Me | 6-F | 2-acetamidothiazol-5-yl- |
| 3.007 | —Me | —Me | 6-F | 2-amino-4-pyridyl- |
| 3.008 | —Me | —Me | 6-F | 2-chloro-3-pyridyl- |
| 3.009 | —Me | —Me | 6-F | 2-chloro-4-pyridyl- |
| 3.010 | —Me | —Me | 6-F | 2-chlorothiazol-5-yl- |
| 3.011 | —Me | —Me | 6-F | 2-cyanophenyl- |
| 3.012 | —Me | —Me | 6-F | 2-cyano-phenyl- |
| 3.013 | —Me | —Me | 6-F | 2-fluoro-4-pyridyl- |
| 3.014 | —Me | —Me | 6-F | 2-methyl-4-pyridyl- |
| 3.015 | —Me | —Me | 6-F | 2-methyl-triazol-4-yl- |
| 3.016 | —Me | —Me | 6-F | 2-tolyl- |
| 3.017 | —Me | —Me | 6-F | 2-trifluoromethyl-4-pyridyl- |
| 3.018 | —Me | —Me | 6-F | 2-trifluoromethyl-phenyl- |
| 3.019 | —Me | —Me | 6-F | 3,4-difluoro-phenyl- |
| 3.020 | —Me | —Me | 6-F | 3,5-difluoro-phenyl- |
| 3.021 | —Me | —Me | 6-F | 3-chloro-4-fluoro-phenyl- |
| 3.022 | —Me | —Me | 6-F | 3-chloro-4-pyridyl- |
| 3.023 | —Me | —Me | 6-F | 3-cyanophenyl- |
| 3.024 | —Me | —Me | 6-F | 3-cyano-phenyl- |
| 3.025 | —Me | —Me | 6-F | 3-methyl-2-pyridyl- |

TABLE 3-continued

Substituent definitions of $R^1$, $R^2$, X and D:

| Compound No. | $R^1$ | $R^2$ | X | D |
|---|---|---|---|---|
| 3.026 | —Me | —Me | 6-F | 3-methyl-4-amino-phenyl- |
| 3.027 | —Me | —Me | 6-F | 3-pyridyl- |
| 3.028 | —Me | —Me | 6-F | 3-tolyl- |
| 3.029 | —Me | —Me | 6-F | 3-trifluoromethyl-3-pyridyl- |
| 3.030 | —Me | —Me | 6-F | 3-trifluoromethyl-phenyl- |
| 3.031 | —Me | —Me | 6-F | 4-(dimethylamino)-phenyl- |
| 3.032 | —Me | —Me | 6-F | 4-(dimethylsulfamoyl)phenyl- |
| 3.033 | —Me | —Me | 6-F | 4-(methylamino)-phenyl- |
| 3.034 | —Me | —Me | 6-F | 4-(methylsulfanyl)phenyl- |
| 3.035 | —Me | —Me | 6-F | 4-(tert-butoxy)-phenyl- |
| 3.036 | —Me | —Me | 6-F | 4-(tert-butoxycarbonylamino)-3-fluoro-phenyl- |
| 3.037 | —Me | —Me | 6-F | 4-(trifluoromethoxy)-phenyl- |
| 3.038 | —Me | —Me | 6-F | 4-[ethyl(methyl)carbamoyl]-3-fluoro-phenyl- |
| 3.039 | —Me | —Me | 6-F | 4-acetamidophenyl- |
| 3.040 | —Me | —Me | 6-F | 4-amino-3-methylphenyl- |
| 3.041 | —Me | —Me | 6-F | 4-amino-phenyl- |
| 3.042 | —Me | —Me | 6-F | 4-biphenyl- |
| 3.043 | —Me | —Me | 6-F | 4-carboxyphenyl- |
| 3.044 | —Me | —Me | 6-F | 4-chloro-3-pyridyl- |
| 3.045 | —Me | —Me | 6-F | 4-chloro-phenyl- |
| 3.046 | —Me | —Me | 6-F | 4-cyanophenyl- |
| 3.047 | —Me | —Me | 6-F | 4-cyano-phenyl- |
| 3.048 | —Me | —Me | 6-F | 4-cyclopropylphenyl- |
| 3.049 | —Me | —Me | 6-F | 4-cyclopropyl-phenyl- |
| 3.050 | —Me | —Me | 6-F | 4-dimethylaminophenyl- |
| 3.051 | —Me | —Me | 6-F | 4-fluoro-phenyl- |
| 3.052 | —Me | —Me | 6-F | 4-hydroxyphenyl- |
| 3.053 | —Me | —Me | 6-F | 4-hydroxy-phenyl- |
| 3.054 | —Me | —Me | 6-F | 4-methoxycarbonylphenyl- |
| 3.055 | —Me | —Me | 6-F | 4-methyl-2-pyridyl- |
| 3.056 | —Me | —Me | 6-F | 4-methylaminophenyl- |
| 3.057 | —Me | —Me | 6-F | 4-methylsulfonylphenyl- |
| 3.058 | —Me | —Me | 6-F | 4-oxazol-5-ylphenyl- |
| 3.059 | —Me | —Me | 6-F | 4-pyridyl- |
| 3.060 | —Me | —Me | 6-F | 4-tert-butoxyphenyl- |
| 3.061 | —Me | —Me | 6-F | 4-tert-butylphenyl- |
| 3.062 | —Me | —Me | 6-F | 4-tolyl- |
| 3.063 | —Me | —Me | 6-F | 4-trifluoromethyl-3-pyridyl- |
| 3.064 | —Me | —Me | 6-F | 4-trifluoromethyl-phenyl- |
| 3.065 | —Me | —Me | 6-F | 5-methyl-1,3,4-oxadiazol-2-yl- |
| 3.066 | —Me | —Me | 6-F | 5-methyl-2-pyridyl- |
| 3.067 | —Me | —Me | 6-F | 5-methyl-3-pyridyl- |
| 3.068 | —Me | —Me | 6-F | 6-chloro-3-pyridyl- |
| 3.069 | —Me | —Me | 6-F | 6-methyl-2-pyridyl- |
| 3.070 | —Me | —Me | 6-F | pyrimidin-5-yl- |
| 3.071 | —Me | —Me | 6-F | thiazol-2-yl- |
| 3.072 | —Me | —Me | 6-F | thiazol-5-yl- |
| 3.073 | —Me | —Me | 6-F | thiophen-3-yl- |
| 3.074 | —Me | —Me | 6-Cl | —Ph |
| 3.075 | —Me | —Me | 6-Cl | 1-methyl-3-(trifluoromethyl)pyrazol-4-yl- |
| 3.076 | —Me | —Me | 6-Cl | 1-methyl-pyrazol-4-yl- |
| 3.077 | —Me | —Me | 6-Cl | 2-(methylsulfanyl)-4-pyridyl- |
| 3.078 | —Me | —Me | 6-Cl | 2-acetamido-4-pyridyl- |
| 3.079 | —Me | —Me | 6-Cl | 2-acetamidothiazol-5-yl- |
| 3.080 | —Me | —Me | 6-Cl | 2-amino-4-pyridyl- |
| 3.081 | —Me | —Me | 6-Cl | 2-chloro-3-pyridyl- |
| 3.082 | —Me | —Me | 6-Cl | 2-chloro-4-pyridyl- |
| 3.083 | —Me | —Me | 6-Cl | 2-chlorothiazol-5-yl- |
| 3.084 | —Me | —Me | 6-Cl | 2-cyanophenyl- |
| 3.085 | —Me | —Me | 6-Cl | 2-cyano-phenyl- |
| 3.086 | —Me | —Me | 6-Cl | 2-fluoro-4-pyridyl- |
| 3.087 | —Me | —Me | 6-Cl | 2-methyl-4-pyridyl- |
| 3.088 | —Me | —Me | 6-Cl | 2-methyl-triazol-4-yl- |
| 3.089 | —Me | —Me | 6-Cl | 2-tolyl- |
| 3.090 | —Me | —Me | 6-Cl | 2-trifluoromethyl-4-pyridyl- |
| 3.091 | —Me | —Me | 6-Cl | 2-trifluoromethyl-phenyl- |
| 3.092 | —Me | —Me | 6-Cl | 3,4-difluoro-phenyl- |
| 3.093 | —Me | —Me | 6-Cl | 3,5-difluoro-phenyl- |
| 3.094 | —Me | —Me | 6-Cl | 3-chloro-4-fluoro-phenyl- |
| 3.095 | —Me | —Me | 6-Cl | 3-chloro-4-pyridyl- |
| 3.096 | —Me | —Me | 6-Cl | 3-cyanophenyl- |
| 3.097 | —Me | —Me | 6-Cl | 3-cyano-phenyl- |
| 3.098 | —Me | —Me | 6-Cl | 3-methyl-2-pyridyl- |
| 3.099 | —Me | —Me | 6-Cl | 3-methyl-4-amino-phenyl- |
| 3.100 | —Me | —Me | 6-Cl | 3-pyridyl- |
| 3.101 | —Me | —Me | 6-Cl | 3-tolyl- |

TABLE 3-continued

Substituent definitions of R¹, R², X and D:

| Compound No. | R¹ | R² | X | D |
|---|---|---|---|---|
| 3.102 | —Me | —Me | 6-Cl | 3-trifluoromethyl-3-pyridyl- |
| 3.103 | —Me | —Me | 6-Cl | 3-trifluoromethyl-phenyl- |
| 3.104 | —Me | —Me | 6-Cl | 4-(dimethylamino)-phenyl- |
| 3.105 | —Me | —Me | 6-Cl | 4-(dimethylsulfamoyl)phenyl- |
| 3.106 | —Me | —Me | 6-Cl | 4-(methylamino)-phenyl- |
| 3.107 | —Me | —Me | 6-Cl | 4-(methylsulfanyl)phenyl- |
| 3.108 | —Me | —Me | 6-Cl | 4-(tert-butoxy)-phenyl- |
| 3.109 | —Me | —Me | 6-Cl | 4-(tert-butoxycarbonylamino)-3-fluoro-phenyl- |
| 3.110 | —Me | —Me | 6-Cl | 4-(trifluoromethoxy)-phenyl- |
| 3.111 | —Me | —Me | 6-Cl | 4-[ethyl(methyl)carbamoyl]-3-fluoro-phenyl- |
| 3.112 | —Me | —Me | 6-Cl | 4-acetamidophenyl- |
| 3.113 | —Me | —Me | 6-Cl | 4-amino-3-methylphenyl- |
| 3.114 | —Me | —Me | 6-Cl | 4-amino-phenyl- |
| 3.115 | —Me | —Me | 6-Cl | 4-biphenyl- |
| 3.116 | —Me | —Me | 6-Cl | 4-carboxyphenyl- |
| 3.117 | —Me | —Me | 6-Cl | 4-chloro-3-pyridyl- |
| 3.118 | —Me | —Me | 6-Cl | 4-chloro-phenyl- |
| 3.119 | —Me | —Me | 6-Cl | 4-cyanophenyl- |
| 3.120 | —Me | —Me | 6-Cl | 4-cyano-phenyl- |
| 3.121 | —Me | —Me | 6-Cl | 4-cyclopropylphenyl- |
| 3.122 | —Me | —Me | 6-Cl | 4-cyclopropyl-phenyl- |
| 3.123 | —Me | —Me | 6-Cl | 4-dimethylaminophenyl- |
| 3.124 | —Me | —Me | 6-Cl | 4-fluoro-phenyl- |
| 3.125 | —Me | —Me | 6-Cl | 4-hydroxyphenyl- |
| 3.126 | —Me | —Me | 6-Cl | 4-hydroxy-phenyl- |
| 3.127 | —Me | —Me | 6-Cl | 4-methoxycarbonylphenyl- |
| 3.128 | —Me | —Me | 6-Cl | 4-methyl-2-pyridyl- |
| 3.129 | —Me | —Me | 6-Cl | 4-methylaminophenyl- |
| 3.130 | —Me | —Me | 6-Cl | 4-methylsulfonylphenyl- |
| 3.131 | —Me | —Me | 6-Cl | 4-oxazol-5-ylphenyl- |
| 3.132 | —Me | —Me | 6-Cl | 4-pyridyl- |
| 3.133 | —Me | —Me | 6-Cl | 4-tert-butoxyphenyl- |
| 3.134 | —Me | —Me | 6-Cl | 4-tert-butylphenyl- |
| 3.135 | —Me | —Me | 6-Cl | 4-tolyl- |
| 3.136 | —Me | —Me | 6-Cl | 4-trifluoromethyl-3-pyridyl- |
| 3.137 | —Me | —Me | 6-Cl | 4-trifluoromethyl-phenyl- |
| 3.138 | —Me | —Me | 6-Cl | 5-methyl-1,3,4-oxadiazol-2-yl- |
| 3.139 | —Me | —Me | 6-Cl | 5-methyl-2-pyridyl- |
| 3.140 | —Me | —Me | 6-Cl | 5-methyl-3-pyridyl- |
| 3.141 | —Me | —Me | 6-Cl | 6-chloro-3-pyridyl- |
| 3.142 | —Me | —Me | 6-Cl | 6-methyl-2-pyridyl- |
| 3.143 | —Me | —Me | 6-Cl | pyrimidin-5-yl- |
| 3.144 | —Me | —Me | 6-Cl | thiazol-2-yl- |
| 3.145 | —Me | —Me | 6-Cl | thiazol-5-yl- |
| 3.146 | —Me | —Me | 6-Cl | thiophen-3-yl- |
| 3.147 | —Me | —Cl | 6-F | —Ph |
| 3.148 | —Me | —Cl | 6-F | 1-methyl-3-(trifluoromethyl)pyrazol-4-yl- |
| 3.149 | —Me | —Cl | 6-F | 1-methyl-pyrazol-4-yl- |
| 3.150 | —Me | —Cl | 6-F | 2-(methylsulfanyl)-4-pyridyl- |
| 3.151 | —Me | —Cl | 6-F | 2-acetamido-4-pyridyl- |
| 3.152 | —Me | —Cl | 6-F | 2-acetamidothiazol-5-yl- |
| 3.153 | —Me | —Cl | 6-F | 2-amino-4-pyridyl- |
| 3.154 | —Me | —Cl | 6-F | 2-chloro-3-pyridyl- |
| 3.155 | —Me | —Cl | 6-F | 2-chloro-4-pyridyl- |
| 3.156 | —Me | —Cl | 6-F | 2-chlorothiazol-5-yl- |
| 3.157 | —Me | —Cl | 6-F | 2-cyanophenyl- |
| 3.158 | —Me | —Cl | 6-F | 2-cyano-phenyl- |
| 3.159 | —Me | —Cl | 6-F | 2-fluoro-4-pyridyl- |
| 3.160 | —Me | —Cl | 6-F | 2-methyl-4-pyridyl- |
| 3.161 | —Me | —Cl | 6-F | 2-methyl-triazol-4-yl- |
| 3.162 | —Me | —Cl | 6-F | 2-tolyl- |
| 3.163 | —Me | —Cl | 6-F | 2-trifluoromethyl-4-pyridyl- |
| 3.164 | —Me | —Cl | 6-F | 2-trifluoromethyl-phenyl- |
| 3.165 | —Me | —Cl | 6-F | 3,4-difluoro-phenyl- |
| 3.166 | —Me | —Cl | 6-F | 3,5-difluoro-phenyl- |
| 3.167 | —Me | —Cl | 6-F | 3-chloro-4-fluoro-phenyl- |
| 3.168 | —Me | —Cl | 6-F | 3-chloro-4-pyridyl- |
| 3.169 | —Me | —Cl | 6-F | 3-cyanophenyl- |
| 3.170 | —Me | —Cl | 6-F | 3-cyano-phenyl- |
| 3.171 | —Me | —Cl | 6-F | 3-methyl-2-pyridyl- |
| 3.172 | —Me | —Cl | 6-F | 3-methyl-4-amino-phenyl- |
| 3.173 | —Me | —Cl | 6-F | 3-pyridyl- |
| 3.174 | —Me | —Cl | 6-F | 3-tolyl- |
| 3.175 | —Me | —Cl | 6-F | 3-trifluoromethyl-3-pyridyl- |
| 3.176 | —Me | —Cl | 6-F | 3-trifluoromethyl-phenyl- |
| 3.177 | —Me | —Cl | 6-F | 4-(dimethylamino)-phenyl- |

TABLE 3-continued

Substituent definitions of $R^1$, $R^2$, X and D:

| Compound No. | $R^1$ | $R^2$ | X | D |
|---|---|---|---|---|
| 3.178 | —Me | —Cl | 6-F | 4-(dimethylsulfamoyl)phenyl- |
| 3.179 | —Me | —Cl | 6-F | 4-(methylamino)-phenyl- |
| 3.180 | —Me | —Cl | 6-F | 4-(methylsulfanyl)phenyl- |
| 3.181 | —Me | —Cl | 6-F | 4-(tert-butoxy)-phenyl- |
| 3.182 | —Me | —Cl | 6-F | 4-(tert-butoxycarbonylamino)-3-fluoro-phenyl- |
| 3.183 | —Me | —Cl | 6-F | 4-(trifluoromethoxy)-phenyl- |
| 3.184 | —Me | —Cl | 6-F | 4-[ethyl(methyl)carbamoyl]-3-fluoro-phenyl- |
| 3.185 | —Me | —Cl | 6-F | 4-acetamidophenyl- |
| 3.186 | —Me | —Cl | 6-F | 4-amino-3-methylphenyl- |
| 3.187 | —Me | —Cl | 6-F | 4-amino-phenyl- |
| 3.188 | —Me | —Cl | 6-F | 4-biphenyl- |
| 3.189 | —Me | —Cl | 6-F | 4-carboxyphenyl- |
| 3.190 | —Me | —Cl | 6-F | 4-chloro-3-pyridyl- |
| 3.191 | —Me | —Cl | 6-F | 4-chloro-phenyl- |
| 3.192 | —Me | —Cl | 6-F | 4-cyanophenyl- |
| 3.193 | —Me | —Cl | 6-F | 4-cyano-phenyl- |
| 3.194 | —Me | —Cl | 6-F | 4-cyclopropylphenyl- |
| 3.195 | —Me | —Cl | 6-F | 4-cyclopropyl-phenyl- |
| 3.196 | —Me | —Cl | 6-F | 4-dimethylaminophenyl- |
| 3.197 | —Me | —Cl | 6-F | 4-fluoro-phenyl- |
| 3.198 | —Me | —Cl | 6-F | 4-hydroxyphenyl- |
| 3.199 | —Me | —Cl | 6-F | 4-hydroxy-phenyl- |
| 3.200 | —Me | —Cl | 6-F | 4-methoxycarbonylphenyl- |
| 3.201 | —Me | —Cl | 6-F | 4-methyl-2-pyridyl- |
| 3.202 | —Me | —Cl | 6-F | 4-methylaminophenyl- |
| 3.203 | —Me | —Cl | 6-F | 4-methylsulfonylphenyl- |
| 3.204 | —Me | —Cl | 6-F | 4-oxazol-5-ylphenyl- |
| 3.205 | —Me | —Cl | 6-F | 4-pyridyl- |
| 3.206 | —Me | —Cl | 6-F | 4-tert-butoxyphenyl- |
| 3.207 | —Me | —Cl | 6-F | 4-tert-butylphenyl- |
| 3.208 | —Me | —Cl | 6-F | 4-tolyl- |
| 3.209 | —Me | —Cl | 6-F | 4-trifluoromethyl-3-pyridyl- |
| 3.210 | —Me | —Cl | 6-F | 4-trifluoromethyl-phenyl- |
| 3.211 | —Me | —Cl | 6-F | 5-methyl-1,3,4-oxadiazol-2-yl- |
| 3.212 | —Me | —Cl | 6-F | 5-methyl-2-pyridyl- |
| 3.213 | —Me | —Cl | 6-F | 5-methyl-3-pyridyl- |
| 3.214 | —Me | —Cl | 6-F | 6-chloro-3-pyridyl- |
| 3.215 | —Me | —Cl | 6-F | 6-methyl-2-pyridyl- |
| 3.216 | —Me | —Cl | 6-F | pyrimidin-5-yl- |
| 3.217 | —Me | —Cl | 6-F | thiazol-2-yl- |
| 3.218 | —Me | —Cl | 6-F | thiazol-5-yl- |
| 3.219 | —Me | —Cl | 6-F | thiophen-3-yl- |
| 3.220 | —Me | —Cl | 6-Cl | —Ph |
| 3.221 | —Me | —Cl | 6-Cl | 1-methyl-3-(trifluoromethyl)pyrazol-4-yl- |
| 3.222 | —Me | —Cl | 6-Cl | 1-methyl-pyrazol-4-yl- |
| 3.223 | —Me | —Cl | 6-Cl | 2-(methylsulfanyl)-4-pyridyl- |
| 3.224 | —Me | —Cl | 6-Cl | 2-acetamido-4-pyridyl- |
| 3.225 | —Me | —Cl | 6-Cl | 2-acetamidothiazol-5-yl- |
| 3.226 | —Me | —Cl | 6-Cl | 2-amino-4-pyridyl- |
| 3.227 | —Me | —Cl | 6-Cl | 2-chloro-3-pyridyl- |
| 3.228 | —Me | —Cl | 6-Cl | 2-chloro-4-pyridyl- |
| 3.229 | —Me | —Cl | 6-Cl | 2-chlorothiazol-5-yl- |
| 3.230 | —Me | —Cl | 6-Cl | 2-cyanophenyl- |
| 3.231 | —Me | —Cl | 6-Cl | 2-cyano-phenyl- |
| 3.232 | —Me | —Cl | 6-Cl | 2-fluoro-4-pyridyl- |
| 3.233 | —Me | —Cl | 6-Cl | 2-methyl-4-pyridyl- |
| 3.234 | —Me | —Cl | 6-Cl | 2-methyl-triazol-4-yl- |
| 3.235 | —Me | —Cl | 6-Cl | 2-tolyl- |
| 3.236 | —Me | —Cl | 6-Cl | 2-trifluoromethyl-4-pyridyl- |
| 3.237 | —Me | —Cl | 6-Cl | 2-trifluoromethyl-phenyl- |
| 3.238 | —Me | —Cl | 6-Cl | 3,4-difluoro-phenyl- |
| 3.239 | —Me | —Cl | 6-Cl | 3,5-difluoro-phenyl- |
| 3.240 | —Me | —Cl | 6-Cl | 3-chloro-4-fluoro-phenyl- |
| 3.241 | —Me | —Cl | 6-Cl | 3-chloro-4-pyridyl- |
| 3.242 | —Me | —Cl | 6-Cl | 3-cyanophenyl- |
| 3.243 | —Me | —Cl | 6-Cl | 3-cyano-phenyl- |
| 3.244 | —Me | —Cl | 6-Cl | 3-methyl-2-pyridyl- |
| 3.245 | —Me | —Cl | 6-Cl | 3-methyl-4-amino-phenyl- |
| 3.246 | —Me | —Cl | 6-Cl | 3-pyridyl- |
| 3.247 | —Me | —Cl | 6-Cl | 3-tolyl- |
| 3.248 | —Me | —Cl | 6-Cl | 3-trifluoromethyl-3-pyridyl- |
| 3.249 | —Me | —Cl | 6-Cl | 3-trifluoromethyl-phenyl- |
| 3.250 | —Me | —Cl | 6-Cl | 4-(dimethylamino)-phenyl- |
| 3.251 | —Me | —Cl | 6-Cl | 4-(dimethylsulfamoyl)phenyl- |
| 3.252 | —Me | —Cl | 6-Cl | 4-(methylamino)-phenyl- |
| 3.253 | —Me | —Cl | 6-Cl | 4-(methylsulfanyl)phenyl- |

TABLE 3-continued

Substituent definitions of $R^1$, $R^2$, X and D:

| Compound No. | $R^1$ | $R^2$ | X | D |
|---|---|---|---|---|
| 3.254 | —Me | —Cl | 6-Cl | 4-(tert-butoxy)-phenyl- |
| 3.255 | —Me | —Cl | 6-Cl | 4-(tert-butoxycarbonylamino)-3-fluoro-phenyl- |
| 3.256 | —Me | —Cl | 6-Cl | 4-(trifluoromethoxy)-phenyl- |
| 3.257 | —Me | —Cl | 6-Cl | 4-[ethyl(methyl)carbamoyl]-3-fluoro-phenyl- |
| 3.258 | —Me | —Cl | 6-Cl | 4-acetamidophenyl- |
| 3.259 | —Me | —Cl | 6-Cl | 4-amino-3-methylphenyl- |
| 3.260 | —Me | —Cl | 6-Cl | 4-amino-phenyl- |
| 3.261 | —Me | —Cl | 6-Cl | 4-biphenyl- |
| 3.262 | —Me | —Cl | 6-Cl | 4-carboxyphenyl- |
| 3.263 | —Me | —Cl | 6-Cl | 4-chloro-3-pyridyl- |
| 3.264 | —Me | —Cl | 6-Cl | 4-chloro-phenyl- |
| 3.265 | —Me | —Cl | 6-Cl | 4-cyanophenyl- |
| 3.266 | —Me | —Cl | 6-Cl | 4-cyano-phenyl- |
| 3.267 | —Me | —Cl | 6-Cl | 4-cyclopropylphenyl- |
| 3.268 | —Me | —Cl | 6-Cl | 4-cyclopropyl-phenyl- |
| 3.269 | —Me | —Cl | 6-Cl | 4-dimethylaminophenyl- |
| 3.270 | —Me | —Cl | 6-Cl | 4-fluoro-phenyl- |
| 3.271 | —Me | —Cl | 6-Cl | 4-hydroxyphenyl- |
| 3.272 | —Me | —Cl | 6-Cl | 4-hydroxy-phenyl- |
| 3.273 | —Me | —Cl | 6-Cl | 4-methoxycarbonylphenyl- |
| 3.274 | —Me | —Cl | 6-Cl | 4-methyl-2-pyridyl- |
| 3.275 | —Me | —Cl | 6-Cl | 4-methylaminophenyl- |
| 3.276 | —Me | —Cl | 6-Cl | 4-methylsulfonylphenyl- |
| 3.277 | —Me | —Cl | 6-Cl | 4-oxazol-5-ylphenyl- |
| 3.278 | —Me | —Cl | 6-Cl | 4-pyridyl- |
| 3.279 | —Me | —Cl | 6-Cl | 4-tert-butoxyphenyl- |
| 3.280 | —Me | —Cl | 6-Cl | 4-tert-butylphenyl- |
| 3.281 | —Me | —Cl | 6-Cl | 4-tolyl- |
| 3.282 | —Me | —Cl | 6-Cl | 4-trifluoromethyl-3-pyridyl- |
| 3.283 | —Me | —Cl | 6-Cl | 4-trifluoromethyl-phenyl- |
| 3.284 | —Me | —Cl | 6-Cl | 5-methyl-1,3,4-oxadiazol-2-yl- |
| 3.285 | —Me | —Cl | 6-Cl | 5-methyl-2-pyridyl- |
| 3.286 | —Me | —Cl | 6-Cl | 5-methyl-3-pyridyl- |
| 3.287 | —Me | —Cl | 6-Cl | 6-chloro-3-pyridyl- |
| 3.288 | —Me | —Cl | 6-Cl | 6-methyl-2-pyridyl- |
| 3.289 | —Me | —Cl | 6-Cl | pyrimidin-5-yl- |
| 3.290 | —Me | —Cl | 6-Cl | thiazol-2-yl- |
| 3.291 | —Me | —Cl | 6-Cl | thiazol-5-yl- |
| 3.292 | —Me | —Cl | 6-Cl | thiophen-3-yl- |
| 3.293 | —CH₂—C≡CH | —Me | 6-F | —Ph |
| 3.294 | —CH₂—C≡CH | —Me | 6-F | 1-methyl-3-(trifluoromethyl)pyrazol-4-yl- |
| 3.295 | —CH₂—C≡CH | —Me | 6-F | 1-methyl-pyrazol-4-yl- |
| 3.296 | —CH₂—C≡CH | —Me | 6-F | 2-(methylsulfanyl)-4-pyridyl- |
| 3.297 | —CH₂—C≡CH | —Me | 6-F | 2-acetamido-4-pyridyl- |
| 3.298 | —CH₂—C≡CH | —Me | 6-F | 2-acetamidothiazol-5-yl- |
| 3.299 | —CH₂—C≡CH | —Me | 6-F | 2-amino-4-pyridyl- |
| 3.300 | —CH₂—C≡CH | —Me | 6-F | 2-chloro-3-pyridyl- |
| 3.301 | —CH₂—C≡CH | —Me | 6-F | 2-chloro-4-pyridyl- |
| 3.302 | —CH₂—C≡CH | —Me | 6-F | 2-chlorothiazol-5-yl- |
| 3.303 | —CH₂—C≡CH | —Me | 6-F | 2-cyanophenyl- |
| 3.304 | —CH₂—C≡CH | —Me | 6-F | 2-cyano-phenyl- |
| 3.305 | —CH₂—C≡CH | —Me | 6-F | 2-fluoro-4-pyridyl- |
| 3.306 | —CH₂—C≡CH | —Me | 6-F | 2-methyl-4-pyridyl- |
| 3.307 | —CH₂—C≡CH | —Me | 6-F | 2-methyl-triazol-4-yl- |
| 3.308 | —CH₂—C≡CH | —Me | 6-F | 2-tolyl- |
| 3.309 | —CH₂—C≡CH | —Me | 6-F | 2-trifluoromethyl-4-pyridyl- |
| 3.310 | —CH₂—C≡CH | —Me | 6-F | 2-trifluoromethyl-phenyl- |
| 3.311 | —CH₂—C≡CH | —Me | 6-F | 3,4-difluoro-phenyl- |
| 3.312 | —CH₂—C≡CH | —Me | 6-F | 3,5-difluoro-phenyl- |
| 3.313 | —CH₂—C≡CH | —Me | 6-F | 3-chloro-4-fluoro-phenyl- |
| 3.314 | —CH₂—C≡CH | —Me | 6-F | 3-chloro-4-pyridyl- |
| 3.315 | —CH₂—C≡CH | —Me | 6-F | 3-cyanophenyl- |
| 3.316 | —CH₂—C≡CH | —Me | 6-F | 3-cyano-phenyl- |
| 3.317 | —CH₂—C≡CH | —Me | 6-F | 3-methyl-2-pyridyl- |
| 3.318 | —CH₂—C≡CH | —Me | 6-F | 3-methyl-4-amino-phenyl- |
| 3.319 | —CH₂—C≡CH | —Me | 6-F | 3-pyridyl- |
| 3.320 | —CH₂—C≡CH | —Me | 6-F | 3-tolyl- |
| 3.321 | —CH₂—C≡CH | —Me | 6-F | 3-trifluoromethyl-3-pyridyl- |
| 3.322 | —CH₂—C≡CH | —Me | 6-F | 3-trifluoromethyl-phenyl- |
| 3.323 | —CH₂—C≡CH | —Me | 6-F | 4-(dimethylamino)-phenyl- |
| 3.324 | —CH₂—C≡CH | —Me | 6-F | 4-(dimethylsulfamoyl)phenyl- |
| 3.325 | —CH₂—C≡CH | —Me | 6-F | 4-(methylamino)-phenyl- |
| 3.326 | —CH₂—C≡CH | —Me | 6-F | 4-(methylsulfanyl)phenyl- |
| 3.327 | —CH₂—C≡CH | —Me | 6-F | 4-(tert-butoxy)-phenyl- |
| 3.328 | —CH₂—C≡CH | —Me | 6-F | 4-(tert-butoxycarbonylamino)-3-fluoro-phenyl- |
| 3.329 | —CH₂—C≡CH | —Me | 6-F | 4-(trifluoromethoxy)-phenyl- |

TABLE 3-continued

Substituent definitions of R¹, R², X and D:

| Compound No. | R¹ | R² | X | D |
|---|---|---|---|---|
| 3.330 | —CH₂—C≡CH | —Me | 6-F | 4-[ethyl(methyl)carbamoyl]-3-fluoro-phenyl- |
| 3.331 | —CH₂—C≡CH | —Me | 6-F | 4-acetamidophenyl- |
| 3.332 | —CH₂—C≡CH | —Me | 6-F | 4-amino-3-methylphenyl- |
| 3.333 | —CH₂—C≡CH | —Me | 6-F | 4-amino-phenyl- |
| 3.334 | —CH₂—C≡CH | —Me | 6-F | 4-biphenyl- |
| 3.335 | —CH₂—C≡CH | —Me | 6-F | 4-carboxyphenyl- |
| 3.336 | —CH₂—C≡CH | —Me | 6-F | 4-chloro-3-pyridyl- |
| 3.337 | —CH₂—C≡CH | —Me | 6-F | 4-chloro-phenyl- |
| 3.338 | —CH₂—C≡CH | —Me | 6-F | 4-cyanophenyl- |
| 3.339 | —CH₂—C≡CH | —Me | 6-F | 4-cyano-phenyl- |
| 3.340 | —CH₂—C≡CH | —Me | 6-F | 4-cyclopropylphenyl- |
| 3.341 | —CH₂—C≡CH | —Me | 6-F | 4-cyclopropyl-phenyl- |
| 3.342 | —CH₂—C≡CH | —Me | 6-F | 4-dimethylaminophenyl- |
| 3.343 | —CH₂—C≡CH | —Me | 6-F | 4-fluoro-phenyl- |
| 3.344 | —CH₂—C≡CH | —Me | 6-F | 4-hydroxyphenyl- |
| 3.345 | —CH₂—C≡CH | —Me | 6-F | 4-hydroxy-phenyl- |
| 3.346 | —CH₂—C≡CH | —Me | 6-F | 4-methoxycarbonylphenyl- |
| 3.347 | —CH₂—C≡CH | —Me | 6-F | 4-methyl-2-pyridyl- |
| 3.348 | —CH₂—C≡CH | —Me | 6-F | 4-methylaminophenyl- |
| 3.349 | —CH₂—C≡CH | —Me | 6-F | 4-methylsulfonylphenyl- |
| 3.350 | —CH₂—C≡CH | —Me | 6-F | 4-oxazol-5-ylphenyl- |
| 3.351 | —CH₂—C≡CH | —Me | 6-F | 4-pyridyl- |
| 3.352 | —CH₂—C≡CH | —Me | 6-F | 4-tert-butoxyphenyl- |
| 3.353 | —CH₂—C≡CH | —Me | 6-F | 4-tert-butylphenyl- |
| 3.354 | —CH₂—C≡CH | —Me | 6-F | 4-tolyl- |
| 3.355 | —CH₂—C≡CH | —Me | 6-F | 4-trifluoromethyl-3-pyridyl- |
| 3.356 | —CH₂—C≡CH | —Me | 6-F | 4-trifluoromethyl-phenyl- |
| 3.357 | —CH₂—C≡CH | —Me | 6-F | 5-methyl-1,3,4-oxadiazol-2-yl- |
| 3.358 | —CH₂—C≡CH | —Me | 6-F | 5-methyl-2-pyridyl- |
| 3.359 | —CH₂—C≡CH | —Me | 6-F | 5-methyl-3-pyridyl- |
| 3.360 | —CH₂—C≡CH | —Me | 6-F | 6-chloro-3-pyridyl- |
| 3.361 | —CH₂—C≡CH | —Me | 6-F | 6-methyl-2-pyridyl- |
| 3.362 | —CH₂—C≡CH | —Me | 6-F | pyrimidin-5-yl- |
| 3.363 | —CH₂—C≡CH | —Me | 6-F | thiazol-2-yl- |
| 3.364 | —CH₂—C≡CH | —Me | 6-F | thiazol-5-yl- |
| 3.365 | —CH₂—C≡CH | —Me | 6-F | thiophen-3-yl- |
| 3.366 | —CH₂—C≡CH | —Me | 6-Cl | —Ph |
| 3.367 | —CH₂—C≡CH | —Me | 6-Cl | 1-methyl-3-(trifluoromethyl)pyrazol-4-yl- |
| 3.368 | —CH₂—C≡CH | —Me | 6-Cl | 1-methyl-pyrazol-4-yl- |
| 3.369 | —CH₂—C≡CH | —Me | 6-Cl | 2-(methylsulfanyl)-4-pyridyl- |
| 3.370 | —CH₂—C≡CH | —Me | 6-Cl | 2-acetamido-4-pyridyl- |
| 3.371 | —CH₂—C≡CH | —Me | 6-Cl | 2-acetamidothiazol-5-yl- |
| 3.372 | —CH₂—C≡CH | —Me | 6-Cl | 2-amino-4-pyridyl- |
| 3.373 | —CH₂—C≡CH | —Me | 6-Cl | 2-chloro-3-pyridyl- |
| 3.374 | —CH₂—C≡CH | —Me | 6-Cl | 2-chloro-4-pyridyl- |
| 3.375 | —CH₂—C≡CH | —Me | 6-Cl | 2-chlorothiazol-5-yl- |
| 3.376 | —CH₂—C≡CH | —Me | 6-Cl | 2-cyanophenyl- |
| 3.377 | —CH₂—C≡CH | —Me | 6-Cl | 2-cyano-phenyl- |
| 3.378 | —CH₂—C≡CH | —Me | 6-Cl | 2-fluoro-4-pyridyl- |
| 3.379 | —CH₂—C≡CH | —Me | 6-Cl | 2-methyl-4-pyridyl- |
| 3.380 | —CH₂—C≡CH | —Me | 6-Cl | 2-methyl-triazol-4-yl- |
| 3.381 | —CH₂—C≡CH | —Me | 6-Cl | 2-tolyl- |
| 3.382 | —CH₂—C≡CH | —Me | 6-Cl | 2-trifluoromethyl-4-pyridyl- |
| 3.383 | —CH₂—C≡CH | —Me | 6-Cl | 2-trifluoromethyl-phenyl- |
| 3.384 | —CH₂—C≡CH | —Me | 6-Cl | 3,4-difluoro-phenyl- |
| 3.385 | —CH₂—C≡CH | —Me | 6-Cl | 3,5-difluoro-phenyl- |
| 3.386 | —CH₂—C≡CH | —Me | 6-Cl | 3-chloro-4-fluoro-phenyl- |
| 3.387 | —CH₂—C≡CH | —Me | 6-Cl | 3-chloro-4-pyridyl- |
| 3.388 | —CH₂—C≡CH | —Me | 6-Cl | 3-cyanophenyl- |
| 3.389 | —CH₂—C≡CH | —Me | 6-Cl | 3-cyano-phenyl- |
| 3.390 | —CH₂—C≡CH | —Me | 6-Cl | 3-methyl-2-pyridyl- |
| 3.391 | —CH₂—C≡CH | —Me | 6-Cl | 3-methyl-4-amino-phenyl- |
| 3.392 | —CH₂—C≡CH | —Me | 6-Cl | 3-pyridyl- |
| 3.393 | —CH₂—C≡CH | —Me | 6-Cl | 3-tolyl- |
| 3.394 | —CH₂—C≡CH | —Me | 6-Cl | 3-trifluoromethyl-3-pyridyl- |
| 3.395 | —CH₂—C≡CH | —Me | 6-Cl | 3-trifluoromethyl-phenyl- |
| 3.396 | —CH₂—C≡CH | —Me | 6-Cl | 4-(dimethylamino)-phenyl- |
| 3.397 | —CH₂—C≡CH | —Me | 6-Cl | 4-(dimethylsulfamoyl)phenyl- |
| 3.398 | —CH₂—C≡CH | —Me | 6-Cl | 4-(methylamino)-phenyl- |
| 3.399 | —CH₂—C≡CH | —Me | 6-Cl | 4-(methylsulfanyl)phenyl- |
| 3.400 | —CH₂—C≡CH | —Me | 6-Cl | 4-(tert-butoxy)-phenyl- |
| 3.401 | —CH₂—C≡CH | —Me | 6-Cl | 4-(tert-butoxycarbonylamino)-3-fluoro-phenyl- |
| 3.402 | —CH₂—C≡CH | —Me | 6-Cl | 4-(trifluoromethoxy)-phenyl- |
| 3.403 | —CH₂—C≡CH | —Me | 6-Cl | 4-[ethyl(methyl)carbamoyl]-3-fluoro-phenyl- |
| 3.404 | —CH₂—C≡CH | —Me | 6-Cl | 4-acetamidophenyl- |
| 3.405 | —CH₂—C≡CH | —Me | 6-Cl | 4-amino-3-methylphenyl- |

TABLE 3-continued

Substituent definitions of $R^1$, $R^2$, X and D:

| Compound No. | $R^1$ | $R^2$ | X | D |
|---|---|---|---|---|
| 3.406 | —CH$_2$—C≡CH | —Me | 6-Cl | 4-amino-phenyl- |
| 3.407 | —CH$_2$—C≡CH | —Me | 6-Cl | 4-biphenyl- |
| 3.408 | —CH$_2$—C≡CH | —Me | 6-Cl | 4-carboxyphenyl- |
| 3.409 | —CH$_2$—C≡CH | —Me | 6-Cl | 4-chloro-3-pyridyl- |
| 3.410 | —CH$_2$—C≡CH | —Me | 6-Cl | 4-chloro-phenyl- |
| 3.411 | —CH$_2$—C≡CH | —Me | 6-Cl | 4-cyanophenyl- |
| 3.412 | —CH$_2$—C≡CH | —Me | 6-Cl | 4-cyano-phenyl- |
| 3.413 | —CH$_2$—C≡CH | —Me | 6-Cl | 4-cyclopropylphenyl- |
| 3.414 | —CH$_2$—C≡CH | —Me | 6-Cl | 4-cyclopropyl-phenyl- |
| 3.415 | —CH$_2$—C≡CH | —Me | 6-Cl | 4-dimethylaminophenyl- |
| 3.416 | —CH$_2$—C≡CH | —Me | 6-Cl | 4-fluoro-phenyl- |
| 3.417 | —CH$_2$—C≡CH | —Me | 6-Cl | 4-hydroxyphenyl- |
| 3.418 | —CH$_2$—C≡CH | —Me | 6-Cl | 4-hydroxy-phenyl- |
| 3.419 | —CH$_2$—C≡CH | —Me | 6-Cl | 4-methoxycarbonylphenyl- |
| 3.420 | —CH$_2$—C≡CH | —Me | 6-Cl | 4-methyl-2-pyridyl- |
| 3.421 | —CH$_2$—C≡CH | —Me | 6-Cl | 4-methylaminophenyl- |
| 3.422 | —CH$_2$—C≡CH | —Me | 6-Cl | 4-methylsulfonylphenyl- |
| 3.423 | —CH$_2$—C≡CH | —Me | 6-Cl | 4-oxazol-5-ylphenyl- |
| 3.424 | —CH$_2$—C≡CH | —Me | 6-Cl | 4-pyridyl- |
| 3.425 | —CH$_2$—C≡CH | —Me | 6-Cl | 4-tert-butoxyphenyl- |
| 3.426 | —CH$_2$—C≡CH | —Me | 6-Cl | 4-tert-butylphenyl- |
| 3.427 | —CH$_2$—C≡CH | —Me | 6-Cl | 4-tolyl- |
| 3.428 | —CH$_2$—C≡CH | —Me | 6-Cl | 4-trifluoromethyl-3-pyridyl- |
| 3.429 | —CH$_2$—C≡CH | —Me | 6-Cl | 4-trifluoromethyl-phenyl- |
| 3.430 | —CH$_2$—C≡CH | —Me | 6-Cl | 5-methyl-1,3,4-oxadiazol-2-yl- |
| 3.431 | —CH$_2$—C≡CH | —Me | 6-Cl | 5-methyl-2-pyridyl- |
| 3.432 | —CH$_2$—C≡CH | —Me | 6-Cl | 5-methyl-3-pyridyl- |
| 3.433 | —CH$_2$—C≡CH | —Me | 6-Cl | 6-chloro-3-pyridyl- |
| 3.434 | —CH$_2$—C≡CH | —Me | 6-Cl | 6-methyl-2-pyridyl- |
| 3.435 | —CH$_2$—C≡CH | —Me | 6-Cl | pyrimidin-5-yl- |
| 3.436 | —CH$_2$—C≡CH | —Me | 6-Cl | thiazol-2-yl- |
| 3.437 | —CH$_2$—C≡CH | —Me | 6-Cl | thiazol-5-yl- |
| 3.438 | —CH$_2$—C≡CH | —Me | 6-Cl | thiophen-3-yl- |
| 3.439 | —CH$_2$—C≡CH | —Cl | 6-F | —Ph |
| 3.440 | —CH$_2$—C≡CH | —Cl | 6-F | 1-methyl-3-(trifluoromethyl)pyrazol-4-yl- |
| 3.441 | —CH$_2$—C≡CH | —Cl | 6-F | 1-methyl-pyrazol-4-yl- |
| 3.442 | —CH$_2$—C≡CH | —Cl | 6-F | 2-(methylsulfanyl)-4-pyridyl- |
| 3.443 | —CH$_2$—C≡CH | —Cl | 6-F | 2-acetamido-4-pyridyl- |
| 3.444 | —CH$_2$—C≡CH | —Cl | 6-F | 2-acetamidothiazol-5-yl- |
| 3.445 | —CH$_2$—C≡CH | —Cl | 6-F | 2-amino-4-pyridyl- |
| 3.446 | —CH$_2$—C≡CH | —Cl | 6-F | 2-chloro-3-pyridyl- |
| 3.447 | —CH$_2$—C≡CH | —Cl | 6-F | 2-chloro-4-pyridyl- |
| 3.448 | —CH$_2$—C≡CH | —Cl | 6-F | 2-chlorothiazol-5-yl- |
| 3.449 | —CH$_2$—C≡CH | —Cl | 6-F | 2-cyanophenyl- |
| 3.450 | —CH$_2$—C≡CH | —Cl | 6-F | 2-cyano-phenyl- |
| 3.451 | —CH$_2$—C≡CH | —Cl | 6-F | 2-fluoro-4-pyridyl- |
| 3.452 | —CH$_2$—C≡CH | —Cl | 6-F | 2-methyl-4-pyridyl- |
| 3.453 | —CH$_2$—C≡CH | —Cl | 6-F | 2-methyl-triazol-4-yl- |
| 3.454 | —CH$_2$—C≡CH | —Cl | 6-F | 2-tolyl- |
| 3.455 | —CH$_2$—C≡CH | —Cl | 6-F | 2-trifluoromethyl-4-pyridyl- |
| 3.456 | —CH$_2$—C≡CH | —Cl | 6-F | 2-trifluoromethyl-phenyl- |
| 3.457 | —CH$_2$—C≡CH | —Cl | 6-F | 3,4-difluoro-phenyl- |
| 3.458 | —CH$_2$—C≡CH | —Cl | 6-F | 3,5-difluoro-phenyl- |
| 3.459 | —CH$_2$—C≡CH | —Cl | 6-F | 3-chloro-4-fluoro-phenyl- |
| 3.460 | —CH$_2$—C≡CH | —Cl | 6-F | 3-chloro-4-pyridyl- |
| 3.461 | —CH$_2$—C≡CH | —Cl | 6-F | 3-cyanophenyl- |
| 3.462 | —CH$_2$—C≡CH | —Cl | 6-F | 3-cyano-phenyl- |
| 3.463 | —CH$_2$—C≡CH | —Cl | 6-F | 3-methyl-2-pyridyl- |
| 3.464 | —CH$_2$—C≡CH | —Cl | 6-F | 3-methyl-4-amino-phenyl- |
| 3.465 | —CH$_2$—C≡CH | —Cl | 6-F | 3-pyridyl- |
| 3.466 | —CH$_2$—C≡CH | —Cl | 6-F | 3-tolyl- |
| 3.467 | —CH$_2$—C≡CH | —Cl | 6-F | 3-trifluoromethyl-3-pyridyl- |
| 3.468 | —CH$_2$—C≡CH | —Cl | 6-F | 3-trifluoromethyl-phenyl- |
| 3.469 | —CH$_2$—C≡CH | —Cl | 6-F | 4-(dimethylamino)-phenyl- |
| 3.470 | —CH$_2$—C≡CH | —Cl | 6-F | 4-(dimethylsulfamoyl)phenyl- |
| 3.471 | —CH$_2$—C≡CH | —Cl | 6-F | 4-(methylamino)-phenyl- |
| 3.472 | —CH$_2$—C≡CH | —Cl | 6-F | 4-(methylsulfanyl)phenyl- |
| 3.473 | —CH$_2$—C≡CH | —Cl | 6-F | 4-(tert-butoxy)-phenyl- |
| 3.474 | —CH$_2$—C≡CH | —Cl | 6-F | 4-(tert-butoxycarbonylamino)-3-fluoro-phenyl- |
| 3.475 | —CH$_2$—C≡CH | —Cl | 6-F | 4-(trifluoromethoxy)-phenyl- |
| 3.476 | —CH$_2$—C≡CH | —Cl | 6-F | 4-[ethyl(methyl)carbamoyl]-3-fluoro-phenyl- |
| 3.477 | —CH$_2$—C≡CH | —Cl | 6-F | 4-acetamidophenyl- |
| 3.478 | —CH$_2$—C≡CH | —Cl | 6-F | 4-amino-3-methylphenyl- |
| 3.479 | —CH$_2$—C≡CH | —Cl | 6-F | 4-amino-phenyl- |
| 3.480 | —CH$_2$—C≡CH | —Cl | 6-F | 4-biphenyl- |
| 3.481 | —CH$_2$—C≡CH | —Cl | 6-F | 4-carboxyphenyl- |

TABLE 3-continued

Substituent definitions of R¹, R², X and D:

| Compound No. | R¹ | R² | X | D |
|---|---|---|---|---|
| 3.482 | —CH₂—C≡CH | —Cl | 6-F | 4-chloro-3-pyridyl- |
| 3.483 | —CH₂—C≡CH | —Cl | 6-F | 4-chloro-phenyl- |
| 3.484 | —CH₂—C≡CH | —Cl | 6-F | 4-cyanophenyl- |
| 3.485 | —CH₂—C≡CH | —Cl | 6-F | 4-cyano-phenyl- |
| 3.486 | —CH₂—C≡CH | —Cl | 6-F | 4-cyclopropylphenyl- |
| 3.487 | —CH₂—C≡CH | —Cl | 6-F | 4-cyclopropyl-phenyl- |
| 3.488 | —CH₂—C≡CH | —Cl | 6-F | 4-dimethylaminophenyl- |
| 3.489 | —CH₂—C≡CH | —Cl | 6-F | 4-fluoro-phenyl- |
| 3.490 | —CH₂—C≡CH | —Cl | 6-F | 4-hydroxyphenyl- |
| 3.491 | —CH₂—C≡CH | —Cl | 6-F | 4-hydroxy-phenyl- |
| 3.492 | —CH₂—C≡CH | —Cl | 6-F | 4-methoxycarbonylphenyl- |
| 3.493 | —CH₂—C≡CH | —Cl | 6-F | 4-methyl-2-pyridyl- |
| 3.494 | —CH₂—C≡CH | —Cl | 6-F | 4-methylaminophenyl- |
| 3.495 | —CH₂—C≡CH | —Cl | 6-F | 4-methylsulfonylphenyl- |
| 3.496 | —CH₂—C≡CH | —Cl | 6-F | 4-oxazol-5-ylphenyl- |
| 3.497 | —CH₂—C≡CH | —Cl | 6-F | 4-pyridyl- |
| 3.498 | —CH₂—C≡CH | —Cl | 6-F | 4-tert-butoxyphenyl- |
| 3.499 | —CH₂—C≡CH | —Cl | 6-F | 4-tert-butylphenyl- |
| 3.500 | —CH₂—C≡CH | —Cl | 6-F | 4-tolyl- |
| 3.501 | —CH₂—C≡CH | —Cl | 6-F | 4-trifluoromethyl-3-pyridyl- |
| 3.502 | —CH₂—C≡CH | —Cl | 6-F | 4-trifluoromethyl-phenyl- |
| 3.503 | —CH₂—C≡CH | —Cl | 6-F | 5-methyl-1,3,4-oxadiazol-2-yl- |
| 3.504 | —CH₂—C≡CH | —Cl | 6-F | 5-methyl-2-pyridyl- |
| 3.505 | —CH₂—C≡CH | —Cl | 6-F | 5-methyl-3-pyridyl- |
| 3.506 | —CH₂—C≡CH | —Cl | 6-F | 6-chloro-3-pyridyl- |
| 3.507 | —CH₂—C≡CH | —Cl | 6-F | 6-methyl-2-pyridyl- |
| 3.508 | —CH₂—C≡CH | —Cl | 6-F | pyrimidin-5-yl- |
| 3.509 | —CH₂—C≡CH | —Cl | 6-F | thiazol-2-yl- |
| 3.510 | —CH₂—C≡CH | —Cl | 6-F | thiazol-5-yl- |
| 3.511 | —CH₂—C≡CH | —Cl | 6-F | thiophen-3-yl- |
| 3.512 | —CH₂—C≡CH | —Cl | 6-Cl | —Ph |
| 3.513 | —CH₂—C≡CH | —Cl | 6-Cl | 1-methyl-3-(trifluoromethyl)pyrazol-4-yl- |
| 3.514 | —CH₂—C≡CH | —Cl | 6-Cl | 1-methyl-pyrazol-4-yl- |
| 3.515 | —CH₂—C≡CH | —Cl | 6-Cl | 2-(methylsulfanyl)-4-pyridyl- |
| 3.516 | —CH₂—C≡CH | —Cl | 6-Cl | 2-acetamido-4-pyridyl- |
| 3.517 | —CH₂—C≡CH | —Cl | 6-Cl | 2-acetamidothiazol-5-yl- |
| 3.518 | —CH₂—C≡CH | —Cl | 6-Cl | 2-amino-4-pyridyl- |
| 3.519 | —CH₂—C≡CH | —Cl | 6-Cl | 2-chloro-3-pyridyl- |
| 3.520 | —CH₂—C≡CH | —Cl | 6-Cl | 2-chloro-4-pyridyl- |
| 3.521 | —CH₂—C≡CH | —Cl | 6-Cl | 2-chlorothiazol-5-yl- |
| 3.522 | —CH₂—C≡CH | —Cl | 6-Cl | 2-cyanophenyl- |
| 3.523 | —CH₂—C≡CH | —Cl | 6-Cl | 2-cyano-phenyl- |
| 3.524 | —CH₂—C≡CH | —Cl | 6-Cl | 2-fluoro-4-pyridyl- |
| 3.525 | —CH₂—C≡CH | —Cl | 6-Cl | 2-methyl-4-pyridyl- |
| 3.526 | —CH₂—C≡CH | —Cl | 6-Cl | 2-methyl-triazol-4-yl- |
| 3.527 | —CH₂—C≡CH | —Cl | 6-Cl | 2-tolyl- |
| 3.528 | —CH₂—C≡CH | —Cl | 6-Cl | 2-trifluoromethyl-4-pyridyl- |
| 3.529 | —CH₂—C≡CH | —Cl | 6-Cl | 2-trifluoromethyl-phenyl- |
| 3.530 | —CH₂—C≡CH | —Cl | 6-Cl | 3,4-difluoro-phenyl- |
| 3.531 | —CH₂—C≡CH | —Cl | 6-Cl | 3,5-difluoro-phenyl- |
| 3.532 | —CH₂—C≡CH | —Cl | 6-Cl | 3-chloro-4-fluoro-phenyl- |
| 3.533 | —CH₂—C≡CH | —Cl | 6-Cl | 3-chloro-4-pyridyl- |
| 3.534 | —CH₂—C≡CH | —Cl | 6-Cl | 3-cyanophenyl- |
| 3.535 | —CH₂—C≡CH | —Cl | 6-Cl | 3-cyano-phenyl- |
| 3.536 | —CH₂—C≡CH | —Cl | 6-Cl | 3-methyl-2-pyridyl- |
| 3.537 | —CH₂—C≡CH | —Cl | 6-Cl | 3-methyl-4-amino-phenyl- |
| 3.538 | —CH₂—C≡CH | —Cl | 6-Cl | 3-pyridyl- |
| 3.539 | —CH₂—C≡CH | —Cl | 6-Cl | 3-tolyl- |
| 3.540 | —CH₂—C≡CH | —Cl | 6-Cl | 3-trifluoromethyl-3-pyridyl- |
| 3.541 | —CH₂—C≡CH | —Cl | 6-Cl | 3-trifluoromethyl-phenyl- |
| 3.542 | —CH₂—C≡CH | —Cl | 6-Cl | 4-(dimethylamino)-phenyl- |
| 3.543 | —CH₂—C≡CH | —Cl | 6-Cl | 4-(dimethylsulfamoyl)phenyl- |
| 3.544 | —CH₂—C≡CH | —Cl | 6-Cl | 4-(methylamino)-phenyl- |
| 3.545 | —CH₂—C≡CH | —Cl | 6-Cl | 4-(methylsulfanyl)phenyl- |
| 3.546 | —CH₂—C≡CH | —Cl | 6-Cl | 4-(tert-butoxy)-phenyl- |
| 3.547 | —CH₂—C≡CH | —Cl | 6-Cl | 4-(tert-butoxycarbonylamino)-3-fluoro-phenyl- |
| 3.548 | —CH₂—C≡CH | —Cl | 6-Cl | 4-(trifluoromethoxy)-phenyl- |
| 3.549 | —CH₂—C≡CH | —Cl | 6-Cl | 4-[ethyl(methyl)carbamoyl]-3-fluoro-phenyl- |
| 3.550 | —CH₂—C≡CH | —Cl | 6-Cl | 4-acetamidophenyl- |
| 3.551 | —CH₂—C≡CH | —Cl | 6-Cl | 4-amino-3-methylphenyl- |
| 3.552 | —CH₂—C≡CH | —Cl | 6-Cl | 4-amino-phenyl- |
| 3.553 | —CH₂—C≡CH | —Cl | 6-Cl | 4-biphenyl- |
| 3.554 | —CH₂—C≡CH | —Cl | 6-Cl | 4-carboxyphenyl- |
| 3.555 | —CH₂—C≡CH | —Cl | 6-Cl | 4-chloro-3-pyridyl- |
| 3.556 | —CH₂—C≡CH | —Cl | 6-Cl | 4-chloro-phenyl- |
| 3.557 | —CH₂—C≡CH | —Cl | 6-Cl | 4-cyanophenyl- |

TABLE 3-continued

Substituent definitions of $R^1$, $R^2$, X and D:

| Compound No. | $R^1$ | $R^2$ | X | D |
|---|---|---|---|---|
| 3.558 | —CH$_2$—C≡CH | —Cl | 6-Cl | 4-cyano-phenyl- |
| 3.559 | —CH$_2$—C≡CH | —Cl | 6-Cl | 4-cyclopropylphenyl- |
| 3.560 | —CH$_2$—C≡CH | —Cl | 6-Cl | 4-cyclopropyl-phenyl- |
| 3.561 | —CH$_2$—C≡CH | —Cl | 6-Cl | 4-dimethylaminophenyl- |
| 3.562 | —CH$_2$—C≡CH | —Cl | 6-Cl | 4-fluoro-phenyl- |
| 3.563 | —CH$_2$—C≡CH | —Cl | 6-Cl | 4-hydroxyphenyl- |
| 3.564 | —CH$_2$—C≡CH | —Cl | 6-Cl | 4-hydroxy-phenyl- |
| 3.565 | —CH$_2$—C≡CH | —Cl | 6-Cl | 4-methoxycarbonylphenyl- |
| 3.566 | —CH$_2$—C≡CH | —Cl | 6-Cl | 4-methyl-2-pyridyl- |
| 3.567 | —CH$_2$—C≡CH | —Cl | 6-Cl | 4-methylaminophenyl- |
| 3.568 | —CH$_2$—C≡CH | —Cl | 6-Cl | 4-methylsulfonylphenyl- |
| 3.569 | —CH$_2$—C≡CH | —Cl | 6-Cl | 4-oxazol-5-ylphenyl- |
| 3.570 | —CH$_2$—C≡CH | —Cl | 6-Cl | 4-pyridyl- |
| 3.571 | —CH$_2$—C≡CH | —Cl | 6-Cl | 4-tert-butoxyphenyl- |
| 3.572 | —CH$_2$—C≡CH | —Cl | 6-Cl | 4-tert-butylphenyl- |
| 3.573 | —CH$_2$—C≡CH | —Cl | 6-Cl | 4-tolyl- |
| 3.574 | —CH$_2$—C≡CH | —Cl | 6-Cl | 4-trifluoromethyl-3-pyridyl- |
| 3.575 | —CH$_2$—C≡CH | —Cl | 6-Cl | 4-trifluoromethyl-phenyl- |
| 3.576 | —CH$_2$—C≡CH | —Cl | 6-Cl | 5-methyl-1,3,4-oxadiazol-2-yl- |
| 3.577 | —CH$_2$—C≡CH | —Cl | 6-Cl | 5-methyl-2-pyridyl- |
| 3.578 | —CH$_2$—C≡CH | —Cl | 6-Cl | 5-methyl-3-pyridyl- |
| 3.579 | —CH$_2$—C≡CH | —Cl | 6-Cl | 6-chloro-3-pyridyl- |
| 3.580 | —CH$_2$—C≡CH | —Cl | 6-Cl | 6-methyl-2-pyridyl- |
| 3.581 | —CH$_2$—C≡CH | —Cl | 6-Cl | pyrimidin-5-yl- |
| 3.582 | —CH$_2$—C≡CH | —Cl | 6-Cl | thiazol-2-yl- |
| 3.583 | —CH$_2$—C≡CH | —Cl | 6-Cl | thiazol-5-yl- |
| 3.584 | —CH$_2$—C≡CH | —Cl | 6-Cl | thiophen-3-yl- |
| 3.585 | —Me | —Me | 6-F | 4-(1-methylpyrazol-3-yl)phenyl- |
| 3.586 | —Me | —Me | 6-F | 4-(5-methyltetrazol-1-yl)phenyl- |
| 3.587 | —Me | —Me | 6-F | 4-morpholinophenyl- |
| 3.588 | —Me | —Me | 6-F | 4-(3-methylpyrazol-1-yl)phenyl- |
| 3.589 | —Me | —Me | 6-F | 4-(3,5-dimethylpyrazol-1-yl)phenyl- |
| 3.590 | —Me | —Me | 6-F | 4-pyrazol-1-ylphenyl- |
| 3.591 | —Me | —Me | 6-F | 4-pyrrol-1-ylphenyl- |
| 3.592 | —Me | —Me | 6-F | 4-(5-methyltetrahydrofuran-2-yl)phenyl- |
| 3.593 | —Me | —Me | 6-F | 4-(5-methyl-2-furyl)phenyl- |
| 3.594 | —Me | —Me | 6-F | 4-oxazol-2-ylphenyl- |
| 3.595 | —Me | —Me | 6-F | 4-(2-methylthiazol-4-yl)phenyl- |
| 3.596 | —Me | —Me | 6-F | 4-(2-thienyl)phenyl- |
| 3.597 | —Me | —Me | 6-F | 4-(1,2,4-triazol-1-yl)phenyl- |
| 3.598 | —Me | —Me | 6-F | 1-phenyl-4-pyrazolyl- |
| 3.599 | —Me | —Me | 6-F | 1-cyclopropyl-4-pyrazolyl- |
| 3.600 | —Me | —Me | 6-F | 4-(methylsulfanylmethyl)phenyl- |
| 3.601 | —Me | —Me | 6-F | 4-(isopropylsulfanylmethyl)phenyl- |
| 3.602 | —Me | —Me | 6-F | 4-(methylsulfamoyl)phenyl- |
| 3.603 | —Me | —Me | 6-F | 4-sulfamoylphenyl- |
| 3.604 | —Me | —Me | 6-F | 4-carbamoylphenyl- |
| 3.605 | —Me | —Me | 6-Cl | 4-(1-methylpyrazol-3-yl)phenyl- |
| 3.606 | —Me | —Me | 6-Cl | 4-(5-methyltetrazol-1-yl)phenyl- |
| 3.607 | —Me | —Me | 6-Cl | 4-morpholinophenyl- |
| 3.608 | —Me | —Me | 6-Cl | 4-(3-methylpyrazol-1-yl)phenyl- |
| 3.609 | —Me | —Me | 6-Cl | 4-(3,5-dimethylpyrazol-1-yl)phenyl- |
| 3.610 | —Me | —Me | 6-Cl | 4-pyrazol-1-ylphenyl- |
| 3.611 | —Me | —Me | 6-Cl | 4-pyrrol-1-ylphenyl- |
| 3.612 | —Me | —Me | 6-Cl | 4-(5-methyltetrahydrofuran-2-yl)phenyl- |
| 3.613 | —Me | —Me | 6-Cl | 4-(5-methyl-2-furyl)phenyl- |
| 3.614 | —Me | —Me | 6-Cl | 4-oxazol-2-ylphenyl- |
| 3.615 | —Me | —Me | 6-Cl | 4-(2-methylthiazol-4-yl)phenyl- |
| 3.616 | —Me | —Me | 6-Cl | 4-(2-thienyl)phenyl- |
| 3.617 | —Me | —Me | 6-Cl | 4-(1,2,4-triazol-1-yl)phenyl- |
| 3.618 | —Me | —Me | 6-Cl | 1-phenyl-4-pyrazolyl- |
| 3.619 | —Me | —Me | 6-Cl | 1-cyclopropyl-4-pyrazolyl- |
| 3.620 | —Me | —Me | 6-Cl | 4-(methylsulfanylmethyl)phenyl- |
| 3.621 | —Me | —Me | 6-Cl | 4-(isopropylsulfanylmethyl)phenyl- |
| 3.622 | —Me | —Me | 6-Cl | 4-(methylsulfamoyl)phenyl- |
| 3.623 | —Me | —Me | 6-Cl | 4-sulfamoylphenyl- |
| 3.624 | —Me | —Me | 6-Cl | 4-carbamoylphenyl- |
| 3.625 | —Me | —Cl | 6-F | 4-(1-methylpyrazol-3-yl)phenyl- |
| 3.626 | —Me | —Cl | 6-F | 4-(5-methyltetrazol-1-yl)phenyl- |
| 3.627 | —Me | —Cl | 6-F | 4-morpholinophenyl- |
| 3.628 | —Me | —Cl | 6-F | 4-(3-methylpyrazol-1-yl)phenyl- |
| 3.629 | —Me | —Cl | 6-F | 4-(3,5-dimethylpyrazol-1-yl)phenyl- |
| 3.630 | —Me | —Cl | 6-F | 4-pyrazol-1-ylphenyl- |
| 3.631 | —Me | —Cl | 6-F | 4-pyrrol-1-ylphenyl- |
| 3.632 | —Me | —Cl | 6-F | 4-(5-methyltetrahydrofuran-2-yl)phenyl- |
| 3.633 | —Me | —Cl | 6-F | 4-(5-methyl-2-furyl)phenyl- |

TABLE 3-continued

Substituent definitions of R¹, R², X and D:

| Compound No. | R¹ | R² | X | D |
|---|---|---|---|---|
| 3.634 | —Me | —Cl | 6-F | 4-oxazol-2-ylphenyl- |
| 3.635 | —Me | —Cl | 6-F | 4-(2-methylthiazol-4-yl)phenyl- |
| 3.636 | —Me | —Cl | 6-F | 4-(2-thienyl)phenyl- |
| 3.637 | —Me | —Cl | 6-F | 4-(1,2,4-triazol-1-yl)phenyl- |
| 3.638 | —Me | —Cl | 6-F | 1-phenyl-4-pyrazolyl- |
| 3.639 | —Me | —Cl | 6-F | 1-cyclopropyl-4-pyrazolyl- |
| 3.640 | —Me | —Cl | 6-F | 4-(methylsulfanylmethyl)phenyl- |
| 3.641 | —Me | —Cl | 6-F | 4-(isopropylsulfanylmethyl)phenyl- |
| 3.642 | —Me | —Cl | 6-F | 4-(methylsulfamoyl)phenyl- |
| 3.643 | —Me | —Cl | 6-F | 4-sulfamoylphenyl- |
| 3.644 | —Me | —Cl | 6-F | 4-carbamoylphenyl- |
| 3.645 | —Me | —Cl | 6-Cl | 4-(1-methylpyrazol-3-yl)phenyl- |
| 3.646 | —Me | —Cl | 6-Cl | 4-(5-methyltetrazol-1-yl)phenyl- |
| 3.647 | —Me | —Cl | 6-Cl | 4-morpholinophenyl- |
| 3.648 | —Me | —Cl | 6-Cl | 4-(3-methylpyrazol-1-yl)phenyl- |
| 3.649 | —Me | —Cl | 6-Cl | 4-(3,5-dimethylpyrazol-1-yl)phenyl- |
| 3.650 | —Me | —Cl | 6-Cl | 4-pyrazol-1-ylphenyl- |
| 3.651 | —Me | —Cl | 6-Cl | 4-pyrrol-1-ylphenyl- |
| 3.652 | —Me | —Cl | 6-Cl | 4-(5-methyltetrahydrofuran-2-yl)phenyl- |
| 3.653 | —Me | —Cl | 6-Cl | 4-(5-methyl-2-furyl)phenyl- |
| 3.654 | —Me | —Cl | 6-Cl | 4-oxazol-2-ylphenyl- |
| 3.655 | —Me | —Cl | 6-Cl | 4-(2-methylthiazol-4-yl)phenyl- |
| 3.656 | —Me | —Cl | 6-Cl | 4-(2-thienyl)phenyl- |
| 3.657 | —Me | —Cl | 6-Cl | 4-(1,2,4-triazol-1-yl)phenyl- |
| 3.658 | —Me | —Cl | 6-Cl | 1-phenyl-4-pyrazolyl- |
| 3.659 | —Me | —Cl | 6-Cl | 1-cyclopropyl-4-pyrazolyl- |
| 3.660 | —Me | —Cl | 6-Cl | 4-(methylsulfanylmethyl)phenyl- |
| 3.661 | —Me | —Cl | 6-Cl | 4-(isopropylsulfanylmethyl)phenyl- |
| 3.662 | —Me | —Cl | 6-Cl | 4-(methylsulfamoyl)phenyl- |
| 3.663 | —Me | —Cl | 6-Cl | 4-sulfamoylphenyl- |
| 3.664 | —Me | —Cl | 6-Cl | 4-carbamoylphenyl- |
| 3.665 | —CH₂—C≡CH | —Me | 6-F | 4-(1-methylpyrazol-3-yl)phenyl- |
| 3.666 | —CH₂—C≡CH | —Me | 6-F | 4-(5-methyltetrazol-1-yl)phenyl- |
| 3.667 | —CH₂—C≡CH | —Me | 6-F | 4-morpholinophenyl- |
| 3.668 | —CH₂—C≡CH | —Me | 6-F | 4-(3-methylpyrazol-1-yl)phenyl- |
| 3.669 | —CH₂—C≡CH | —Me | 6-F | 4-(3,5-dimethylpyrazol-1-yl)phenyl- |
| 3.670 | —CH₂—C≡CH | —Me | 6-F | 4-pyrazol-1-ylphenyl- |
| 3.671 | —CH₂—C≡CH | —Me | 6-F | 4-pyrrol-1-ylphenyl- |
| 3.672 | —CH₂—C≡CH | —Me | 6-F | 4-(5-methyltetrahydrofuran-2-yl)phenyl- |
| 3.673 | —CH₂—C≡CH | —Me | 6-F | 4-(5-methyl-2-furyl)phenyl- |
| 3.674 | —CH₂—C≡CH | —Me | 6-F | 4-oxazol-2-ylphenyl- |
| 3.675 | —CH₂—C≡CH | —Me | 6-F | 4-(2-methylthiazol-4-yl)phenyl- |
| 3.676 | —CH₂—C≡CH | —Me | 6-F | 4-(2-thienyl)phenyl- |
| 3.677 | —CH₂—C≡CH | —Me | 6-F | 4-(1,2,4-triazol-1-yl)phenyl- |
| 3.678 | —CH₂—C≡CH | —Me | 6-F | 1-phenyl-4-pyrazolyl- |
| 3.679 | —CH₂—C≡CH | —Me | 6-F | 1-cyclopropyl-4-pyrazolyl- |
| 3.680 | —CH₂—C≡CH | —Me | 6-F | 4-(methylsulfanylmethyl)phenyl- |
| 3.681 | —CH₂—C≡CH | —Me | 6-F | 4-(isopropylsulfanylmethyl)phenyl- |
| 3.682 | —CH₂—C≡CH | —Me | 6-F | 4-(methylsulfamoyl)phenyl- |
| 3.683 | —CH₂—C≡CH | —Me | 6-F | 4-sulfamoylphenyl- |
| 3.684 | —CH₂—C≡CH | —Me | 6-F | 4-carbamoylphenyl- |
| 3.685 | —CH₂—C≡CH | —Me | 6-Cl | 4-(1-methylpyrazol-3-yl)phenyl- |
| 3.686 | —CH₂—C≡CH | —Me | 6-Cl | 4-(5-methyltetrazol-1-yl)phenyl- |
| 3.687 | —CH₂—C≡CH | —Me | 6-Cl | 4-morpholinophenyl- |
| 3.688 | —CH₂—C≡CH | —Me | 6-Cl | 4-(3-methylpyrazol-1-yl)phenyl- |
| 3.689 | —CH₂—C≡CH | —Me | 6-Cl | 4-(3,5-dimethylpyrazol-1-yl)phenyl- |
| 3.690 | —CH₂—C≡CH | —Me | 6-Cl | 4-pyrazol-1-ylphenyl- |
| 3.691 | —CH₂—C≡CH | —Me | 6-Cl | 4-pyrrol-1-ylphenyl- |
| 3.692 | —CH₂—C≡CH | —Me | 6-Cl | 4-(5-methyltetrahydrofuran-2-yl)phenyl- |
| 3.693 | —CH₂—C≡CH | —Me | 6-Cl | 4-(5-methyl-2-furyl)phenyl- |
| 3.694 | —CH₂—C≡CH | —Me | 6-Cl | 4-oxazol-2-ylphenyl- |
| 3.695 | —CH₂—C≡CH | —Me | 6-Cl | 4-(2-methylthiazol-4-yl)phenyl- |
| 3.696 | —CH₂—C≡CH | —Me | 6-Cl | 4-(2-thienyl)phenyl- |
| 3.697 | —CH₂—C≡CH | —Me | 6-Cl | 4-(1,2,4-triazol-1-yl)phenyl- |
| 3.698 | —CH₂—C≡CH | —Me | 6-Cl | 1-phenyl-4-pyrazolyl- |
| 3.699 | —CH₂—C≡CH | —Me | 6-Cl | 1-cyclopropyl-4-pyrazolyl- |
| 3.700 | —CH₂—C≡CH | —Me | 6-Cl | 4-(methylsulfanylmethyl)phenyl- |
| 3.701 | —CH₂—C≡CH | —Me | 6-Cl | 4-(isopropylsulfanylmethyl)phenyl- |
| 3.702 | —CH₂—C≡CH | —Me | 6-Cl | 4-(methylsulfamoyl)phenyl- |
| 3.703 | —CH₂—C≡CH | —Me | 6-Cl | 4-sulfamoylphenyl- |
| 3.704 | —CH₂—C≡CH | —Me | 6-Cl | 4-carbamoylphenyl- |
| 3.705 | —CH₂—C≡CH | —Cl | 6-F | 4-(1-methylpyrazol-3-yl)phenyl- |
| 3.706 | —CH₂—C≡CH | —Cl | 6-F | 4-(5-methyltetrazol-1-yl)phenyl- |
| 3.707 | —CH₂—C≡CH | —Cl | 6-F | 4-morpholinophenyl- |
| 3.708 | —CH₂—C≡CH | —Cl | 6-F | 4-(3-methylpyrazol-1-yl)phenyl- |
| 3.709 | —CH₂—C≡CH | —Cl | 6-F | 4-(3,5-dimethylpyrazol-1-yl)phenyl- |

TABLE 3-continued

Substituent definitions of $R^1$, $R^2$, X and D:

| Compound No. | $R^1$ | $R^2$ | X | D |
|---|---|---|---|---|
| 3.710 | —CH$_2$—C≡CH | —Cl | 6-F | 4-pyrazol-1-ylphenyl- |
| 3.711 | —CH$_2$—C≡CH | —Cl | 6-F | 4-pyrrol-1-ylphenyl- |
| 3.712 | —CH$_2$—C≡CH | —Cl | 6-F | 4-(5-methyltetrahydrofuran-2-yl)phenyl- |
| 3.713 | —CH$_2$—C≡CH | —Cl | 6-F | 4-(5-methyl-2-furyl)phenyl- |
| 3.714 | —CH$_2$—C≡CH | —Cl | 6-F | 4-oxazol-2-ylphenyl- |
| 3.715 | —CH$_2$—C≡CH | —Cl | 6-F | 4-(2-methylthiazol-4-yl)phenyl- |
| 3.716 | —CH$_2$—C≡CH | —Cl | 6-F | 4-(2-thienyl)phenyl- |
| 3.717 | —CH$_2$—C≡CH | —Cl | 6-F | 4-(1,2,4-triazol-1-yl)phenyl- |
| 3.718 | —CH$_2$—C≡CH | —Cl | 6-F | 1-phenyl-4-pyrazolyl- |
| 3.719 | —CH$_2$—C≡CH | —Cl | 6-F | 1-cyclopropyl-4-pyrazolyl- |
| 3.720 | —CH$_2$—C≡CH | —Cl | 6-F | 4-(methylsulfanylmethyl)phenyl- |
| 3.721 | —CH$_2$—C≡CH | —Cl | 6-F | 4-(isopropylsulfanylmethyl)phenyl- |
| 3.722 | —CH$_2$—C≡CH | —Cl | 6-F | 4-(methylsulfamoyl)phenyl- |
| 3.723 | —CH$_2$—C≡CH | —Cl | 6-F | 4-sulfamoylphenyl- |
| 3.724 | —CH$_2$—C≡CH | —Cl | 6-F | 4-carbamoylphenyl- |
| 3.725 | —CH$_2$—C≡CH | —Cl | 6-Cl | 4-(1-methylpyrazol-3-yl)phenyl- |
| 3.726 | —CH$_2$—C≡CH | —Cl | 6-Cl | 4-(5-methyltetrazol-1-yl)phenyl- |
| 3.727 | —CH$_2$—C≡CH | —Cl | 6-Cl | 4-morpholinophenyl- |
| 3.728 | —CH$_2$—C≡CH | —Cl | 6-Cl | 4-(3-methylpyrazol-1-yl)phenyl- |
| 3.729 | —CH$_2$—C≡CH | —Cl | 6-Cl | 4-(3,5-dimethylpyrazol-1-yl)phenyl- |
| 3.730 | —CH$_2$—C≡CH | —Cl | 6-Cl | 4-pyrazol-1-ylphenyl- |
| 3.731 | —CH$_2$—C≡CH | —Cl | 6-Cl | 4-pyrrol-1-ylphenyl- |
| 3.732 | —CH$_2$—C≡CH | —Cl | 6-Cl | 4-(5-methyltetrahydrofuran-2-yl)phenyl- |
| 3.733 | —CH$_2$—C≡CH | —Cl | 6-Cl | 4-(5-methyl-2-furyl)phenyl- |
| 3.734 | —CH$_2$—C≡CH | —Cl | 6-Cl | 4-oxazol-2-ylphenyl- |
| 3.735 | —CH$_2$—C≡CH | —Cl | 6-Cl | 4-(2-methylthiazol-4-yl)phenyl- |
| 3.736 | —CH$_2$—C≡CH | —Cl | 6-Cl | 4-(2-thienyl)phenyl- |
| 3.737 | —CH$_2$—C≡CH | —Cl | 6-Cl | 4-(1,2,4-triazol-1-yl)phenyl- |
| 3.738 | —CH$_2$—C≡CH | —Cl | 6-Cl | 1-phenyl-4-pyrazolyl- |
| 3.739 | —CH$_2$—C≡CH | —Cl | 6-Cl | 1-cyclopropyl-4-pyrazolyl- |
| 3.740 | —CH$_2$—C≡CH | —Cl | 6-Cl | 4-(methylsulfanylmethyl)phenyl- |
| 3.741 | —CH$_2$—C≡CH | —Cl | 6-Cl | 4-(isopropylsulfanylmethyl)phenyl- |
| 3.742 | —CH$_2$—C≡CH | —Cl | 6-Cl | 4-(methylsulfamoyl)phenyl- |
| 3.743 | —CH$_2$—C≡CH | —Cl | 6-Cl | 4-sulfamoylphenyl- |
| 3.744 | —CH$_2$—C≡CH | —Cl | 6-Cl | 4-carbamoylphenyl- |

Table C-2 provides 744 compounds C-2.001 to C-2.744 of formula (I) wherein G is —H, W is (E) —CH═CH—, Y is 3-cyclopropyl, and $R^1$, $R^2$, X, Y, and D are as defined for compound Nos 3.001 to 3.744 respectively in Table 3 above.

Table C-3 provides 744 compounds C-3.001 to C-3.744 of formula (I) wherein G is —(C═O)iPr, W is —CH$_2$—CH$_2$—, Y is 3-cyclopropyl, and $R^1$, $R^2$, X, and D are as defined for compound Nos 3.001 to 3.744 respectively in Table 3 above.

Table C-4 provides 744 compounds C-4.001 to C-4.744 of formula (I) wherein G is —(C═O)iPr, W is (E) —CH═CH— Y is 3-cyclopropyl, and $R^1$, $R^2$, X, and D are as defined for compound Nos 3.001 to 3.744 respectively in Table 3 above.

The compounds of the present invention may be prepared according to the following schemes, in which the substituents $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, W, D, Dp, G, X, Y, and m have (unless otherwise stated explicitly) the definitions described hereinbefore.

Certain compounds (I-ii) of the present invention may be prepared from compounds (2) as shown in Reaction scheme 1. Compounds (I-ii) are compounds of formula (I) in which W is —CH$_2$—CH$_2$—.

Reaction scheme 1

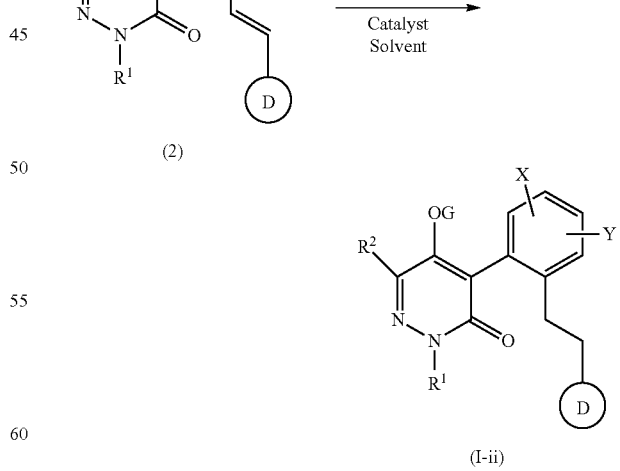

Compounds (I-ii) may be prepared by catalytic hydrogenation of compounds (2) with hydrogen gas in a suitable solvent [such as tetrahydrofuran, methanol, ethanol, acetic acid or ethyl acetate] in the presence of a suitable catalyst

[such as Pd/C, Pd/CaCO$_3$, Rh/Al$_2$CO$_3$ or sponge nickel] at a temperature between −10 and 100° C.

Alternatively, compounds (I-ii) may also be prepared by catalytic transfer-hydrogenation of compounds (2) by treatment with a suitable hydrogen source in a suitable solvent in the presence of a suitable catalyst at a temperature between −10 and 100° C. Examples of suitable systems are tetrahydroxydiboron in dichloromethane/water or dichloromethane/methanol mixtures in the presence of Pd/C, Pd(OAc)$_2$ or Pd(OH)$_2$/C (*J. Am. Chem. Soc.*, 2016, 138, 6107-6110) or, diethyl 1,4-dihydro-2,6-dimethyl-3,5-pyridinedicarboxylate in ethanol in the presence of Pd/C (*Tetrahedron Letters*, 2009, 50, 1026).

Compounds (2) may be prepared from compounds (3) and compounds (4) as shown in Reaction scheme 2, according to either the Suzuki Protocol or the Heck Protocol described below. When employing the Suzuki Protocol, compounds (4) are organoboron compounds such as boronic acids, boronic esters or trifluoroborate potassium salts. When employing the Heck Protocol, compounds (4) are styrenes.

Alternatively, compounds (I-ii) may also be prepared by reduction with diimide generated in-situ from a suitable pre-cursor in a suitable solvent at a temperature between −10 and 200° C. Examples of suitable reagents for generation of diimide include substituted arylsulfonyl hydrazides such as 2,4,6-triisopropylbenzenesulfonyl hydrazide, optionally in the presence of a suitable base. Examples of suitable bases include triethylamine, diisopropylethylamine, potassium carbonate and sodium carbonate. Suitable solvents include tetrahydrofuran, 1,4-dioxane, ethyl acetate, acetonitrile and dimethylformamide.

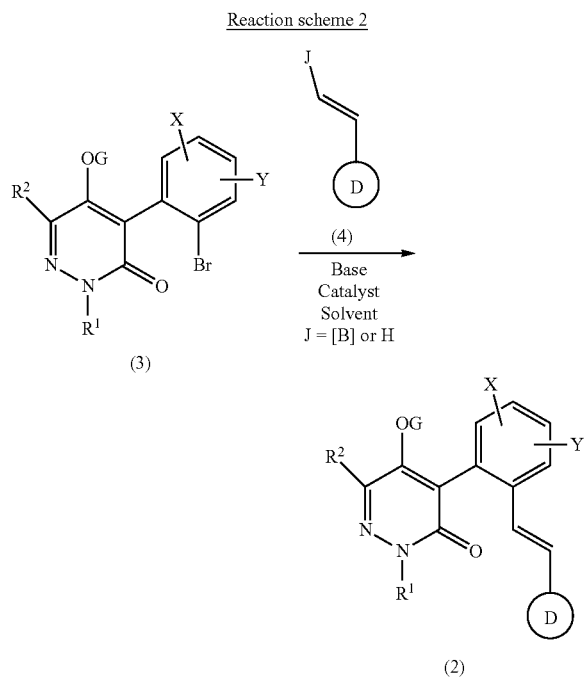

Reaction scheme 2

(3)

(4)

(2)

Suzuki Protocol

Compounds (2) may be prepared by treatment of compounds (3) with compounds (4) in the presence of a suitable base and a suitable catalyst in a suitable solvent at a temperature between 10 and 150° C. Examples of suitable bases include potassium carbonate, potassium phosphate, sodium carbonate, sodium bicarbonate and potassium fluoride. Examples of suitable catalysts include 1,1'-bis(diphenylphosphino)ferrocene]dichloropalladium(II) dichloromethane complex [PdCl$_2$(dppf).DCM], tetrakis(triphenylphosphine)palladium(0) [Pd(PPh$_3$)$_4$], and a catalytic system formed in-situ from a mixture of palladium(II)acetate and triphenylphosphine. Examples of suitable solvents include water, 1,4-dioxane, tetrahydrofuran, acetonitrile and toluene. Many compounds (4) are commercially available [for example, trans-2-(4-biphenyl)vinylboronic acid] or can be made by known methods. Examples of compounds (3) with particular utility in the Suzuki Protocol are isobutyryl esters (3-i) wherein G is isobutyryl.

The skilled man will appreciate that the conditions of the Suzuki Protocol are liable to cleave ester groups, so that Reaction scheme 2 may also describe a reaction wherein starting material (3) contains an ester moiety [such that G is an acyl group], but product (2) does not [such that G is hydrogen].

Heck Protocol

Compounds (2) may be prepared by treatment of compounds (3) with compounds (4) in the presence of a suitable base and a suitable catalyst at a temperature between 10 and 150° C. An additional solvent may optionally be included. Examples of suitable bases include triethylamine, morpholine, N-methylmorpholine, diisopropylethylamine and pyridine. Examples of suitable catalysts include tetrakis(triphenylphosphine)palladium(0) [Pd(PPh$_3$)$_4$], a catalytic system formed in-situ from a mixture of palladium(II)acetate and triphenylphosphine, a catalytic system formed in-situ from a mixture of tris(dibenzylideneacetone)dipalladium(0) and tri-tertbutylphosphonium tetrafluoroborate and a catalytic system formed in-situ from a palladacycle pre-catalyst such as chloro[(tri-tert-butylphosphine)-2-(2-aminobiphenyl)] palladium(II). Examples of the optional additional solvent include 1,4-dioxane, tetrahydrofuran, acetonitrile and toluene. Many compounds (4) are commercially available [such as 4-cyanostyrene] or can be made by known methods. Examples of compounds (3) with particular utility in the Heck Protocol are isobutyryl esters (3-i) wherein G is isobutyryl.

Compounds (3-i) may be prepared from compounds (5) as shown in Reaction scheme 3.

Reaction scheme 3

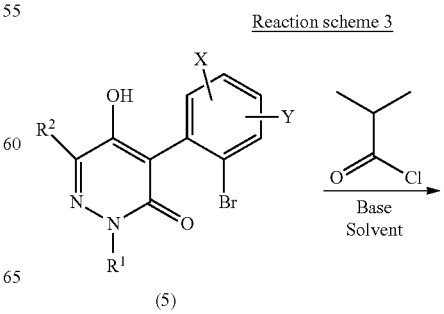

(5)

Reaction scheme 4

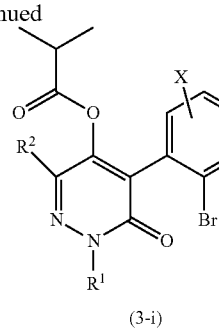

(3-i)

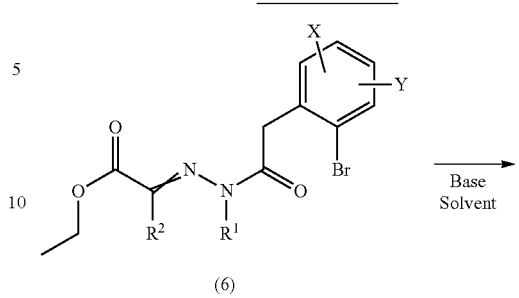

(6)

Compounds (3-i) may be prepared by treatment of compounds (5) with isobutyryl chloride in a suitable solvent [such as dichloromethane, acetonitrile or toluene] in the presence of a suitable base [such as triethylamine, diisopropylethylamine or pyridine] at a temperature between −10 and 60° C. A catalyst [such as 4-(dimethylamino)pyridine] may optionally be included.

Compounds (5) may be prepared from compounds (6) as shown in Reaction scheme 4, by heating compounds (6) with a base (such as 1,8-diazabicyclo[5.4.0]undec-7-ene, sodium hexamethyldisilazide or lithium hexamethyldisilazide) in a solvent [such as acetonitrile, N,N-dimethylformamide or toluene] at a temperature between 50 and 200° C. Conventional heating or microwave heating may be used.

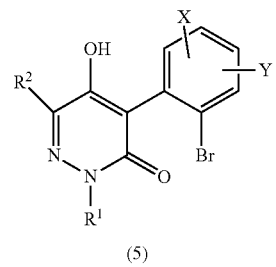

(5)

Compounds (6) may be prepared from phenylacetic acids (7) as shown in Reaction scheme 5.

Reaction scheme 5

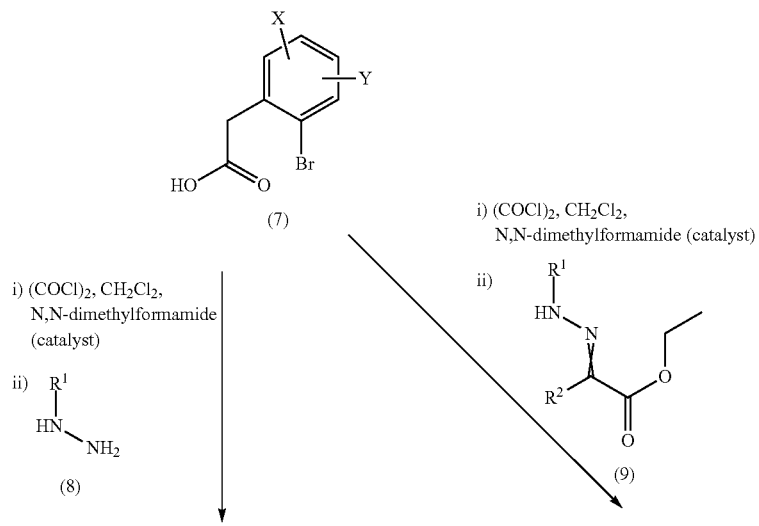

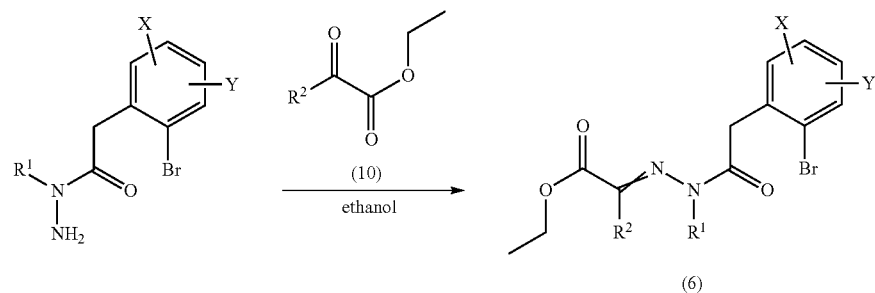

With respect to Reaction scheme 5, an example of a hydrazine (8) is methylhydrazine, and an example of ketoesters (10) is ethyl pyruvate. An example of a hydrazone (9) is ethyl(2E/Z)-2-(methylhydrazono)propanoate, prepared according to methods described in PCT patent application WO2016/008816. An example of a phenylacetic acid (7) is (2-bromo-6-fluoro-phenyl)acetic acid, which may be synthesised according to Reaction scheme 10. A further example of a phenylacetic acid (7) is (2-bromo-3-chloro-6-fluoro-phenyl)acetic acid, which may be synthesised according to Reaction scheme 11.

Certain compounds (1-iii) of the present invention may be prepared from compounds (11) as shown in Reaction scheme 6 or from compounds (1-iv) as shown in Reaction scheme 12. Compounds (I-iii) are compounds of formula (I) in which W is —CH$_2$—CH$_2$— and G is hydrogen.

Reaction scheme 6

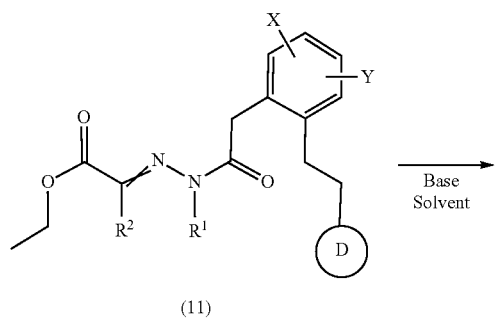

(11)

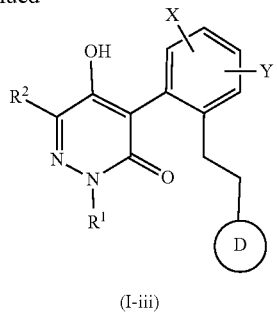

(I-iii)

Compounds (I-iii) may be prepared by heating compounds (11) with a base (such as 1,8-diazabicyclo[5.4.0]undec-7-ene, sodium hexamethyldisilazide or lithium hexamethyldisilazide) in a solvent [such as acetonitrile, N,N-dimethylformamide or toluene] at a temperature between 50 and 200° C. Conventional heating or microwave heating may be used.

Compounds (11) may be prepared from compounds (12) as shown in Reaction scheme 7 below.

Reaction scheme 7

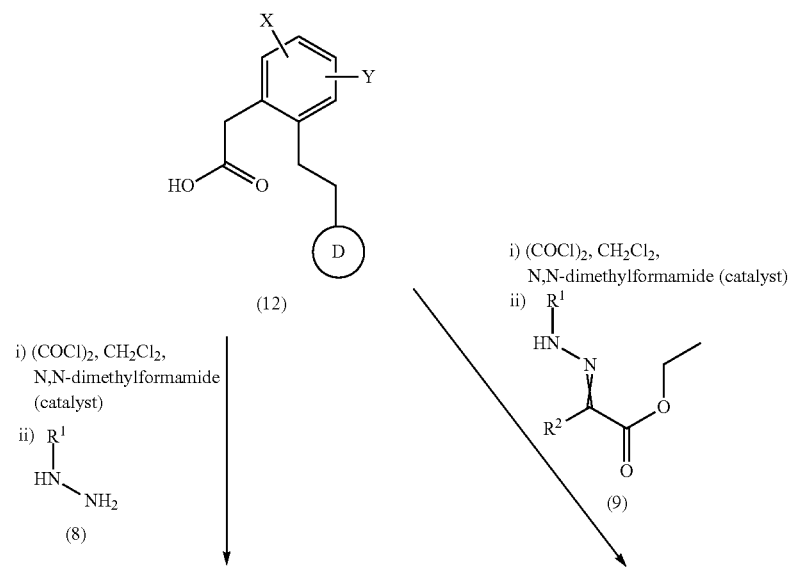

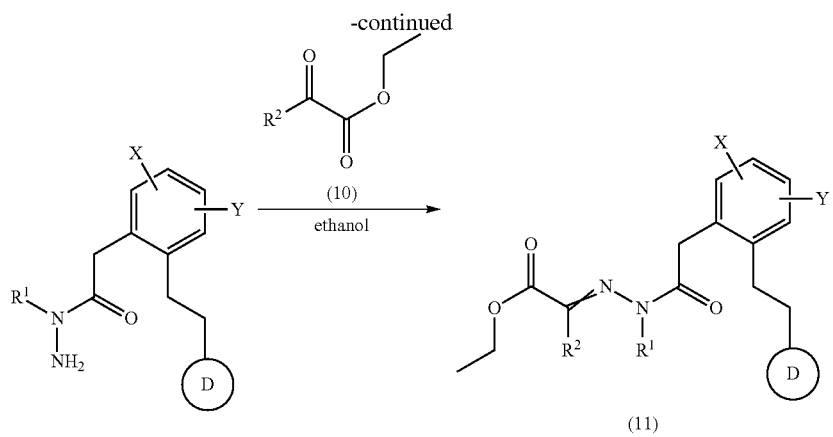
Compounds (12) can be prepared from compounds (13) as shown in Reaction scheme 8. Many compounds (13) are commercially available [such as methyl 2-phenylacetate and methyl 2-(2-fluorophenyl)acetate].
With respect to Reaction scheme 8, phosphoranes (15) can be made according to Reaction scheme 9.
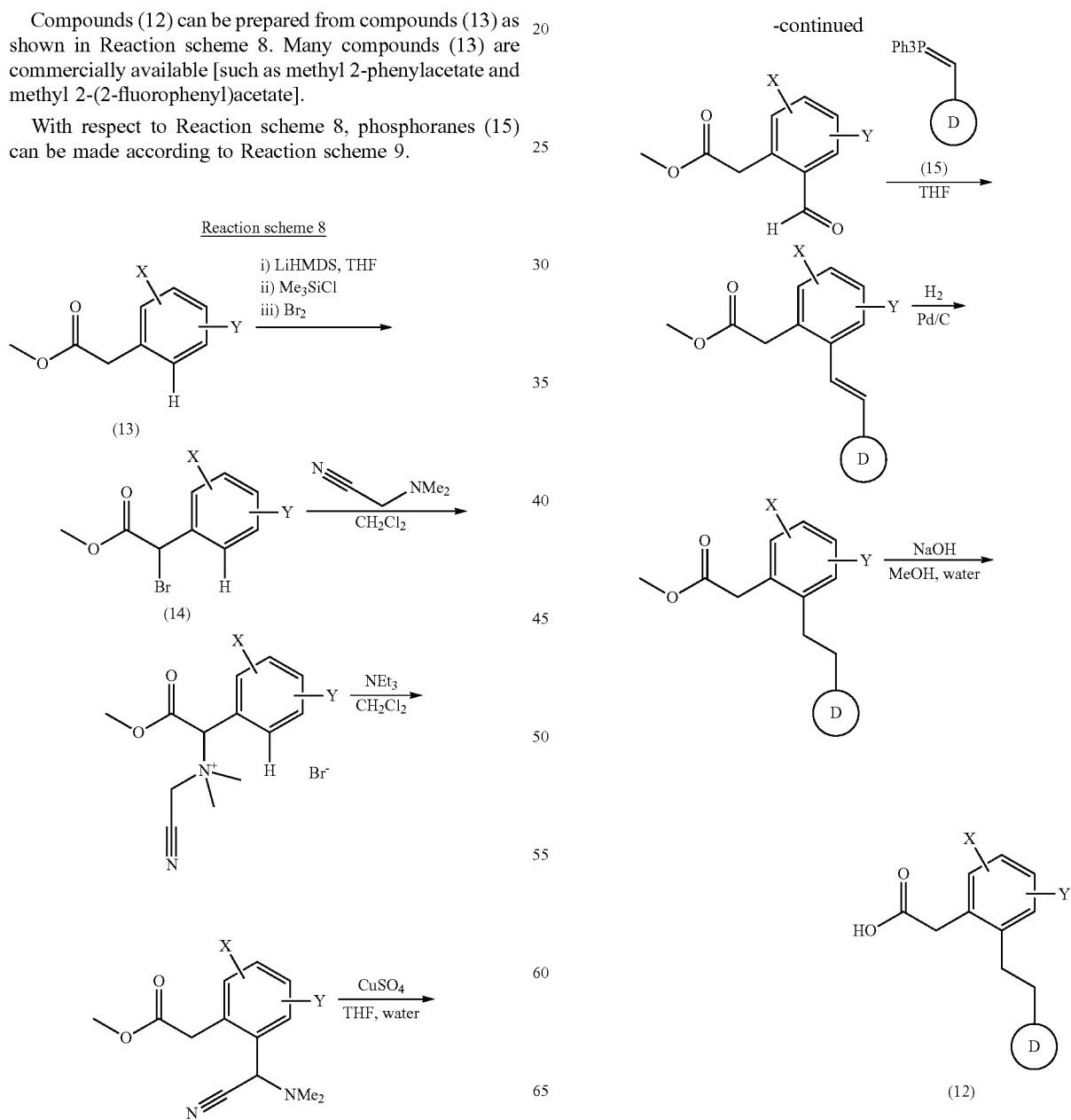

Reaction scheme 9

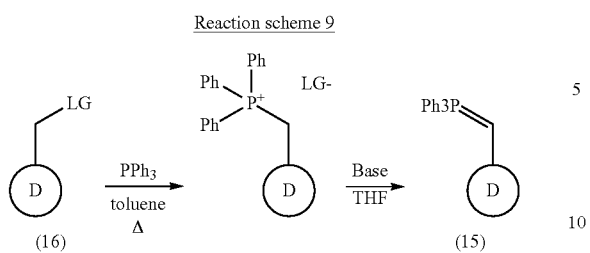

With respect to Reaction scheme 9, examples of suitable bases are sodium hydride, sodium hexamethyldisilazide and potassium tert-butoxide. Compounds (16) are electrophiles wherein LG is a Leaving Group [such as chloride, bromide, iodide, tosylate or mesylate]. Many compounds (16) are commercially available [such as 4-chlorobenzyl bromide or 2-chloro-5-chloromethylthiazole].

Reaction scheme 10

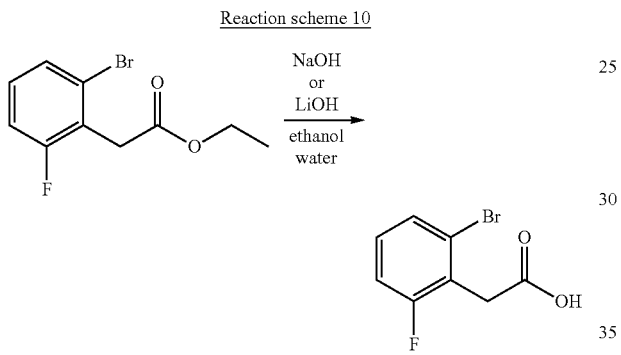

With respect to Reaction scheme 10, (2-Bromo-6-fluorophenyl)acetic acid ethyl ester may be prepared as described in Lundgren et al. *JACS* 2016, 138, 13826-13829.

Reaction scheme 11

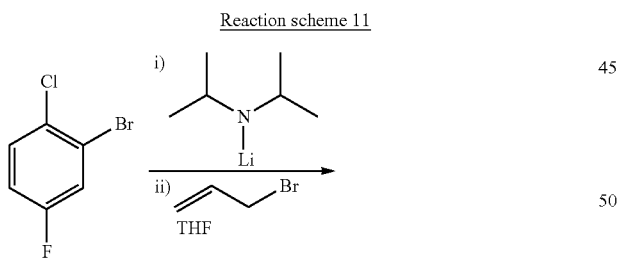

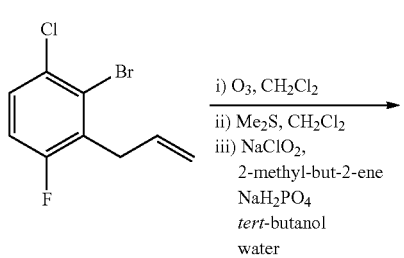

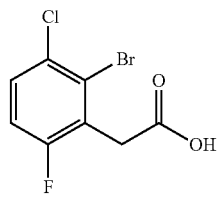

With respect to Reaction scheme 11, 2-Bromo-1-chloro-4-fluoro-benzene is commercially available.

Reaction scheme 12

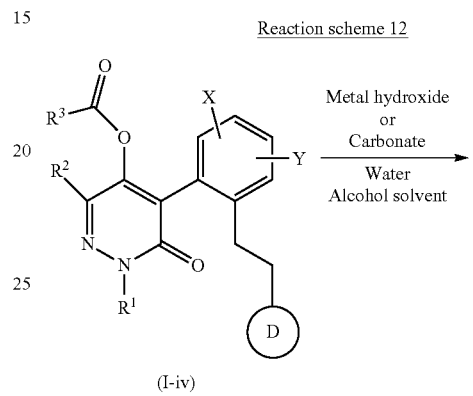

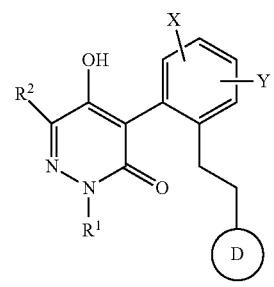

Compounds (I-iii) may be prepared by treating compounds (I-iv) with a metal hydroxide [such as sodium hydroxide, lithium hydroxide or potassium hydroxide] in a mixture of water and a suitable solvent [such as methanol, ethanol or tetrahydrofuran]; or by treating compounds (I-iv) with a metal carbonate [such as sodium carbonate or potassium carbonate] in an alcohol solvent [such as methanol or ethanol] at a temperature between 0° C. and 100° C. Compounds (I-iv) are compounds of formula (I) in which W is —CH$_2$—CH$_2$— and G is C(O)R$^3$.

Compounds (2) may be prepared from compounds (14) and compounds (15) as shown in Reaction scheme 13, according to either the Suzuki Protocol or the Heck Protocol described below. When employing the Suzuki Protocol, compounds (14) are organoboron compounds such as boronic acids, boronic esters or trifluoroborate potassium salts and compounds (15) are halide or pseudo-halide compounds such as chlorides, bromides, iodides or triflates. When employing the Heck Protocol, compounds (14) are styrenes and compounds (15) are halide or pseudo-halide compounds such as chlorides, bromides, iodides or triflates.

Reaction scheme 13

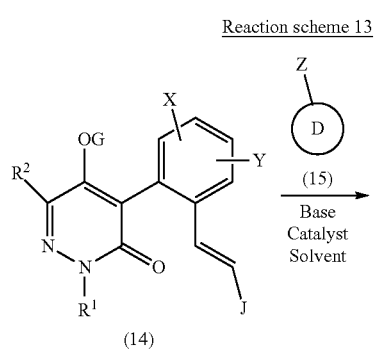

(14)

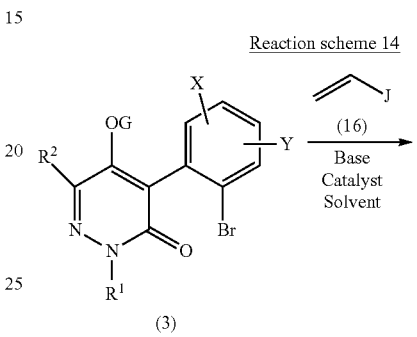

(2)

J = [B] or H
Z = halide or psueudo-halide

Suzuki Protocol

Compounds (2) may be prepared by treatment of compounds (14) with compounds (15) in the presence of a suitable base and a suitable catalyst in a suitable solvent at a temperature between 10 and 150° C. Examples of suitable bases include potassium carbonate, potassium phosphate, sodium carbonate, sodium bicarbonate and potassium fluoride. Examples of suitable catalysts include 1,1'-bis(diphenylphosphino)ferrocene]dichloropalladium(II) dichloromethane complex [PdCl$_2$(dppf).DCM], tetrakis(triphenylphosphine)palladium(0) [Pd(PPh$_3$)$_4$], and a catalytic system formed in-situ from a mixture of palladium (II)acetate and triphenylphosphine. Examples of suitable solvents include water 1,4-dioxane, tetrahydrofuran, acetonitrile and toluene. Many compounds (15) are commercially available or can be made by known methods. Examples of compounds (14) with particular utility in the Suzuki Protocol are isobutyryl esters (14-i) wherein G is isobutyryl.

The skilled man will appreciate that the conditions of the Suzuki Protocol are liable to cleave ester groups, so that Reaction scheme 13 may also describe a reaction wherein starting material (14) contains an ester moiety [such that G is an acyl group], but product (2) does not [such that G is hydrogen].

Heck Protocol

Compounds (2) may be prepared by treatment of compounds (14) with compounds (15) in the presence of a suitable base and a suitable catalyst at a temperature between 10 and 150° C. An additional solvent may optionally be included. Examples of suitable bases include triethylamine, morpholine, N-methylmorpholine, diisopropylethylamine and pyridine. Examples of suitable catalysts include tetrakis(triphenylphosphine)palladium(0) [Pd(PPh$_3$)$_4$], a catalytic system formed in-situ from a mixture of palladium (II)acetate and triphenylphosphine, a catalytic system formed in-situ from a mixture of tris(dibenzylideneacetone)dipalladium(0) and tri-tertbutylphosphonium tetrafluoroborate and a catalytic system formed in-situ from a palladacycle pre-catalyst such as chloro[(tri-tert-butylphosphine)-2-(2-aminobiphenyl)] palladium(II). Examples of the optional additional solvent include 1,4-dioxane, tetrahydrofuran, acetonitrile and toluene. Many compounds (15) are commercially available or can be made by known methods. Examples of compounds (14) with particular utility in the Heck Protocol are isobutyryl esters (14-i) wherein G is isobutyryl.

Compounds (14-ii), wherein J is an organoboron species such as a boronic ester, may be prepared from compounds (3) and compounds (16) as shown in Reaction scheme 14.

Reaction scheme 14

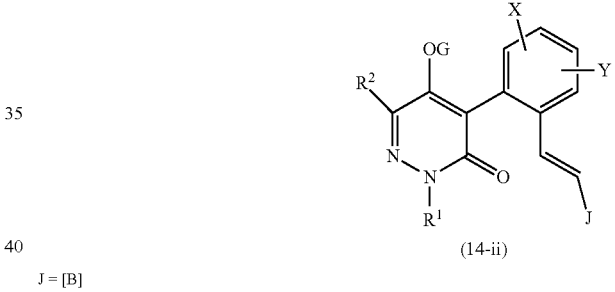

(3)

(14-ii)

J = [B]

Compounds (14-ii) may be prepared by treatment of compounds (3) with compounds (16) in the presence of a suitable base and a suitable catalyst at a temperature between 10 and 150° C. An additional solvent may optionally be included. Examples of suitable bases include triethylamine, morpholine, N-methylmorpholine, diisopropylethylamine and pyridine. Examples of suitable catalysts are tetrakis(triphenylphosphine)palladium(0) [Pd(PPh$_3$)$_4$], a catalytic system formed in-situ from a mixture of palladium (II)acetate and triphenylphosphine, and a catalytic system formed in-situ from a mixture of tris(dibenzylideneacetone) dipalladium(0) and tri-tertbutylphosphonium tetrafluoroborate. Examples of the optional additional solvent include 1,4-dioxane, tetrahydrofuran, acetonitrile and toluene. Many compounds (16) are commercially available, such as vinylboronic acid MIDA ester or vinylboronic acid pinacol ester, or can be made by known methods. Examples of compounds (3) with particular utility in the Heck Protocol are isobutyryl esters (3-i) wherein G is isobutyryl.

Compounds (14-iii), wherein J is hydrogen, may be prepared from compounds (3) as shown in Reaction scheme 15.

Reaction scheme 15

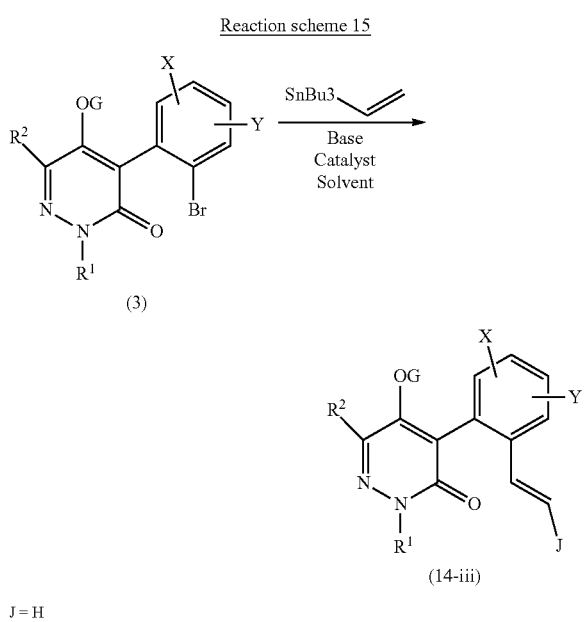

J = H

Compounds (14-iii) may be prepared by treatment of compounds (3) with tributyl(vinyl)stannane, optionally in the presence of a suitable base, in the presence of a suitable catalyst at a temperature between 10 and 150° C. in a suitable solvent. Examples of the optional base include triethylamine, morpholine, N-methylmorpholine, diisopropylethylamine and pyridine. Examples of suitable catalysts include 1,1'-bis(diphenylphosphino)-ferrocene]dichloropalladium(II) dichloromethane complex [$PdCl_2$(dppf).DCM], tetrakis-(triphenylphosphine)palladium(0) [$Pd(PPh_3)_4$], a catalytic system formed in-situ from a mixture of palladium (II)acetate and triphenylphosphine, a catalytic system formed in-situ from a mixture of tris(dibenzylideneacetone)dipalladium(0) and tri-tertbutylphosphonium tetrafluoroborate, and a catalytic system formed in-situ from a palladacycle pre-catalyst such as chloro[(tri-tert-butylphosphine)-2-(2-aminobiphenyl)] palladium(II). Examples of suitable solvents include 1,4-dioxane, tetrahydrofuran, acetonitrile and toluene. Examples of compounds (3) with particular utility are isobutyryl esters (3-i) wherein G is isobutyryl.

Compounds (18) may be prepared from compounds (3) through a Sonogashira reaction as shown in Reaction scheme 16.

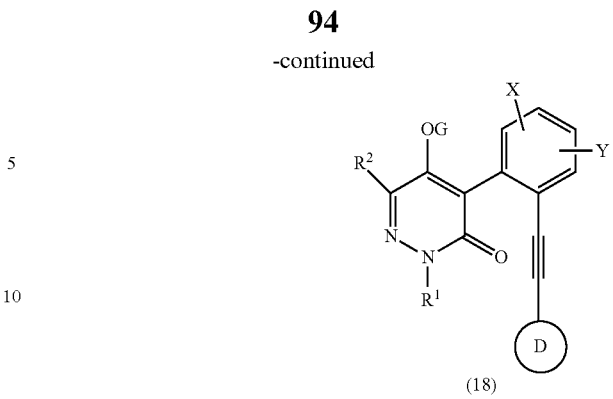

Compounds (18) may be prepared by treatment of compounds (3) with compounds (17) in the presence of a suitable base and suitable catalyst(s) at a temperature between 10 and 150° C. Optionally an additional solvent may be added. Examples of suitable bases include triethylamine, morpholine, N-methylmorpholine, diiisopropylamine, diisopropylethylamine and pyridine. Examples of suitable catalysts include bis(triphenylphosphine)palladium(II) dichloride [Pd($PPh_3$)$Cl_2$], a catalytic system formed in-situ from a mixture of palladium(II)acetate and triphenylphosphine, a catalytic system formed in-situ from a mixture of tris(dibenzylideneacetone)dipalladium(0) and tri-tertbutylphosphonium tetrafluoroborate, and a catalytic system formed in-situ from a palladacycle pre-catalyst such as chloro[(tri-tert-butylphosphine)-2-(2-aminobiphenyl)] palladium(II). Optionally a copper catalysts, such as copper (I) iodide, may also be added. Examples of suitable additional solvents are 1,4-dioxane, tetrahydrofuran, acetonitrile, toluene and N,N-dimethylformamide. Examples of compounds (3) with particular utility are isobutyryl esters (3-i) wherein G is isobutyryl.

The skilled man will appreciate that the conditions of the Sonogashira reaction are liable to cleave ester groups, so that Reaction scheme 16 may also describe a reaction wherein starting material (3) contains an ester moiety [such that G is an acyl group], but product (18) does not [such that G is hydrogen].

Compounds (19) may be prepared from compounds (3) and compounds (20) as shown in Reaction scheme 17, through a Suzuki reaction, wherein compound (20) is a suitable organoboron species, such as a bornic acid, boronate ester or potassium trifluoroborate salt.

Reaction scheme 17

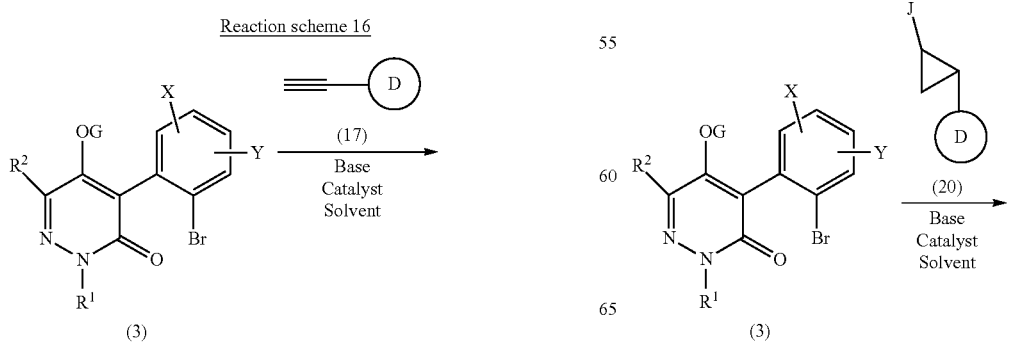

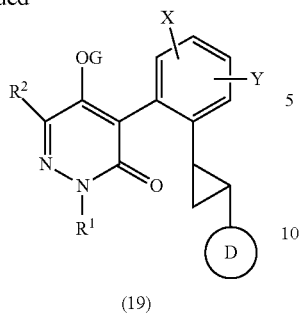

(19)

J = [B]

Compounds (19) may be prepared by treatment of compounds (3) with compounds (20) in the presence of a suitable base and a suitable catalyst in a suitable solvent at a temperature between 10 and 150° C. Examples of suitable bases include potassium carbonate, potassium phosphate, sodium carbonate, sodium bicarbonate and potassium fluoride. Examples of suitable catalysts include 1,1'-bis(diphenylphosphino)ferrocene]dichloropalladium(II) dichloromethane complex [PdCl$_2$(dppf).DCM], a catalytic system formed in-situ from a mixture of tris(dibenzylideneacetone)dipalladium(0) and tri-tertbutylphosphonium tetrafluoroborate, a catalytic system formed in-situ from a mixture of tris(dibenzylideneacetone)dipalladium(0) and tricyclohexylphosphine, a catalytic system formed in-situ from a palladacycle pre-catalyst such as chloro[(tri-tert-butylphosphine)-2-(2-aminobiphenyl)] palladium(II), and a catalytic system formed in-situ from a palladacycle pre-catalyst such as chloro[(tricyclohexylphosphine)-2-(2'-aminobiphenyl)] palladium(II). Examples of suitable solvents include water 1,4-dioxane, tetrahydrofuran, acetonitrile and toluene. Some compounds (20) are commercially available [such as 4,4,5,5-tetramethyl-2-(2-phenyl-cyclopropyl)-[1,3,2]dioxaborolane] or can be made by known methods (see for example methods described in Org. Process Res. Dev. 2012, 16, 87-95). Examples of compounds (3) with particular utility in the Suzuki reaction are benzyl ethers (3-ii) wherein G is benzyl.

Reaction scheme 18

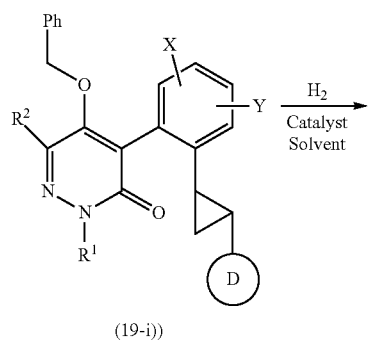

(19-i)

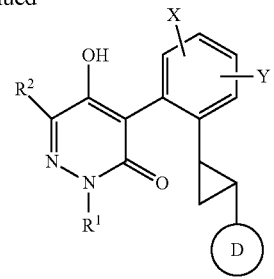

(19-ii)

Compounds (19-ii) may be prepared by catalytic hydrogenation of compounds (19-i) with hydrogen gas in a suitable solvent [such as tetrahydrofuran, methanol, ethanol, acetic acid or ethyl acetate] in the presence of a suitable catalyst [such as Pd/C, Pd/CaCO$_3$, Rh/Al$_2$CO$_3$ or sponge nickel] at a temperature between −10 and 100° C.

Certain compounds (I-ii) of the present invention may be prepared from compounds (21) as shown in Reaction scheme 19. Compounds (I-ii) are compounds of formula (I) in which W is —CH$_2$—CH$_2$—.

Reaction scheme 19

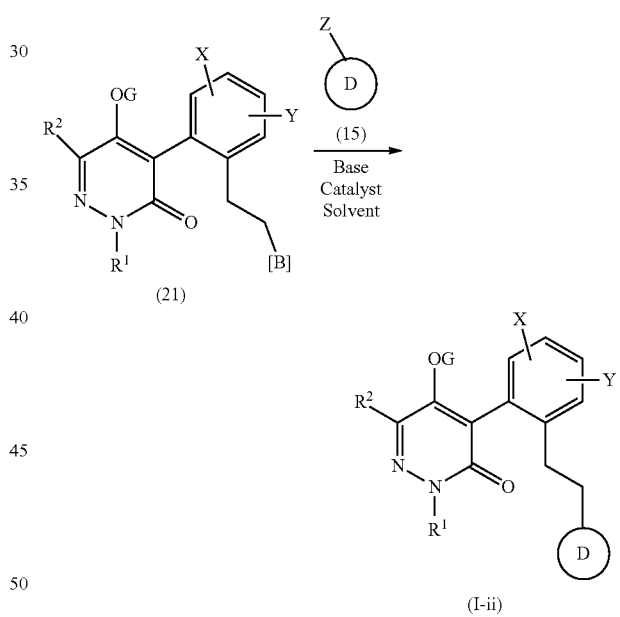

Z = halide or pseudo-halide

Compounds (I-ii) may be prepared by treatment of compounds (21) where [B] may be a trialkyl borane, alkyl boronic acid, alkyl boronic ester or alkyl potassium trifluoroborate salt, with compounds (15) in the presence of a suitable base and a suitable catalyst in a suitable solvent at a temperature between 10 and 150° C. Examples of suitable bases include potassium carbonate, potassium phosphate, sodium carbonate, caesium carbonate, sodium bicarbonate and potassium fluoride. Examples of suitable catalysts include 1,1'-bis(diphenylphosphino)ferrocene]-dichloropalladium(II) dichloromethane complex [PdCl$_2$(dppf).DCM], [1,3-Bis(2,6-Di-3-pentylphenyl)imidazol-2-ylidene](3-chloropyridyl)dichloropalladium(II) [Pd-PEPPSI™-IPent], a catalytic system formed in-situ from a palladacycle pre-catalyst such as chloro(2-dicyclohexylphosphino-2',6'-diisopropoxy-1,1'-biphenyl)[2-(2'-amino-1,1'-biphenyl)]palladium(II) [RuPhos-Pd-G2], [Dicyclohexyl[2',4',6'-tris(1-methylethyl)[1,1'-biphenyl]-2-yl]phosphine](methanesulfonato-κO)[2'-(methylamino-κN)[1,1'-biphenyl]-2-yl-κC]palladium [XPhos-Pd-G4], and [(4-(N,N-Dimethylamino)phenyl)di-tert-butyl phosphine](methanesulfonato-κO)[2'-(methylamino-κN)[1,1'-biphenyl]-2-yl-κC] palladium [APhos-Pd-G4]. Examples of suitable solvents include water 1,4-dioxane, tetrahydrofuran, acetonitrile and toluene. Many compounds (15) are commercially available or can be made by known methods. Examples of compounds (21) with particular utility in the Suzuki Protocol are isobutyryl esters (21-i) wherein G is isobutyryl.

The skilled man will appreciate that the conditions of the Suzuki Protocol are liable to cleave ester groups, so that Reaction Scheme 19 may also describe a reaction wherein starting material (21) contains an ester moiety [such that G is an acyl group], but product (I-ii) does not [such that G is hydrogen].

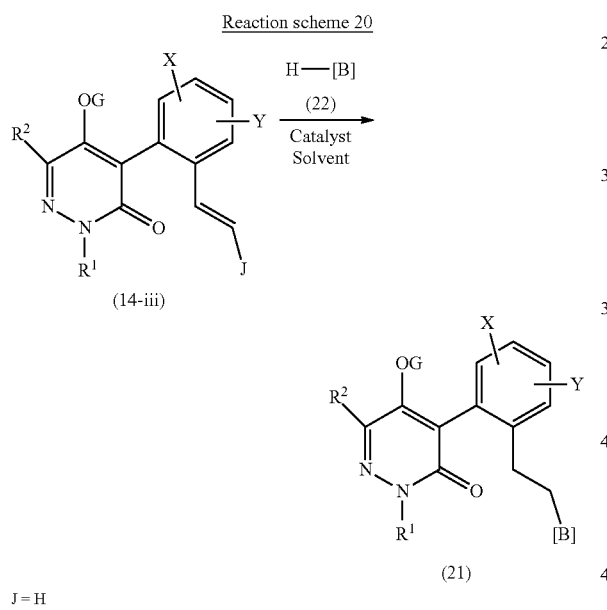

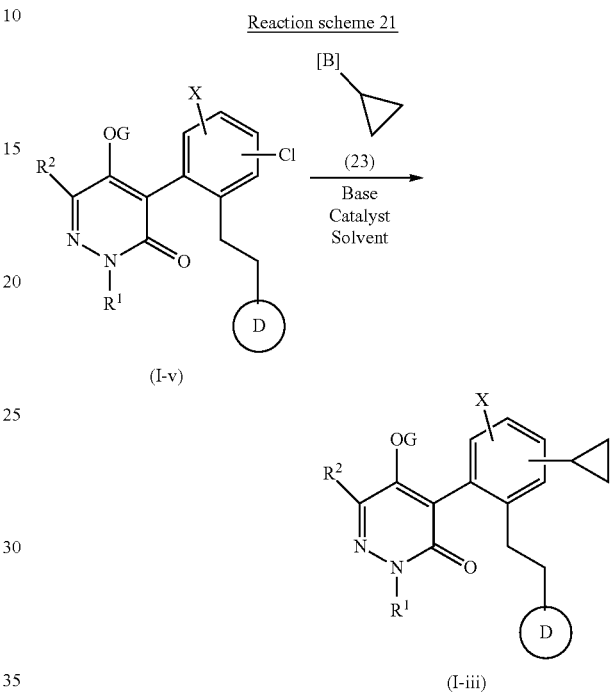

Compounds (I-iii) where Y is cyclopropyl may be prepared by treatment of compounds (I-v) with compounds (23) where [B] may be a trialkyl borane, alkyl boronic acid, alkyl boronic ester or alkyl potassium trifluoroborate salt where compounds in the presence of a suitable base and a suitable catalyst in a suitable solvent at a temperature between 10 and 150° C. Compounds (I-v) are compounds of formula (I) in which C is —CH$_2$—CH$_2$—, G is C(o)R$^3$ and Y is —Cl. Examples of suitable bases include potassium carbonate, potassium phosphate, sodium carbonate, caesium carbonate, sodium bicarbonate and potassium fluoride. Examples of suitable catalysts include 1,1'-bis(diphenylphosphino)ferrocene]-dichloropalladium(II) dichloromethane complex [PdCl$_2$(dppf).DCM], [1,3-Bis(2,6-Di-3-pentylphenyl)imidazol-2-ylidene](3-chloropyridyl)dichloropalladium(II) [Pd-PEPPSI™-IPent], a catalytic system formed in-situ from a palladacycle pre-catalyst such as chloro(2-dicyclohexylphosphino-2',6'-diisopropoxy-1,1'-biphenyl)[2-(2'-amino-1,1'-biphenyl)]palladium(II) [RuPhos-Pd-G2], [Dicyclohexyl[2',4',6'-tris(1-methylethyl)[1,1'-biphenyl]-2-yl] phosphine](methanesulfonato-κO)[2'-(methylamino-κN)[1,1'-biphenyl]-2-yl-κC]palladium [XPhos-Pd-G4], and [(4-(N,N-Dimethylamino)phenyl)di-tert-butyl phosphine] (methanesulfonato-κO)[2'-(methylamino-κN)[1,1'-biphenyl]-2-yl-κC]palladium [APhos-Pd-G4]. Examples of suitable solvents include water, 1,4-dioxane, tetrahydrofuran, acetonitrile and toluene. Examples of compounds (I-v) with particular utility in the Suzuki Protocol are isobutyryl esters (I-v) wherein G is isobutyryl.

Compounds (21) may be prepared by hydroboration of alkenes (14-iii) using a suitable hydroborating reagent (22) in a suitable solvent with the optional addition of a suitable catalyst at a temperature between 0° C. and 100° C. Examples of hydroborating reagents include borane, dichloroborane, dibromoborane, 4,4,5,5-tetramethyl-1,3,2-dioxaborolane [pinacolborane], 1,3,2-benzodioxaborole [Catecholborane] or 9-Borylbicyclo[3.3.1]nonane [9-BBN]. Examples of suitable solvents include tetrahydrofuran, 2-methyltetrahydrofuran, 1,4-dioxane, 2-methoxy-2-methyl-propane [MTBE] and diethyl ether. Examples of suitable catalysts include a catalytic system formed in situ from bis(1,5-cyclooctadiene)diiridium(I) dichloride [[Ir(COD)Cl]$_2$], and 4-diphenylphosphanylbutyl(diphenyl)phosphane [DPPB] [*J. Am. Chem. Soc.*, 2004, 126, 9200-9201].

Where [B] is an alkyl boronic ester, this can be converted to the corresponding boronic acid by treatment with methylboronic acid [MeB(OH)$_2$] and trifluoroacetic acid in a suitable solvent such as dichloromethane [DCM] at temperatures between 0 and 40° C. [*Org. Lett.*, 2019, 21, 3048-3052]. Where [B] is an alkyl boronic acid or ester, this may be converted to the corresponding alkyl potassium trifluoroborate salt by treatment with potassium hydrogenfluoride in a suitable solvent such as methanol or acetone at temperatures between 0 and 40° C.

The skilled man will appreciate that the conditions of the Suzuki Protocol are liable to cleave ester groups, so that Reaction Scheme 21 may describe a reaction wherein starting material (1-v) contains an ester moiety [such that G is an acyl group], but product (1-iii) does not [such that G is hydrogen].

The compounds of Formula (I) according to the invention can be used as herbicides by themselves, but they are generally formulated into herbicidal compositions using formulation adjuvants, such as carriers, solvents and surface-active agents (SFAs). Thus, the present invention further provides a herbicidal composition comprising a herbicidal compound according to any one of the previous claims and an agriculturally acceptable formulation adjuvant. The composition can be in the form of concentrates which are diluted prior to use, although ready-to-use compositions can also be made. The final dilution is usually made with water, but can be made instead of, or in addition to, water, with, for example, liquid fertilisers, micronutrients, biological organisms, oil or solvents.

The herbicidal compositions generally comprise from 0.1 to 99% by weight, especially from 0.1 to 95% by weight, compounds of Formula I and from 1 to 99.9% by weight of a formulation adjuvant which preferably includes from 0 to 25% by weight of a surface-active substance.

The compositions can be chosen from a number of formulation types, many of which are known from the Manual on Development and Use of FAO Specifications for Plant Protection Products, 5th Edition, 1999. These include dustable powders (DP), soluble powders (SP), water soluble granules (SG), water dispersible granules (WG), wettable powders (WP), granules (GR) (slow or fast release), soluble concentrates (SL), oil miscible liquids (OL), ultra low volume liquids (UL), emulsifiable concentrates (EC), dispersible concentrates (DC), emulsions (both oil in water (EW) and water in oil (EO)), micro-emulsions (ME), suspension concentrates (SC), aerosols, capsule suspensions (CS) and seed treatment formulations. The formulation type chosen in any instance will depend upon the particular purpose envisaged and the physical, chemical and biological properties of the compound of Formula (I).

Dustable powders (DP) may be prepared by mixing a compound of Formula (I) with one or more solid diluents (for example natural clays, kaolin, pyrophyllite, bentonite, alumina, montmorillonite, kieselguhr, chalk, diatomaceous earths, calcium phosphates, calcium and magnesium carbonates, sulphur, lime, flours, talc and other organic and inorganic solid carriers) and mechanically grinding the mixture to a fine powder.

Soluble powders (SP) may be prepared by mixing a compound of Formula (I) with one or more water-soluble inorganic salts (such as sodium bicarbonate, sodium carbonate or magnesium sulphate) or one or more water-soluble organic solids (such as a polysaccharide) and, optionally, one or more wetting agents, one or more dispersing agents or a mixture of said agents to improve water dispersibility/solubility. The mixture is then ground to a fine powder. Similar compositions may also be granulated to form water soluble granules (SG).

Wettable powders (WP) may be prepared by mixing a compound of Formula (I) with one or more solid diluents or carriers, one or more wetting agents and, preferably, one or more dispersing agents and, optionally, one or more suspending agents to facilitate the dispersion in liquids. The mixture is then ground to a fine powder. Similar compositions may also be granulated to form water dispersible granules (WG).

Granules (GR) may be formed either by granulating a mixture of a compound of Formula (I) and one or more powdered solid diluents or carriers, or from pre-formed blank granules by absorbing a compound of Formula (I) (or a solution thereof, in a suitable agent) in a porous granular material (such as pumice, attapulgite clays, fuller's earth, kieselguhr, diatomaceous earths or ground corn cobs) or by adsorbing a compound of Formula (I) (or a solution thereof, in a suitable agent) on to a hard core material (such as sands, silicates, mineral carbonates, sulphates or phosphates) and drying if necessary. Agents which are commonly used to aid absorption or adsorption include solvents (such as aliphatic and aromatic petroleum solvents, alcohols, ethers, ketones and esters) and sticking agents (such as polyvinyl acetates, polyvinyl alcohols, dextrins, sugars and vegetable oils). One or more other additives may also be included in granules (for example an emulsifying agent, wetting agent or dispersing agent).

Dispersible Concentrates (DC) may be prepared by dissolving a compound of Formula (I) in water or an organic solvent, such as a ketone, alcohol or glycol ether. These solutions may contain a surface active agent (for example to improve water dilution or prevent crystallisation in a spray tank).

Emulsifiable concentrates (EC) or oil-in-water emulsions (EW) may be prepared by dissolving a compound of Formula (I) in an organic solvent (optionally containing one or more wetting agents, one or more emulsifying agents or a mixture of said agents). Suitable organic solvents for use in ECs include aromatic hydrocarbons (such as alkylbenzenes or alkylnaphthalenes, exemplified by SOLVESSO 100, SOLVESSO 150 and SOLVESSO 200, SOLVESSO is a Registered Trade Mark), ketones (such as cyclohexanone or methylcyclohexanone) and alcohols (such as benzyl alcohol, furfuryl alcohol or butanol), N-alkylpyrrolidones (such as N-methylpyrrolidone or N-octylpyrrolidone), dimethyl amides of fatty acids (such as $C_8$-$C_{10}$ fatty acid dimethylamide) and chlorinated hydrocarbons. An EC product may spontaneously emulsify on addition to water, to produce an emulsion with sufficient stability to allow spray application through appropriate equipment.

Preparation of an EW involves obtaining a compound of Formula (I) either as a liquid (if it is not a liquid at room temperature, it may be melted at a reasonable temperature, typically below 70° C.) or in solution (by dissolving it in an appropriate solvent) and then emulsifying the resultant liquid or solution into water containing one or more SFAs, under high shear, to produce an emulsion. Suitable solvents for use in EWs include vegetable oils, chlorinated hydrocarbons (such as chlorobenzenes), aromatic solvents (such as alkylbenzenes or alkylnaphthalenes) and other appropriate organic solvents which have a low solubility in water.

Microemulsions (ME) may be prepared by mixing water with a blend of one or more solvents with one or more SFAs, to produce spontaneously a thermodynamically stable isotropic liquid formulation. A compound of Formula (I) is present initially in either the water or the solvent/SFA blend. Suitable solvents for use in MEs include those hereinbefore described for use in in ECs or in EWs. An ME may be either an oil-in-water or a water-in-oil system (which system is present may be determined by conductivity measurements) and may be suitable for mixing water-soluble and oil-soluble pesticides in the same formulation. An ME is suitable for dilution into water, either remaining as a microemulsion or forming a conventional oil-in-water emulsion.

Suspension concentrates (SC) may comprise aqueous or non-aqueous suspensions of finely divided insoluble solid particles of a compound of Formula (I). SCs may be prepared by ball or bead milling the solid compound of Formula (I) in a suitable medium, optionally with one or more dispersing agents, to produce a fine particle suspension of the compound. One or more wetting agents may be included in the composition and a suspending agent may be included to reduce the rate at which the particles settle. Alternatively, a compound of Formula (I) may be dry milled and added to water, containing agents hereinbefore described, to produce the desired end product.

Aerosol formulations comprise a compound of Formula (I) and a suitable propellant (for example n-butane). A compound of Formula (I) may also be dissolved or dispersed in a suitable medium (for example water or a water miscible liquid, such as n-propanol) to provide compositions for use in non-pressurised, hand-actuated spray pumps.

Capsule suspensions (CS) may be prepared in a manner similar to the preparation of EW formulations but with an additional polymerisation stage such that an aqueous dispersion of oil droplets is obtained, in which each oil droplet is encapsulated by a polymeric shell and contains a compound of Formula (I) and, optionally, a carrier or diluent therefor. The polymeric shell may be produced by either an interfacial polycondensation reaction or by a coacervation procedure. The compositions may provide for controlled release of the compound of Formula (I) and they may be used for seed treatment. A compound of Formula (I) may also be formulated in a biodegradable polymeric matrix to provide a slow, controlled release of the compound.

The composition may include one or more additives to improve the biological performance of the composition, for example by improving wetting, retention or distribution on surfaces; resistance to rain on treated surfaces; or uptake or mobility of a compound of Formula (I). Such additives include surface active agents (SFAs), spray additives based on oils, for example certain mineral oils or natural plant oils (such as soy bean and rape seed oil), and blends of these with other bio-enhancing adjuvants (ingredients which may aid or modify the action of a compound of Formula (I)).

Wetting agents, dispersing agents and emulsifying agents may be SFAs of the cationic, anionic, amphoteric or non-ionic type.

Suitable SFAs of the cationic type include quaternary ammonium compounds (for example cetyltrimethyl ammonium bromide), imidazolines and amine salts.

Suitable anionic SFAs include alkali metals salts of fatty acids, salts of aliphatic monoesters of sulphuric acid (for example sodium lauryl sulphate), salts of sulphonated aromatic compounds (for example sodium dodecylbenzenesulphonate, calcium dodecylbenzenesulphonate, butylnaphthalene sulphonate and mixtures of sodium di-isopropyl- and tri-isopropyl-naphthalene sulphonates), ether sulphates, alcohol ether sulphates (for example sodium laureth-3-sulphate), ether carboxylates (for example sodium laureth-3-carboxylate), phosphate esters (products from the reaction between one or more fatty alcohols and phosphoric acid (predominately mono-esters) or phosphorus pentoxide (predominately di-esters), for example the reaction between lauryl alcohol and tetraphosphoric acid; additionally these products may be ethoxylated), sulphosuccinamates, paraffin or olefine sulphonates, taurates and lignosulphonates.

Suitable SFAs of the amphoteric type include betaines, propionates and glycinates.

Suitable SFAs of the non-ionic type include condensation products of alkylene oxides, such as ethylene oxide, propylene oxide, butylene oxide or mixtures thereof, with fatty alcohols (such as oleyl alcohol or cetyl alcohol) or with alkylphenols (such as octylphenol, nonylphenol or octylcresol); partial esters derived from long chain fatty acids or hexitol anhydrides; condensation products of said partial esters with ethylene oxide; block polymers (comprising ethylene oxide and propylene oxide); alkanolamides; simple esters (for example fatty acid polyethylene glycol esters); amine oxides (for example lauryl dimethyl amine oxide); and lecithins.

Suitable suspending agents include hydrophilic colloids (such as polysaccharides, polyvinylpyrrolidone or sodium carboxymethylcellulose) and swelling clays (such as bentonite or attapulgite).

The composition of the present may further comprise at least one additional pesticide. For example, the compounds according to the invention can also be used in combination with other herbicides or plant growth regulators. In a preferred embodiment the additional pesticide is a herbicide and/or herbicide safener. Specific examples of such mixtures include (wherein "I" represents a compound of Formula (I)): I+acetochlor; I+acifluorfen (including acifluorfen-sodium); I+aclonifen; I+ametryn; I+amicarbazone; I+aminopyralid; I+aminotriazole; I+atrazine; I+beflubutamid-M; I+benquitrione; I+bensulfuron (including bensulfuron-methyl); I+bentazone; I+bicyclopyrone; I+bilanafos; I+bispyribac-sodium; I+bixlozone; I+bromacil; I+bromoxynil; I+butachlor; I+butafenacil; I+carfentrazone (including carfentrazone-ethyl); I+cloransulam (including cloransulam-methyl); I+chlorimuron (including chlorimuron-ethyl); I+chlorotoluron; I+chlorsulfuron; I+cinmethylin; I+clacyfos; I+clethodim; I+clodinafop (including clodinafop-propargyl); I+clomazone; I+clopyralid; I+cyclopyranil; I+cyclopyrimorate; I+cyclosulfamuron; I+cyhalofop (including cyhalofop-butyl); I+2,4-D (including the choline salt and 2-ethylhexyl ester thereof); I+2,4-DB; I+desmedipham; I+dicamba (including the aluminium, aminopropyl, bis-aminopropylmethyl, choline, dichloroprop, diglycolamine, dimethylamine, dimethylammonium, potassium and sodium salts thereof); I+diclosulam; I+diflufenican; I+diflufenzopyr; I+dimethachlor; I+dimethenamid-P; I+diquat dibromide; I+diuron; I+epyrifenacil; I+ethalfluralin; I+ethofumesate; I+fenoxaprop (including fenoxaprop-P-ethyl); I+fenoxasulfone; I+fenquinotrione; I+fentrazamide; I+flazasulfuron; I+florasulam; I+florpyrauxifen (including florpyrauxifen-benzyl); I+fluazifop (including fluazifop-P-butyl); I+flucarbazone (including flucarbazone-sodium); I+flufenacet; I+flumetsulam; I+flumioxazin; I+fluometuron; I+flupyrsulfuron (including flupyrsulfuron-methyl-sodium); I+fluroxypyr (including fluroxypyr-meptyl); I+fomesafen; I+foramsulfuron; I+glufosinate (including the ammonium salt thereof); I+glyphosate (including the diammonium, isopropylammonium and potassium salts thereof); I+halauxifen (including halauxifen-methyl); I+haloxyfop (including haloxyfop-methyl); I+hexazinone; I+hydantocidin; I+imazamox; I+imazapic; I+imazapyr; I+imazethapyr; I+indaziflam; I+iodosulfuron (including iodosulfuron-methyl-sodium); I+iofensulfuron (including iofensulfuron-sodium); I+ioxynil; I+isoproturon; I+isoxaflutole; I+lancotrione; I+MCPA; I+MCPB; I+mecoprop-P; I+mesosulfuron (including mesosulfuron-methyl); I+mesotrione; I+metamitron; I+metazachlor; I+methiozolin; I+metolachlor; I+metosulam; I+metribuzin; I+metsulfuron; I+napropamide; I+nicosulfuron; I+norflurazon; I+oxadiazon; I+oxasulfuron; I+oxyfluorfen; I+paraquat dichloride; I+pendimethalin; I+penoxsulam; I+phenmedipham; I+picloram; I+pinoxaden; I+pretilachlor; I+primisulfuron-methyl; I+prometryne; I+propanil; I+propaquizafop; I+propyrisulfuron; I+propyzamide; I+prosulfocarb; I+prosulfuron; I+pyraclonil; I+pyraflufen (including pyraflufen-ethyl); I+pyrasulfotole; I+pyridate; I+pyriftalid; I+pyrimisulfan; I+pyroxasulfone; I+pyroxsulam; I+quinclorac; I+quinmerac; I+quizalofop (including quizalofop-P-ethyl and quizalofop-P-tefuryl); I+rimsulfuron; I+saflufenacil; I+sethoxydim; I+simazine; I+S-metalochlor; I+sulfentrazone; I+sulfosulfuron; I+tebuthiuron; I+tefuryltrione; I+tembotrione; I+terbuthylazine; I+terbutryn; I+tetflupyrolimet; I+thiencarbazone; I+thifensulfuron; I+tiafenacil; I+tolpyralate; I+topramezone; I+tralkoxydim; I+triafamone; I+triallate; I+triasulfuron; I+tribenuron (including tribenuron-methyl); I+triclopyr; I+trifloxysulfuron (including trifloxysulfuron-sodium); I+trifludimoxazin; I+trifluralin; I+triflusulfuron; I+3-(2-chloro-4-fluoro-5-(3-methyl-2,6-dioxo-4-trifluoromethyl-3,6-dihydropyrimidin-1(2H)-yl)phenyl)-5-methyl-4,5-dihydroisoxazole-5-carboxylic acid ethyl ester; I+4-hydroxy-1-methoxy-5-methyl-3-[4-(trifluoromethyl)-2-pyridyl]imidazolidin-2-one; I+4-hydroxy-1,5-dimethyl-3-[4-(trifluoromethyl)-2-pyridyl]imidazolidin-2-one; I+5-ethoxy-4-hydroxy-1-methyl-3-[4-(trifluoromethyl)-2-pyridyl]imidazolidin-2-one; I+4-hydroxy-1-methyl-3-[4-(trifluoromethyl)-2-pyridyl]imidazolidin-2-one; I+4-hydroxy-1,5-dimethyl-3-[1-methyl-5-(trifluoromethyl) pyrazol-3-yl]imidazolidin-2-one; I+(4R)$_1$-(5-tert-butylisoxazol-3-yl)-4-ethoxy-5-hydroxy-3-methyl-imidazolidin-2-one; I+3-[2-(3,4-dimethoxyphenyl)-6-methyl-3-oxo-pyridazine-4-carbonyl]bicyclo[3.2.1]octane-2,4-dione; I+2-[2-(3,4-dimethoxyphenyl)-6-methyl-3-oxo-pyridazine-4-carbonyl]-5-methyl-cyclohexane-1,3-dione; I+2-[2-(3,4-dimethoxyphenyl)-6-methyl-3-oxo-pyridazine-4-carbonyl]cyclohexane-1,3-dione; I+2-[2-(3,4-dimethoxyphenyl)-6-methyl-3-oxo-pyridazine-4-carbonyl]-5,5-dimethyl-cyclohexane-1,3-dione; I+6-[2-(3,4-dimethoxyphenyl)-6-methyl-3-oxo-pyridazine-4-carbonyl]-2,2,4,4-tetramethyl-cyclohexane-1,3,5-trione; I+2-[2-(3,4-dimethoxyphenyl)-6-methyl-3-oxo-pyridazine-4-carbonyl]-5-ethyl-cyclohexane-1,3-dione; I+2-[2-(3,4-dimethoxyphenyl)-6-methyl-3-oxo-pyridazine-4-carbonyl]-4,4,6,6-tetramethyl-cyclohexane-1,3-dione; I+2-[6-cyclopropyl-2-(3,4-dimethoxyphenyl)-3-oxo-pyridazine-4-carbonyl]-5-methyl-cyclohexane-1,3-dione; I+3-[6-cyclopropyl-2-(3,4-dimethoxyphenyl)-3-oxo-pyridazine-4-carbonyl]bicyclo[3.2.1]octane-2,4-dione; I+2-[6-cyclopropyl-2-(3,4-dimethoxyphenyl)-3-oxo-pyridazine-4-carbonyl]-5,5-dimethyl-cyclohexane-1,3-dione; I+6-[6-cyclopropyl-2-(3,4-dimethoxyphenyl)-3-oxo-pyridazine-4-carbonyl]-2,2,4,4-tetramethyl-cyclohexane-1,3,5-trione; I+2-[6-cyclopropyl-2-(3,4-dimethoxyphenyl)-3-oxo-pyridazine-4-carbonyl]cyclohexane-1,3-dione; I+4-[2-(3,4-dimethoxyphenyl)-6-methyl-3-oxo-pyridazine-4-carbonyl]-2,2,6,6-tetramethyl-tetrahydropyran-3,5-dione; I+4-[6-cyclopropyl-2-(3,4-dimethoxyphenyl)-3-oxo-pyridazine-4-carbonyl]-2,2,6,6-tetramethyl-tetrahydropyran-3,5-dione; I+4-amino-3-chloro-5-fluoro-6-(7-fluoro-1H-indol-6-yl) pyridine-2-carboxylic acid (including agrochemically acceptable esters thereof, for example, methyl 4-amino-3-chloro-5-fluoro-6-(7-fluoro-1H-indol-6-yl)pyridine-2-carboxylate, prop-2-ynyl 4-amino-3-chloro-5-fluoro-6-(7-fluoro-1H-indol-6-yl)pyridine-2-carboxylate and cyanomethyl 4-amino-3-chloro-5-fluoro-6-(7-fluoro-1H-indol-6-yl)pyridine-2-carboxylate); I+3-ethylsulfanyl-N-(1,3,4-oxadiazol-2-yl)-5-(trifluoromethyl)-[1,2,4]triazolo[4,3-a]pyridine-8-carboxamide; I+3-(isopropylsulfanylmethyl)-N-(5-methyl-1,3,4-oxadiazol-2-yl)-5-(trifluoromethyl)-[1,2,4]triazolo[4,3-a]pyridine-8-carboxamide; I+3-(isopropylsulfonylmethyl)-N-(5-methyl-1,3,4-oxadiazol-2-yl)-5-(trifluoromethyl)-[1,2,4]triazolo[4,3-a]pyridine-8-carboxamide; I+3-(ethylsulfonylmethyl)-N-(5-methyl-1,3,4-oxadiazol-2-yl)-5-(trifluoromethyl)-[1,2,4]triazolo[4,3-a] pyridine-8-carboxamide; I+ethyl 2-[[3-[[3-chloro-5-fluoro-6-[3-methyl-2,6-dioxo-4-(trifluoromethyl)pyrimidin-1-yl]-2-pyridyl]oxy]acetate; I+6-chloro-4-(2,7-dimethyl-1-naphthyl)-5-hydroxy-2-methyl-pyridazin-3-one; I+1-[2-chloro-6-(5-chloropyrimidin-2-yl)oxy-phenyl]-4,4,4-trifluoro-butan-1-one and I+5-[2-chloro-6-(5-chloropyrimidin-2-yl)oxy-phenyl]-3-(difluoromethyl) isoxazole.

The mixing partners of the compound of Formula (I) may also be in the form of esters or salts, as mentioned e.g. in The Pesticide Manual, Fourteenth Edition, British Crop Protection Council, 2006.

The compound of Formula (I) can also be used in mixtures with other agrochemicals such as fungicides, nematicides or insecticides, examples of which are given in The Pesticide Manual.

The mixing ratio of the compound of Formula (I) to the mixing partner is preferably from 1:100 to 1000:1.

The mixtures can advantageously be used in the above-mentioned formulations (in which case "active ingredient" relates to the respective mixture of compound of Formula (I) with the mixing partner).

Compounds of Formula (I) of the present invention may also be combined with herbicide safeners. Preferred combinations (wherein "I" represents a compound of Formula (I)) include I+benoxacor, I+cloquintocet (including cloquintocet-mexyl), I+cyprosulfamide, I+dichlormid, I+fenchlorazole (including fenchlorazole-ethyl), I+fenclorim, I+fluxofenim, I+furilazole, I+isoxadifen (including isoxadifen-ethyl), I+mefenpyr (including mefenpyr-diethyl), I+metcamifen and I+oxabetrinil.

Particularly preferred are mixtures of a compound of Formula (I) with cyprosulfamide, isoxadifen (including isoxadifen-ethyl), cloquintocet (including cloquintocet-mexyl) and/or N-(2-methoxybenzoyl)-4-[(methyl-aminocarbonyl)amino]benzenesulfonamide.

The safeners of the compound of Formula (I) may also be in the form of esters or salts, as mentioned e.g. in The Pesticide Manual, 14$^{th}$ Edition (BCPC), 2006. The reference to cloquintocet-mexyl also applies to a lithium, sodium, potassium, calcium, magnesium, aluminium, iron, ammonium, quaternary ammonium, sulfonium or phosphonium salt thereof as disclosed in WO 02/34048, and the reference to fenchlorazole-ethyl also applies to fenchlorazole, etc.

Preferably the mixing ratio of compound of Formula (I) to safener is from 100:1 to 1:10, especially from 20:1 to 1:1.

The compound of Formula (I) can also be used in mixtures with other agrochemicals such as fungicides, nematicides or insecticides, examples of which are given in The Pesticide Manual.

The mixing ratio of the compound of Formula (I) to the mixing partner is preferably from 1:100 to 1000:1.

The mixtures can advantageously be used in the above-mentioned formulations (in which case "active ingredient" relates to the respective mixture of compound of Formula I with the mixing partner).

The present invention still further provides a method of selectively controlling weeds at a locus comprising crop plants and weeds, wherein the method comprises application to the locus of a weed controlling amount of a composition according to the present invention. 'Controlling' means killing, reducing or retarding growth or preventing or reducing germination. Generally the plants to be controlled are unwanted plants (weeds). 'Locus' means the area in which the plants are growing or will grow.

The rates of application of compounds of Formula (I) may vary within wide limits and depend on the nature of the soil, the method of application (pre- or post-emergence; seed dressing; application to the seed furrow; no tillage application etc.), the crop plant, the weed(s) to be controlled, the prevailing climatic conditions, and other factors governed by the method of application, the time of application and the target crop. The compounds of Formula I according to the invention are generally applied at a rate of from 10 to 2000 g/ha, especially from 50 to 1000 g/ha.

The application is generally made by spraying the composition, typically by tractor mounted sprayer for large areas, but other methods such as dusting (for powders), drip or drench can also be used.

Useful plants in which the composition according to the invention can be used include crops such as cereals, for example barley and wheat, cotton, oilseed rape, sunflower, maize, rice, soybeans, sugar beet, sugar cane and turf.

Crop plants can also include trees, such as fruit trees, palm trees, coconut trees or other nuts. Also included are vines such as grapes, fruit bushes, fruit plants and vegetables.

Crops are to be understood as also including those crops which have been rendered tolerant to herbicides or classes of herbicides (e.g. ALS-, GS-, EPSPS-, PPO-, ACCase- and HPPD-inhibitors) by conventional methods of breeding or by genetic engineering. An example of a crop that has been rendered tolerant to imidazolinones, e.g. imazamox, by conventional methods of breeding is Clearfield® summer rape (canola). Examples of crops that have been rendered tolerant to herbicides by genetic engineering methods include e.g. glyphosate- and glufosinate-resistant maize varieties commercially available under the trade names RoundupReady® and LibertyLink®. In a particularly preferred aspect, the crop plant has been engineered to over-express homogentisate solanesyltransferase as taught in, for example, WO2010/029311.

Crops are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle). Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278, WO 95/34656, WO 03/052073 and EP-A-427 529. Examples of transgenic plants comprising one or more genes that code for an insecticidal resistance and express one or more toxins are KnockOut® (maize), Yield Gard® (maize), NuCOTIN33B® (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

Crops are also to be understood to include those which are obtained by conventional methods of breeding or genetic engineering and contain so-called output traits (e.g. improved storage stability, higher nutritional value and improved flavour).

Other useful plants include turf grass for example in golf-courses, lawns, parks and roadsides, or grown commercially for sod, and ornamental plants such as flowers or bushes.

The compositions can be used to control unwanted plants (collectively, 'weeds'). The weeds to be controlled include both monocotyledonous species, for example *Agrostis, Alopecurus, Avena, Brachiaria, Bromus, Cenchrus, Cyperus, Digitaria, Echinochloa, Eleusine, Lolium, Monochoria, Rottboellia, Sagittaria, Scirpus, Setaria* and Sorghum, and dicotyledonous species, for example *Abutilon, Amaranthus, Ambrosia, Chenopodium, Chrysanthemum, Conyza, Galium, Ipomoea, Nasturtium, Sida, Sinapis, Solanum, Stellaria, Veronica,* Viola and *Xanthium*. Weeds can also include plants which may be considered crop plants but which are growing outside a crop area ('escapes'), or which grow from seed left over from a previous planting of a different crop ('volunteers'). Such volunteers or escapes may be tolerant to certain other herbicides.

Various aspects and embodiments of the present invention will now be illustrated in more detail by way of example. It will be appreciated that modification of detail may be made without departing from the scope of the invention.

Typical Abbreviations Used Herein Include:
br=broadDba
$^t$Bu=tert-butyl
d=doublet
dba=dibenzylideneacetone
DCM=dichloromethane
DMSO=dimethylsulfoxide
DPPA=diphenylphosphoryl azide
Et$_2$O=diethyl ether
EtOAc=ethyl acetate
h=hour
m=multiplet
Me=methyl
MeOH=methanol
Ph=phenyl
$^i$Pr=isopropyl
rt=room temperature
s=singlet
t=triplet
THF=tetrahydrofuran

PREPARATION EXAMPLES

Example 1 Preparation of 4-[3-chloro-6-fluoro-2-[2-(4-phenylphenyl)ethyl]phenyl]-5-hydroxy-2,6-dimethyl-pyridazin-3-one (A-1.027)

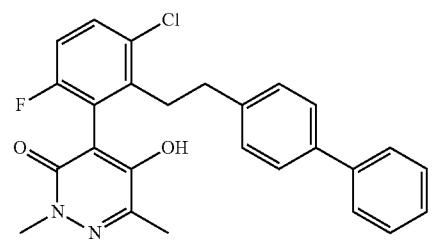 [SMILES: Cc1nn(C)c(=O)c(-c2c(F)ccc(Cl)c2CCc2ccc(-c3ccccc3)cc2)c1O]

1.1 3-allyl-2-bromo-1-chloro-4-fluoro-benzene

A solution of lithium diisopropylamide (2M in tetrahydrofuran, 3.6 ml, 7.2 mmol) was cooled to −78° C. under nitrogen. A solution of 2-bromo-1-chloro-4-fluoro-benzene (1.0 g, 4.8 mmol) in tetrahydrofuran was added dropwise at −78° C. The mixture was stirred for 45 minutes at the same temperature before being treated with allyl bromide (0.3 ml, 5.7 mmol). The reaction was continued at −78° C. for 2 h then allowed to warm to room temperature. The reaction was quenched with sat. NH₄Cl (aq) and extracted with ethyl acetate. The organics were separated and kept, then washed with brine. The organics were dried over sodium sulfate and concentrated under reduced pressure to give 3-allyl-2-bromo-1-chloro-4-fluoro-benzene (1.2 g, 100%) as an oil.

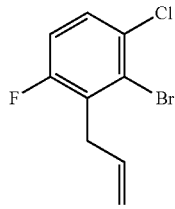

$^1$H NMR (400 MHz, CDCl₃) $\delta_H$: 7.34-7.30 (m, 1H), 7.01-6.96 (m, 1H), 5.94-5.83 (m, 1H), 5.10-5.00 (m, 2H), 3.64-3.58 (m, 2H).

1.2 2-(2-bromo-3-chloro-6-fluoro-phenyl)acetic acid

A solution of 3-allyl-2-bromo-1-chloro-4-fluoro-benzene (15.0 g, 60.1 mmol) in dichloromethane (200 mL) in a 2-necked flask was cooled to −78° C. One side neck was connected to a trap containing an aqueous solution of KI. Ozone was bubbled through the solution until the starting material was fully consumed (5 hours). Air was bubbled through the solution for 10 minutes to remove excess ozone. Dimethyl sulfide (44 ml, 601 mmol) was added and the mixture allowed to warm to room temperature. The reaction was continued for 16 h at room temperature.

The mixture was washed with brine (2×100 mL) and the organic layer kept. The organics were dried over Na₂SO₄, filtered and concentrated under reduced pressure to give crude 2-(2-bromo-3-chloro-6-fluoro-phenyl)acetaldehyde (15.3 g) which was used for the next step without further purification.

Crude 2-(2-bromo-3-chloro-6-fluoro-phenyl)acetaldehyde (15.3 g, 60.8 mmol) was dissolved in a mixture of tert-butanol (92 mL) and water (46 mL) then cooled to 0° C. 2-methylbut-2-ene (64.5 mL, 608 mmol), sodium dihydrogen phosphate (34.6 g, 243 mmol) and sodium chlorite (16.5 g, 163 mmol) were added. The mixture was stirred for 2 h then diluted with brine (150 mL) and 2M hydrochloric acid (150 mL). The mixture was extracted with ethyl acetate (3×100 mL). The combined organic extracts were washed with a saturated aqueous solution of sodium metabisulfite (100 mL) then dried over Na₂SO₄, filtered and concentrated under reduced pressure to provide a pale yellow solid. The crude solid was dissolved in a mixture of water (100 mL) and 2.0M NaOH (30 mL). The aqueous solution was washed with ethyl acetate (100 mL) and the organics discarded. The aqueous layer was acidified by addition of concentrated hydrochloric acid (20 mL) resulting in the formation of a white suspension. The mixture was extracted with ethyl acetate (3×200 mL). The combined organics were washed with brine, dried over Na₂SO₄, filtered and evaporated to provide 2-(2-bromo-3-chloro-6-fluoro-phenyl)acetic acid (8.0 g, 49%) as a white solid.

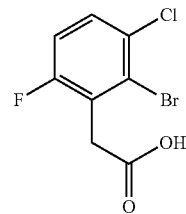 [SMILES: O=C(O)Cc1c(F)ccc(Cl)c1Br]

$^1$H NMR (400 MHz, DMSO-d6) $\delta_H$: 12.79 (br. s, 1H), 7.67-7.59 (m, 1H), 7.39-7.31 (m, 1H), 3.82 (s, 2H).

1.3 2-(2-Bromo-3-chloro-6-fluoro-phenyl)-N-methyl-acetohydrazide

To a stirred solution of 2-(2-bromo-3-chloro-6-fluoro-phenyl)acetic acid (2.0 g, 7.5 mmol) in dichloromethane (20 ml) at 0° C. was added N-(3-Dimethylaminopropyl)-N'-ethylcarbodiimide hydrochloride [EDC.HCl] (1.4 g, 9.0 mmol), followed by dropwise addition of methyl hydrazine (0.4 ml, 7.5 mmol). The temperature of the reaction mixture was maintained at 0° C. for 3 h. The reaction was then quenched with water and extracted into dichloromethane. The organics were separated, washed with brine and dried over Na₂SO₄. Concentration under reduced pressure gave crude 2-(2-bromo-3-chloro-6-fluoro-phenyl)-N-methyl-acetohydrazide (1.8 g, 81%) which was used in the next step without further purification.

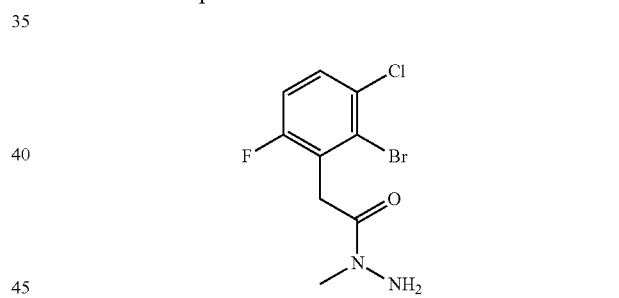

$^1$H NMR (400 MHz, DMSO-d6) $\delta_H$: 7.59 (dd, J=8.9 and 5.4, 1H), 7.30 (t, J=8.9, 1H), 4.91 (s, 2H), 4.10 (br. s, 2H), 3.02 (s, 3H).

1.4 2-{[2-(2-Bromo-3-chloro-6-fluoro-phenyl)-acetyl]-methyl-hydrazono}-propionic acid ethyl ester To a stirred solution of 2-(2-bromo-3-chloro-6-fluoro-phenyl)-N-methyl-acetohydrazide (1.8 g, 6.09 mmol) in ethanol (5 ml) was added ethyl pyruvate (0.7 ml, 6.7 mmol) dropwise. The reaction was heated at 80° C. for 4 h. The reaction mixture was then allowed to cool to room temperature, and evaporated under reduced pressure. The residue was purified by column chromatography on silica gel (eluent an ethyl acetate/hexane gradient) to give the desired compound 2-{[2-(2-Bromo-3-chloro-6-fluoro-phenyl)-acetyl]-methyl-hydrazono}-propionic acid ethyl ester (1.8 g, 75%) as an off-white solid.

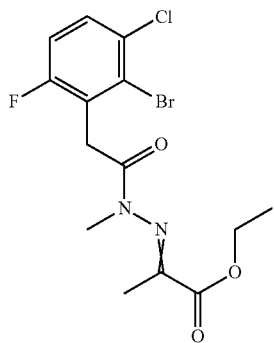 [SMILES: CCOC(=O)C(C)=NN(C)C(=O)Cc1c(F)ccc(Cl)c1Br]

¹H NMR (400 MHz, CDCl₃) δ_H: 7.40-7.35 (m, 1H), 7.04-6.98 (m, 1H), 4.32 (q, J=7.1, 2H), 4.24 (s, 2H), 3.41 (s, 3H), 2.32 (s, 3H), 1.36 (t, J=7.1, 3H).

1.5 4-(2-Bromo-3-chloro-6-fluoro-phenyl)-5-hydroxy-2,6-dimethyl-pyridazin-3-one 2-{[2-(2-Bromo-3-chloro-6-fluoro-phenyl)-acetyl]-methyl-hydrazono}-propionic acid ethyl ester (500 mg, 1.27 mmol) was dissolved in acetonitrile (2.5 ml) and treated with 1,8-diazabicyclo[5.4.0]undec-7-ene [DBU] (0.47 ml, 3.2 mmol). The mixture was heated to 125° C. using microwave irradiation for 1 h. The reaction mixture was then evaporated under reduced pressure. The residue was dissolved in water and acidified to pH 1 with 2N hydrochloric acid. The mixture was extracted with DCM, the organics separated and washed with brine solution. The organic solution was dried over Na₂SO₄ and concentrated under reduced pressure to give crude product. The crude was purified by column chromatography on silica gel (eluent an ethyl acetate/hexane gradient) to give 4-(2-bromo-3-chloro-6-fluoro-phenyl)-5-hydroxy-2,6-dimethyl-pyridazin-3-one (340 mg, 77.1%) as an off-white solid.

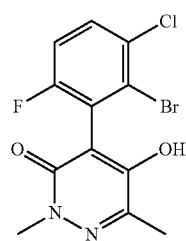 [SMILES: Cc1nn(C)c(=O)c(-c2c(F)ccc(Cl)c2Br)c1O]

¹H NMR (400 MHz, DMSO-d6) δ_H: 11.01 (s, 1H), 7.77-7.73 (m, 1H), 7.39 (t, J=8.7, 1H), 3.58 (s, 3H), 2.24 (s, 3H).

1.6 [5-(2-bromo-3-chloro-6-fluoro-phenyl)-1,3-dimethyl-6-oxo-pyridazin-4-yl]2-methylpropanoate To a stirred solution of 4-(2-bromo-3-chloro-6-fluoro-phenyl)-5-hydroxy-2,6-dimethyl-pyridazin-3-one (1.4 g, 4.02 mmol) in dichloromethane (32 ml) at rt were added triethylamine (1.1 ml, 8.06 mmol), 4-(dimethylamino)pyridine [DMAP] (49 mg, 0.40 mmol) and isobutyryl chloride (0.6 ml, 4.83 mmol).

Once judged complete, the reaction was diluted with dichloromethane and water. The organic layer was separated, dried over Na₂SO₄, and concentrated under reduced pressure to give crude product. The crude was purified by column chromatography on silica gel (eluent an ethyl acetate/hexane gradient) to give [5-(2-bromo-3-chloro-6-fluoro-phenyl)-1,3-dimethyl-6-oxo-pyridazin-4-yl] 2-methylpropanoate (1.47 g, 87%).

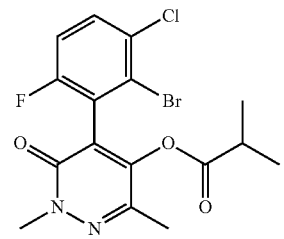 [SMILES: Cc1nn(C)c(=O)c(-c2c(F)ccc(Cl)c2Br)c1OC(=O)C(C)C]

¹H NMR (400 MHz, CDCl₃) δ_H: 7.51-7.47 (m, 1H), 7.10-7.05 (m, 1H), 3.82 (s, 3H), 2.60-2.55 (m, 1H), 2.25 (s, 3H), 1.02-0.98 (m, 6H).

1.7 4-[3-chloro-6-fluoro-2-[(E)-2-(4-phenylphenyl)vinyl]phenyl]-5-hydroxy-2,6-dimethyl-pyridazin-3-one (A-2.027)

[5-(2-Bromo-3-chloro-6-fluoro-phenyl)-1,3-dimethyl-6-oxo-pyridazin-4-yl] 2-methylpropanoate (0.54 g, 1.3 mmol), K₂CO₃ (0.55 g, 3.9 mmol), trans-2-(4-phenylphenyl)vinylboronic acid (0.44 g, 2.00 mmol), PdCl₂(dppf).DCM (53 mg, 0.065 mmol), 1,4-dioxane (13 ml) and H₂O (3.3 mL) were combined in a 20 mL microwave vial then heated at 140° C. for 30 mins under microwave irradiation.

The reaction mixture was concentrated in vacuo to remove the 1,4-dioxane then partitioned between 2N HCl (aq) and DCM. The organic layer was separated and the aqueous layer extracted with further portions of DCM (×2). The combined organics were concentrated in vacuo to give a crude residue which was purified by column chromatography on silica gel (eluent an ethyl acetate/hexane gradient) to give 4-[3-chloro-6-fluoro-2-[(E)-2-(4-phenylphenyl)vinyl]phenyl]-5-hydroxy-2,6-dimethyl-pyridazin-3-one (343 mg, 53%, A-2.027)) as a yellow foam.

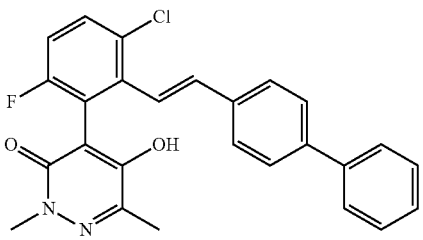 [SMILES: Cc1nn(C)c(=O)c(-c2c(F)ccc(Cl)c2/C=C/c2ccc(-c3ccccc3)cc2)c1O]

¹H NMR (400 MHz, chloroform) δ=7.59-7.33 (m, 10H), 7.07 (t, J=8.6 Hz, 1H), 7.01 (d, J=16.4 Hz, 1H), 6.70 (d, J=16.5 Hz, 1H), 5.63 (s, 1H), 3.73 (s, 3H), 2.28 (s, 3H)

1.8 4-(3-Chloro-6-fluoro-2-phenethyl-phenyl)-5-hydroxy-2,6-dimethyl-pyridazin-3-one (A-1.027)

To a 10 mL round-bottom flask was added 5% Pd/C (73 mg, 0.034 mmol) followed by a solution of 4-[3-chloro-6-fluoro-2-[(E)-2-(4-phenylphenyl)vinyl]phenyl]-5-hydroxy-2,6-dimethyl-pyridazin-3-one (308 mg, 0.69 mmol) in 10:1

(v/v) DCM/MeOH (4 mL). B₂(OH)₄ (325 mg, 3.45 mmol) was then added and the reaction mixture stirred at room temperature overnight.

The reaction mixture was then filtered through Celite®, eluting with 10:1 (v/v) DCM/MeOH. The filtrate was dry-loaded onto silica and purified by column chromatography on silica gel (eluent an ethyl acetate/hexane gradient) to give 4-[3-chloro-6-fluoro-2-[2-(4-phenylphenyl)ethyl]phenyl]-5-hydroxy-2,6-dimethyl-pyridazin-3-one (299 mg, 97% yield, A-1.027) as a yellow oil which solidified on standing.

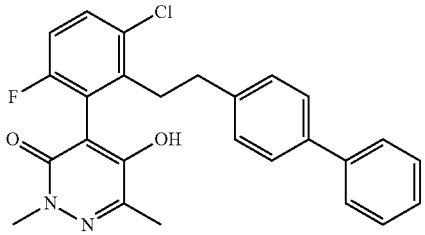 [SMILES: Cc1nn(C)c(=O)c(-c2c(F)ccc(Cl)c2CCc2ccc(-c3ccccc3)cc2)c1O]

¹H NMR (400 MHz, chloroform) δ=7.57-7.52 (m, 2H), 7.50-7.40 (m, 5H), 7.37-7.30 (m, 1H), 7.07 (d, J=8.2 Hz, 2H), 7.02 (t, J=8.6 Hz, 1H), 5.47 (s, 1H), 3.75 (s, 3H), 2.88-2.80 (m, 3H), 2.27 (s, 3H)

Example 2 Preparation of 4-[2-[6-chloro-3-fluoro-2-(5-hydroxy-2,6-dimethyl-3-oxo-pyridazin-4-yl)phenyl]ethyl]benzonitrile (A-1.036)

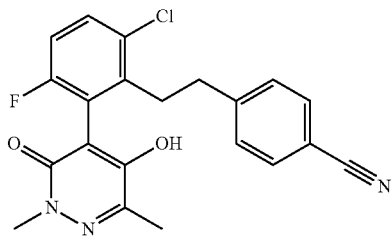 [SMILES: Cc1nn(C)c(=O)c(-c2c(F)ccc(Cl)c2CCc2ccc(C#N)cc2)c1O]

2.1 [5-[3-Chloro-2-[(E)-2-(4-cyanophenyl)vinyl]-6-fluoro-phenyl]-1,3-dimethyl-6-oxo-pyridazin-4-yl] 2-methylpropanoate (4.036)

[5-(2-Bromo-3-chloro-6-fluoro-phenyl)-1,3-dimethyl-6-oxo-pyridazin-4-yl] 2-methylpropanoate (1.10 g, 2.63 mmol) [prepared as described in Example 1] and chloro[(tri-tert-butylphosphine)-2-(2-aminobiphenyl)] palladium(II) (68 mg, 0.13 mmol) were combined in degassed toluene (12 mL). 4-vinylbenzonitrile (408 mg, 3.16 mmol) and Hunig's base (0.92 mL, 5.27 mmol) were then added and the reaction mixture heated to 95° C. for 2.5 hrs.

The reaction mixture was allowed to cool to room temperature then diluted with dichloromethane and filtered through celite, washing with further dichloromethane. The filtrate was concentrated in vacuo then purified by column chromatography on silica gel (eluent an ethyl acetate/hexane gradient) to give [5-[3-chloro-2-[(E)-2-(4-cyanophenyl)vinyl]-6-fluoro-phenyl]-1,3-dimethyl-6-oxo-pyridazin-4-yl] 2-methylpropanoate (781 mg, 64% yield, A-4.036) as a white solid

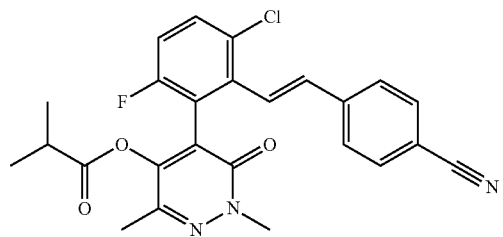 [SMILES: Cc1nn(C)c(=O)c(-c2c(F)ccc(Cl)c2/C=C/c2ccc(C#N)cc2)c1OC(=O)C(C)C]

¹H NMR (400 MHz, chloroform) δ=7.62-7.55 (m, 2H), 7.45 (dd, J=5.0, 8.5 Hz, 1H), 7.45-7.40 (m, 1H), 7.13 (d, J=16.5 Hz, 1H), 7.05 (t, J=8.5 Hz, 1H), 6.68 (d, J=16.5 Hz, 1H), 3.69 (s, 3H), 2.65 (spt, J=7.0 Hz, 1H), 2.23 (s, 3H), 1.11 (d, J=7.0 Hz, 3H), 1.07 (d, J=7.0 Hz, 3H).

2.2 [5-[3-Chloro-2-[2-(4-cyanophenyl)ethyl]-6-fluoro-phenyl]-1,3-dimethyl-6-oxo-pyridazin-4-yl] 2-methylpropanoate (A-3.036)

[5-[3-Chloro-2-[(E)-2-(4-cyanophenyl)vinyl]-6-fluoro-phenyl]-1,3-dimethyl-6-oxo-pyridazin-4-yl] 2-methylpropanoate (900 mg, 1.93 mmol) was subjected to catalytic hydrogenation in EtOAc (20 mL) over 5% Pd/C (50% wet) catalyst (0.82 g) at 4 bar H₂.

After 1.5 hrs, LC/MS showed complete reaction. The reaction mixture was filtered through a pad of Celite®, washing with ethyl acetate. The filtrate was concentrated in-vacuo to afford a crude residue.

The residue was adsorbed onto silica and purified by column chromatography on silica gel (eluent an ethyl acetate/hexane gradient) to give [5-[3-chloro-2-[2-(4-cyanophenyl)ethyl]-6-fluoro-phenyl]-1,3-dimethyl-6-oxo-pyridazin-4-yl] 2-methylpropanoate (800 mg, 81% yield, A-3.036) as a white solid.

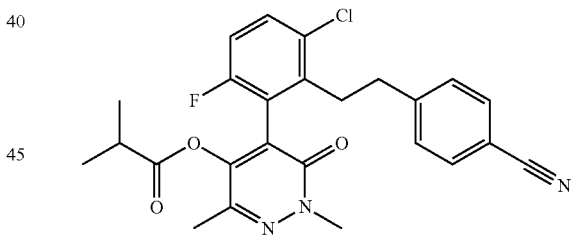

¹H NMR (400 MHz, chloroform) δ=7.56-7.51 (m, 2H), 7.42 (dd, J=5.2, 8.9 Hz, 1H), 7.26-7.21 (m, 2H), 7.00 (t, J=8.9 Hz, 1H), 3.84 (s, 3H), 3.02-2.92 (m, 1H), 2.91-2.80 (m, 2H), 2.75-2.65 (m, 1H), 2.54 (spt, J=7.0 Hz, 1H), 2.25 (s, 3H), 0.98 (d, J=7.0 Hz, 3H), 0.95 (d, J=7.0 Hz, 3H).

2.3 4-[2-[6-Chloro-3-fluoro-2-(5-hydroxy-2,6-dimethyl-3-oxo-pyridazin-4-yl)phenyl]ethyl]benzonitrile (A-1.036)

[[5-[3-Chloro-2-[2-(4-cyanophenyl)ethyl]-6-fluoro-phenyl]-1,3-dimethyl-6-oxo-pyridazin-4-yl] 2-methylpropanoate (400 mg, 0.855 mmol) was dissolved in ethanol (6 mL). The mixture was treated with a solution of lithium hydroxide (108 mg, 2.56 mmol) in water (2 mL). The reaction was stirred at room temperature for 2 hrs.

The reaction mixture was concentrated in-vacuo to remove ethanol. The remaining aqueous solution was diluted with water (15 mL) then acidified to ~pH 3 with 2M HCl and extracted with DCM (3×10 mL). The combined organics were dried over MgSO₄, filtered and concentrated in vacuo to afford crude product.

The crude product was purified by column chromatography on silica gel (eluent an ethyl acetate/hexane gradient) to give 4-[2-[6-chloro-3-fluoro-2-(5-hydroxy-2,6-dimethyl-3-oxo-pyridazin-4-yl)phenyl]ethyl]benzonitrile (83 mg, 91% yield, A-1.036)) as a white solid.

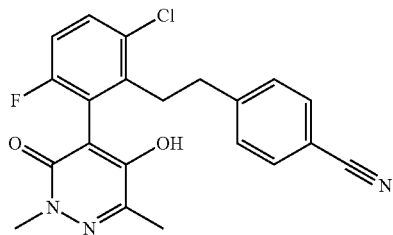 [SMILES: Cc1nn(C)c(=O)c(-c2c(F)ccc(Cl)c2CCc2ccc(C#N)cc2)c1O]

$^1$H NMR (400 MHz, CDCl₃) δ ppm 7.46-7.51 (m, 2H) 7.26-7.31 (m, 1H) 7.08 (d, J=8.19 Hz, 2H) 6.86 (t, J=8.50 Hz, 1H) 3.63 (s, 3H) 2.61-2.77 (m, 4H) 2.24 (s, 3H).

Example 4 Preparation of 4-[2-[6-chloro-3-fluoro-2-(5-hydroxy-2,6-dimethyl-3-oxo-pyridazin-4-yl)phenyl]ethyl]-N-ethyl-2-fluoro-N-methyl-benzamide (A-1.028)

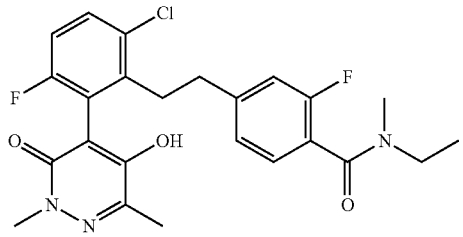 [SMILES: CCN(C)C(=O)c1ccc(CCc2c(Cl)ccc(F)c2-c2c(O)c(C)nn(C)c2=O)cc1F]

4.1 [5-[3-Chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate

[5-(2-Bromo-3-chloro-6-fluoro-phenyl)-1,3-dimethyl-6-oxo-pyridazin-4-yl] 2-methylpropanoate (5.00 g, 11.97 mmol, 1.0 eq), 6-methyl-2-vinyl-1,3,6,2-dioxazaborocane-4,8-dione (2.63 g, 14.36 mmol, 1.2 eq) and chloro[(tri-tert-butylphosphine)-2-(2-aminobiphenyl)] palladium(II) (307 mg, 0.60 mmol, 0.05 eq) were charged into a 250 ml round bottom flask fitted with a condenser, stirrer bar and nitrogen bubbler. THF (100 mL) was added followed by N,N-diisopropylethylamine (4.2 mL, 23.94 mmol, 2.0 eq) against a flow of nitrogen and the mixture heated to reflux for 3 h.

The reaction mixture was allowed to cool to room temperature then diluted in DCM and filtered through Celite®, washing with further portions of DCM. The eluent was then concentrated to dryness.

The crude product purified by flash column chromatography to afford [5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (5.91 g, 11.4 mmol, 95% yield) as an off white solid.

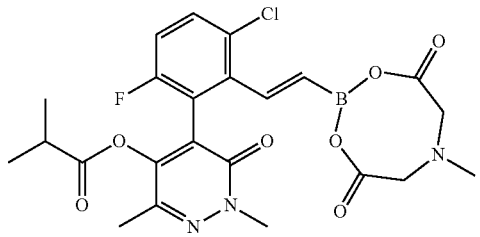 [SMILES: Cc1nn(C)c(=O)c(-c2c(F)ccc(Cl)c2/C=C/B2OC(=O)CN(C)CC(=O)O2)c1OC(=O)C(C)C]

$^1$H NMR (400 MHz, DMSO-d₆) δ=7.63 (dd, J=5.1, 8.9 Hz, 1H), 7.31 (t, J=8.9 Hz, 1H), 6.65 (d, J=18.3 Hz, 1H), 5.68 (d, J=18.3 Hz, 1H), 4.24 (dd, J=11.9, 17.2 Hz, 2H), 3.95-3.83 (m, 2H), 3.70 (s, 3H), 2.66 (spt, J=7.0 Hz, 1H), 2.16 (s, 3H), 0.90 (d, J=7.0 Hz, 3H), 0.89 (d, J=7.0 Hz, 3H)

4.2 [5-[3-Chloro-2-[2-[4-[ethyl(methyl)carbamoyl]-3-fluoro-phenyl]ethyl]-6-fluoro-phenyl]-1,3-dimethyl-6-oxo-pyridazin-4-yl] 2-methylpropanoate (A-3.028)

[5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (500 mg, 0.96 mmol), K₃PO₄ (886 mg, 3.85 mmol) and 1,1-bis(diphenylphosphino)ferrocene]dichloropalladium(II) dichloromethane complex [PdCl₂(dppf).DCM] (39 mg, 0.05 mmol) were added to a 20 mL microwave vial. THF (10 mL), 4-bromo-N-ethyl-2-fluoro-N-methyl-benzamide (500 mg, 1.92 mmol) and water (0.35 mL) were added then the reaction mixture was heated to 100° C. for 2 hours under microwave irradiation.

The reaction mixture was concentrated in vacuo to remove THF, then diluted with water (20 mL) and DCM (20 mL). The organic layer was separated and the aqueous layer extracted with DCM (3×5 mL). The combined organics were dried and concentrated in vacuo to give a crude residue which was purified by column chromatography on silica gel, eluting with a cyclohexane/ethyl acetate gradient, to give [5-[3-chloro-2-[(E)-2-[4-[ethyl(methyl)carbamoyl]-3-fluoro-phenyl]vinyl]-6-fluoro-phenyl]-1,3-dimethyl-6-oxo-pyridazin-4-yl] 2-methylpropanoate (397 mg, 76% yield, A-4.028) as an off white solid.

[5-[3-Chloro-2-[(E)-2-[4-[ethyl(methyl)carbamoyl]-3-fluoro-phenyl]vinyl]-6-fluoro-phenyl]-1,3-dimethyl-6-oxo-pyridazin-4-yl] 2-methylpropanoate (300 mg, 0.55 mmol) was subjected to catalytic hydrogenation in EtOAc (6 mL) over 5% Pd/C (50% wet) catalyst (0.12 g) at 3 bar H₂.

After 5.5 hrs, LC/MS showed complete reaction. The reaction mixture was filtered through a pad of Celite®, washing with ethyl acetate/methanol. The filtrate was concentrated in-vacuo to afford a crude residue.

The residue was adsorbed onto silica and purified by column chromatography on silica gel (eluent an ethyl acetate/hexane gradient) to give [5-[3-chloro-2-[2-[4-[ethyl(methyl)carbamoyl]-3-fluoro-phenyl]ethyl]-6-fluoro-phenyl]-1,3-dimethyl-6-oxo-pyridazin-4-yl] 2-methylpropanoate (285 mg, 95% yield, A-3.028) as a colourless gum.

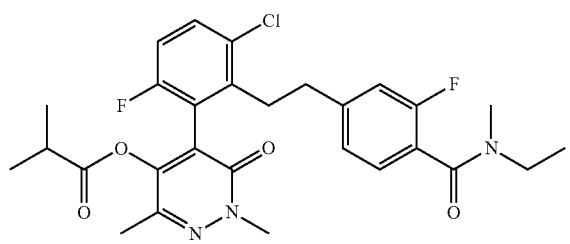 [SMILES: CCN(C)C(=O)c1ccc(CCc2c(Cl)ccc(F)c2-c2c(OC(=O)C(C)C)c(C)nn(C)c2=O)cc1F]

[NMR of mixture of rotamers] ¹H NMR (400 MHz, chloroform) δ=7.42 (dd, J=5.1, 8.9 Hz, 1H), [7.25 (t, J=7.2 Hz, 0.5H), 7.21 (t, J=7.5 Hz, 0.5H)], 6.99 (t, J=8.9 Hz, 1H), 6.96 (dd, J=1.2, 7.5 Hz, 1H), [6.89 (dd, J=1.2, 6.9 Hz, 1H), 6.86 (dd, J=1.2, 6.9 Hz, 1H)], 3.85 (s, 3H), [3.59 (q, J=7.4 Hz, 1H), 3.24 (q, J=7.4 Hz, 1H)], [3.08 (s, 1.5H), 2.90 (br s, 1.5H)], 2.88-2.78 (m, 3H), 2.75-2.64 (m, 1H), 2.55 (spt, J=7.0 Hz, 1H), 2.26 (s, 3H), [1.23 (t, J=7.2 Hz, 1.5H), 1.10 (t, J=7.2 Hz, 1.5H)], 0.98 (d, J=7.0 Hz, 3H), 0.96 (d, J=7.1 Hz, 3H)

4.3 4-[2-[6-Chloro-3-fluoro-2-(5-hydroxy-2,6-dimethyl-3-oxo-pyridazin-4-yl)phenyl]ethyl]-N-ethyl-2-fluoro-N-methyl-benzamide (A-1.028)

[5-[3-Chloro-2-[2-[4-[ethyl(methyl)carbamoyl]-3-fluoro-phenyl]ethyl]-6-fluoro-phenyl]-1,3-dimethyl-6-oxo-pyridazin-4-yl] 2-methylpropanoate (300 mg, 0.55 mmol) was dissolved in ethanol (3 mL). The mixture was treated with a solution of lithium hydroxide (69 mg, 1.65 mmol) in water (3 mL). The reaction was stirred at room temperature for 2 hrs.

The reaction mixture was concentrated in vacuo to remove ethanol. The remaining aqueous solution was diluted with water (15 mL) then acidified to ~pH 3 with 2M HCl and extracted with DCM (3×10 mL). The combined organics were dried and concentrated in-vacuo to afford crude product.

The crude product was purified by column chromatography on silica gel (eluent a DCM/methanol gradient) to give 4-[2-[6-chloro-3-fluoro-2-(5-hydroxy-2,6-dimethyl-3-oxo-pyridazin-4-yl)phenyl]ethyl]-N-ethyl-2-fluoro-N-methyl-benzamide (224 mg, 86% yield, A-1.028) as a white solid.

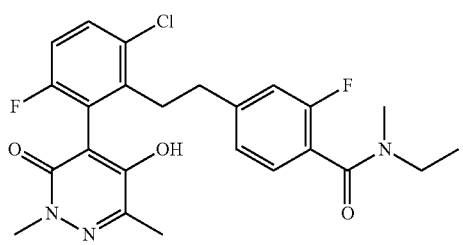 [SMILES: CCN(C)C(=O)c1ccc(CCc2c(Cl)ccc(F)c2-c2c(O)c(C)nn(C)c2=O)cc1F]

[NMR of mixture of rotamers] ¹H NMR (400 MHz, DMSO-d6) δ=10.86 (br s, 1H), 7.55-7.49 (m, 1H), 7.25-7.19 (m, 2H), 6.95-6.89 (m, 2H), 3.61 (s, 3H), 3.46 (q, J=7.1 Hz, 1H), 3.12 (q, J=7.1 Hz, 1H), 2.95 (s, 1.5H), 2.78 (s, 1.5H), 2.78-2.63 (m, 4H), 2.26 (s, 3H), 1.11 (t, J=7.1 Hz, 1.5H), 1.00 (t, J=7.1 Hz, 1.5H).

Example 5 Preparation of [5-[3-chloro-2-[(E)-2-(4-cyclopropylphenyl)vinyl]-6-fluoro-phenyl]-1,3-dimethyl-6-oxo-pyridazin-4-yl] 2-methylpropanoate (A-4.038)

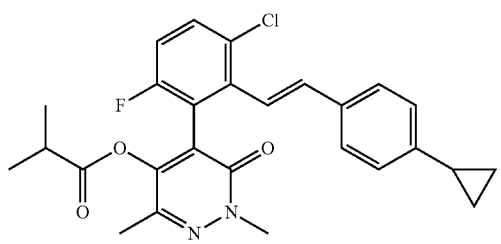 [SMILES: Cc1nn(C)c(=O)c(-c2c(F)ccc(Cl)c2/C=C/c2ccc(C3CC3)cc2)c1OC(=O)C(C)C]

5.1 [5-(3-Chloro-6-fluoro-2-vinyl-phenyl)-1,3-dimethyl-6-oxo-pyridazin-4-yl] 2-methylpropanoate

[5-(2-Bromo-3-chloro-6-fluoro-phenyl)-1,3-dimethyl-6-oxo-pyridazin-4-yl] 2-methylpropanoate (4.177 g, 10.00 mmol, 1.0 eq) and tributyl(vinyl)stannane (4.384 mL, 15.00 mmol, 1.50 eq) were dissolved in toluene (60.00 mL) then 1,1-bis(diphenylphosphino)ferrocene]dichloropalladium(II) dichloromethane complex [PdCl₂(dppf).DCM] (408 mg, 0.50 mmol, 0.05 eq) was added. The reaction mixture was heated at reflux overnight.

The reaction mixture was allowed to cool to room temperature then concentrated in vacuo. The crude product was then purified by flash column chromatography to afford [5-(3-chloro-6-fluoro-2-vinyl-phenyl)-1,3-dimethyl-6-oxo-pyridazin-4-yl] 2-methylpropanoate as an off-white solid (3.02 g, 83% yield).

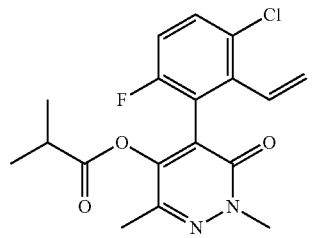 [SMILES: C=Cc1c(Cl)ccc(F)c1-c1c(OC(=O)C(C)C)c(C)nn(C)c1=O]

¹H NMR (400 MHz, CDCl₃) δ=7.40 (dd, J=5.1, 8.7 Hz, 1H), 6.99 (t, J=8.7 Hz, 1H), 6.65 (dd, J=11.6, 17.6 Hz, 1H), 5.37-5.30 (m, 2H), 3.79 (s, 3H), 2.59 (spt, J=7.0 Hz, 1H), 2.23 (s, 3H), 1.04 (d, J=7.0 Hz, 4H), 1.03 (d, J=7.0 Hz, 1H)

5.2 [5-[3-Chloro-2-[(E)-2-(4-cyclopropylphenyl)vinyl]-6-fluoro-phenyl]-1,3-dimethyl-6-oxo-pyridazin-4-yl] 2-methylpropanoate (A-4.038)

A stirred mixture of [5-(3-chloro-6-fluoro-2-vinyl-phenyl)-1,3-dimethyl-6-oxo-pyridazin-4-yl]2-methylpropanoate (300 mg, 1.0 eq), chloro[(tri-tert-butylphosphine)-2-(2-aminobiphenyl)]palladium(II) (21 mg, 0.05 eq), 1-bromo-4-cyclopropylbenzene (243 mg, 1.5 eq) and N,N-diisopropylethylamine (0.29 mL, 2.0 eq) in toluene (5 mL) under nitrogen was heated at reflux for 3 hrs.

The reaction mixture was allowed to cool to room temperature then diluted with DCM and filtered through a pad of Celite, eluting with further portions of DCM. The filtrate was concentrated in vacuo to give the crude product.

The crude product was purified by flash column chromatography to give [5-[3-chloro-2-[(E)-2-(4-cyclopropylphenyl)vinyl]-6-fluoro-phenyl]-1,3-dimethyl-6-oxo-pyridazin-4-yl] 2-methylpropanoate (285 mg, 72% yield) as a pale yellow gum.

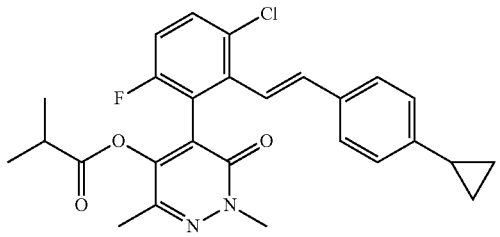 [SMILES: Cc1nn(C)c(=O)c(-c2c(F)ccc(Cl)c2/C=C/c2ccc(C3CC3)cc2)c1OC(=O)C(C)C]

$^1$H NMR (400 MHz, CDCl$_3$) δ=7.41 (dd, J=5.1, 8.9 Hz, 1H), 7.26-7.22 (m, 2H), 7.02-6.98 (m, 2H), 6.99 (t, J=8.9 Hz, 1H), 6.93 (d, J=16.5 Hz, 1H), 6.59 (d, J=16.5 Hz, 1H), 3.71 (s, 3H), 2.62 (spt, J=7.0 Hz, 1H), 2.19 (s, 3H), 1.87 (tt, J=5.0, 8.4 Hz, 1H), 1.07 (d, J=7.0 Hz, 3H), 1.06 (d, J=7.0 Hz, 1H), 0.99-0.93 (m, J=2.0, 8.4 Hz, 2H), 0.73-0.64 (m, 2H).

Example 6 Preparation of 4-[3-chloro-6-fluoro-2-[2-(4-methylsulfanylphenyl)ethyl]-phenyl]-5-hydroxy-2,6-dimethyl-pyridazin-3-one (A-1.039)

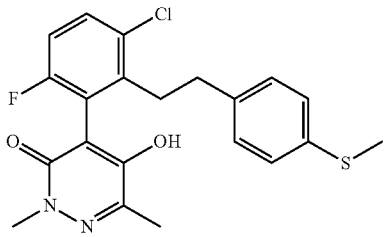 [SMILES: CSc1ccc(CCc2c(Cl)ccc(F)c2-c2c(O)c(C)nn(C)c2=O)cc1]

6.1 [5-[3-Chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate An oven-dried round-bottom flask was then charged with Ir(COD)Cl$_2$ (299 mg, 0.45 mmol) and 4-diphenylphosphanylbutyl(diphenyl)phosphane (0380 mg, 0.89 mmol). The flask was evacuated and backfilled with nitrogen (×3), then THF (75 mL) was added and the reaction was stirred at room temperature for 30 mins. A solution of [5-(3-chloro-6-fluoro-2-vinyl-phenyl)-1,3-dimethyl-6-oxo-pyridazin-4-yl] 2-methylpropanoate [prepared as described in Example 4] (6.7 g, 17.8 mmol) in THF was added dropwise and the mixture was stirred for 10 mins, followed by the dropwise addition of 4,4,5,5-tetramethyl-1,3,2-dioxaborolane (3.02 mL, 20.8 mmol). The reaction was stirred at 60° C. overnight.

After 24 h, the reaction was allowed to cool to room temperature then concentrated in vacuo. The crude product was purified by column chromatography on silica gel, eluting with a cyclohexane/ethylacetate gradient, to give [5-[3-chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate (4.50 g, 51% yield) as a yellow solid.

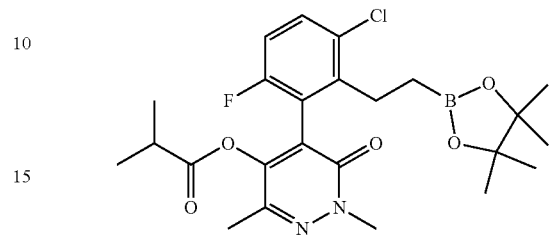

$^1$H NMR (500 MHz, chloroform) δ=7.35 (dd, J=5.2, 8.9 Hz, 1H), 6.90 (t, J=8.6 Hz, 1H), 3.81 (s, 3H), 2.59 (t, J=8.5 Hz, 2H), 2.53 (spt, J=7.0 Hz, 1H), 2.24 (s, 3H), 1.32-1.16 (m, 12H), 1.08-1.00 (m, 2H), 0.98 (d, J=7.0 Hz, 3H), 0.94 (d, J=7.0 Hz, 3H).

6.2 4-[3-Chloro-6-fluoro-2-[2-(4-methylsulfanylphenyl)ethyl]phenyl]-5-hydroxy-2,6-dimethyl-pyridazin-3-one (A-1.039)

[5-[3-Chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate (100 mg, 0.20 mmol), 1-bromo-4-methylsulfanyl-benzene (62 mg, 0.30 mmol), chloro(2-dicyclohexylphosphino-2',6'-diisopropoxy-1,1'-biphenyl)[2-(2'-amino-1,1'-biphenyl)]palladium(II) (24 mg, 0.03 mmol), K$_2$CO$_3$ (84 mg, 0.61 mmol), 1,4-dioxane (2 mL) and water (0.2 mL) were combined in a 5 mL microwave vial. The reaction mixture was then heated at 140° C. for 90 minutes under microwave irradiation.

The reaction mixture was allowed to cool to room temperature then diluted with water (10 mL), acidified to ~pH 3 with 2M HCl and extracted with DCM (4×). The combined organics were concentrated in vacuo to give the crude product was purified by mass-directed reverse-phase HPLC to afford 4-[3-chloro-6-fluoro-2-[2-(4-methylsulfanylphenyl)ethyl]phenyl]-5-hydroxy-2,6-dimethyl-pyridazin-3-one as a white solid (22 mg, 22% yield, A-1.039).

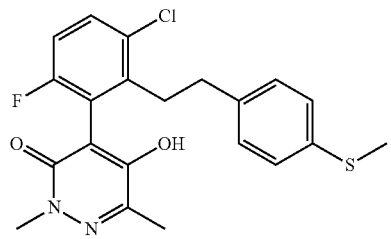 [SMILES: CSc1ccc(CCc2c(Cl)ccc(F)c2-c2c(O)c(C)nn(C)c2=O)cc1]

$^1$H NMR (400 MHz, chloroform) δ=7.46-7.39 (m, 3H), 7.12 (d, J=8.0 Hz, 2H), 6.98 (t, J=8.6 Hz, 1H), 6.90 (d, J=8.0 Hz, 2H), 3.73 (s, 3H), 2.84-2.64 (m, 4H), 2.45 (s, 3H), 2.29 (s, 3H).

Example 7 Preparation of 4-[3-chloro-6-fluoro-2-[2-[4-(methylsulfanylmethyl)phenyl]ethyl]phenyl]-5-hydroxy-2,6-dimethyl-pyridazin-3-one (A-1.388)

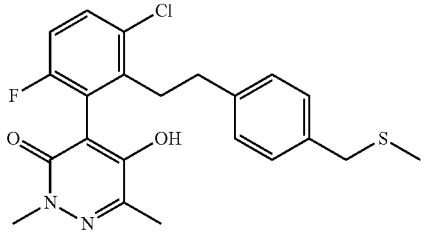 [SMILES: CSCc1ccc(CCc2c(Cl)ccc(F)c2-c2c(O)c(C)nn(C)c2=O)cc1]

7.1 4-[3-chloro-6-fluoro-2-[(E)-2-[4-(methylsulfanylmethyl)phenyl]vinyl]phenyl]-5-hydroxy-2,6-dimethyl-pyridazin-3-one

[5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (500 mg, 0.96 mmol), 1-bromo-4-(methylsulfanylmethyl)benzene (324 mg, 1.44 mmol), 1,1-bis(diphenylphosphino)ferrocene]dichloropalladium(II) dichloromethane complex [PdCl$_2$(dppf) .DCM] (41 mg, 0.05 mmol) and POTASSIUM CARBONATE (417 mg, 2.89 mmol) were added to a 10-20 ml microwave vial under an atmosphere of nitrogen. De-gassed acetonitrile (11.5 mL) and water (2.9 mL) were added and the mixture heated to 150° C. for 20 min under microwave irradiation.

The reaction mixture was concentrated to dryness. The residue was treated with water (20 ml) and the aqueous phase acidified to pH 3 by addition of 2M HCl leading to formation of a precipitate. DCM (20 ml) was added to take up the precipitate. Brine (20 ml) was added and the phases separated. The aqueous phase was extracted with two further portions of DCM then the combined organic extracts were dried and concentrated directly onto silica. The crude material was purified by automated flash chromatography on silica gel, eluting with a cyclohexane/ethyl acetate gradient to give 4-[3-chloro-6-fluoro-2-[(E)-2-[4-(methylsulfanylmethyl)phenyl]vinyl]phenyl]-5-hydroxy-2,6-dimethyl-pyridazin-3-one (341 mg, 82% yield) as an off-white solid.

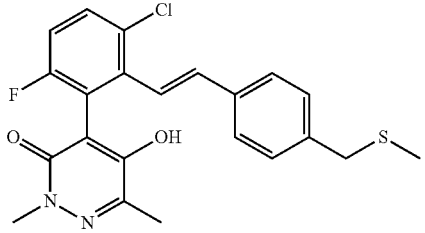 [SMILES: CSCc1ccc(/C=C/c2c(Cl)ccc(F)c2-c2c(O)c(C)nn(C)c2=O)cc1]

$^1$H NMR (500 MHz, DMSO-d$_6$) δ=10.78 (br s, 1H), 7.60 (dd, J=5.2, 8.7 Hz, 1H), 7.30-7.24 (m, 5H), 6.93 (d, J=16.5 Hz, 1H), 6.56 (d, J=16.5 Hz, 1H), 3.67 (s, 2H), 3.54 (s, 3H), 2.19 (s, 3H), 1.94 (s, 3H)

7.2 4-[3-chloro-6-fluoro-2-[2-[4-(methylsulfanylmethyl)phenyl]ethyl]phenyl]-5-hydroxy-2,6-dimethyl-pyridazin-3-one (A-1.388)

To a solution of 4-[3-chloro-6-fluoro-2-[(E)-2-[4-(methylsulfanylmethyl)phenyl]vinyl]phenyl]-5-hydroxy-2,6-dimethyl-pyridazin-3-one (335 mg, 0.78 mmol) in tetrahydrofuran (12 ml) under a nitrogen atmosphere, was added N,N-Diisopropylethylamine (1.08 ml, 6.20 mmol). The stirred reaction mixture was heated to 70° C. and 2,4,6-Triisopropylbenzenesulfonyl hydrazide (2.06 g, 6.21 mmol) was added portionwise over 6 h then the mixture heated to reflux for 16 h. Additional N,N-Diisopropylethylamine (0.68 ml, 3.89 mmol) was added to the reaction mixture, followed by 2,4,6-Triisopropylbenzenesulfonyl hydrazide (1.29 g, 3.89 mmol) and the mixture heated to reflux for a further 6 h.

The reaction mixture was allowed to cool to room temperature, then concentrated directly onto silica. The crude material was partially purified by automated flash chromatography on silica gel eluting with a cyclohexane/ethyl acetate gradient. The material obtained was further purified by mass-directed reverse-phase HPLC to afford 4-[3-chloro-6-fluoro-2-[2-[4-(methylsulfanylmethyl)phenyl]ethyl]phenyl]-5-hydroxy-2,6-dimethyl-pyridazin-3-one as a white solid (208 mg, 62% yield, A-1.388)

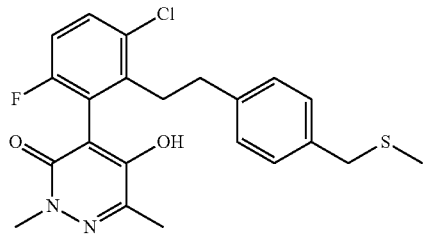 [SMILES: CSCc1ccc(CCc2c(Cl)ccc(F)c2-c2c(O)c(C)nn(C)c2=O)cc1]

$^1$H NMR (400 MHz, d6-DMSO), δ=10.83 (s, 1H), 7.56-7.53 (m, 1H), 7.23-7.16 (m, 3H), 6.96-6.94 (d, 2H), 3.62 (s, 2H), 3.60 (s, 3H), 2.68-2.54 (m, 4H), 2.26 (s, 3H), 1.92 (s, 3H)

Example 8 4-[3-chloro-6-fluoro-2-[2-[4-(1,2,4-triazol-1-yl)phenyl]ethyl]phenyl]-5-hydroxy-2,6-dimethyl-pyridazin-3-one (A-1.385)

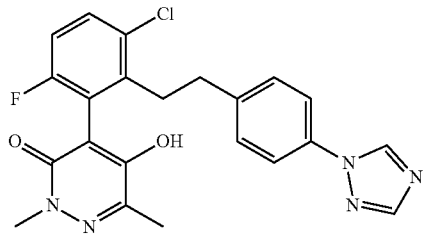 [SMILES: Cc1nn(C)c(=O)c(-c2c(F)ccc(Cl)c2CCc2ccc(-n3cncn3)cc2)c1O]

8.1 [4-(1,2,4-triazol-1-yl)phenyl]trifluoromethanesulfonate 4-(1,2,4-triazol-1-yl)phenol (1.22 g, 7.57 mmol) was dissolved dichloromethane (10 ml) under nitrogen and cooled to ~0° C. A solution of pyridine (1.22 ml, 15.1 mmol) in dichloromethane (5 ml) was added dropwise over ~2 minutes. The mixture was stirred 5 minutes, then a solution of trifluoromethanesulfonic anhydride (1.53 ml, 9.08 mmol) in dichloromethane (5 ml) was added dropwise over ~2 minutes. Cooling was removed and the reaction mixture allowed to warm to room temperature then stirred at room temperature for 16 h.

The reaction was quenched by addition of 2M HCl aq. (20 ml), then the organic phase separated. The aqueous phase was further extracted with dichloromethane (2×20 ml). The combined organics were washed with water (20 ml), dried, then concentrated under reduced pressure to give a cream solid. The crude material was purified by automated flash chromatography on silica eluting with a cyclohexane/ethyl acetate gradient to give [4-(1,2,4-triazol-1-yl)phenyl]trifluoromethanesulfonate as a white solid (2.02 g, 91% yield).

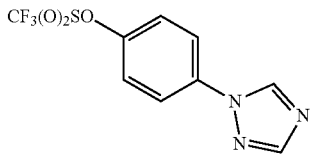

¹H NMR (400 MHz, chloroform) δ=8.59 (s, 1H), 8.14 (s, 1H), 7.86-7.78 (m, 2H), 7.50-7.41 (m, 2H).

8.2 [5-[3-chloro-6-fluoro-2-[(E)-2-[4-(1,2,4-triazol-1-yl)phenyl]vinyl]phenyl]-1,3-dimethyl-6-oxo-pyridazin-4-yl] 2-methylpropanoate

[5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (500 mg, 0.96 mmol), 1,1-bis(diphenylphosphino)ferrocene]dichloropalladium(II) dichloromethane complex [PdCl₂(dppf).DCM] (39 mg, 0.048 mmol), [4-(1,2,4-triazol-1-yl)phenyl]trifluoromethanesulfonate (367 mg, 1.25 mmol) and potassium phosphate (834 mg, 3.85 mmol) were added to a 10-20 ml microwave vial.

Tetrahydrofuran (10 ml) and water (0.5 ml) were added, then the reaction mixture degassed by stirring under vacuum then back-filling with nitrogen (×3). The reaction mixture heated in the microwave at 120° C. for 60 mins under microwave irradiation.

The reaction mixture was filtered through a plug of Celite®, washing through with EtOAc & EtOH. The filtrate was concentrated under reduced pressure to give a brown gum (840 mg). The crude material was purified by automated flash chromatography on silica gel eluting with a cyclohexane/ethyl acetate gradient to give a pale yellow gum (389 mg). The purified material was dissolved in acetonitrile (10 ml) and treated with SiliCycle SiliaMetS® Thiol (SH) metal scavenger resin (365 mg) at room temperature. The suspension was stirred at room temperature for 3 h, then filtered to remove the resin, washing with further acetonitrile. The filtrate was concentrated in vacuo to provide [5-[3-chloro-6-fluoro-2-[(E)-2-[4-(1,2,4-triazol-1-yl)phenyl]vinyl]phenyl]-1,3-dimethyl-6-oxo-pyridazin-4-yl] 2-methylpropanoate as a colourless gum (361 mg, 73% yield).

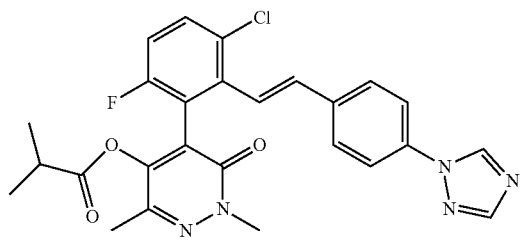 [SMILES: Cc1nn(C)c(=O)c(-c2c(F)ccc(Cl)c2/C=C/c2ccc(-n3cncn3)cc2)c1OC(=O)C(C)C]

¹H NMR (400 MHz, chloroform) δ ppm 8.55 (s, 1H), 8.11 (s, 1H), 7.60-7.66 (m, 2H), 7.42-7.53 (m, 3H), 7.01-7.10 (m, 2H), 6.69 (d, J=16.5 Hz, 1H), 3.70 (s, 3H), 2.66 (spt, J=7.0 Hz, 1H), 2.23 (s, 3H), 1.11 (d, J=7.0 Hz, 1H), 1.08 (d, J=7.1 Hz, 1H)

8.3 [5-[3-chloro-6-fluoro-2-[2-[4-(1,2,4-triazol-1-yl)phenyl]ethyl]phenyl]-1,3-dimethyl-6-oxo-pyridazin-4-yl] 2-methylpropanoate (A-3.385)

[5-[3-chloro-6-fluoro-2-[(E)-2-[4-(1,2,4-triazol-1-yl)phenyl]vinyl]phenyl]-1,3-dimethyl-6-oxo-pyridazin-4-yl] 2-methylpropanoate (365 mg, 0.72 mmol) was subjected to catalytic hydrogenation in EtOAc (10 mL) over 5% Pd/C (50% wet) catalyst (0.15 g) at 3 bar H₂ for 24 h.

The reaction mixture was filtered through a pad of Celite®, washing with ethyl acetate. The filtrate was concentrated in-vacuo to afford a crude residue (350 mg) which was adsorbed onto silica and purified by automated flash chromatography on silica gel, eluting with a cyclohexane/ethyl acetate gradient. [5-[3-chloro-6-fluoro-2-[2-[4-(1,2,4-triazol-1-yl)phenyl]ethyl]phenyl]-1,3-dimethyl-6-oxo-pyridazin-4-yl] 2-methylpropanoate (A-3.385) was obtained as a colourless gum (321 mg, 88% yield).

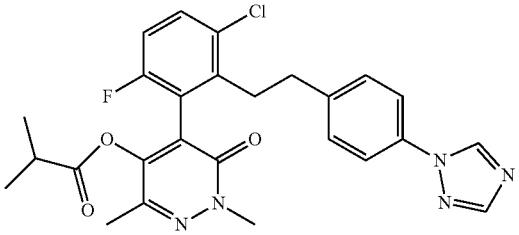 [SMILES: Cc1nn(C)c(=O)c(-c2c(F)ccc(Cl)c2CCc2ccc(-n3cncn3)cc2)c1OC(=O)C(C)C]

¹H NMR (400 MHz, chloroform) δ=8.51 (s, 1H), 8.09 (s, 1H), 7.55 (d, J=8.2 Hz, 2H), 7.43 (dd, J=5.2, 8.7 Hz, 1H), 7.27 (d, J=8.2 Hz, 2H), 7.00 (t, J=8.7 Hz, 1H), 3.84 (s, 3H), 2.97-2.80 (m, 3H), 2.79-2.67 (m, 1H), 2.55 (spt, J=7.0 Hz, 1H), 2.25 (s, 3H), 0.98 (d, J=7.0 Hz, 3H), 0.96 (d, J=7.0 Hz, 1H)

8.4 4-[3-chloro-6-fluoro-2-[2-[4-(1,2,4-triazol-1-yl)phenyl]ethyl]phenyl]-5-hydroxy-2,6-dimethyl-pyridazin-3-one (A-1.385)

[5-[3-chloro-6-fluoro-2-[2-[4-(1,2,4-triazol-1-yl)phenyl]ethyl]phenyl]-1,3-dimethyl-6-oxo-pyridazin-4-yl] 2-methylpropanoate (320 mg, 0.63 mmol) stirred in ethanol (5 ml) at room temperature.

A solution of lithium hydroxide monohydrate (81 mg, 1.88 mmol) in water (2 ml) was added dropwise and the reaction stirred at room temperature for 1 h.

The ethanol solvent was removed under reduced pressure, then residue diluted with water (20 ml). The aqueous phase was acidified to ~pH 3-4 by the addition of 2M HCl (aq.), then extracted with EtOAc (3×10 ml). The combined organic extracts were concentrated under reduced pressure to give a white solid (292 mg). The crude residue was purified by automated flash chromatography on silica, eluting with a cyclohexane/ethyl acetate and ethyl acetate/ethanol gradient to afford 4-[3-chloro-6-fluoro-2-[2-[4-(1,2,4-triazol-1-yl)phenyl]ethyl]phenyl]-5-hydroxy-2,6-dimethyl-pyridazin-3-one (A-1.365) as a white solid (260 mg, 94% yield).

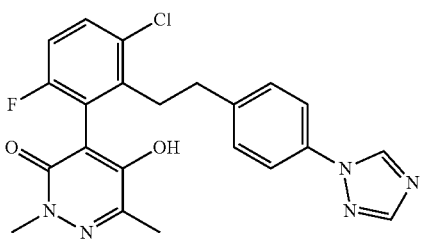 [SMILES: Cc1nn(C)c(=O)c(-c2c(F)ccc(Cl)c2CCc2ccc(-n3cncn3)cc2)c1O]

$^1$H NMR (400 MHz, methanol), δ ppm 9.03 (s, 1H), 8.14 (s, 1H), 7.65-7.70 (m, 2H), 7.51 (dd, J=5.2, 8.7 Hz, 1H), 7.20 (m, 2H), 7.11 (t, J=8.7 Hz, 1H), 3.72 (s, 3H), 2.72-2.89 (m, 4H), 2.32 (s, 3H)

Example 9 4-[3-cyclopropyl-6-fluoro-2-[2-(2-fluoro-4-pyridyl)ethyl]phenyl]-5-hydroxy-2,6-dimethyl-pyridazin-3-one (C-1.013)

[5-[3-chloro-6-fluoro-2-[2-(2-fluoro-4-pyridyl)ethyl]phenyl]-1,3-dimethyl-6-oxo-pyridazin-4-yl] 2-methylpropanoate (250 mg, 0.54 mmol), tripotassium phosphate monohydrate (374 mg., 1.62 mmol) and RuPhos Pd G2 (42 mg, 0.05 mmol) were charged into a 2-5 ml microwave vial equipped with a stirrer bar. The reaction vessel was evacuated and back filled with nitrogen (×3). 1,4-dioxane (4 ml) was added followed by cyclopropylboronic acid (139 mg, 1.62 mmol) and water (1 ml) (both solvents degassed). The mixture was then heated to 120° C. for 1 h under microwave irradiation.

The reaction was cooled to room temperature, before additional cyclopropylboronic (139 mg, 1.62 mmol) and RuPhos Pd G2 (42 mg, 0.05 mmol) were added and the reaction heated to 120° C. for a further 2.5 hours:

The reaction mixture was concentrated in vacuo to remove the dioxane. The residue was diluted with water (20 ml) and DCM (20 mL) and the layers separated. The aqueous phase was extracted with further portions of DCM (3×5 ml) then the combined organic extracts dried and concentrated to give a dark solid (331 mg)

The crude residue was purified by mass-directed reverse-phase HPLC to afford 4-[3-cyclopropyl-6-fluoro-2-[2-(2-fluoro-4-pyridyl)ethyl]phenyl]-5-hydroxy-2,6-dimethyl-pyridazin-3-one (C-1.013) as a white solid

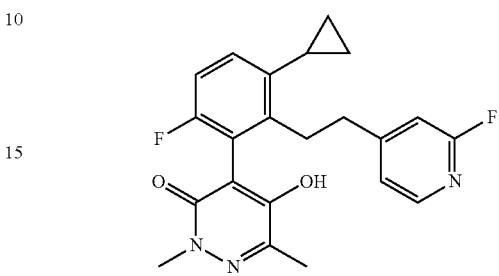

$^1$H NMR (400 MHz, methanol) δ=8.01 (d, J=5.1 Hz, 1H), 7.13 (dd, J=5.6, 8.3 Hz, 1H), 7.02-6.93 (m, 2H), 6.72 (br s, 1H), 3.72 (s, 3H), 3.02-2.75 (m, 4H), 2.32 (s, 3H), 1.97-1.87 (m, 1H), 1.02-0.89 (m, 2H), 0.74-0.61 (m, 2H)

Compounds A-1.023, A-1.024, A-1.025, A-1.026, A-1.027, A-1.028, A-1.029, A-1.030, A-1.031, A-1.032, A-1.033, A-1.034, A-1.035, A-1.036, A-1.037, A-1.038, A-1.039, A-1.040, A-1.041, A-1.042, A-1.043, A-1.044, A-2.027, A-2.030, A-2.037, A-3.028, A-3.029, A-3.030, A-3.035, A-3.036, A-3.038, A-4.029, A-4.030, A-4.035, A-4.036, A-1.373, A-1.374, A-1.375, A-1.376, A-1.377, A-1.378, A-1.379, A-1.380, A-1.381, A-1.382, A-1.383, A-1.384, A-1.386, A-1.387, A-1.389, A-1.390, A-1.391 and A-1.392 were prepared using the general methods as described supra. Table 4 below shows the structure of these compounds and NMR characterising data.

TABLE 4

Preparation examples of compounds of formula (I). The numbering system used to describe the positions of X and Y is shown for the purposes of clarity only.

(I)

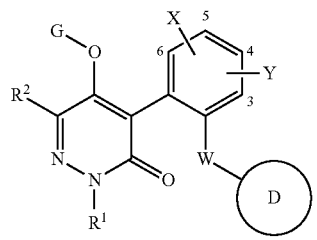

| Compound | R$^1$ | R$^2$ | G | X | Y | W | D | NMR details |
|---|---|---|---|---|---|---|---|---|
| A-1.023 | —Me | —Me | —H | 6-F | 3-Cl | —CH$_2$—CH$_2$— | 4-oxazol-5-ylphenyl- | $^1$H NMR (400 MHz, methanol) δ = 8.22 (s, 1H), 7.63-7.56 (m, 2H), 7.51 (dd, J = 5.2, 8.9 Hz, 1H), 7.45 (s, 1H), 7.14-7.07 (m, 3H), 3.72 (s, 3H), 2.86-2.66 (m, 4H), 2.32 (s, 3H). |
| A-1.024 | —Me | —Me | —H | 6-F | 3-Cl | —CH$_2$—CH$_2$— | 4-acetamidophenyl- | $^1$H NMR (400 MHz, methanol) δ = 7.50 (dd, J = 5.3, 8.6 Hz, 1H), 7.38 (d, J = 8.4 Hz, 2H), 7.09 (t, J = 8.6 Hz, |

TABLE 4-continued

Preparation examples of compounds of formula (I). The numbering system used to describe the positions of X and Y is shown for the purposes of clarity only.

(I)

| Compound | R¹ | R² | G | X | Y | W | D | NMR details |
|---|---|---|---|---|---|---|---|---|
| A-1.025 | —Me | —Me | —H | 6-F | 3-Cl | —CH₂—CH₂— | 4-(dimethylsulfamoyl)phenyl- | 1H), 6.94 (d, J = 8.4 Hz, 2H), 3.72 (s, 3H), 2.74 (s, 4H), 2.33 (s, 3H), 2.09 (s, 3H) <br> ¹H NMR (500 MHz, DMSO-d6) δ = 10.86 (br s, 1H), 7.62 (d, J = 8.3 Hz, 2H), 7.53 (dd, J = 5.2, 8.8 Hz, 1H), 7.29 (d, J = 8.3 Hz, 2H), 7.22 (t, J = 8.8 Hz, 1H), 3.61 (s, 3H), 2.83-2.64 (m, 4H), 2.57 (s, 6H), 2.26 (s, 3H) |
| A-1.026 | —Me | —Me | —H | 6-F | 3-Cl | —CH₂—CH₂— | 4-tert-butylphenyl- | ¹H NMR (400 MHz, DMSO-d6) δ = 10.86 (br s, 1H), 7.57 (dd, J = 5.1, 8.9 Hz, 1H), 7.28 (d, J = 8.3 Hz, 2H), 7.22 (t, J = 8.9 Hz, 1H), 6.93 (d, J = 8.3 Hz, 2H), 3.62 (s, 3H), 2.70-2.53 (m, 4H), 2.27 (s, 3H), 1.24 (s, 9H) |
| A-1.027 | —Me | —Me | —H | 6-F | 3-Cl | —CH₂—CH₂— | 4-biphenyl- | ¹H NMR (400 MHz, chloroform) δ = 7.57-7.52 (m, 2H), 7.50-7.40 (m, 5H), 7.37-7.30 (m, 1H), 7.07 (d, J = 8.2 Hz, 2H), 7.02 (t, J = 8.6 Hz, 1H), 5.47 (s, 1H), 3.75 (s, 3H), 2.88-2.80 (m, 3H), 2.27 (s, 3H) |
| A-1.028 | —Me | —Me | —H | 6-F | 3-Cl | —CH₂—CH₂— | 4-[ethyl(methyl)carbamoyl]-3-fluoro-phenyl- | ¹H NMR (400 MHz, DMSO-d6) δ = 10.86 (br s, 1H), 7.55-7.49 (m, 1H), 7.25-7.19 (m, 2H), 6.95-6.89 (m, 2H), 3.61 (s, 3H), 3.46 (q, J = 7.1 Hz, 1H), 3.12 (q, J = 7.1 Hz, 1H), 2.95 (s, 1.5H), 2.78 (s, 1.5H), 2.78-2.63 (m, 4H), 2.26 (s, 3H), 1.11 (t, J = 7.1 Hz, 1.5H), 1.00 (t, J = 7.1 Hz, 1.5H) |
| A-1.029 | —Me | —Me | —H | 6-F | 3-Cl | —CH₂—CH₂— | 2-cyanophenyl- | ¹H NMR (400 MHz, chloroform) δ = 7.51-7.44 (m, 2H), 7.33-7.24 (m, 3H + CHCl3 peak), 6.95 (t, J = 8.6 Hz, 1H), 3.69 (s, 3H), 2.95-2.79 (m, 4H), 2.30 (s, 3H). |
| A-1.030 | —Me | —Me | —H | 6-F | 3-Cl | —CH₂—CH₂— | 3-cyanophenyl- | ¹H NMR (400 MHz, chloroform) δ = 7.46 (td, J = 1.4, 7.6 Hz, 1H), 7.37 (dd, J = 5.2, 8.9 Hz, 1H), 7.35-7.28 |

TABLE 4-continued

Preparation examples of compounds of formula (I). The numbering system used to describe the positions of X and Y is shown for the purposes of clarity only.

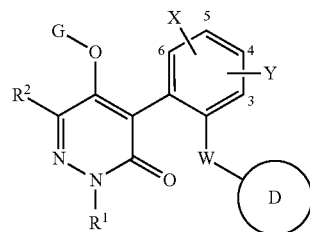

(I)

| Compound | $R^1$ | $R^2$ | G | X | Y | W | D | NMR details |
|---|---|---|---|---|---|---|---|---|
| A-1.031 | —Me | —Me | —H | 6-F | 3-Cl | —CH$_2$—CH$_2$— | 4-amino-3-methylphenyl- | (m, 2H), 7.26-7.23 (m, 1H), 6.95 (t, J = 8.6 Hz, 1H), 3.69 (s, 3H), 2.82-2.63 (m, 4H), 2.28 (s, 3H). $^1$H NMR (400 MHz, chloroform) δ ppm 2.09 (s, 3 H) 2.27 (s, 3 H) 2.50-2.83 (m, 4 H) 3.70 (s, 3 H) 6.52 (d, J = 7.83 Hz, 1 H) 6.59-6.73 (m, 2 H) 6.93 (t, J = 8.56 Hz, 1 H) 7.38 (dd, J = 8.86, 5.20 Hz, 1 H) |
| A-1.032 | —Me | —Me | —H | 6-F | 3-Cl | —CH$_2$—CH$_2$— | 4-methylsulfonylphenyl- | $^1$H NMR (400 MHz, DMSO-d6) δ = 10.86 (br s, 1H), 7.81 (app. d, J = 8.3 Hz, 2H), 7.56 (dd, J = 5.2, 8.6 Hz, 1H), 7.29 (app. d, J = 8.3 Hz, 2H), 7.23 (t, J = 8.6 Hz, 1H), 3.61 (s, 3H), 3.17 (s, 3H), 2.86-2.63 (m, 4H), 2.26 (s, 3H) |
| A-1.033 | —Me | —Me | —H | 6-F | 3-Cl | —CH$_2$—CH$_2$— | 4-dimethylaminophenyl- | $^1$H NMR (400 MHz, chloroform) δ ppm 2.27 (s, 3 H) 2.62-2.77 (m, 3 H) 2.80-2.87 (m, 1 H) 2.90 (s, 6 H) 3.72 (s, 3 H) 6.59-6.65 (m, 2 H) 6.86 (d, J = 8.68 Hz, 2 H) 6.96 (t, J = 8.56 Hz, 1 H) 7.42 (dd, J = 8.80, 5.14 Hz, 1 H) |
| A-1.034 | —Me | —Me | —H | 6-F | 3-Cl | —CH$_2$—CH$_2$— | 4-methylaminophenyl- | $^1$H NMR (400 MHz, chloroform) δ ppm 2.28 (s, 3 H) 2.80 (s, 7 H) 3.73 (s, 3 H) 6.49 (d, J = 8.44 Hz, 2 H) 6.81 (d, J = 8.44 Hz, 2 H) 6.97 (t, J = 8.56 Hz, 1 H) 7.42 (dd, J = 8.80, 5.14 Hz, 1 H) |
| A-1.035 | —Me | —Me | —H | 6-F | 3-Cl | —CH$_2$—CH$_2$— | 4-tert-butoxyphenyl- | $^1$H NMR (400 MHz, chloroform) δ = 7.28 (dd, J = 5.2, 8.9 Hz, 1H), 6.82 (s, 5H), 3.62 (s, 3H), 2.73-2.50 (m, 4H), 2.23 (s, 3H) |
| A-1.036 | —Me | —Me | —H | 6-F | 3-Cl | —CH$_2$—CH$_2$— | 4-cyanophenyl- | $^1$H NMR (400 MHz, CDCl3) δ ppm 7.46-7.51 (m, 2 H) 7.26-7.31 (m, 1 H) 7.08 (d, J = 8.19 Hz, 2 H) 6.86 (t, J = 8.50 Hz, 1 H) 3.63 (s, 3 H) 2.61-2.77 (m, 4 H) 2.24 (s, 3 H) |

TABLE 4-continued

Preparation examples of compounds of formula (I). The numbering system used to describe the positions of X and Y is shown for the purposes of clarity only.

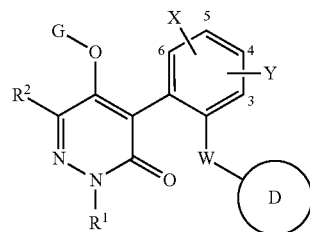
(I)

| Compound | R¹ | R² | G | X | Y | W | D | NMR details |
|---|---|---|---|---|---|---|---|---|
| A-1.037 | —Me | —Me | —H | 6-F | 3-Cl | —CH$_2$—CH$_2$— | 4-hydroxyphenyl- | $^1$H NMR (400 MHz, DMSO-d6) δ = 10.82 (br s, 1H), 9.17 (s, 1H), 7.54 (dd, J = 5.2, 8.9 Hz, 1H), 7.20 (t, J = 8.9 Hz, 1H), 6.82-6.75 (m, 2H), 6.65-6.60 (m, 2H), 3.61 (s, 3H), 2.69-2.43 (m, 4H), 2.26 (s, 3H) |
| A-1.038 | —Me | —Me | —H | 6-F | 3-Cl | —CH$_2$—CH$_2$— | 4-cyclopropylphenyl- | $^1$H NMR (400 MHz, chloroform) δ = 7.37 (dd, J = 5.2, 8.8 Hz, 1H), 6.96-6.88 (m, 2H), 6.91 (t, J = 8.8 Hz, 1H), 6.88-6.83 (m, 2H), 3.67 (s, 3H), 2.82-2.62 (m, 4H), 2.25 (s, 3H), 1.84 (tt, J = 5.0, 8.5 Hz, 1H), 0.95-0.88 (m, 2H), 0.68-0.60 (m, 2H) |
| A-1.039 | —Me | —Me | —H | 6-F | 3-Cl | —CH$_2$—CH$_2$— | 4-(methylsulfanyl)phenyl- | $^1$H NMR (400 MHz, chloroform) δ = 7.46-7.39 (m, 3H), 7.12 (d, J = 8.0 Hz, 2H), 6.98 (t, J = 8.6 Hz, 1H), 6.90 (d, J = 8.0 Hz, 2H), 3.73 (s, 3H), 2.84-2.64 (m, 4H), 2.45 (s, 3H), 2.29 (s, 3H) |
| A-1.040 | —Me | —Me | —H | 6-F | 3-Cl | —CH$_2$—CH$_2$— | 4-carboxyphenyl- | $^1$H NMR (400 MHz, methanol) δ = 7.88 (d, J = 8.4 Hz, 2H), 7.51 (dd, J = 5.2, 8.9 Hz, 1H), 7.11 (d, J = 8.0 Hz, 1H), 7.11 (t, J = 8.5 Hz, 1H), 3.74-3.70 (m, 3H), 2.88-2.70 (m, 3H), 2.34-2.26 (m, 3H) |
| A-1.041 | —Me | —Me | —H | 6-F | 3-Cl | —CH$_2$—CH$_2$— | 4-methoxycarbonylphenyl- | $^1$H NMR (400 MHz, chloroform) δ = 7.88 (d, J = 8.3 Hz, 2H), 7.40 (dd, J = 5.2, 8.9 Hz, 1H), 7.05 (d, J = 8.3 Hz, 2H), 6.96 (t, J = 8.9 Hz, 1H), 3.89 (s, 3H), 3.72 (s, 3H), 2.86-2.72 (m, 4H), 2.28 (s, 3H) |
| A-1.042 | —Me | —Me | —H | 6-F | 3-Cl | —CH$_2$—CH$_2$— | 4-(tert-butoxycarbonylamino)-3-fluoro-phenyl- | $^1$H NMR (400 MHz, methanol) δ = 7.66-7.55 (m, 1H), 7.48 (br dd, J = 5.3, 8.7 Hz, 1H), 7.08 (t, J = 8.7 Hz, 1H), 6.78-6.71 (m, 2H), 3.72 (s, 3H), 2.82-2.60 (m, 4H), 2.32 (s, 3H), 1.50 (s, 9H) |

TABLE 4-continued

Preparation examples of compounds of formula (I). The numbering system used to describe the positions of X and Y is shown for the purposes of clarity only.

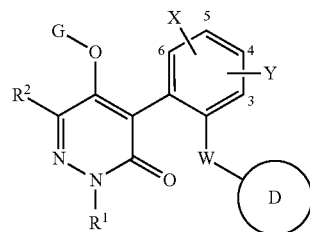

(I)

| Compound | R¹ | R² | G | X | Y | W | D | NMR details |
|---|---|---|---|---|---|---|---|---|
| A-1.043 | —Me | —Me | —H | 6-F | 3-Cl | —CH₂—CH₂— | 2-(methylsulfanyl)-4-pyridyl- | ¹H NMR (500 MHz, chloroform) δ ppm 2.30 (s, 3 H) 2.52 (s, 3 H) 2.69-2.80 (m, 1 H) 2.85-2.94 (m, 1 H) 2.96-3.09 (m, 2 H) 3.69 (s, 3 H) 6.85 (d, J = 5.54 Hz, 1 H) 6.89-6.97 (m, 2 H) 7.35 (dd, J = 8.77, 4.99 Hz, 1 H) 8.18 (d, J = 5.79 Hz, 1 H) |
| A-1.044 | —Me | —Me | —H | 6-F | 3-Cl | —CH₂—CH₂— | 2-acetamido-4-pyridyl- | ¹H NMR (400 MHz, chloroform) δ ppm 8.00 (d, J = 5.26 Hz, 1 H) 7.64 (br s, 1 H) 7.37 (br s, 1 H) 7.00 (br d, J = 1.10 Hz, 1 H) 6.78 (dd, J = 5.26, 1.34 Hz, 1 H) 3.73 (s, 3 H) 2.97 (br d, J = 9.66 Hz, 1 H) 2.73-2.88 (m, 3 H) 2.27 (s, 4 H) 2.16 (s, 3 H) |
| A-2.027 | —Me | —Me | —H | 6-F | 3-Cl | (E)-CH=CH— | 4-biphenyl- | ¹H NMR (400 MHz, chloroform) δ = 7.59-7.33 (m, 10H), 7.07 (t, J = 8.6 Hz, 1H), 7.01 (d, J = 16.4 Hz, 1H), 6.70 (d, J = 16.5 Hz, 1H), 5.63 (s, 1H), 3.73 (s, 3H), 2.28 (s, 3H) |
| A-2.030 | —Me | —Me | —H | 6-F | 3-Cl | (E)-CH=CH— | 3-cyanophenyl- | ¹H NMR (400 MHz, chloroform) δ = 7.56-7.47 (m, 3H), 7.44-7.38 (m, 2H), 7.04-6.93 (m, 2H), 6.53 (d, J = 16.5 Hz, 1H), 3.64 (s, 3H), 2.25 (s, 3H). |
| A-2.037 | —Me | —Me | —H | 6-F | 3-Cl | (E)-CH=CH— | 4-hydroxyphenyl- | ¹H NMR (400 MHz, DMSO-d6) δ = 10.75 (br s, 1H), 9.67 (s, 1H), 7.58 (dd, J = 5.3, 8.8 Hz, 1H), 7.23 (t, J = 8.8 Hz, 1H), 7.19-7.13 (m, 2H), 6.75-6.72 (m, 2H), 6.73 (d, J = 16.5 Hz, 1H), 6.48 (d, J = 16.5 Hz, 1H), 3.55 (s, 3H), 2.19 (s, 3H) |
| A-3.028 | —Me | —Me | —(C=O)iPr | 6-F | 3-Cl | —CH₂—CH₂— | 4-[ethyl(methyl)carbamoyl]-3-fluoro-phenyl- | ¹H NMR (400 MHz, chloroform) δ = 7.42 (dd, J = 5.1, 8.9 Hz, 1H), [7.25 (t, J = 7.2 Hz, 0.5H), 7.21 (t, J = 7.5 Hz, 0.5H)], 6.99 (t, J = 8.9 Hz, 1H), 6.96 (dd, J = 1.2, 7.5 Hz, 1H), [6.89 (dd, J = 1.2, 6.9 Hz, 1H), 6.86 (dd, J = 1.2, 6.9 Hz, 1H)], |

TABLE 4-continued

Preparation examples of compounds of formula (I). The numbering system used to describe the positions of X and Y is shown for the purposes of clarity only.

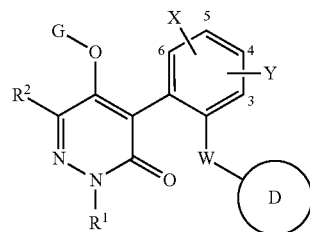

(I)

| Compound | R¹ | R² | G | X | Y | W | D | NMR details |
|---|---|---|---|---|---|---|---|---|
| A-3.029 | —Me | —Me | —(C=O)iPr | 6-F | 3-Cl | —CH₂—CH₂— | 2-cyanophenyl- | 3.85 (s, 3H), [3.59 (q, J = 7.4 Hz, 1H), 3.24 (q, J = 7.4 Hz, 1H)], [3.08 (s, 1.5H), 2.90 (br s, 1.5H)], 2.88-2.78 (m, 3H), 2.75-2.64 (m, 1H), 2.55 (spt, J = 7.0 Hz, 1H), 2.26 (s, 3H), 1.23 (t, J = 7.2 Hz, 1.5H), 1.10 (t, J = 7.2 Hz, 1.5H)], 0.98 (d, J = 7.0 Hz, 3H), 0.96 (d, J = 7.1 Hz, 3H) ¹H NMR (400 MHz, chloroform) δ = 7.56 (dd, J = 1.1, 7.7 Hz, 1H), 7.51-7.46 (m, 1H), 7.43 (dd, J = 5.1, 8.8 Hz, 1H), 7.32 (d, J = 7.7 Hz, 1H), 7.30-7.26 (m, 1H + CHCl3 peak), 7.01 (t, J = 8.6 Hz, 1H), 3.85 (s, 3H), 3.15-3.05 (m, 1H), 3.04-2.80 (m, 3H), 2.55 (spt, J = 7.0 Hz, 1H), 2.27 (s, 3H), 0.97 (dd, J = 1.1, 7.0 Hz, 6H). |
| A-3.030 | —Me | —Me | —(C=O)iPr | 6-F | 3-Cl | —CH₂—CH₂— | 3-cyanophenyl- | ¹H NMR (400 MHz, chloroform) δ = 7.50-7.46 (m, 1H), 7.46-7.37 (m, 3H), 7.37-7.31 (m, 1H), 7.00 (t, J = 8.6 Hz, 1H), 3.86 (s, 3H), 3.00-2.78 (m, 3H), 2.73-2.63 (m, 1H), 2.55 (quin, J = 7.0 Hz, 1H), 2.26 (s, 3H), 0.97 (dd, J = 7.0, 13.5 Hz, 6H). |
| A-3.035 | —Me | —Me | —(C=O)iPr | 6-F | 3-Cl | —CH₂—CH₂— | 4-tert-butoxyphenyl- | ¹H NMR (400 MHz, chloroform) δ = 7.40 (dd, J = 5.1, 8.8 Hz, 1H), 7.03-6.99 (m, 2H), 6.97 (t, J = 8.8 Hz, 1H), 6.90-6.83 (m, 2H), 3.84 (s, 3H), 2.85-2.68 (m, 4H), 2.55 (spt, J = 7.0 Hz, 1H), 2.25 (s, 3H), 1.32 (s, 9H), 0.97 (d, J = 7.0 Hz, 3H), 0.97 (d, J = 7.0 Hz, 3H) |
| A-3.036 | —Me | —Me | —(C=O)iPr | 6-F | 3-Cl | —CH₂—CH₂— | 4-cyanophenyl- | ¹H NMR (400 MHz, chloroform) δ = 7.56-7.51 (m, 2H), 7.42 (dd, J = 5.2, 8.9 Hz, 1H), 7.26-7.21 (m, 2H), 7.00 (t, J = 8.9 Hz, 1H), 3.84 (s, 3H), 3.02- |

TABLE 4-continued

Preparation examples of compounds of formula (I). The numbering system used to describe the positions of X and Y is shown for the purposes of clarity only.

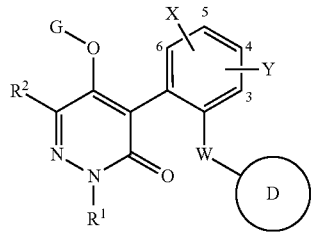

(I)

| Compound | R¹ | R² | G | X | Y | W | D | NMR details |
|---|---|---|---|---|---|---|---|---|
| A-3.038 | —Me | —Me | —(C=O)iPr | 6-F | 3-Cl | —CH₂—CH₂— | 4-cyclopropylphenyl- | 2.92 (m, 1H), 2.91-2.80 (m, 2H), 2.75-2.65 (m, 1H), 2.54 (spt, J = 7.0 Hz, 1H), 2.25 (s, 3H), 0.98 (d, J = 7.0 Hz, 3H), 0.95 (d, J = 7.0 Hz, 3H) ¹H NMR (400 MHz, chloroform) δ = 7.41 (dd, J = 5.2, 8.8 Hz, 1H), 7.04-7.00 (m, 2H), 6.98-6.94 (m, 2H), 6.97 (t, J = 8.8 Hz, 1H), 3.83 (s, 3H), 2.84-2.67 (m, 4H), 2.53 (spt, J = 7.0 Hz, 1H), 2.24 (s, 3H), 1.85 (tt, J = 5.1, 8.4 Hz, 1H), 0.96 (d, J = 7.0 Hz, 3H), 0.96 (d, J = 7.0 Hz, 3H), 0.94-0.88 (m, J = 1.9, 8.5 Hz, 2H), 0.68-0.61 (m, 2H) |
| A-4.029 | —Me | —Me | —(C=O)iPr | 6-F | 3-Cl | (E)-CH=CH— | 2-cyanophenyl- | ¹H NMR (400 MHz, chloroform) δ = 7.70 (d, J = 8.1 Hz, 1H), 7.61-7.53 (m, 2H), 7.46 (dd, J = 5.1, 8.9 Hz, 1H), 7.34 (dt, J = 1.0, 7.6 Hz, 1H), 7.24 (d, J = 16.5 Hz, 1H), 7.10-6.97 (m, 2H), 3.76 (s, 3H), 2.65 (spt, J = 7.0 Hz, 1H), 2.26 (s, 3H), 1.08 (dd, J = 3.0, 7.0 Hz, 6H). |
| A-4.030 | —Me | —Me | —(C=O)iPr | 6-F | 3-Cl | (E)-CH=CH— | 3-cyanophenyl- | ¹H NMR (400 MHz, chloroform) δ = 7.63-7.55 (m, 2H), 7.55-7.50 (m, 1H), 7.48-7.38 (m, 2H), 7.12-7.00 (m, 2H), 6.65 (d, J = 16.5 Hz, 1H), 3.70 (s, 3H), 2.65 (spt, J = 7.0 Hz, 1H), 2.24 (s, 3H), 1.09 (dd, J = 7.0, 12.5 Hz, 6H). |
| A-4.035 | —Me | —Me | —(C=O)iPr | 6-F | 3-Cl | (E)-CH=CH— | 4-tert-butoxyphenyl- | ¹H NMR (400 MHz, chloroform) δ = 7.41 (dd, J = 5.0, 8.6 Hz, 1H), 7.26-7.23 (m, 2H), 6.99 (t, J = 8.6 Hz, 1H), 6.94-6.90 (m, 1H), 6.91 (d, J = 16.5 Hz, 1H), 6.60 (d, J = 16.5 Hz, 1H), 3.71 (s, 3H), 2.63 (spt, J = 7.0 Hz, 1H), 2.22 (s, 3H), 1.35 (s, 9H), 1.08 (d, J = 7.0 Hz, 3H), 1.06 (d, J = 7.0 Hz, 1H) |

TABLE 4-continued

Preparation examples of compounds of formula (I). The numbering system used to describe the positions of X and Y is shown for the purposes of clarity only.

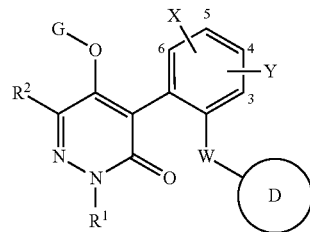

(I)

| Compound | R¹ | R² | G | X | Y | W | D | NMR details |
|---|---|---|---|---|---|---|---|---|
| A-4.036 | —Me | —Me | —(C=O)iPr | 6-F | 3-Cl | (E)-CH=CH— | 4-cyanophenyl- | ¹H NMR (400 MHz, chloroform) δ = 7.62-7.55 (m, 2H), 7.45 (dd, J = 5.0, 8.5 Hz, 1H), 7.45-7.40 (m, 1H), 7.13 (d, J = 16.5 Hz, 1H), 7.05 (t, J = 8.5 Hz, 1H), 6.68 (d, J = 16.5 Hz, 1H), 3.69 (s, 3H), 2.65 (spt, J = 7.0 Hz, 1H), 2.23 (s, 3H), 1.11 (d, J = 7.0 Hz, 3H), 1.07 (d, J = 7.0 Hz, 3H) |
| A-1.373 | —Me | —Me | —H | 6-F | 3-Cl | —CH₂—CH₂— | 4-(1-methylpyrazol-3-yl)phenyl- | ¹H NMR (400 MHz, methanol) δ ppm 7.62 (d, J = 8.3 Hz, 2H) 7.57 (d, J = 2.3 Hz, 1 H) 7.48-7.54 (m, 1H), 7.07-7.17 (m, 1H), 7.03 (d, J = 8.3 Hz, 2 H), 6.56 (d, J = 2.3 Hz, 1 H), 3.91 (s, 3 H,) 3.73 (s, 3H), 2.63-2.85 (m, 4H), 2.32 (s, 3H) |
| A-1.374 | —Me | —Me | —H | 6-F | 3-Cl | —CH₂—CH₂— | 4-(5-methyltetrazol-1-yl)phenyl- | ¹H NMR (400 MHz, DMSO-d6) δ ppm 7.58-7.53 (m, 3H), 7.28 (d, J = 8.2 Hz, 2H), 7.23 (t, J = 8.7 Hz, 1H), 3.61 (s, 3H), 2.87-2.68 (m, 4H), 2.53 (s, 3H), 2.27 (s, 3H) |
| A-1.375 | —Me | —Me | —H | 6-F | 3-Cl | —CH₂—CH₂— | 4-morpholinophenyl- | ¹H NMR (400 MHz, DMSO-d6) δ ppm 7.55 (dd, J = 5.2, 8.8 Hz, 1H), 7.21 (t, J = 8.8 Hz, 1H), 6.89-6.80 (m, 4H), 3.73-3.69 (m, 4H), 3.61 (s, 3H), 3.05-3.00 (m, 4H), 2.69-2.49 (m, 4H), 2.26 (s, 3H) |
| A-1.376 | —Me | —Me | —H | 6-F | 3-Cl | —CH₂—CH₂— | 4-(3-methylpyrazol-1-yl)phenyl- | ¹H NMR (400 MHz, DMSO-d6) δ = 10.84 (s, 1H), 8.30 (d, J = 2.3 Hz, 1H), 7.65 (d, J = 8.5 Hz, 2H), 7.55 (dd, J = 5.3, 8.7 Hz, 1H), 7.22 (t, J = 8.7 Hz, 1H), 7.07 (d, J = 8.5 Hz, 2H), 6.30 (d, J = 2.3 Hz, 1H), 3.61 (s, 3H), 2.76-2.61 (m, 4H), 2.26 (s, 3H), 2.25 (s, 3H) |
| A-1.377 | —Me | —Me | —H | 6-F | 3-Cl | —CH₂—CH₂— | 4-(3,5-dimethylpyrazol-1-yl)phenyl- | ¹H NMR (400 MHz, DMSO-d6) δ = 10.84 (br s, 1H), 7.56 (dd, J = 5.3, 8.7 Hz, 1H), 7.35 (d, J = 8.3 Hz, 2H), 7.22 (t, J = 8.7 Hz, 1H), 7.12 (d, J = 8.3 Hz, |

TABLE 4-continued

Preparation examples of compounds of formula (I). The numbering system used to describe the positions of X and Y is shown for the purposes of clarity only.

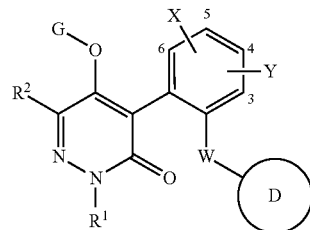

(I)

| Compound | R¹ | R² | G | X | Y | W | D | NMR details |
|---|---|---|---|---|---|---|---|---|
| | | | | | | | | 2H), 6.04 (s, 1H), 3.62 (s, 3H), 2.81-2.66 (m, 4H), 2.27 (s, 3H), 2.25 (s, 3H), 2.16 (s, 3H) |
| A-1.378 | —Me | —Me | —H | 6-F | 3-Cl | —CH₂—CH₂— | 4-pyrazol-1-ylphenyl- | $^1$H NMR (400 MHz, DMSO-d6) δ = 10.85 (s, 1H), 8.44 (s, 1H), 7.77-7.65 (m, 3H), 7.56 (dd, J = 5.3, 8.7 Hz, 1H), 7.22 (t, J = 8.7 Hz, 1H), 7.11 (d, J = 8.2 Hz, 2H), 6.52 (s, 1H), 3.61 (s, 3H), 2.78-2.61 (m, 4H), 2.26 (s, 3H) |
| A-1.379 | —Me | —Me | —H | 6-F | 3-Cl | —CH₂—CH₂— | 4-pyrrol-1-ylphenyl- | $^1$H NMR (400 MHz, DMSO-d6) δ = 10.85 (s, 1H), 7.56 (dd, J = 5.2, 8.7 Hz, 1H), 7.45 (d, J = 8.4 Hz, 2H), 7.31 (t, J = 2.1 Hz, 2H), 7.22 (t, J = 8.7 Hz, 1H), 7.07 (d, J = 8.4 Hz, 2H), 6.24 (t, J = 2.1 Hz, 2H), 3.62 (s, 3H), 2.76-2.60 (m, 4H), 2.27 (s, 3H) |
| A-1.380 | —Me | —Me | —H | 6-F | 3-Cl | —CH₂—CH₂— | 4-(5-methyltetrahydrofuran-2-yl)phenyl- | $^1$H NMR (400 MHz, chloroform) δ = 7.42-7.36 (m, 1H), 7.20-7.14 (m, 2H), 6.96-6.87 (m, 3H), 4.79-4.71 (m, 1H), 4.16-4.05 (m, 1H), 2.84-2.62 (m, 4H), 2.27 (s, 3H), 2.29-2.16 (m, 1H), 2.13-2.02 (m, 1H), 1.92-1.71 (m, 1H), 1.68-1.49 (m, 1H), 1.33 (d, J = 6.1 Hz, 3H) |
| A-1.381 | —Me | —Me | —H | 6-F | 3-Cl | —CH₂—CH₂— | 4-(5-methyl-2-furyl)phenyl- | $^1$H NMR (400 MHz, chloroform) δ ppm 7.44-7.48 (m, 2H) 7.42 (dd, J = 5.2, 8.8 Hz, 1H) 6.93-7.00 (m, 3H) 6.47 (d, J = 3.2 Hz, 1H) 6.00-6.05 (m, 1H) 3.72 (s, 3H) 2.68-2.89 (m, 4H) 2.35 (s, 3H) 2.25 (s, 3H) |
| A-1.382 | —Me | —Me | —H | 6-F | 3-Cl | —CH₂—CH₂— | 4-oxazol-2-ylphenyl- | $^1$H NMR (400 MHz, chloroform) δ ppm 7.75 (d, J = 8.2 Hz, 2H), 7.57 (s, 1H), 7.20 (dd, J = 5.1, 8.8 Hz, 1H), 7.01 (d, J = 8.2 Hz, 2H,) 6.84-6.91 (m, 2H), 3.77 (s, 3H), 2.74 (td, J = 5.2, 12.5 Hz, 1H) 2.58 (td, J = 4.9, 12.5 |

TABLE 4-continued

Preparation examples of compounds of formula (I). The numbering system used to describe the positions of X and Y is shown for the purposes of clarity only.

(I)

| Compound | R¹ | R² | G | X | Y | W | D | NMR details |
|---|---|---|---|---|---|---|---|---|
| | | | | | | | | Hz, 1H) 2.32-2.42 (m, 4H) 2.11 (td, J = 4.9, 12.4 Hz, 1H) |
| A-1.383 | —Me | —Me | —H | 6-F | 3-Cl | —CH₂—CH₂— | 4-(2-methylthiazol-4-yl)phenyl- | ¹H NMR (400 MHz, methanol) δ ppm 7.73 (d, J = 8.1 Hz, 2H), 7.55 (s, 1H), 7.51 (dd, J = 5.2, 8.7 Hz, 1H), 7.11 (t, J = 8.7 Hz, 1H), 7.06 (d, J = 8.1 Hz, 2H), 3.73 (s, 3H), 2.65-2.86 (m, 7H) 2.33 (s, 3H) |
| A-1.384 | —Me | —Me | —H | 6-F | 3-Cl | —CH₂—CH₂— | 4-(2-thienyl)phenyl- | ¹H NMR (400 MHz, methanol) δ ppm 7.54-7.46 (m, 3H), 7.32 (d, J = 3.8 Hz, 2H), 7.10 (t, J = 8.7 Hz, 1H), 7.06 (dd, J = 3.8, 5.1 Hz, 1H), 7.02 (d, J = 8.2 Hz, 2H), 3.72 (s, 3H), 2.84-2.64 (m, 4H), 2.32 (s, 3H) |
| A-1.386 | —Me | —Me | —H | 6-F | 3-Cl | —CH₂—CH₂— | 1-phenyl-4-pyrazolyl- | ¹H NMR (400 MHz, DMSO-d6) δ ppm 8.20 (s, 1H), 7.78-7.74 (m, 2H), 7.56 (dd, J = 5.2, 8.7 Hz, 1H), 7.49-7.43 (m, 2H), 7.40 (s, 1H), 7.29-7.25 (m, 1H), 7.22 (t, J = 8.7 Hz, 1H), 3.59 (s, 3H), 2.81-2.69 (m, 2H), 2.67-2.52 (m, 2H), 2.24 (s, 3H) |
| A-1.387 | —Me | —Me | —H | 6-F | 3-Cl | —CH₂—CH₂— | 1-cyclopropyl-4-pyrazolyl- | ¹H NMR (400 MHz, DMSO-d6) δ = 10.77 (s, 1H), 7.54 (dd, J = 5.2, 8.9 Hz, 1H), 7.43 (s, 1H), 7.20 (t, J = 8.7 Hz, 1H), 7.04 (s, 1H), 3.59 (s, 3H), 3.63-3.55 (m, 1H), 2.70-2.56 (m, 2H), 2.49-2.35 (m, 2H), 2.25 (s, 3H), 0.98-0.91 (m, 2H), 0.91-0.84 (m, 2H) |
| A-1.389 | —Me | —Me | —H | 6-F | 3-Cl | —CH₂—CH₂— | 4-(isopropylsulfanylmethyl)phenyl- | ¹H NMR (400 MHz, d6-DMSO, δ ppm 10.82 (br. s,1H), 7.56-7.52 (m, 1H), 7.23-7.18 (m, 3H), 6.95-6.93 (d, 2H), 3.69 (s, 2H), 3.60 (s, 3H), 2.76-2.49 (m, 5H), 2.26 (s, 3H), 1.17 (d, 6H) |
| A-1.390 | —Me | —Me | —H | 6-F | 3-Cl | —CH₂—CH₂— | 4-(methylsulfamoyl)phenyl- | ¹H NMR (500 MHz, chloroform) δ ppm 7.68 (d, J = 8.2 Hz, 2H), 7.38 (dd, J = 5.1, 8.7 |

TABLE 4-continued

Preparation examples of compounds of formula (I). The numbering system used to describe the positions of X and Y is shown for the purposes of clarity only.

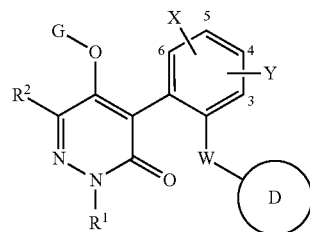

(I)

| Compound | R¹ | R² | G | X | Y | W | D | NMR details |
|---|---|---|---|---|---|---|---|---|
| A-1.391 | —Me | —Me | —H | 6-F | 3-Cl | —CH₂—CH₂— | 4-sulfamoylphenyl- | Hz, 1H), 7.17-7.11 (m, J = 8.2 Hz, 2H), 6.96 (t, J = 8.7 Hz, 1H), 3.72 (s, 3H), 2.84-2.71 (m, 4H), 2.63 (s, 3H), 2.30 (s, 3H) ¹H NMR (500 MHz, chloroform) δ ppm 7.76 (d, J = 8.4 Hz, 2H), 7.48 (dd, J = 5.2, 8.7 Hz, 2H), 7.15 (d, J = 8.4 Hz, 2H), 7.05 (t, J = 8.7 Hz, 1H), 3.76 (s, 3H), 2.94-2.72 (m, 4H), 2.32 (s, 3H) |
| A-1.392 | —Me | —Me | —H | 6-F | 3-Cl | —CH₂—CH₂— | 4-carbamoylphenyl- | ¹H NMR (400 MHz, DMSO-d6) δ ppm 10.83 (s, 1H), 7.87 (br s, 1H), 7.76 (d, J = 8.2 Hz, 2H), 7.55 (dd, J = 5.3, 8.7 Hz, 1H), 7.26 (br s, 1H), 7.22 (t, J = 8.7 Hz, 1H), 7.07 (d, J = 8.2 Hz, 2H), 3.61 (s, 3H), 2.75-2.63 (m, 4H), 2.26 (s, 3H) |

B1 Post-Emergence Efficacy—Test 1

Seeds of a variety of test species are sown in standard soil in pots:—*Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethylene sorbitan monolaurate, CAS RN 9005-64-5). Compounds are applied at 1000 g/ha. The test plants are then grown in a glasshouse under controlled conditions in a glasshouse (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 5

Control of weed species by compounds of formula (I) after post-emergence application

| Compound | AMARE | SOLNI | SETFA | LOLPE | ECHCG | IPOHE |
|---|---|---|---|---|---|---|
| A-1.036 | 5 | 5 | 5 | 5 | 5 | 5 |

B2 Post-Emergence Efficacy—Test 2

Seeds of a variety of test species are sown in standard soil in pots:—*Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethylene sorbitan monolaurate, CAS RN 9005-64-5). Compounds are applied at 250 g/ha. The test plants are then grown in a glasshouse under controlled conditions in a glasshouse (at 24/16° C., day/night; 14 hours light; 65% humidity) and watered twice daily. After 13 days, the test is evaluated for the percentage damage caused to the plant. The biological activities are assessed on a five point scale (5=80-100%;

4=60-79%; 3=40-59%; 2=20-39%; 1=0-19%). A blank value in the table is indicative that the compound was not tested on that species.

TABLE 6

Control of weed species by compounds of formula
(I) after post-emergence application

| Compound | AMARE | SOLNI | SETFA | LOLPE | ECHCG | IPOHE |
|---|---|---|---|---|---|---|
| A-1.024 | 5 | 5 | 5 | 5 | 4 | 5 |
| A-1.025 | 5 | 5 | 5 | 5 | 5 | 5 |
| A-1.026 | 4 | 4 | 2 | 1 | 0 | 0 |
| A-1.027 | 5 | 4 | 5 | 5 | 5 | 4 |
| A-1.028 | 5 | 5 | 5 | 5 | 5 | 5 |
| A-1.029 | 4 | 5 | 4 | 4 | 2 | 5 |
| A-1.030 | 4 | 5 | 4 | 5 | 4 | 5 |
| A-1.031 | 5 | 5 | 4 | 4 | 4 | 4 |
| A-1.032 | 5 | 5 | 5 | 5 | 5 | 5 |
| A-1.033 | 5 | 5 | 5 | 5 | 4 | 5 |
| A-1.034 | 5 | 5 | 5 | 5 | 1 | 5 |
| A-1.035 | 4 | 5 | 4 | 4 | 4 | 4 |
| A-1.036 | 5 | 5 | 5 | 5 | 5 | 5 |
| A-1.037 | 1 | 5 | 5 | 1 | 3 | 5 |
| A-1.038 | 5 | 5 | 5 | 5 | 5 | 5 |
| A-1.039 | 5 | 5 | 5 | 5 | 5 | 5 |
| A-1.040 | 3 | 3 | 0 | 0 | 0 | 0 |
| A-1.041 | 5 | 5 | 4 | 1 | 1 | 2 |
| A-1.042 | 5 | 5 | 5 | 5 | 5 | 3 |
| A-1.044 | 5 | 5 | 5 | 4 | 3 | 0 |
| A-2.030 | 3 | 4 | 0 | 1 | 0 | 4 |
| A-2.037 | 1 | 2 | 1 | 1 | 2 | 2 |
| A-3.028 | 4 | 5 | 4 | 5 | 5 | 5 |
| A-3.029 | 4 | 5 | 2 | 2 | 1 | 5 |
| A-3.030 | 5 | 5 | 5 | 4 | 2 | 5 |
| A-3.035 | 5 | 5 | 5 | 5 | 4 | 5 |
| A-3.036 | 5 | 5 | 4 | 4 | 4 | 5 |
| A-3.038 | 5 | 5 | 5 | 5 | 2 | 5 |
| A-4.029 | 4 | 4 | 0 | 1 | 1 | 4 |
| A-4.030 | 2 | 3 | 0 | 1 | 1 | 3 |
| A-4.035 | 1 | 3 | 0 | 0 | 0 | 3 |
| A-4.036 | 2 | 5 | 1 | 3 | 3 | 4 |
| A-4.038 | 1 | 5 | 0 | 1 | 1 | 2 |
| A-1.383 | 5 | 5 | 5 | 5 | 5 | 5 |
| A-1.384 | 5 | 5 | 5 | 4 | 3 | 5 |
| A-1.385 | 5 | 5 | 5 | 5 | 5 | 5 |

B3 Post-Emergence Efficacy—Test 3

Seeds of a variety of test species are sown in standard soil in pots:—*Amaranthus retoflexus* (AMARE), *Setaria faberi* (SETFA), *Echinochloa crus-galli* (ECHCG), *Ipomoea hederacea* (IPOHE), *Zea Mays* (ZEAMX), *Abutilon theophrasti* (ABUTH). After 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethylene sorbitan monolaurate, CAS RN 9005-64-5). Compounds are applied at 250 g/ha. The test plants are then grown in a glasshouse under controlled conditions in a glasshouse (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 7

Control of weed species by compounds of formula
(I) after post-emergence application

| Compound | AMARE | ZEAMX | SETFA | ABUTH | ECHCG | IPOHE |
|---|---|---|---|---|---|---|
| A-1.380 | 4 | 2 | 3 | 3 | 1 | 3 |
| A-1.381 | 4 | 1 | 2 | 3 | 0 | 4 |
| A-1.382 | 4 | 5 | 4 | 4 | 4 | 5 |
| A-3.386 | 4 | 5 | 4 | 4 | 5 | 4 |
| C-1.013 | 5 | 4 | 4 | 4 | 5 | 4 |
| A-1.386 | 4 | 4 | 4 | 3 | 4 | 4 |
| A-1.387 | 4 | 4 | 4 | 4 | 4 | 4 |
| A-1.388 | 5 | 4 | 4 | 5 | 4 | 4 |
| A-1.389 | 4 | 5 | 5 | 4 | 5 | 5 |
| A-1.390 | 5 | 1 | 5 | 4 |   | 4 |
| A-1.391 | 4 | 1 | 4 | 2 |   | 3 |
| A-1.392 | 5 | 2 | 5 | 4 |   | 3 |

B4 Pre-Emergence Efficacy—Test 1

Seeds of a variety of test species were sown in standard soil in pots: *Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After cultivation for one day (pre-emergence) under controlled conditions in a glasshouse (at 24/16° C., day/night; 14 hours light; 65% humidity), the plants were sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 1000 g/ha. The test plants were then grown in a glasshouse under controlled conditions (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 8

Control of weed species by compounds of formula
(I) after pre-emergence application

| Compound | AMARE | SOLNI | SETFA | LOLPE | ECHCG | IPOHE |
|---|---|---|---|---|---|---|
| A-1.036 | 5 | 5 | 5 | 5 | 5 | 5 |

B5 Pre-Emergence Efficacy—Test 2

Seeds of a variety of test species were sown in standard soil in pots: *Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After cultivation for one day (pre-emergence) under controlled conditions in a glasshouse (at 24/16° C., day/night; 14 hours light; 65% humidity), the plants were sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 250 g/ha. The test plants were then grown in a glasshouse under controlled conditions (at 24/16° C., day/night; 14 hours light; 65% humidity) and watered twice daily. After 13 days, the test is evaluated for the percentage damage caused to the plant. The biological activities are assessed on a five point scale (5=80-100%;

4=60-79%; 3=40-59%; 2=20-39%; 1=0-19%). A blank value in the table is indicative that the compound was not tested on that species.

TABLE 9

Control of weed species by compounds of formula (I) after pre-emergence application

| Compound | AMARE | SOLNI | SETFA | LOLPE | ECHCG | IPOHE |
| --- | --- | --- | --- | --- | --- | --- |
| A-1.024 | 5 | 5 | 5 | 4 | 2 | 0 |
| A-1.025 | 5 | 5 | 5 | 4 | 5 | 1 |
| A-1.026 | 0 | 0 | 0 | 0 | 0 | 0 |
| A-1.027 | 5 | 4 | 3 | 2 | 1 | 4 |
| A-1.028 | 5 | 5 | 5 | 5 | 4 | 5 |
| A-1.029 | 3 | 5 | 1 | 2 | 5 | 1 |
| A-1.030 | 5 | 5 | 5 | 4 | 5 | 0 |
| A-1.031 | 3 | 2 | 1 | 1 | 2 | 1 |
| A-1.032 | 5 | 5 | 5 | 5 | 5 | 2 |
| A-1.033 | 1 | 1 | 2 | 1 | 0 | 1 |
| A-1.034 | 0 | 2 | 0 | 0 | 0 | 0 |
| A-1.035 | 4 | 3 | 3 | 3 | 1 | 1 |
| A-1.036 | 5 | 5 | 5 | 5 | 5 | 5 |
| A-1.037 | 1 | 2 | 0 | 0 | 2 | 0 |
| A-1.038 | 5 | 5 | 0 | 5 | 5 | 2 |
| A-1.039 | 5 | 5 | 5 | 4 | 5 | 3 |
| A-1.040 | 0 | 0 | 0 | 0 | 0 | 0 |
| A-1.041 | 4 | 0 | 0 | 0 | 0 | 0 |
| A-1.042 | 5 | 5 | 5 | 1 | 2 | 2 |
| A-1.044 | 5 | 5 | 5 | 2 | 3 | 1 |
| A-2.030 | 0 | 0 | 0 | 0 | 0 | 0 |
| A-2.037 | 0 | 0 | 1 | 1 | 0 | 1 |
| A-3.028 | 5 | 5 | 5 | 5 | 5 | 5 |
| A-3.029 | 4 | 5 | 2 | 2 | 3 | 3 |
| A-3.030 | 5 | 5 | 5 | 4 | 4 | 3 |
| A-3.035 | 4 | 5 | 5 | 5 | 4 | 5 |
| A-3.036 | 5 | 5 | 5 | 5 | 5 | 5 |
| A-3.038 | 5 | 5 | 1 | 5 | 2 | 5 |
| A-4.029 | 2 | 4 | 0 | 0 | 0 | 0 |
| A-4.030 | 3 | 4 | 1 | 2 | 1 | 1 |
| A-4.035 | 0 | 0 | 0 | 1 | 1 | 1 |
| A-4.036 | 2 | 5 | 0 | 1 | 1 | 3 |
| A-4.038 | 2 | 1 | 0 | 0 | 0 | 0 |
| A-1.383 | 5 | 5 | 4 | 3 | 4 | 5 |
| A-1.384 | 2 | 1 | 0 | 0 | 0 | 2 |
| A-1.385 | 5 | 5 | 5 | 5 | 5 | 5 |

B6 Pre-Emergence Efficacy—Test 3

Seeds of a variety of test species were sown in standard soil in pots: *Amaranthus retoflexus* (AMARE), *Setaria faberi* (SETFA), *Echinochloa crus-galli* (ECHCG), *Ipomoea hederacea* (IPOHE), *Zea Mays* (ZEAMX), *Abutilon theophrasti* (ABUTH). After cultivation for one day (pre-emergence) under controlled conditions in a glasshouse (at 24/16° C., day/night; 14 hours light; 65% humidity), the plants were sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 250 g/ha. The test plants were then grown in a glasshouse under controlled conditions (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 10

Control of weed species by compounds of formula (I) after pre-emergence application

| Compound | AMARE | ZEAMX | SETFA | ABUTH | ECHCG | IPOHE |
| --- | --- | --- | --- | --- | --- | --- |
| A-1.380 | 5 | 2 | 1 | 4 | 0 | 4 |
| A-1.381 | 3 | 1 | 0 | 1 | 0 | 3 |
| A-1.382 | 5 | 4 | 5 | 4 | 5 | 5 |
| A-3.386 | 5 | 5 | 5 | 5 | 5 | 5 |
| C-1.013 | 5 | 4 | 5 | 5 | 5 | 5 |
| A-1.386 | 2 | 2 | 5 | 2 | 5 | 4 |
| A-1.387 | 5 | 4 | 5 | 4 | 5 | 5 |
| A-1.388 | 5 | 4 | 5 | 5 | 5 | 5 |
| A-1.389 | 5 | 4 | 5 | 3 | 5 | 5 |
| A-1.390 | 5 | 1 | 5 | 5 | | 5 |
| A-1.391 | 5 | 0 | 5 | 2 | | 2 |
| A-1.392 | 5 | 2 | 5 | 5 | 5 | 5 |

The invention claimed is:

1. A compound of formula (I)

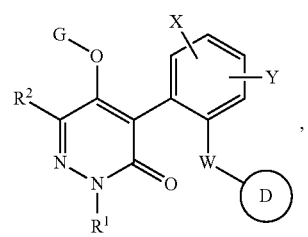

or a salt or N-oxide thereof, wherein $R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$alkyl, $C_2$-$C_4$alkenyl, $C_1$-$C_4$haloalkyl, cyano-$C_1$-$C_4$alkyl, $C_2$-$C_4$haloalkenyl, $C_2$-$C_4$alkynyl and $C_2$-$C_4$haloalkynyl;

$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl-, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$ $C_1$-$C_6$alkyl, amino, $C_1$-$C_6$alkylamino, $C_1$-$C_6$dialkylamino, —C($C_1$-$C_3$alkyl)=N—O—$C_1$-$C_3$alkyl and $C_2$-$C_6$ haloalkynyl;

G is hydrogen, or C(O)$R^3$;

$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;

each $R^4$ and $R^5$ are independently selected from the group consisting of hydrogen, $C_1$-$C_6$ alkyl, $C_1$-$C_6$alkoxy, and $C_3$-$C_6$cycloalkyl, or $R^4$ and $R^5$ together can form a morpholinyl ring; and, each $R^{4a}$ and $R^{5a}$ are independently selected from the group consisting of $C_1$-$C_6$alkoxy, and $C_3$-$C_6$cycloalkyl, or $R^{4a}$ and $R^{5a}$ together can form a morpholinyl ring; and, $R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;

X and Y are each independently hydrogen, $C_1$-$C_3$ alkyl, cyclopropyl, $C_1$-$C_3$ alkoxy, $C_1$-$C_3$haloalkyl, $C_1$-$C_3$haloalkoxy, or halogen;

D is a substituted monocyclic heteroaryl ring containing 1, 2, or 3 heteroatoms independently selected from oxygen, nitrogen and sulphur, substituted on at least one ring carbon atom with $R^8$ and/or on at least one ring nitrogen atom with $R^9$;

at least one $R^8$ is selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; and a ring system selected from the group consisting of a phenyl ring, a 5-6-membered heteroaryl ring and a 3-6-membered heterocyclyl ring, wherein said ring system is substituted by 0 to 5 $R^{16}$, at least one $R^9$ is selected from the group consisting of $C_5$-$C_6$alkyl, $C_5$-$C_6$haloalkyl, $C_3$-$C_6$-cycloalkyl, $C_1$-$C_3$alkoxy-$C_3$alkyl-, $C_3$alkoxy-$C_1$-$C_2$alkyl-, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$;

m is an integer of 0, 1, or 2;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

or D is a phenyl ring substituted by at least one $R^8$;

and,

W is either

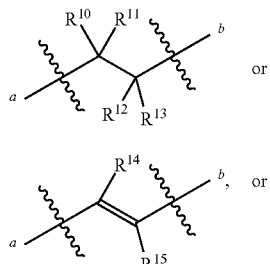

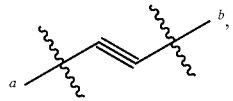

wherein:
"a" denotes the point of attachment to the phenyl-pyridazine dione/phenyl-pyridazinone moiety,
"b" denotes the point of attachment to ring D,
$R^{10}$, $R^{12}$, $R^{14}$ and $R^{15}$ are each independently hydrogen, $C_1$-$C_3$alkyl, or $C_1$-$C_3$haloalkyl;
or $R^{10}$ and $R^{12}$ together with the carbon atoms to which they are joined forma a $C_3$-$C_6$ carbocyclic ring; and
$R^{11}$ and $R^{13}$ are each independently hydrogen, halogen, $C_1$-$C_3$alkyl, or $C_1$-$C_3$haloalkyl;
provided that when one of $R^{11}$ or $R^{13}$ is halogen, $C_1$-$C_3$alkyl or $C_1$-$C_3$haloalkyl, the other is hydrogen.

2. A compound of formula (I)

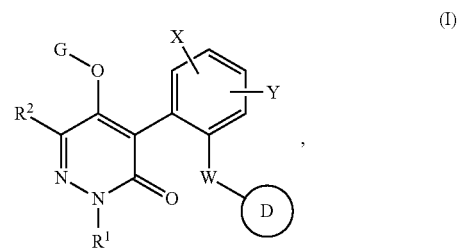

or a salt or N-oxide thereof, wherein
$R^1$ is selected from the group consisting of $C_1$-$C_4$ alkyl, $C_3$-$C_6$cycloalkyl, $C_3$-$C_6$alkoxy, $C_1$-$C_2$ alkoxy-$C_1$-$C_2$alkyl, $C_2$-$C_4$alkenyl, $C_1$-$C_4$haloalkyl, cyano-$C_1$-$C_4$alkyl, $C_2$-$C_4$haloalkenyl, $C_2$-$C_4$alkynyl and $C_2$-$C_4$haloalkynyl;

$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$$C_1$-$C_6$alkyl, —NR$^4$R$^5$, —C($C_1$-$C_3$alkyl)=N—O—$C_1$-$C_3$alkyl and $C_2$-$C_6$ haloalkynyl;

G is hydrogen, or C(O)R$^3$;

$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;

each $R^4$ and $R^5$ are independently selected from the group consisting of hydrogen, $C_1$-$C_6$ alkyl, $C_1$-$C_6$alkoxy, and $C_3$-$C_6$cycloalkyl, or $R^4$ and $R^5$ together can form a morpholinyl ring; and, $R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;

X is cyclopropyl;

Y is hydrogen, $C_1$-$C_3$ alkyl, $C_1$-$C_3$alkoxy, $C_1$-$C_3$haloalkyl, $C_1$-$C_3$haloalkoxy, or halogen;

D is a substituted or unsubstituted monocyclic heteroaryl ring containing 1, 2, or 3 heteroatoms independently selected from oxygen, nitrogen and sulphur, and wherein when D is substituted it is substituted on at least one ring carbon atom with $R^8$ and/or on a ring nitrogen atom with $R^9$;

each $R^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl) amino; or a ring system selected from the group consisting: of a phenyl ring, a 5-6-membered heteroaryl ring and a 3-6-membered heterocyclyl ring, wherein said ring system is substituted by 0 to 5 $R^{16}$;

m is an integer of 0, 1, or 2; and each $R^9$ is independently $C_1$-$C_6$alkyl, $C_1$-$C_3$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 $R^{16}$;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

or D is a substituted or unsubstituted phenyl ring, and wherein when said phenyl ring is substituted it is substituted by 1 to 5 $R^8$;

and,

W is either

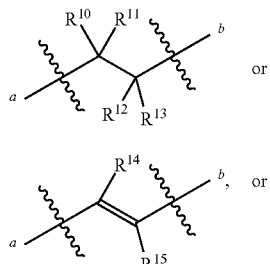

W1

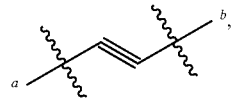

W2

W3 wherein

"a" denotes the point of attachment to the phenyl-pyridazine dione/phenyl-pyridazinone moiety, "b" denotes the point of attachment to ring D, $R^{10}$, $R^{12}$, $R^{14}$ and $R^{15}$ are each independently hydrogen, $C_1$-$C_3$alkyl, or $C_1$-$C_3$haloalkyl; or $R^{10}$ and $R^{12}$ together with the carbon atoms to which they are joined forma a $C_3$-$C_6$ carbocyclic ring; and $R^{11}$ and $R^{13}$ are each independently hydrogen, halogen, $C_1$-$C_3$alkyl, or $C_1$-$C_3$haloalkyl, provided that when one of $R^{11}$ or $R^{13}$ is halogen, $C_1$-$C_3$alkyl or $C_1$-$C_3$ haloalkyl, the other is hydrogen.

3. A compound of formula (I)

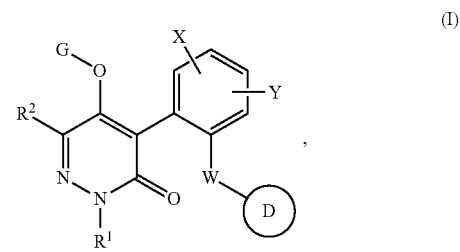

(I)

or a salt or N-oxide thereof, wherein $R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$alkyl, $C_2$-$C_4$alkenyl, $C_1$-$C_4$haloalkyl, cyano-$C_1$-$C_4$alkyl, $C_2$-$C_4$haloalkenyl, $C_2$-$C_4$alkynyl and $C_2$-$C_4$haloalkynyl;

$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$ $C_1$-$C_6$alkyl, —NR$^4$R$^5$, —C($C_1$-$C_3$alkyl)=N—O—$C_1$-$C_3$alkyl and $C_2$-$C_6$haloalkynyl;

G is hydrogen, or C(O)R$^3$;

$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;

each $R^4$ and $R^5$ are independently selected from the group consisting of hydrogen, $C_1$-$C_6$ alkyl, $C_1$-$C_6$alkoxy, and $C_3$-$C_6$cycloalkyl, or $R^4$ and $R^5$ together can form a morpholinyl ring; and, $R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;

X is hydrogen, $C_1$-$C_3$alkyl, $C_1$-$C_3$alkoxy, $C_1$-$C_3$haloalkyl, $C_1$-$C_3$haloalkoxy, or halogen;

Y is cyclopropyl;

D is a substituted or unsubstituted monocyclic heteroaryl ring containing 1, 2, or 3 heteroatoms independently selected from oxygen, nitrogen and sulphur, and wherein when D is substituted it is substituted on at least one ring carbon atom with $R^8$ and/or on a ring nitrogen atom with $R^9$;

each $R^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_3$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl, —NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)OC$_1$-$C_6$alkyl, —C(O)NHS—(O)$_2C_1$-$C_6$alkyl, —C(O)NR$^4$R$^5$, —NR$^4$C(O)NR$^4$R$^5$, $C_1$-$C_6$alky-lcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 $R^{16}$;

m is an integer of 0, 1, or 2; and each $R^9$ is independently $C_1$-$C_6$alkyl, $C_1$-$C_6$haloalkyl, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 $R^{16}$;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;

or D is a substituted or unsubstituted phenyl ring, and wherein when said phenyl ring is substituted it is substituted by 1 to 5 $R^8$;

and,

W is either

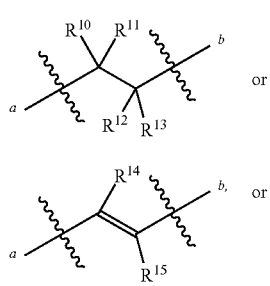

W1 or

W2

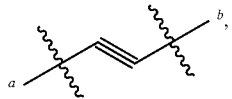

W3 wherein

"a" denotes the point of attachment to the phenyl-pyridazine dione/phenyl-pyridazinone moiety, "b" denotes the point of attachment to ring D, $R^{10}$, $R^{12}$, $R^{14}$ and $R^{15}$ are each independently hydrogen, $C_1$-$C_3$alkyl, or $C_1$-$C_3$haloalkyl;

or $R^{10}$ and $R^{12}$ together with the carbon atoms to which they are joined forma a $C_3$-$C_6$ carbocyclic ring; and $R^{11}$ and $R^{13}$ are each independently hydrogen, halogen, $C_1$-$C_3$alkyl, or $C_1$-$C_3$haloalkyl, provided that when one of $R^{11}$ or $R^{13}$ is halogen, $C_1$-$C_3$alkyl or $C_1$-$C_3$ haloalkyl, the other is hydrogen.

4. The compound according to claim 1, wherein G is hydrogen or —C(O)R$^3$, and R$^3$ is $C_1$-$C_4$alkyl, $C_2$-$C_3$alkenyl, $C_2$-$C_3$alkynyl, $C_1$-$C_4$alkoxy, —NR$^4$R$^5$ wherein R$^4$ and R$^5$ together form a morpholinyl ring, or phenyl.

5. The compound according to claim 1, wherein G is hydrogen or C(O)R$^3$ wherein R$^3$ is isopropyl, t-butyl, methyl, ethyl, propargyl, methoxy, ethoxy, or tert-butoxy.

6. The compound according to claim 1, wherein X is hydrogen, $C_1$-$C_3$alkyl, halogen, or $C_1$haloalkyl.

7. The compound according to claim 1, wherein Y is hydrogen, $C_1$-$C_3$ alkyl, $C_1$-$C_3$haloalkyl, or halogen.

8. The compound according to claim 1, wherein X is ortho with respect to the pyrdazinone/pyridazine-dione moiety.

9. The compound according to claim 1, wherein Y is ortho with respect to the —W-D moiety.

10. The compound according to claim 1, wherein R$^1$ is methyl, ethyl, n-propyl, cyclopropyl, propargyl, or $C_1$haloalkyl.

11. The compound according to claim 1, wherein R$^2$ is selected from the group consisting of hydrogen, halogen, $C_1$-$C_6$alkyl, $C_1$-$C_6$haloalkyl, $C_1$-$C_6$alkoxy, $C_1$-$C_3$alkoxy-$C_1$-$C_3$alkyl, $C_3$-$C_6$cycloalkyl, $C_2$-$C_6$alkenyl, $C_2$-$C_6$haloalkenyl, $C_2$-$C_6$alkynyl and $C_2$-$C_6$haloalkynyl.

12. The compound according to claim 1, wherein D is the monocyclic heteroaryl ring.

13. The compound according to claim 1, wherein D is the phenyl ring.

14. The compound according to claim 1, wherein W is W1 and each of R$^{10}$, R$^{11}$, R$^{12}$, and R$^{13}$ is hydrogen.

15. The compound according to claim 1, wherein W is W2 and each of R$^{14}$ and R$^{15}$ is hydrogen.

16. The compound according to claim 1, wherein W is W3.

17. A herbicidal composition comprising a herbicidal compound according to claim 1 and an agriculturally acceptable formulation adjuvant.

18. A herbicidal composition according to claim 17, further comprising at least one additional pesticide.

19. A herbicidal composition according to claim 18, wherein the additional pesticide is a herbicide or herbicide safener.

20. A method of controlling unwanted plant growth, comprising applying a compound of formula (I) as defined in claim 1, to the unwanted plants or to the locus thereof.

21. A method of controlling unwanted plant growth, comprising applying an herbicidal composition according to claim 17, to the unwanted plants or to the locus thereof.

22. A compound of Formula (I),

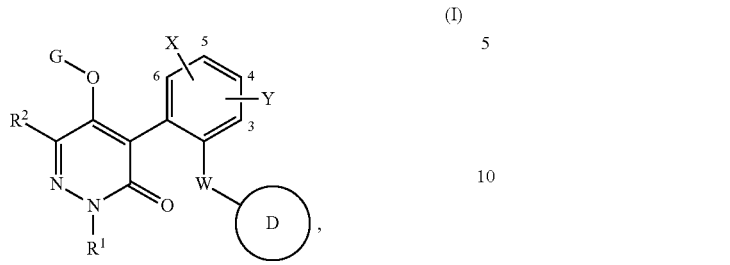

as defined in the below table

| # | R$^1$ | R$^2$ | G | X | Y | W | D |
|---|---|---|---|---|---|---|---|
| 1 | —Me | —Me | —H | 6-F | 3-Cl | —CH$_2$—CH$_2$— | 4-oxazol-5-ylphenyl- |
| 2 | —Me | —Me | —H | 6-F | 3-Cl | —CH$_2$—CH$_2$— | 4-acetamidophenyl- |
| 3 | —Me | —Me | —H | 6-F | 3-Cl | —CH$_2$—CH$_2$— | 4-(dimethylsulfamoyl)phenyl- |
| 4 | —Me | —Me | —H | 6-F | 3-Cl | —CH$_2$—CH$_2$— | 4-tert-butylphenyl- |
| 5 | —Me | —Me | —H | 6-F | 3-Cl | —CH$_2$—CH$_2$— | 4-biphenyl- |
| 6 | —Me | —Me | —H | 6-F | 3-Cl | —CH$_2$—CH$_2$— | 4-[ethyl(methyl)carbamoyl]-3-fluoro-phenyl- |
| 7 | —Me | —Me | —H | 6-F | 3-Cl | —CH$_2$—CH$_2$— | 2-cyanophenyl- |
| 8 | —Me | —Me | —H | 6-F | 3-Cl | —CH$_2$—CH$_2$— | 3-cyanophenyl- |
| 9 | —Me | —Me | —H | 6-F | 3-Cl | —CH$_2$—CH$_2$— | 4-amino-3-methylphenyl- |
| 10 | —Me | —Me | —H | 6-F | 3-Cl | —CH$_2$—CH$_2$— | 4-methylsulfonylphenyl- |
| 11 | —Me | —Me | —H | 6-F | 3-Cl | —CH$_2$—CH$_2$— | 4-dimethylaminophenyl- |
| 12 | —Me | —Me | —H | 6-F | 3-Cl | —CH$_2$—CH$_2$— | 4-methylaminophenyl- |
| 13 | —Me | —Me | —H | 6-F | 3-Cl | —CH$_2$—CH$_2$— | 4-tert-butoxyphenyl- |
| 14 | —Me | —Me | —H | 6-F | 3-Cl | —CH$_2$—CH$_2$— | 4-cyanophenyl- |
| 15 | —Me | —Me | —H | 6-F | 3-Cl | —CH$_2$—CH$_2$— | 4-hydroxyphenyl- |
| 16 | —Me | —Me | —H | 6-F | 3-Cl | —CH$_2$—CH$_2$— | 4-cyclopropylphenyl- |
| 17 | —Me | —Me | —H | 6-F | 3-Cl | —CH$_2$—CH$_2$— | 4-(methylsulfanyl)phenyl- |
| 18 | —Me | —Me | —H | 6-F | 3-Cl | —CH$_2$—CH$_2$— | 4-carboxyphenyl- |
| 19 | —Me | —Me | —H | 6-F | 3-Cl | —CH$_2$—CH$_2$— | 4-methoxycarbonylphenyl- |
| 20 | —Me | —Me | —H | 6-F | 3-Cl | —CH$_2$—CH$_2$— | 4-(tert-butoxycarbonylamino)-3-fluoro-phenyl- |
| 21 | —Me | —Me | —H | 6-F | 3-Cl | —CH$_2$—CH$_2$— | 2-(methylsulfanyl)-4-pyridyl- |
| 22 | —Me | —Me | —H | 6-F | 3-Cl | —CH$_2$—CH$_2$— | 2-acetamido-4-pyridyl- |
| 23 | —Me | —Me | —H | 6-F | 3-Cl | (E) —CH═CH— | 4-biphenyl- |
| 24 | —Me | —Me | —H | 6-F | 3-Cl | (E) —CH═CH— | 3-cyanophenyl- |
| 25 | —Me | —Me | —H | 6-F | 3-Cl | (E) —CH═CH— | 4-hydroxyphenyl- |
| 26 | —Me | —Me | —(C═O)iPr | 6-F | 3-Cl | —CH$_2$—CH$_2$— | 4-[ethyl(methyl)carbamoyl]-3-fluoro-phenyl- |
| 27 | —Me | —Me | —(C═O)iPr | 6-F | 3-Cl | —CH$_2$—CH$_2$— | 2-cyanophenyl- |
| 28 | —Me | —Me | —(C═O)iPr | 6-F | 3-Cl | —CH$_2$—CH$_2$— | 3-cyanophenyl- |
| 29 | —Me | —Me | —(C═O)iPr | 6-F | 3-Cl | —CH$_2$—CH$_2$— | 4-tert-butoxyphenyl- |
| 30 | —Me | —Me | —(C═O)iPr | 6-F | 3-Cl | —CH$_2$—CH$_2$— | 4-cyanophenyl- |
| 31 | —Me | —Me | —(C═O)iPr | 6-F | 3-Cl | —CH$_2$—CH$_2$— | 4-cyclopropylphenyl- |
| 32 | —Me | —Me | —(C═O)iPr | 6-F | 3-Cl | (E) —CH═CH— | 2-cyanophenyl- |
| 33 | —Me | —Me | —(C═O)iPr | 6-F | 3-Cl | (E) —CH═CH— | 3-cyanophenyl- |
| 34 | —Me | —Me | —(C═O)iPr | 6-F | 3-Cl | (E) —CH═CH— | 4-tert-butoxyphenyl- |
| 35 | —Me | —Me | —(C═O)iPr | 6-F | 3-Cl | (E) —CH═CH— | 4-cyanophenyl- |
| 36 | —Me | —Me | —H | 6-F | 3-Cl | —CH$_2$—CH$_2$— | 4-(1-methylpyrazol-3-yl)phenyl- |
| 37 | —Me | —Me | —H | 6-F | 3-Cl | —CH$_2$—CH$_2$— | 4-(5-methyltetrazol-1-yl)phenyl- |
| 38 | —Me | —Me | —H | 6-F | 3-Cl | —CH$_2$—CH$_2$— | 4-morpholinophenyl- |
| 39 | —Me | —Me | —H | 6-F | 3-Cl | —CH$_2$—CH$_2$— | 4-(3-methylpyrazol-1-yl)phenyl- |
| 40 | —Me | —Me | —H | 6-F | 3-Cl | —CH$_2$—CH$_2$— | 4-(3,5-dimethylpyrazol-1-yl)phenyl- |
| 41 | —Me | —Me | —H | 6-F | 3-Cl | —CH$_2$—CH$_2$— | 4-pyrazol-1-ylphenyl- |
| 42 | —Me | —Me | —H | 6-F | 3-Cl | —CH$_2$—CH$_2$— | 4-pyrrol-1-ylphenyl- |
| 43 | —Me | —Me | —H | 6-F | 3-Cl | —CH$_2$—CH$_2$— | 4-(5-methyltetrahydrofuran-2-yl)phenyl- |
| 44 | —Me | —Me | —H | 6-F | 3-Cl | —CH$_2$—CH$_2$— | 4-(5-methyl-2-furyl)phenyl- |
| 45 | —Me | —Me | —H | 6-F | 3-Cl | —CH$_2$—CH$_2$— | 4-oxazol-2-ylphenyl- |
| 46 | —Me | —Me | —H | 6-F | 3-Cl | —CH$_2$—CH$_2$— | 4-(2-methylthiazol-4-yl)phenyl- |
| 47 | —Me | —Me | —H | 6-F | 3-Cl | —CH$_2$—CH$_2$— | 4-(2-thienyl)phenyl- |
| 48 | —Me | —Me | —H | 6-F | 3-Cl | —CH$_2$—CH$_2$— | 1-phenyl-4-pyrazolyl- |
| 49 | —Me | —Me | —H | 6-F | 3-Cl | —CH$_2$—CH$_2$— | 1-cyclopropyl-4-pyrazolyl- |
| 50 | —Me | —Me | —H | 6-F | 3-Cl | —CH$_2$—CH$_2$— | 4-(isopropylsulfanylmethyl)phenyl- |
| 51 | —Me | —Me | —H | 6-F | 3-Cl | —CH$_2$—CH$_2$— | 4-(methylsulfamoyl)phenyl- |
| 52 | —Me | —Me | —H | 6-F | 3-Cl | —CH$_2$—CH$_2$— | 4-sulfamoylphenyl- |
| 53 | —Me | —Me | —H | 6-F | 3-Cl | —CH$_2$—CH$_2$— | 4-carbamoylphenyl- |

23. A compound of formula (I)

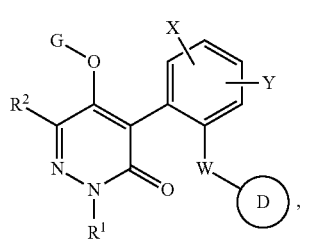

or a salt or N-oxide thereof, wherein
$R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$alkyl, $C_2$-$C_4$alkenyl, $C_1$-$C_4$haloalkyl, cyano-$C_1$-$C_4$alkyl, $C_2$-$C_6$haloalkenyl, $C_2$-$C_6$alkynyl and $C_2$-$C_4$haloalkynyl;
$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl-, $C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$ $C_1$-$C_6$alkyl, amino, $C_1$-$C_6$alkylamino, $C_1$-$C_6$dialkylamino, —C($C_1$-$C_3$alkyl)=N—O—$C_1$-$C_3$alkyl and $C_2$-$C_6$ haloalkynyl;
G is hydrogen, or C(O)$R^3$;
$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;
each $R^4$ and $R^5$ are independently selected from the group consisting of hydrogen, $C_1$-$C_6$ alkyl, $C_1$-$C_6$alkoxy, and $C_3$-$C_6$cycloalkyl, or $R^4$ and $R^5$ together can form a morpholinyl ring; and,
each $R^{4a}$ and $R^{5a}$ are independently selected from the group consisting of $C_1$-$C_6$alkoxy, and $C_3$-$C_6$cycloalkyl, or $R^{4a}$ and $R^{5a}$ together can form a morpholinyl ring; and,
$R^6$ is selected from the group consisting of halogen, cyano, nitro, $C_1$-$C_3$alkyl, $C_1$-$C_3$haloalky, $C_1$-$C_3$alkoxy and $C_1$-$C_3$haloalkoxy;
X and Y are each independently hydrogen, $C_1$-$C_3$ alkyl, cyclopropyl, $C_1$-$C_3$ alkoxy, $C_1$-$C_3$haloalkyl, $C_1$-$C_3$haloalkoxy, or halogen;
D is a substituted monocyclic heteroaryl ring containing 1, 2, or 3 heteroatoms independently selected from oxygen, nitrogen and sulphur, substituted on at least one ring carbon atom with $R^8$ and/or on at least one ring nitrogen atom with $R^9$;
at least one $R^8$ is selected from the group consisting of $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^{4a}$R$^{5a}$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alky- lcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalky- lsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino-, $C_1$-$C_6$haloalkoxyamino, $C_1$-$C_6$haloalkoxy($C_1$-$C_6$alkyl)amino; and a ring system selected from the group consisting of a phenyl ring, a 5-6-membered heteroaryl ring and a 3-6-membered heterocyclyl ring, wherein said ring system is substituted by 0 to 5 $R^{16}$;
at least one $R^9$ is selected from the group consisting of $C_5$-$C_6$alkyl, $C_5$-$C_6$haloalkyl, $C_3$-$C_6$-cycloalkyl, $C_1$-$C_3$alkoxy-$C_3$alkyl-, $C_3$alkoxy-$C_1$-$C_2$alkyl-, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, and a ring system selected from the group consisting of: a phenyl ring, a 5-6-membered heteroaryl ring and a 3-6-membered heterocyclyl ring, wherein said ring system is substituted by 0 to 5 $R^{16}$;
Any further $R^8$ substituent may be selected from the group consisting of oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, NR$^4$R$^5$, —C(S)NR$^4$R$^5$, —S(O)$_2$NHC(O)$C_1$-$C_3$alkyl, —S(O)$_2$NR$^4$R$^5$, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alky- lcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, —NR$^4$C(O)NR$^4$R$^5$, $C_1$-$C_6$alkylsulfonylamino-, $C_1$-$C_6$alkylsulfonyl($C_1$-$C_6$alkyl)amino-, $C_1$-$C_6$hal- oalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl) amino; or a ring system selected from the group consisting: of a phenyl ring, a 5-6-membered heteroaryl ring and a 3-6-membered heterocyclyl ring, wherein said ring system is substituted by 0 to 5 $R^{16}$, wherein m, $R^4$, $R^5$ and $R^{16}$ are as defined herein;
m is an integer of 0, 1, or 2;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy;
or D is a phenyl ring substituted by at least one $R^8$;
and,
W is either

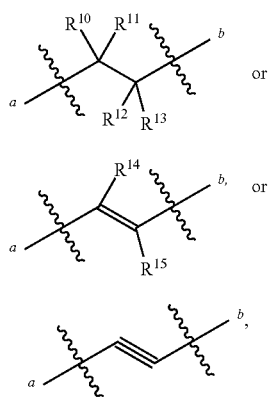

wherein:
"a" denotes the point of attachment to the phenyl-pyridazine dione/phenyl-pyridazinone moiety,
"b" denotes the point of attachment to ring D,
$R^{10}$, $R^{12}$, $R^{14}$ and $R^{15}$ are each independently hydrogen, $C_1$-$C_3$alkyl, or $C_1$-$C_3$haloalkyl;
or $R^{10}$ and $R^{12}$ together with the carbon atoms to which they are joined forma a $C_3$-$C_6$ carbocyclic ring; and
$R^{11}$ and $R^{13}$ are each independently hydrogen, halogen, $C_1$-$C_3$alkyl, or $C_1$-$C_3$haloalkyl;
provided that when one of $R^{11}$ or $R^{13}$ is halogen, $C_1$-$C_3$alkyl or $C_1$-$C_3$haloalkyl, the other is hydrogen.

24. The compound of claim 23, wherein
$R^1$ is methyl;
$R^2$ is methyl;
G is hydrogen or —C(O)—$R^3$, wherein $R^3$ is isopropyl;
X is fluoro and is ortho with respect to pyridazinone/pyridazine-dione moiety;
Y is chloro and ortho with respect to the —W-D moiety;
D is a phenyl ring substituted by one $R^8$ selected from the group consisting of methylsulfanylmethyl, isopropylsulfanylmethyl, sulfamoyl, methylsulfamoyl and carbamoyl; or a ring system selected from the group consisting: of a phenyl, morpholinyl, tetrahydrofuranyl, furyl, thienyl, pyrrolyl, pyrazolyl, 1,2,4-triazolyl, oxazolyl and a thiazolyl ring, wherein said ring system is substituted by 0 to 2 $R^{16}$;
each $R^{16}$ is methyl;
W is W1; and
$R^{10}$, $R^{11}$, $R^{12}$, and $R^{13}$ are all hydrogen.

25. The compound of claim 23, wherein
$R^1$ is methyl;
$R^2$ is methyl;
G is hydrogen or —C(O)—$R^3$, wherein $R^3$ is isopropyl;
X is fluoro and is ortho with respect to pyridazinone/pyridazine-dione moiety;
Y is chloro and ortho with respect to the —W-D moiety;
D is a pyrazolyl or pyridyl substituted either on a ring carbon by one $R^8$ selected from the group consisting of methylsulfanylmethyl, isopropylsulfanylmethyl, sulfamoyl, methylsulfamoyl and carbamoyl; or a ring system selected from the group consisting: of a phenyl, morpholinyl, tetrahydrofuranyl, furyl, thienyl, pyrrolyl, pyrazolyl, 1,2,4-triazolyl, oxazolyl and a thiazolyl ring, wherein said ring system is substituted by 0 to 2 $R^{16}$, and/or D will be substituted on a ring nitrogen by one $R^9$ selected from cyclopropyl or phenyl;
each $R^{16}$ is methyl;
W is W1; and
$R^{10}$, $R^{11}$, $R^{12}$, and $R^{13}$ are all hydrogen.

* * * * *